(12) United States Patent
Carey, II et al.

(10) Patent No.: US 6,861,159 B2
(45) Date of Patent: Mar. 1, 2005

(54) CORROSION-RESISTANT COATED COPPER AND METHOD FOR MAKING THE SAME

(75) Inventors: Jay F. Carey, II, Follansbee, WV (US); Mehrooz Zamanzadeh, Pittsburgh, PA (US)

(73) Assignee: The Louis Berkman Company, Stuebenville, OH (US)

( * ) Notice: Subject to any disclaimer, the term of this patent is extended or adjusted under 35 U.S.C. 154(b) by 152 days.

(21) Appl. No.: 10/254,824

(22) Filed: Sep. 24, 2002

(65) Prior Publication Data

US 2003/0196732 A1 Oct. 23, 2003

Related U.S. Application Data

(60) Continuation-in-part of application No. 10/144,128, filed on May 10, 2002, now abandoned, which is a continuation of application No. 09/634,828, filed on Aug. 9, 2000, now (List continued on next page.)

(51) Int. Cl.$^7$ .............................................. B32B 15/20
(52) U.S. Cl. ..................... 428/647; 428/658; 428/939
(58) Field of Search ................................ 428/647, 658, 428/648, 646, 659, 939

(56) References Cited

U.S. PATENT DOCUMENTS

| | | |
|---|---|---|
| 84,205 A | 11/1868 | Mills |
| 169,810 A | 11/1875 | Holden |
| 347,928 A | 8/1886 | Farmer |
| 616,613 A | 12/1898 | Griffith |
| 863,058 A | 8/1907 | Ellis |
| 941,835 A | 11/1909 | Wirgovits |
| 1,156,169 A | 10/1915 | Monnot |
| 1,239,785 A | 9/1917 | Gardiner |
| 1,939,925 A | 2/1933 | Hoover |
| 2,004,372 A | 6/1935 | Luschenowsky |

(List continued on next page.)

FOREIGN PATENT DOCUMENTS

| | | |
|---|---|---|
| CA | 674003 | 11/1963 |
| DE | 139925 | 12/1934 |
| DE | 2713196 | 10/1978 |
| DE | 4309500 | 9/1993 |
| EP | 12437 | 6/1979 |
| EP | 261078 | 9/1987 |
| EP | 269006 | 11/1987 |
| EP | 0 413 261 A2 | 2/1991 |
| EP | 480122 | 4/1992 |
| EP | 0 763 608 A1 | 3/1997 |

(List continued on next page.)

OTHER PUBLICATIONS

Standard Specification for Solder Metal; American Society for Testing and Materials; pp. 1 & 9, Nov. 1986.
Soldering Manual; American Welding Society; 1959; pp. 21–23.
The Making, Shaping, and Treating of Steel, U.S. Steel Corporation, 1957, pp. 655–659.
Constitution of Binary Alloys; McGraw–Hill Book Company; 1958; pp. 1217–1219.

(List continued on next page.)

*Primary Examiner*—John J. Zimmerman
(74) *Attorney, Agent, or Firm*—Fay, Sharpe, Fagan, Minnich & McKee

(57) ABSTRACT

A corrosion-resistant coated base metal coated with a corrosion resistant alloy. The corrosion resistant alloy includes tin and zinc. The corrosion resistant coated base metal includes a heat created intermetallic layer primarily including copper and zinc.

44 Claims, 10 Drawing Sheets

Related U.S. Application Data abandoned, which is a continuation-in-part of application No. 08/929,623, filed on Sep. 15, 1997, now abandoned, which is a continuation-in-part of application No. 08/604,074, filed on Feb. 20, 1996, now Pat. No. 5,667,849, which is a division of application No. 08/551,456, filed on Nov. 1, 1995, now Pat. No. 5,616,424, which is a division of application No. 08/402,925, filed on Mar. 13, 1995, now Pat. No. 5,491,036, which is a continuation-in-part of application No. 08/165,085, filed on Dec. 10, 1993, now Pat. No. 5,397,652, which is a continuation-in-part of application No. 08/000,101, filed on Jan. 4, 1993, now abandoned, which is a continuation-in-part of application No. 07/858,662, filed on Mar. 27, 1992, now Pat. No. 5,314,758, application No. 10/254,824, which is a continuation-in-part of application No. 10/144,128, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/260,333, filed on Jun. 15, 1994, now Pat. No. 5,429,882, which is a continuation-in-part of application No. 08/209,400, filed on Mar. 14, 1994, now abandoned, which is a continuation-in-part of application No. 08/175,523, filed on Dec. 30, 1993, now Pat. No. 5,401,586, which is a continuation-in-part of application No. 08/154,376, filed on Nov. 17, 1993, now abandoned, which is a continuation of application No. 08/042,649, filed on Apr. 5, 1993, now abandoned, application No. 10/254,824, which is a continuation-in-part of application No. 10/144,128, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/341,365, filed on Nov. 17, 1994, now Pat. No. 5,489,490, which is a continuation-in-part of application No. 08/175,523, which is a continuation-in-part of application No. 08/154,376, which is a continuation of application No. 08/042,649, application No. 10/254,824, which is a continuation-in-part of application No. 10/144,128, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/347,261, filed on Nov. 30, 1994, now Pat. No. 5,491,035, which is a continuation-in-part of application No. 08/175,523, which is a continuation-in-part of application No. 08/154,376, which is a continuation of application No. 08/042,649, application No. 10/254,824, which is a continuation-in-part of application No. 10/144,128, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/175,523, which is a continuation-in-part of application No. 08/154,376, which is a continuation of application No. 08/042,649, application No. 10/254,824, which is a continuation-in-part of application No. 10/144,128, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/373,533, filed on Jan. 17, 1995, now Pat. No. 5,455,122, which is a continuation of application No. 08/254,875, filed on Jun. 6, 1994, now abandoned, which is a division of application No. 08/209,400, which is a continuation-in-part of application No. 08/175,523, which is a continuation-in-part of application No. 08/154,376, which is a continuation of application No. 08/042,649, application No. 10/254,824, which is a continuation-in-part of application No. 10/144,128, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/338,337, filed on Nov. 14, 1904, now abandoned, which is a division of application No. 08/229,097, filed on Apr. 18, 1994, now Pat. No. 5,395,702, which is a continuation of application No. 08/000,101, which is a continuation-in-part of application No. 07/858,662, application No. 10/254,824, which is a continuation-in-part of application No. 10/144,128, which is a continuation of application No. 09/634,828, which is a continuation of application No. 08/929,623, which is a continuation-in-part of application No. 08/604,078, filed on Feb. 20, 1996, now Pat. No. 5,695,822, which is a division of application No. 08/438,042, filed on May 8, 1995, now Pat. No. 5,597,656, which is a continuation-in-part of application No. 08/338,386, filed on Nov. 14, 1994, now Pat. No. 5,470,667, which is a continuation of application No. 08/175,523, which is a continuation-in-part of application No. 08/154,376, which is a continuation of application No. 08/042,649, application No. 10/254,824, which is a continuation-in-part of application No. 10/144,128, which is a continuation of application No. 09/634,828, which is a continuation-in-part of application No. 08/929,623, which is a continuation-in-part of application No. 08/604,078, which is a division of application No. 08/438,042, which is a continuation-in-part of application No. 08/260,333, which is a continuation-in-part of application No. 08/209,400, which is a continuation-in-part of application No. 08/175,523, which is a continuation-in-part of application No. 08/154,376, which is a continuation of application No. 08/042,649, application No. 10/254,824, which is a continuation-in-part of application No. 10/144,128, which is a continuation of application No. 09/634,828, which is a continuation-in-part of application No. 08/929,623, which is a continuation-in-part of application No. 08/604,078, which is a division of application No. 08/438,042, which is a continuation-in-part of application No. 08/341,365, which is a continuation-in-part of application No. 08/175,523, which is a continuation-in-part of application No. 08/154,376, which is a continuation of application No. 08/042,649, application No. 10/254,824, which is a continuation-in-part of application No. 10/144,128, which is a continuation of application No. 09/634,828, which is a continuation-in-part of application No. 08/929,623, which is a continuation-in-part of application No. 08/604,078, which is a division of application No. 08/438,042, which is a continuation-in-part of application No. 08/347,261, which is a continuation-in-part of application No. 08/175,523, which is a continuation-in-part of application No. 08/154,376, which is a continuation of application No. 08/042,649, application No. 10/254,824, which is a continuation-in-part of application No. 10/144,128, which is a continuation of application No. 09/634,828, which is a continuation-in-part of application No. 08/980,985, filed on Oct. 20, 1997, now abandoned, which is a continuation of application No. 08/636,179, filed on Apr. 22, 1996, now abandoned, which is a continuation-in-part of application No. 08/551,456, filed on Nov. 1, 1995, now Pat. No. 5,616,424, which is a division of application No. 08/402,925, which is a continuation-in-part of application No. 08/380,372, filed on Jan. 30, 1995, now Pat. No. 5,480,731, which is a continuation of application No. 08/153,026, filed on Nov. 17, 1993, now Pat. No. 5,395,703, which is a division of application No. 07/858,662, application No. 10/254,824, which is a continuation-in-part of application No. 10/144,128, which is a continuation of application No. 09/634,828, which is a continuation-in-part of application No. 09/071,316, filed on May 1, 1998, now Pat. No. 6,080,497, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/165,085, which is a continuation-in-part of application No. 08/000,101, which is a continuation-in-part of application No. 07/967,407, filed on Oct. 26, 1992, now abandoned, which is a continuation-in-part of application No. 07/913,209, filed on Jul. 15, 1992, now abandoned, which is a continuation-in-part of application No. 07/858,662, application No. 10/254,824, which is a continuation-in-part of application No. 10/144,128, which is a continuation of application No. 09/634,828, which is a continuation-in-part of application No. 09/100,578, filed on Jun. 19, 1998, now abandoned, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/380,372, which is a continuation of application No. 08/153,026, which is a division of application No. 07/858,662, application No. 10/254,824, which is a continuation-in-part of application No. 10/144,128, which is a continuation of application No. 09/634,828, which is a continuation-in-part of application No. 09/131,219, filed on Aug. 7, 1998, now abandoned, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/380,372, which is a continuation of application No. 08/153,026, which is a division of application No. 07/858,662, application No. 10/254,824, which is a continuation-in-part of application No. 10/144,128, which is a continuation of application No. 09/634,828, which is a continuation-in-part of application No. 09/161,573, filed on Sep. 28, 1998, now abandoned, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/380,372, which is a continuation of application No. 08/153,026, which is a division of application No. 07/858,662, application No. 10/254,824, which is a continuation-in-part of application No. 10/144,128, which is a continuation of application No. 09/634,828, which is a continuation-in-part of application No. 09/161,580, filed on Sep. 28, 1998, now abandoned, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/380,372, which is a continuation of application No. 08/153,026, which is a division of application No. 07/858,662, application No. 10/254,824, which is a continuation-in-part of application No. 10/144,128, which is a continuation of application No. 09/634,828, which is a continuation-in-part of application No. 09/420,165, filed on Oct. 18, 1999, now abandoned, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/380,372, which is a continuation of application No. 08/153,026, which is a division of application No. 07/858,662.

U.S. PATENT DOCUMENTS

| | | |
|---|---|---|
| 2,069,658 A | 2/1937 | Renkin |
| 2,210,593 A | 11/1940 | McCullough |
| 2,233,578 A | 3/1941 | Boek |
| 2,252,414 A | 8/1941 | Riesmeyer |
| 2,258,327 A | 10/1941 | Kramer |
| 2,374,926 A | 5/1945 | Fink |
| 2,472,402 A | 6/1949 | Boyle |
| 2,533,048 A | 12/1950 | Rodgers |
| 2,703,766 A | 3/1955 | Ellis |
| 2,806,622 A | 9/1957 | Leirer |
| 2,863,766 A | 12/1958 | Larkins |
| 2,864,733 A | 12/1958 | Kranich |
| 2,884,350 A | 4/1959 | Saubestre |
| 3,012,310 A | 12/1961 | Godfrey |
| 3,058,856 A | 10/1962 | Miller |
| 3,105,022 A | 9/1963 | Boggs |
| 3,231,127 A | 1/1966 | Virzi |
| 3,331,230 A | 7/1967 | Bentz |
| 3,630,792 A | 12/1971 | Smyth |
| 3,728,144 A | 4/1973 | Poucke |
| 3,791,801 A | 2/1974 | Ariga et al. |
| 3,860,438 A | 1/1975 | Shoemaker |

| | | | | | |
|---|---|---|---|---|---|
| 3,962,501 A | 6/1976 | Ohbu et al. | 5,520,964 A | 5/1996 | Carey, II et al. |
| 3,966,564 A | 6/1976 | Hyner et al. | 5,597,656 A | 1/1997 | Carey et al. |
| 4,015,950 A | 4/1977 | Galland et al. | 5,614,328 A | 3/1997 | Suzuki et al. |
| 4,026,728 A | 5/1977 | Yoshida et al. | 5,616,424 A | 4/1997 | Carey et al. |
| 4,045,869 A | 9/1977 | Hartmann et al. | 5,666,644 A | 9/1997 | Tanaka et al. |
| 4,049,481 A | 9/1977 | Morisaki | 5,667,849 A | 9/1997 | Carey, II et al. |
| 4,082,591 A * | 4/1978 | Morisaki et al. ............ 156/150 | 5,695,822 A | 12/1997 | Carey et al. |
| 4,126,450 A | 11/1978 | Lathrop et al. | 5,755,950 A | 5/1998 | Bell |
| 4,152,471 A | 5/1979 | Schnedler et al. | 5,827,618 A | 10/1998 | Oyagi et al. |
| 4,173,663 A | 11/1979 | Bostroem | 5,916,695 A | 6/1999 | Fister et al. |
| 4,177,326 A | 12/1979 | Windal et al. | 6,080,497 A | 6/2000 | Carey, II et al. |
| 4,184,928 A | 1/1980 | Hoije | | | |
| 4,190,504 A | 2/1980 | Usui | | FOREIGN PATENT DOCUMENTS | |
| 4,202,921 A | 5/1980 | Enghag | ES | 40-6969 | 4/1965 |
| 4,216,250 A | 8/1980 | Nakayama et al. | FR | 704909 | 5/1931 |
| 4,321,289 A | 3/1982 | Bartsch | FR | 746337 | 5/1933 |
| 4,330,574 A | 5/1982 | Pierson et al. | FR | 1130210 | 4/1955 |
| 4,339,284 A | 7/1982 | Hasimoto et al. | FR | 1457769 | 9/1966 |
| 4,357,027 A | 11/1982 | Zeitlow | FR | 2052324 | 3/1971 |
| 4,413,039 A | 11/1983 | Higuchi et al. | FR | 2314949 | 4/1974 |
| 4,416,920 A | 11/1983 | Pierson et al. | FR | 2281995 | 8/1974 |
| 4,441,118 A | 4/1984 | Fister et al. | FR | 2514673 | 4/1983 |
| 4,451,541 A | 5/1984 | Beal | FR | 2554831 | 5/1985 |
| 4,461,679 A | 7/1984 | Higuchi et al. | FR | 2 689 142 | 12/1994 |
| 4,576,657 A | 3/1986 | Satoh et al. | FR | 2 714 677 | 4/1996 |
| 4,599,279 A | 7/1986 | Mirra et al. | FR | 2 721 327 | 11/1996 |
| 4,695,428 A | 9/1987 | Ballentine et al. | FR | 2 713 665 | 1/1999 |
| 4,713,144 A | 12/1987 | Schiller | GB | 2812 | of 1857 |
| 4,731,301 A | 3/1988 | Higuchi et al. | GB | 131299 | 8/1919 |
| 4,758,407 A | 7/1988 | Ballentine et al. | GB | 228995 | 2/1925 |
| 4,778,733 A | 10/1988 | Lubrano et al. | GB | 237224 | 12/1925 |
| 4,806,309 A | 2/1989 | Tulman | GB | 244523 | 12/1925 |
| 4,814,049 A | 3/1989 | Helton et al. | GB | 528558 | 10/1932 |
| 4,862,825 A | 9/1989 | Fontaine | GB | 546179 | 7/1942 |
| 4,879,096 A | 11/1989 | Vaton | GB | 581604 | 10/1946 |
| 4,883,723 A | 11/1989 | Kilbane et al. | GB | 601029 | 4/1948 |
| 4,934,120 A | 6/1990 | Boyd | GB | 626826 | 7/1949 |
| 4,946,748 A | 8/1990 | Higuchi et al. | GB | 629425 | 9/1949 |
| 4,969,980 A | 11/1990 | Yoshioka et al. | GB | 642122 | 8/1950 |
| 4,987,716 A | 1/1991 | Boyd | GB | 707765 | 4/1954 |
| 4,999,258 A | 3/1991 | Wake et al. | GB | 709163 | 5/1954 |
| 5,017,267 A | 5/1991 | Cordani | GB | 786651 | 11/1957 |
| 5,023,113 A | 6/1991 | Boston et al. | GB | 796128 | 6/1958 |
| 5,035,749 A | 7/1991 | Haruta et al. | GB | 927530 | 5/1963 |
| 5,049,202 A | 9/1991 | Willis et al. | GB | 1008316 | 10/1965 |
| 5,053,112 A | 10/1991 | Jones et al. | GB | 1040916 | 9/1966 |
| 5,063,117 A * | 11/1991 | Suda et al. ................ 428/610 | GB | 1074852 | 7/1967 |
| 5,094,813 A | 3/1992 | Kale | GB | 1143107 | 2/1969 |
| 5,114,799 A | 5/1992 | Wake et al. | GB | 1178816 | 1/1970 |
| 5,134,039 A | 7/1992 | Alexander et al. | GB | 1194751 | 6/1970 |
| 5,175,026 A | 12/1992 | Bertol et al. | GB | 1277523 | 6/1972 |
| 5,202,002 A | 4/1993 | Tsuchinaga et al. | GB | 1361942 | 7/1974 |
| 5,203,985 A | 4/1993 | Nishimura et al. | GB | 1419534 | 12/1975 |
| 5,272,849 A | 12/1993 | Zahner, III | GB | 1439774 | 6/1976 |
| 5,314,758 A | 5/1994 | Carey, II et al. | GB | 1448662 | 9/1976 |
| 5,354,624 A | 10/1994 | Carey, II | GB | 1513002 | 6/1978 |
| 5,395,702 A | 3/1995 | Carey, II et al. | GB | 1517454 | 7/1978 |
| 5,395,703 A | 3/1995 | Carey, II et al. | GB | 2005307 | 4/1979 |
| 5,397,652 A | 3/1995 | Carey, II et al. | GB | 2030176 * | 4/1980 |
| 5,401,586 A | 3/1995 | Carey, II et al. | GB | 2055158 | 2/1981 |
| 5,429,882 A | 7/1995 | Carey, II et al. | GB | 2055402 | 3/1981 |
| 5,433,839 A | 7/1995 | Amelot et al. | GB | 1588808 | 4/1981 |
| 5,455,122 A | 10/1995 | Carey et al. | GB | 2099857 | 1/1982 |
| 5,470,667 A | 11/1995 | Carey, II et al. | GB | 2087931 | 6/1982 |
| 5,480,731 A | 1/1996 | Carey, II et al. | GB | 2117414 | 10/1983 |
| 5,489,490 A | 2/1996 | Carey, II et al. | GB | 2242696 | 10/1991 |
| 5,491,035 A | 2/1996 | Carey, II et al. | GB | 2265389 | 9/1993 |
| 5,491,036 A | 2/1996 | Carey, II et al. | GB | 2276887 | 10/1994 |
| 5,492,772 A | 2/1996 | Carey, II et al. | GB | 2 288 410 | 10/1995 |
| 5,492,776 A | 2/1996 | Paz-Pujalt et al. | GB | 2 289 691 | 11/1995 |
| 5,496,652 A | 3/1996 | Sasaki et al. | JP | 4218219 | 9/1967 |

| | | |
|---|---|---|
| JP | 4934230 | 5/1974 |
| JP | 55-158825 | 12/1980 |
| JP | 56-69340 | 6/1981 |
| JP | 5848694 | 3/1983 |
| JP | 5864498 | 4/1983 |
| JP | 58221283 | 12/1983 |
| JP | 5941430 | 3/1984 |
| JP | 5996238 | 6/1984 |
| JP | 60208465 | 10/1985 |
| JP | 61-16428 | 4/1986 |
| JP | 61-270391 | 11/1986 |
| JP | 62-230987 | 10/1987 |
| JP | 62-230988 | 10/1987 |
| JP | 63-153253 | 6/1988 |
| JP | 63-66916 | 12/1988 |
| JP | 64-24946 | 1/1989 |
| JP | 1259153 | 10/1989 |
| JP | 4-214848 | 8/1992 |
| JP | 4247860 | 9/1992 |
| JP | 8-3711 | 1/1996 |
| JP | 8-269733 | 10/1996 |
| JP | 8-269734 | 10/1996 |
| JP | 8-269735 | 10/1996 |
| JP | 08-325692 | 12/1996 |
| JP | 09-003658 | 1/1997 |
| JP | 09-071879 | 3/1997 |
| JP | 10-18054 | 1/1998 |
| SU | 386733 | 6/1973 |
| SU | 640831 | 1/1979 |
| WO | 96/30560 | 10/1996 |

OTHER PUBLICATIONS

Metal Handbook, 10th Ed.; vol. 2, Properties and Selection; Nonferrous Alloys and Special–Purpose Materials; ASM; pp. 1166–1168; Oct. 1990.

Design for Metal Spinning; Tin–Zinc Alloy Coatings; Materials and Methods; pp. 1248, 1250; Jul. 1946.

"Tin–Zinc Alloy Coatings", Materials and Methods, pp. 1248–1250, Jul. 1946.

Federal Specification QQ–T–201F, Nov. 12, 1986, "Teme Plate, for Roofing and Roofing Products", pp. 1–8.

Hot Dip Tin Coating of Steel and Cast Iron, Metals Handbook; 9th Ed., vol. 5, 1983, pp. 351–355.

"Handbook of Stainless Steels", McGraw–Hill Book Company, Chapter 35 "The Cleaning of Stainless Steels", 35–1 –35–16, 1977.

Metals Handbook Ninth Edition, vol. 5, Surface Cleaning, Finishing, and Coating, "Pickling of Iron and Steel", pp. 68–82; "Hot Dip Galvanized Coatings", pp. 323–332; "Hot Dip Tin Coating of Steel and Cast Iron", pp. 351–355; "Hot Dip Lead Alloy Coating of Steel", pp. 358–360; "Cleaning and Finishing of Stainless Steel", pp. 551–554; Oct. 1982.

*Metals Handbook*, The American Society for Metals, "Metallic Coatings", pp. 703–721; "Surface Treatments", pp. 725–732; "Tin and Tin Alloys", pp. 1063–1076; "Zinc and Zinc Alloys", pp. 1077–1092, 1958.

Van Nostrand's Scientific Encyclopedia, 6th Edition, vol. 1, 1983; pp. 94–96—Definition of "Alloys", p–1322—Definition of "Galvanizing".

Van Nostrand's Scientific Encyclopedia, 6th Edition, vol. 11, 1983; pp. 2832–2834—Definition of "Tin"; pp. 3059–3062—Definition of "Zinc".

McGraw–Hill Encyclopedia of Science and Technology, 6th Edition, 1987, p. 517.

McGraw–Hill Encyclopedia of Science & Technology, 6th Edition, 1987, pp. 35–37; pp. 44–46.

McGraw–Hill Encyclopedia of Science & Technology, 6th Edition, 1987, pp. 368–372.

McGraw–Hill Encyclopedia of Science & Technology, 6th Edition, 1987, pp. 618–623.

Great Britain Search Report dated May 22, 1995, for GB Application 9504712.2.

* cited by examiner

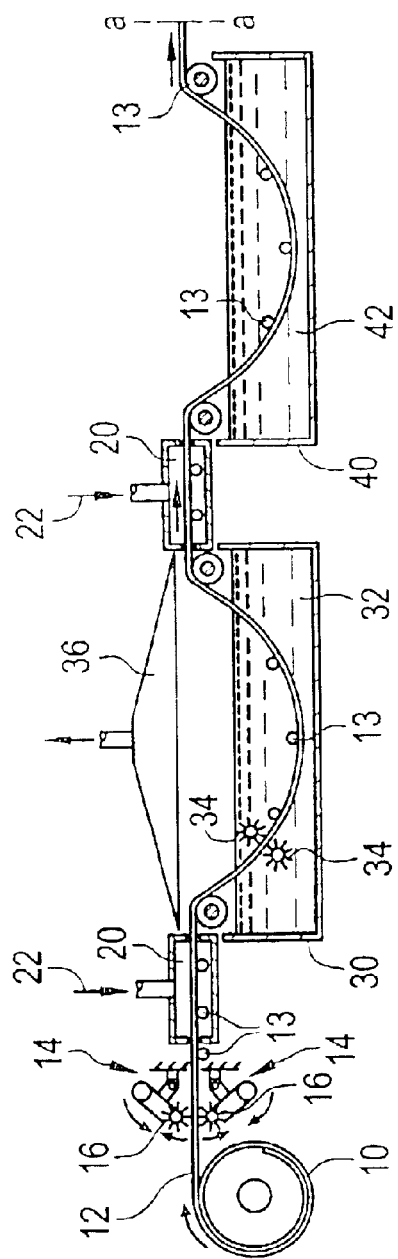
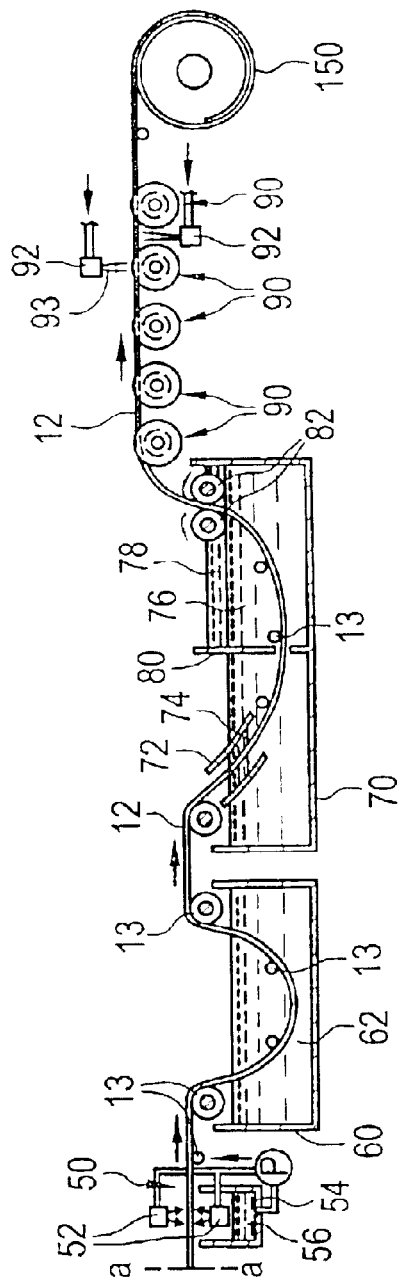

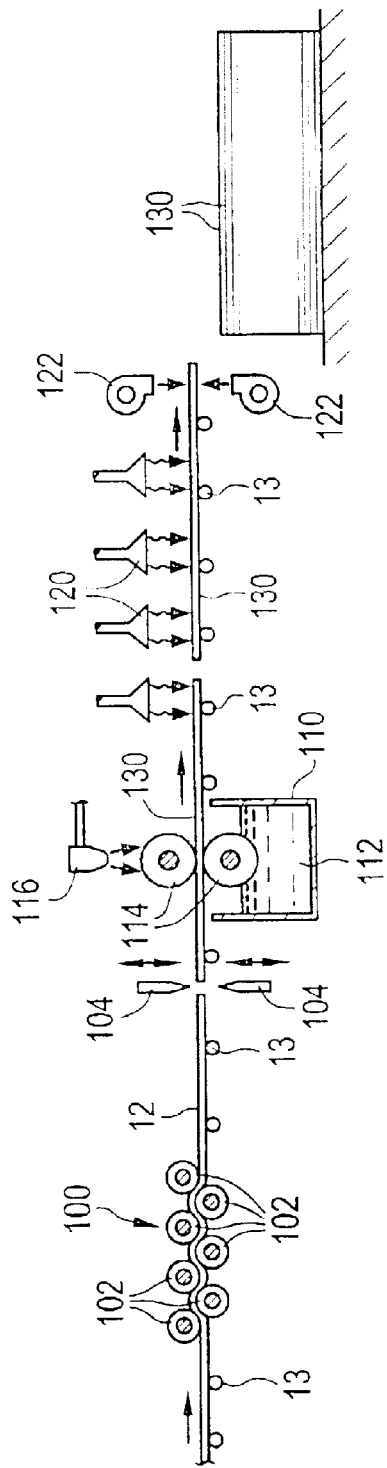
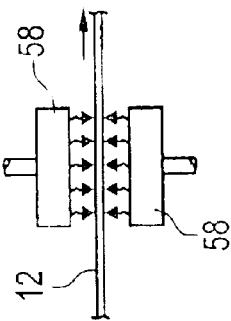
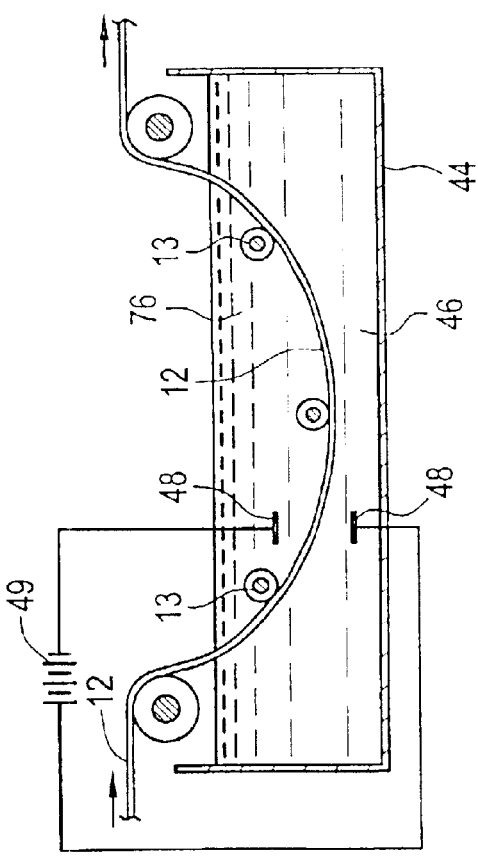
FIG. 2
FIG. 4
FIG. 3

FIG. 16
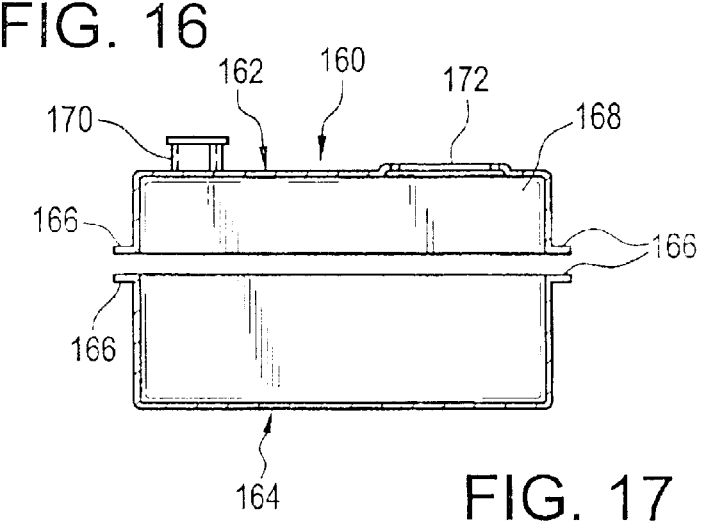
FIG. 17
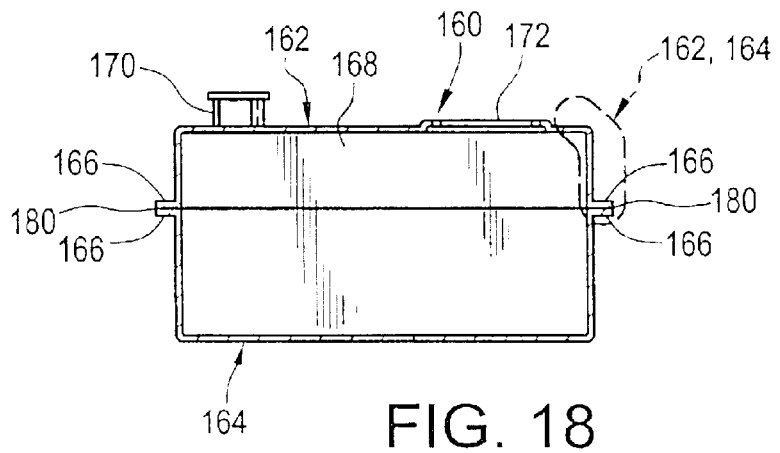
FIG. 18
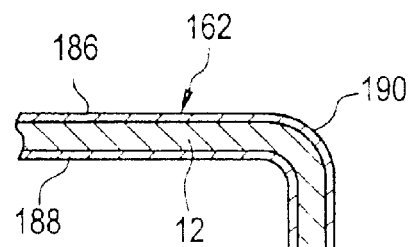
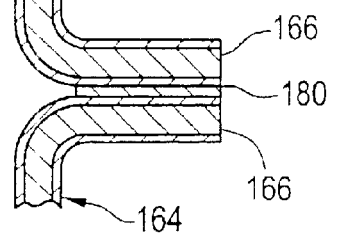

CORROSION-RESISTANT COATED COPPER AND METHOD FOR MAKING THE SAME

This patent application is a continuation-in-part of co-pending Ser. No. 10/144,128 filed May 10, 2002, now abandoned, which in turn is a continuation of Ser. No. 09/634,828 filed Aug. 9, 2000, now abandoned, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/165,085 filed Dec. 10, 1993, now U.S. Pat. No. 5,397,652, which in turn is a continuation-in-part of Ser. No. 08/000,101 filed Jan. 4, 1993, now abandoned, which in turn is a continuation-in-part of Ser. No. 07/858,662 filed Mar. 27, 1992, now U.S. Pat. No. 5,314,758.

This patent application is also a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/260,333 filed Jun. 15, 1994, now U.S. Pat. No. 5,429,882, which in turn is a continuation-in-part of Ser. No. 08/209,400 filed Mar. 14, 1994, now abandoned, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is further a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/341,365 filed Nov. 17, 1994, now U.S. Pat. No. 5,489,490, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is still further a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/347,261 filed Nov. 30, 1994, now U.S. Pat. No. 5,491,035, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is yet further a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is also a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/373,533 filed Jan. 17, 1995, now U.S. Pat. No. 5,455,122, which in turn is a continuation of Ser. No. 08/254,875 filed Jun. 6, 1994, now abandoned, which in turn is a divisional of Ser. No. 08/209,400 filed Mar. 14, 1994, now abandoned, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is further a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/338,337 filed Nov. 14, 1994, now abandoned, which in turn is a divisional of 08/229,097 filed Apr. 18, 1994, now U.S. Pat. No. 5,395,702, which in turn is a continuation of Ser. No. 08/000,101 filed Jan. 4, 1993, now abandoned, which in turn is a continuation-in-part of Ser. No. 07/858,662 filed Mar. 27, 1992, now U.S. Pat. No. 5,314,758.

This patent application is yet further a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 08/929,623 filed Sep. 15, 1997, now abandoned, which in turn is a continuation-in-part of Ser. No. 08/604,078 filed Feb. 20, 1996, now U.S. Pat. No. 5,695,822, which in turn is a divisional of Ser. No. 08/438,042 filed May 8, 1995, now U.S. Pat. No. 5,597,656, which in turn is a continuation-in-part of Ser. No. 08/338,386 filed Nov. 14, 1994, now U.S. Pat. No. 5,470,667, which in turn is a continuation of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is also a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 08/929,623 filed Sep. 15, 1997, now abandoned, which in turn is a continuation-in-part of Ser. No. 08/604,078 filed Feb. 20, 1996, now U.S. Pat. No. 5,695,822, which in turn is a divisional of Ser. No. 08/438,042 filed May 8, 1995, now U.S. Pat. No. 5,597,656, which in turn is a continuation-in-part of Ser. No. 08/260,333 filed Jun. 15, 1994, now U.S. Pat. No. 5,429,882, which in turn is a continuation-in-part of Ser. No. 08/209,400 filed Mar. 14, 1994, now abandoned, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is further a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 08/929,623 filed Sep. 15, 1997, now abandoned, which in turn is a continuation-in-part of Ser. No. 08/604,078 filed Feb. 20, 1996, now U.S. Pat. No. 5,695,822, which in turn is a divisional of Ser. No. 08/438,042 filed May 8, 1995, now U.S. Pat. No. 5,597,656, which in turn is a continuation-in-part of Ser. No. 08/341,365 filed Nov. 17, 1994, now U.S. Pat. No. 5,489,490, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is yet further a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 08/929,623 filed Sep. 15, 1997, now abandoned, which in turn is a continuation-in-part of Ser. No. 08/604,078 filed Feb. 20, 1996, now U.S. Pat. No. 5,695,822, which in turn is a divisional of Ser. No. 08/438,042 filed May 8, 995, now U.S. Pat. No. 5,597,656, which in turn is a continuation-in-part of Ser. No. 08/347,261 filed Nov. 30, 1994, now U.S. Pat. No. 5,491,035, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is further a continuation-in-part of co-pending Ser. No 10/144,128 filed May 10, 2002, which in turn is a continuation of Ser. No. 09/634,828 filed Aug. 9, 2000, which in turn is a continuation-in-part of Ser. No. 08/980,985 filed Oct. 20, 1997, now abandoned, which in turn is a continuation of Ser. No. 08/636,179 filed Apr. 22, 1996, now abandoned, which in turn is a continuation-in-part of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/380,372 filed Jan. 30, 1995, now U.S. Pat. No. 5,480,731, which is in turn a continuation of Ser. No. 08/153,026 filed Nov. 17, 1993, now U.S. Pat. No. 5,395,703, which in turn is a divisional of Ser. No. 07/858,662 filed Mar. 27, 1992, now U.S. Pat. No. 5,314,758.

This patent application is still further a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 09/071,316 filed May 1, 1998, now U.S. Pat. No. 6,080,497, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/165,085 filed Dec. 10, 1993, now U.S. Pat. No. 5,397,652, which in turn is a continuation-in-part of Ser. No. 08/000,101 filed Jan. 4, 1993, now abandoned, which in turn is a continuation-in-part of Ser. No. 07/967,407 filed Oct. 26, 1992, now abandoned, which in turn is a continuation-in-part of Ser. No. 07/913,209 filed Jul. 15, 1992, now abandoned, which in turn is a continuation-in-part of Ser. No. 07/858,662 filed Mar. 27, 1992, now U.S. Pat. No. 5,314,758.

This patent application is yet further a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 09/100,578 filed Jun. 19, 1998, now abandoned, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/380,372 filed Jan. 30, 1995, now U.S. Pat. No. 5,480,731, which is in turn a continuation of Ser. No. 08/153,026 filed Nov. 17, 1993, now U.S. Pat. No. 5,395,703, which in turn is a divisional of Ser. No. 07/858,662 filed Mar. 27, 1992, now U.S. Pat. No. 5,314,758.

This patent application is also a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 09/131,219 filed Aug. 7, 1998, now abandoned, which in turn is a continuation-in-part of Ser. No. 08/929,623 filed Sep. 15, 1997, now abandoned, which in turn is a continuation-in part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/380,372 filed Jan. 30, 1995, now U.S. Pat. No. 5,480,731, which is in turn a continuation of Ser. No. 08/153,026 filed Nov. 17, 1993, now U.S. Pat. No. 5,395,703, which in turn is a divisional of Ser. No. 07/858,662 filed Mar. 27, 1992, now U.S. Pat. No. 5,314,758.

This patent application is further a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 09/161,573 filed Sep. 28, 1998, now abandoned, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/380,372 filed Jan. 30, 1995, now U.S. Pat. No. 5,480,731, which is in turn a continuation of Ser. No. 08/153,026 filed Nov. 17, 1993, now U.S. Pat. No. 5,395,703, which in turn is a divisional of Ser. No. 07/858,662 filed Mar. 27, 1992, now U.S. Pat. No. 5,314,758.

This patent application is still further a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 09/161,580 filed Sep. 28, 1998, now abandoned, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/380,372 filed Jan. 30, 1995, now U.S. Pat. No. 5,480,731, which is in turn a continuation of Ser. No. 08/153,026 filed Nov. 17, 1993, now U.S. Pat. No. 5,395,703, which in turn is a divisional of Ser. No. 07/858,662 filed Mar. 27, 1992, now U.S. Pat. No. 5,314,758.

This patent application is yet further a continuation-in-part of co-pending Ser. No. 10/144,128 filed May 10, 2002, which in turn is a continuation of Ser. No. 09/634,828 filed Aug. 9, 2000, which in turn is a continuation-in-part of Ser. No. 09/420,165 filed Oct. 18, 1999, now abandoned, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/380,372 filed Jan. 30, 1995, now U.S. Pat. No. 5,480,731, which is in turn a continuation of Ser. No. 08/153,026 filed Nov. 17, 1993, now U.S. Pat. No. 5,395,703, which in turn is a divisional of Ser. No. 07/858,662 filed Mar. 27, 1992, now U.S. Pat. No. 5,314,758.

The present invention relates to the art of a corrosion-resistant metal material and more particularly to a coated copper metal which is coated with a corrosion resistant tin and zinc alloy.

INCORPORATION BY REFERENCE

As background material so that the specification need not specify in detail what is known in the art, U.S. Pat. Nos. 4,934,120; 4,982,543; 4,987,716; 4,934,120; 5,001,881; 5,022,203; 5,259,166; and 5,301,474 are incorporated herein by reference to illustrate metal roofing systems of the type to which this invention can be used. U.S. Pat. No. 5,455,122 is incorporated herein by reference to illustrate petroleum receptacles of the type to which this invention can be used. U.S. Pat. Nos. 5,296,300; 5,314,758; 5,354,624; 5,395,702; 5,395,703; 5,397,652; 5,401,586; 5,429,882; 5,455,122; 5,470,667; 5,480,731; 5,489,490; 5,491,035; 5,491,036; 5,492,772; 5,520,964; 5,597,656; 5,616,424; 5,667,849; 5,695,822; and 6,080,497 and U.S. patent application Ser. No. 07/913,209, filed Jul. 15, 1992; Ser. No. 08/042,649, filed Apr. 5, 1993; Ser. No. 08/929,623, filed Sep. 15, 1997; Ser. No. 08/980,985, filed Oct. 20, 1997; Ser. No. 09/100,578, filed Jun. 19, 1998; Ser. No. 09/131,219, filed Aug. 7, 1998; Ser. No. 09/161,573, filed Sep. 28, 1998; Ser. No. 09/161,580, filed Sep. 28, 1998; Ser. No. 09/420,165, filed Oct. 18, 1999; and Ser. No. 09/634,828 filed Aug. 9, 2000 are incorporated herein by reference to illustrate various coatings and processes that can be used to coat, treat and use the coated base metal.

BACKGROUND OF THE INVENTION

The present invention relates to the art of a base metal which is coated with a corrosion resistant metal alloy, which corrosion-resistant metal material can be used in a wide variety of applications such as, but not limited to, architectural or building materials such as roofing materials, siding materials, window frames, sheet metal, metal plates and the like; truck and automotive products such as, but not limited to, gasoline tanks, filter casings, body molding, body parts and the like; household products such as, but not limited to, appliance housings, electrical housings, light fixtures and the like; marine products such as, but not limited to, boat hulls, boat masts, dock system components, water retaining systems; and/or other types of metal materials such as, but not limited to, tools, machinery, wires, cables, electrodes, solder and the like. The invention also relates to several novel methods and processes for forming base metals coated with the metal alloy materials, such as but not limited to, coated metal forming by a hot-dip process (i.e plating of metal alloy and subsequent flow heating, immersion in molten metal alloy, metal spraying of metal alloy, and/or roller coating of metal alloy), pretreatment of the base metal prior to metal alloy coating, applying an intermediate barrier metal layer prior to metal alloy coating, post-treating the metal alloy or coated base metal, and/or forming the metal alloy or coated base metal into a variety of different articles.

Over the last several years, there has been a trend in the industry to produce products which are higher in quality, are environmentally friendly, and are safe for use by humans, animals, and/or plants. This push for quality, safety and environmental friendliness is very apparent in the automotive industry wherein both consumer groups and environmental organizations are constantly lobbying for safer, higher-quality vehicles that are more fuel efficient and less detrimental to the environment. Recycling old vehicles has been one answer to resolving the environmental issues associated with vehicles which have run out their useful life. Automotive salvage markets have developed for these vehicles. The vehicles are partially dismantled and sold as scrap metal wherein the metal is melted down and reformed into various parts. Because of the environmentally-unfriendly nature of lead, the gasoline tanks of vehicles must be removed prior to the recycling of the vehicle. Gasoline tanks are commonly made of carbon or stainless steel that are coated with a terne alloy.

Other industries have also demanded higher quality products. These industries include the building industry and marine industry. Corrosion-resistant products that are exposed to various corrosive environments are constantly in demand. Historically, terne coated products were used to coat carbon steel sheets and other carbon steel articles to effectively and inexpensively provide corrosion-resistance to the carbon steel in various applications. Terne or terne alloy is a term commonly used to describe a metal alloy containing about 80% lead and the balance tin. The terne alloy is commonly applied to a the carbon steel by immersing the carbon steel in a molten bath of terne metal by a continuous or batch process.

Although terne coated metals have excellent corrosion-resistant properties and have been used in various applications, terne coated materials have been questioned due to environmental concerns based on the high lead content of the alloy. Environmental and public safety laws have been proposed and/or passed prohibiting or penalizing the user of materials containing a significant portion of lead. As a result, these terne coated articles are typically disposed of in dumping yards or landfills. Not only do these the terne coated articles take up space in the landfills, but there is a concern with the lead leaching from the terne coating into the landfill site and potentially contaminating the surrounding area and underground water reservoirs.

The lead content in terne coated materials is also of some concern for building materials and marine applications. This is especially a concern when the terne coated materials are in contact with drinking water. In many countries, lead pipe has been outlawed to reduce the amount of lead in the water. In many remote locations throughout the world, piped water or well water is not readily available. As a result, structures, such as roof systems, are built to capture rain and to store the rain water for later use. These roof systems supply an important water source for inhabitants utilizing such structures. Roof systems that are designed to collect rain water are typically made of metal to increase the longevity of the roofing system. Typically, the roof systems are made of carbon steel since such metal is less expensive. Terne alloy has historically been used due to its relatively low cost, ease of application, excellent corrosion-resistant properties and desirable colorization during weathering. Roof systems have been made of other metals, but to much less extent due to higher cost and natural corrosion resistance. Such metals include stainless steel, copper, copper alloys and aluminum. Stainless steel, copper, copper alloys and aluminum were typically not coated with a terne coating since these metals have excellent corrosion-resistant properties. However, in some limited applications, these metals have been coated with terne to extend the life of these metals. However, as with lead piping, thereis a concern that the lead in the terne coated roofing materials results in lead dissolving in the collected water.

Terne coated materials have typically been coated with a 6–8 lb. coating (7–11 microns), which is a very thin coating. This thin coating commonly includes pinholes. Terne coated materials that are drawn or formed in various types of materials such as, but not limited to, gasoline tanks, corrugated roofing materials and the like typically included one or more defects in the coating. Due to the thin layer of the terne coating and the pinholes in the coating, the coating on the base metal, upon being drawn by a die or by being formed tended to tear or shear the terne coating and/or elongate the pin holes on the coating thereby exposing the base metal. These exposed surfaces typically corroded at a faster rate than the unexposed surfaces. The corroded regions about the coated areas, in some instances, compromised the adherence of the coated area, thereby resulting, in some instances, to flaking of the coated regions. These corroded regions compromised, in some instances, rapidly compromised the structural integrity, safety and/or performance of the coated base metal. Another disadvantage of using a terne alloy coating is the softness of the terne layer. The softness of the terne coating is susceptible to damage from the abrasive nature of forming machines and to environments that subject the terne coating to frequent contact with other materials.

Terne alloys have a further disadvantage in that the newly applied terne is very shiny and highly reflective. As a result, in some building applications, the highly reflective coating cannot immediately be used. The terne coating eventually loses its highly reflective properties as the components of the terne coating are reduced (weathered); however, the desired amount of reduction commonly takes about 1.5 to 2 years when the terne coating is exposed to the atmosphere. The storage of the terne coated base metal significantly prolongs the weathering of the terne coated materials.

Metallic coatings such as tin or zinc have been tested as substitutes for terne coatings with limited success. The most popular process for applying a tin coating to a base metal is by en electroplating process. In an electroplating process, the coating thickness is very thin and typically ranges between 0.3 microns to 30 microns. The very thin thicknesses of the tin coating typically results in a tin coating having a network of small pinholes, thereby making the coated material generally unacceptable for use in corrosive environments, such as on building materials, marine materials, and automotive products. Such tin plated base metals can include a flash or intermediate metal layer (plated layer) to reduce the pinhole problems inherent with the tin plating process; however, the corrosion effectiveness of the plated tin layer, in some applications, is less than terne coated materials. The tin plated layer is also susceptible to flaking or being scrapped off when the tin plated base metal is drawn through a die and/or formed into various components. The flaking of the tin coating can also cause premature clogging of filter systems and liquid lines, such as in gasoline lines and filters, when the tin plated based metals are formed into gasoline tanks. The pinholes problem, flaking and/or scraping problem that is associated with plated tin coatings is very problematic since tin is not electroprotective under oxidizing conditions. Consequently, discontinuities in the plated tin coating can result in the corrosion of the exposed base metal.

Coating a base metal with zinc metal, commonly known as galvanizing, is another popular metal treatment to inhibit corrosion. Zinc is a desirable metal to coat materials because of its relatively low cost, ease of application, and excellent corrosion resistance. Zinc is also electroprotective under oxidizing conditions and inhibits or prevents the exposed metal, due to discontinuities in the zinc coating, from rapidly corroding. This electrolytic protection extends away from the zinc coating over exposed metal surfaces for a sufficient distance to protect the exposed metal at cut edges, scratches, and other coating discontinuities. Although zinc coatings bond to many types of metals, the bond is typically not very strong thereby resulting in the zinc coating flaking off the base metal over time and/or when being formed. The flaking of zinc, like the flaking of tin coatings, can cause premature clogging of filter systems and liquid lines when zinc coated base metal is formed into gasoline tanks or used in other liquid systems. The flaking of the zinc coating can also result in an undesired and/or disfigured product over a short period of time. Zinc also does not form a uniform and/or thick coating when coating on various types of base metals. Zinc is also a very rigid and brittle metal, thus tends to crack and/or flake off when the zinc coating is formed and/or drawn through a die. When zinc oxidizes, the zinc coating forms a white powdery texture (zinc oxide). This white powdery substance is undesirable for many building applications and in various other environments and applications. One such coating process is disclosed in U.S. Pat. No. 5,399,376, which is incorporated herein by reference. Consequently, the use of a tin coating or a zinc coating as a substitute for terne coatings has not been highly reliable, commercially acceptable or a cost effective substitute for traditional terne coatings. Metal coatings that include a hot dip coating of tin and zinc alloy have been used for fuel tanks as disclosed in Japanese Patent Application No. 47-977776 filed Sep. 29, 1972. The alloy coating thickness was disclosed to be 10–15 microns.

Metal coatings that include electroplated tin and zinc have also been used to coated base metals. Electroplating a tin and zinc mixture onto a steel sheet is disclosed in Japanese Patent Application No. 56-144738 filed Sep. 16, 1981, which is incorporated herein by reference. The Japanese patent application discloses the plating of a steel sheet with a tin and zinc mixture to form a coating thickness of less than 20 microns. The Japanese patent application discloses that after plating, pinholes exist in the coating and subject the coating to corrosion. The pin holes are a result of the crystalline layer of the tin and zinc mixture slowly forming during the plating process. Consequently, the Japanese patent application discloses that the plated tin and zinc coating must be covered with chromate or phosphoric acid to fill the pin holes to prevent corrosion. The Japanese patent application discloses that a preplated layer of nickel, tin or cobalt on the steel sheet surface is needed so that the plated tin and zinc mixture will adhere to the steel sheet.

The coating of steel articles by a batch hot-dip process with a tin, zinc and aluminum mixture is disclosed in U.S. Pat. No. 3,962,501 issued Jun. 8, 1976, which is incorporated herein by reference. The '501 patent discloses that the tin, zinc and aluminum mixture resists oxidation and maintains a metallic luster. The '501 patent discloses that the molten tin and zinc alloy is very susceptible to oxidation resulting in viscous oxides forming on the surface of the molten tin and zinc alloy. These viscous oxides cause severe problems with the coating process. While the steel article is immersed in the molten alloy, a large amount of dross forms on the surface of the molten alloy. The dross results in non-uniformity of the coating and the formation of pin holes as the steel article is removed from the molten metal. The '501 patent discloses that the addition of up to 25% aluminum to the tin and zinc alloy inhibits dross formation, reduces Zn—Fe alloy formation, and reduces viscous oxide formation on the molten bath surface.

The treatment of a steel sheet by plating tin and zinc followed by heat flowing is disclosed in U.S. Pat. No. 4,999,258, which is incorporated herein by reference. The '258 patent discloses a steel sheet plated with a layer of tin and a subsequent layer of zinc. The tin and zinc plated layers are then heated until the zinc alloys with the tin. The tin is applied at 0.2–1.0 g/m$^2$ and the zinc is applied at 0.01–0.3 g/m$^2$. The '258 patent also discloses that when less than 1% zinc is used, the beneficial effect of the zinc is null; however, when more than 30% zinc is used, the coating will rapidly corrode under adverse environments. The '258 patent also discloses that a nickel plated layer is preferably applied to the steel sheet prior to applying the tin and zinc plated layers to improve corrosion resistance. The heat treated tin and zinc layer can be further treated by applying a chromate treatment to the plated layer further improve corrosion resistance.

Due to the various environmental concerns and problems associated with corrosion-resistant coatings applied to base metals and the problems associated with the inadvertent removal of the corrosion-resistant coating during the forming and/or drawing of the coated materials, there has been a demand for a coating or metal material that is corrosion-resistant, is environmentally friendly, and resists damage during forming into end components. Many of these demands where met by the tin alloy or the tin and zinc alloy and process and method for applying these alloys to a base metal which is disclosed in Assignee's U.S. Pat. Nos. 5,314,758; 5,354,624; 5,395,702; 5,395,703; 5,397,652; 5,401,586; 5,429,882; 5,455,122; 5,470,667; 5,480,731; 5,489,490; 5,491,035; 5,491,036; 5,492,772; 5,520,964; 5,597,656; 5,616,424; 5,667,849; 5,695,822; and 6,080,497; and Assignee's U.S. patent application No. Ser. No. 09/634,828 filed Aug. 9, 2000, all of which are incorporated herein by reference.

The use of copper base metals for architectural materials and other applications present unique challenges. Copper is typically more corrosion resistant than carbon steel in many environments. Commercial copper is used for the roofing material and for other types of architectural materials due to its desirable mechanical properties and natural corrosive resistant properties. Copper is one of the strongest pure metals. It is moderately hard, extremely tough, and wear resistant. Though copper in its commercially pure state is very formable thus relatively easily shaped, the copper can be further softened by an annealing process to further improve its formability. Copper alloys can also be used in the architectural materials. Some common alloys of copper are copper-zinc alloys or copper-nickel alloys. Generally, the copper alloys reduce the formability of the architectural materials. Although copper or copper alloy materials have properties that are advantageous in various applications, when copper oxidizes, the oxide forms a black, green or blue-green layer. This color change is unacceptable in a variety of applications. Uncoated copper can also be used to collect water; however, the oxidized copper tends to mix with the water and adversely affects the taste and color of the water. As disclosed in U.S. Pat. No. 5,354,624, copper base materials can be coated with a tin alloy to form a corrosion resistant material that is pliable and that resists formation of a black, green or blue-green layer during oxidation. The life of the copper is significantly extended by coating the copper with the tin alloy.

Due to the various environmental concerns and problems associated with corrosion-resistant coatings applied to copper materials and the problems associated with the forming of the coated copper material into various types of components, there has been a demand for a copper material that is corrosion-resistant, is cost effective to use, is environmentally friendly, resists damage during forming, is pliable, does not oxidize to produce an undesirable color, and is not highly reflective.

SUMMARY OF THE INVENTION

The present invention relates to a product and method of producing a corrosion-resistant, environmentally friendly metal material. More particularly, the invention relates the coating of a base metal with a corrosion resistant metal alloy which forms a corrosive-resistant barrier on the base metal. Even more particularly, the invention relates to a copper containing base metal coated with a corrosion-resistant metal alloy which coated base metal is formed into truck and/or automotive products, architectural and/or building materials, household materials, marine products; and/or formed into tools or machinery.

In accordance with the principal feature of the invention, there is provided a corrosion resistant metal alloy primarily including tin and zinc. In one embodiment of the invention, the corrosion resistant metal alloy is coated on a copper containing base metal, which coated base metal is formed, molded, and/or drawn into a metal article. The copper containing base metal includes pure copper base metals; copper alloy base metals (e.g. brasses, bronzes, copper-nickels, etc.); metals (e.g. stainless steel, carbon steel, nickel alloys, titanium or titanium alloys, aluminum or aluminum alloys, tin, etc.) that are plated, clad, or otherwise coated and/or bonded with copper and/or copper alloy.

In accordance with one aspect of the invention, the corrosion resistant metal alloy is a tin and zinc alloy. In one embodiment of the invention, the tin and zinc constituents of the tin and zinc alloy maintain their own integrity (structure or composition) in the composite with one phase metal being a matrix surrounding distinct globules or phases of the second phase metal. The tin and zinc system is a dual strata of metal globules or phases, each globule or phase being distinct from the other in structure or composition. The lowest weight percentage of zinc in an eutectic tin and zinc mixture is a tin rich mixture containing about 90–91 weight percent tin and about 9–10 weight percent zinc. For the tin rich matrix or phase and zinc rich globules or phases to form in a tin and zinc alloy, the zinc must make up at least over about 9–10 weight percent of the tin and zinc alloy. A zinc content over about 9–10 weight percent of the tin and zinc alloy results in the zinc precipitating out of the tin and forming zinc globules or phases within the tin and zinc alloy. The tin content of the tin and zinc alloy must be at least about 15 weight percent of the tin and zinc alloy so that there is a sufficient amount of tin within the tin and zinc alloy to form the tin phase about the zinc phase. A metal alloy that primarily includes tin and zinc but has a zinc content that is equal to or less than the minimum eutectic weight percentage of zinc is defined herein as a tin alloy, instead of a tin and zinc alloy. A tin and zinc alloy is defined herein as a metal alloy that includes at least about 15 weight percent tin and at least about 9–10 weight percent zinc and the tin content plus zinc content of the metal alloy constitutes at least a majority of the metal alloy. One of the important and desirable properties of the tin and zinc alloy is its excellent corrosion-resistance in many different environments. The tin and zinc alloy is very corrosion resistant in marine environments wherein chloride salts are common, and in industrial environments wherein sulfur and sulfur compounds are present. The excellent corrosion-resistance of the tin and zinc alloy is believed to result from the formation of a stable, continuous, adherent, protective film on the surface. The damaged film generally reheals itself quickly. Because of the general inertness of the film, that is at least partially formed of tin and zinc oxide, in most atmospheres, the corrosion resistant tin and zinc alloy is considered to be environmentally safe and friendly, and considered a safe material to be used in the human environment. The tin and zinc alloy also forms over time a dull, low-reflecting surface; has a pleasing color; performs well in low temperatures; has a relatively low coefficient of thermal expansion; resists degradation by solar energy; can be molded, cast, formed, drawn, soldered, painted and/or colored; and/or can be installed in a variety of weather conditions. The tin and zinc alloy is further a cost effective material for use in structures used in corrosive environments such as in the tropics and other areas where buildings are exposed to strong winds, corrosive fumes, and/or marine conditions. In another and/or alternative embodiment of the invention, the tin content plus the zinc content in the tin and zinc alloy makes up over 50 weight percent of the tin and zinc alloy. In one aspect of this embodiment, the tin content plus the zinc content in the tin and zinc alloy is at least about 60 weight percent of the tin and zinc alloy. In another and/or alternative aspect of this embodiment, the tin content plus the zinc content in the tin and zinc alloy is at least about 75 weight percent of the tin and zinc alloy. In yet another and/or alternative aspect of this embodiment, the tin content plus the zinc content in the tin and zinc alloy is at least about 80 weight percent of the tin and zinc alloy. In still yet another and/or alternative aspect of this embodiment, the tin content plus the zinc content in the tin and zinc alloy is at least about 85 weight percent of the tin and zinc alloy. In a further and/or alternative aspect of this embodiment, the tin content plus the zinc content in the tin and zinc alloy is at least about 90 weight percent of the tin and zinc alloy. In yet a further and/or alternative aspect of this embodiment, the tin content plus the zinc content in the tin and zinc alloy is at least about 95 weight percent of the tin and zinc alloy. In still a further and/or alternative aspect of this embodiment, the tin content plus the zinc content in the tin and zinc alloy is at least about 98 weight percent of the tin and zinc alloy. In still yet a further and/or alternative aspect of the embodiment, the tin plus zinc content in the tin and zinc alloy is at least about 99 weight percent of the tin and zinc alloy.

In accordance with another and/or alternative aspect of the invention, a metal alloy is a tin alloy, as defined above, that primarily includes tin, and zinc content is equal to or less than the minimum eutectic weight percentage of zinc in the tin alloy. As such, the tin alloy is a metal alloy that includes at least a majority of tin and less than 9–10 weight percent zinc. The corrosion resistant tin alloy forms a corrosion resistant coating that protects the surface of the base metal from oxidation. The corrosion resistant tin alloy provides protection to the base metal in a variety of environments such as rural, industrial, and/or marine environments. The corrosion resistant tin alloy also performs well in low temperatures; has a relatively low coefficient of thermal expansion; has a pleasing color; resists degradation by solar energy; can be molded, cast, formed, drawn, soldered, painted and/or colored; and/or can be installed in a variety of weather conditions. Because of the relative inertness of the tin oxide in many environments, the corrosion resistant tin alloy is considered to be environmentally safe and friendly and considered a safe material to be used in the human environment. The corrosion resistant tin alloy is also a cost effective material for use in structures erected in corrosive environments, such as in the tropics and other areas where buildings are exposed to strong winds, corrosive flurnes, and/or marine conditions. In one embodiment of the invention, the tin content in the tin alloy makes up over 50 weight percent of the tin alloy. In one aspect of this embodiment, the tin content in the tin alloy is at least about 75 weight percent of the tin alloy. In another and/or alternative aspect of this embodiment, the tin content in the tin alloy is at least about 80 weight percent of the tin alloy. In yet another and/or alternative aspect of this embodiment, the tin content in the tin alloy is at least about 85 weight percent of the tin alloy. In still yet another and/or alternative aspect of this embodiment, the tin content in the tin alloy is at least about 90 weight percent of the tin alloy. In a further and/or alternative aspect of this embodiment, the tin content in the tin alloy is at least about 95 weight percent of the tin alloy. In yet a further and/or alternative aspect of this embodiment, the tin content in the tin alloy is at least about 98 weight percent of the tin alloy. In still a further and/or alternative aspect of this embodiment, the tin content in the tin alloy is at least about 99 weight percent of the tin alloy.

In accordance with yet another aspect of the invention, the corrosion resistant tin alloy and corrosion resistant tin and zinc alloy contain a low lead content. The lead source in the tin alloy or the tin and zinc alloy can be from impurities in the raw tin and/or zinc ore used to make the metal alloy, and/or can be from directed additions of lead to the metal alloy. In some metal alloy combinations, lead in the metal alloy positively affects one or more physical and/or chemical properties of the metal alloy. Metal alloys that include little or no lead are considered more environmentally friendly, and the prejudices associated with the lead containing alloys are overcome. When the metal alloy includes lead, the lead content is generally at least about 0.0001 weight percent of the metal alloy. In one embodiment of the invention, the tin alloy and the tin and zinc alloy include no more than about 10 weight percent lead. In one aspect of this embodiment, the metal alloy include less than about 2 weight percent lead. In another and/or alternative aspect of this embodiment, the metal alloy include less than about 1 weight percent lead. In yet another and/or alternative aspect of this embodiment, the tin alloy and the tin and zinc alloy include less than about 0.5 weight percent lead. In still another and/or alternative aspect of this embodiment, the metal alloy include less than about 0.05 weight percent lead. In still yet another and/or alternative aspect of this embodiment, the metal alloy include less than about 0.01 weight percent lead. In a further and/or alternative aspect of this embodiment, the metal alloy include less than about 0.005 weight percent lead. In still a further and/or alternative aspect of this embodiment, the metal alloy include less than about 0.001 weight percent lead.

In accordance with a further and/or alternative aspect of the invention, the tin alloy and tin and zinc alloy include one or more additives. In one embodiment of the invention, the one or more additives generally constitute less than about 25 weight percent of the metal alloy. In one aspect of this embodiment, the one or more additives constitute less than about 10 weight percent of the metal alloy. In another and/or alternative aspect of this embodiment, the one or more additives constitute less than about 5 weight percent of the metal alloy. In yet another and/or alternative aspect of this embodiment, the one or more additives constitute less than about 2 weight percent of the metal alloy. In still another and/or alternative aspect of this embodiment, the one or more additives constitute less than about 1 weight percent of the metal alloy. In still yet another and/or alternative aspect of this embodiment, the one or more additives constitute less than about 0.5 weight percent of the metal alloy. In another and/or alternative embodiment of the invention, the additives include, but are not limited to, aluminum, antimony, arsenic, bismuth, boron, bromine, cadmium, carbon, chlorine, chromium, copper, cyanide, fluoride, iron, lead, magnesium, manganese, molybdenum, nickel, nitrogen, phosphorous, potassium, silicon, silver, sulfur, tellurium, titanium, vanadium, and/or zinc. The one or more additives included in the corrosion resistant metal alloy are used to positively affect the chemical and/or physical properties of the corrosion-resistant metal alloy such as, but not limited, to enhance the mechanical properties of the alloy, to improve corrosion resistance of the metal alloy, to improve grain refinement of the metal alloy, to alter the color of the metal alloy, to alter the reflectiveness of the metal alloy, to inhibit oxidation of the metal alloy during forming or coating of the metal alloy and/or when the metal alloy is exposed in various types of environments, to inhibit dross formation during the forming or coating of the metal alloy, to stabilize one or more components of the metal alloy, to improve the bonding of the metal alloy on the base metal and/or intermediate barrier metal layer on the base metal, to improve the flowability of the metal alloy during the forming or coating process, to produce the thickness of heat created intermetallic layer, and/or to reduce or inhibit the crystallization of the tin in the metal alloy. The inclusion of one or more additives in the corrosion resistant metal alloy typically preform one or more of the above listed functions and/or features in the metal alloy. As can be appreciated, the source or a portion of the source of one or more of the above-listed additives in the tin alloy or tin and zinc alloy can be from impurities in the raw tin and/or zinc ore used to make the metal alloy. The believed functions and features of select additives are described below; however, the described additives may have additional functions and features. Aluminum can reduce the rate of oxidation of the molten metal alloy; reduce dross formation during the coating process; alter the reflective properties of the metal alloy; alter the mechanical properties of the metal alloy (i.e. coatability, durability, flexibility, flowability, formability, hardness, and strength); and/or reduce the thickness of the heat created intermetallic layer to improve the formability of the coated base metal. Antimony, bismuth, cadmium, and/or copper can prevent or inhibit the crystallization of the tin in the metal alloy, which crystallization can weaken the bonding and/or result in flaking of the corrosion resistant metal alloy; improve the bonding properties of the metal alloy to the base metal and/or intermediate barrier metal layer; alter the mechanical properties of the metal alloy; and/or alter the corrosion resistant properties of the metal alloy. Only small amounts of antimony, bismuth, cadmium, and/or copper are needed to prevent and/or inhibit the crystallization of the tin in the metal alloy. This small amount can be as low as about 0.001–0.05 weight percent, and typically as low as 0.001–0.004 weight percent. Arsenic can alter the mechanical properties of the metal alloy. Cadmium, in addition to its bonding, corrosion resistant, stabilizing and/or mechanical altering properties, can reduce the rate of oxidation of the molten metal alloy; reduce dross formation during the coating or forming process of the metal alloy; alter the color and/or reflective properties of the metal alloy; and/or improve the grain refinement of the metal alloy. Chromium can provide additional corrosion protection to the metal alloy; alter the mechanical properties of the metal alloy; and/or alter the color and/or reflective properties of the metal alloy. Copper, in addition to its corrosion resistant, stabilizing and/or mechanical altering properties, can alter the color and/or reflective properties of the metal alloy. Iron can alter the mechanical properties of the metal alloy; and/or alter the color of the metal alloy. Lead can provide additional corrosion protection to the metal alloy; alter the mechanical properties of the metal alloy; alter the color of the metal alloy; and/or improve the bonding properties of the metal alloy to the base metal and/or intermediate barrier metal layer. Magnesium can alter the mechanical properties of the metal alloy; reduce the anodic characteristics of the metal alloy; reduce the rate of oxidation of the molten metal alloy; and/or reduce dross formation during the forming or coating process of the metal alloy. Manganese can provide additional corrosion protection to the metal alloy; improve the grain refinement of the metal alloy; and/or improve the bonding properties of the metal alloy to the base metal and/or intermediate barrier metal layer. Nickel can provide corrosion protection to the metal alloy, especially in alcohol and chlorine containing environments; alter the mechanical properties of the metal alloy; and/or alter the color and/or reflective properties of the metal alloy. Silver can alter the mechanical properties of the metal alloy; and/or alter the color and/or reflective properties of the metal alloy. Titanium can improve the grain refinement of the metal alloy; alter the mechanical properties of the metal alloy; provide additional corrosion protection to the metal alloy; reduce the rate of oxidation of the molten metal alloy; reduce dross formation during the forming or coating process of the metal alloy; alter the color and/or reflective properties of the metal alloy; and/or improve the bonding properties of the metal alloy to the base metal and/or intermediate barrier metal layer. Zinc can alter the mechanical properties of the metal alloy; provide additional corrosion protection to the metal alloy, alter the color and/or reflective properties of the metal alloy; improve the bonding properties of the metal alloy to the base metal and/or intermediate barrier metal layer, and/or stabilize the tin to inhibit or prevent crystallization of the tin in the metal alloy.

In accordance with another and/or alternative aspect of the invention, the thickness of the corrosion resistant metal alloy is selected to provide the desired amount of corrosion resistant protection to the surface of the base metal. Generally thinner coating thicknesses can be obtained by a plating process and thicker coating thicknesses can be obtained by immersion in molten metal alloy. The selected thickness of the coating will typically depend on the end use of the coated base metal and/or the environment the coated base metal is to be used. A 6 lb. coating on a base metal is a common thickness for a thin coating. A 6 lb. coating has a coating thickness of about 7 microns. A 6 lb. coating is commonly applied by a plating process. In many instances, very thin coatings include one or more pin holes in the coating. A 40 lb. coating is also a common coating having a thickness of about 50 microns. A 40 lb. coating typically has few, if any, pin holes, and due to the thicker coating, thus the thicker coating resists tearing when the coated base metal is drawn or formed into various types of components. Thicker metal alloy coatings are commonly used for automotive components (i.e. gasoline tank shell members), and roofing and siding materials. In one embodiment of the invention, the metal alloy coating is applied by a single plating process. In one aspect of this embodiment, the thickness of the metal alloy coating is at least about 1 micron. In another and/or alternative aspect of this embodiment, the thickness of the metal alloy coating is at least about 2 microns. In still another and/or alternative aspect of this embodiment, the thickness of the metal alloy coating is about 2–30 microns. In another and/or alternative embodiment of the invention, the metal alloy coating is applied by a) multiple plating processes, b) single or multiple hot-dip processes, and/or c) at least one plating process and at least one hot dip process. In one aspect of this embodiment, the thickness of the metal alloy coating is at least about 1 micron. In another and/or alternative aspect of this embodiment, the thickness of the metal alloy coating is up to about 2550. In still another and/or alternative aspect of this embodiment, the thickness of the metal alloy coating is about 2.5–1270 microns. In yet another and/or alternative aspect of this embodiment, the thickness of the metal alloy coating is about 7–1270 microns. In still yet another and/or alternative aspect of this embodiment, the thickness of the metal alloy coating is about 7–1250 microns. In a further and/or alternative aspect of this embodiment, the thickness of the metal alloy coating is about 15 to 1250 microns. In yet a further and/or alternative aspect of this embodiment, the thickness of the metal alloy coating is about 25–77 microns. In still a further and/or alternative aspect of this embodiment, the thickness of the metal alloy coating is about 25–51 microns.

In accordance with still another and/or alternative aspect of the invention, the base metal is a metal strip. A "strip" is defined as metal in the form of a thin metal sheet that is or can be rolled into a roll of metal, as opposed to plates of metal or other configurations of the metal. Metal strip which has a thickness of less than about 127 microns (0.005 inch) can break as the strip is pretreated and/or coated with a metal alloy coating at high process speeds. A high process speed is defined as a metal strip moving through the pretreatment process, intermediate barrier metal coating process, and/or metal alloy coating process at a speed of about 60–400 ft/mm. However, the metal strip thickness should not be too great so as to prevent the strip from being able to be directed, at a relatively high speed, through the pretreatment process, if any, and the coating process. Metal strip which is too thick is more difficult to heat when a heat created intermetallic layer is to be formed between the base metal and metal alloy coating and/or intermediate barrier metal, especially when the metal strip is moving at high speeds and/or coated over a short period of time. Metal strips having too great of thickness are also difficult to maneuver at economical high speeds through the pretreatment process, if any, and the coating process. In one embodiment of the invention, the thickness of the metal strip is thin enough such that the metal strip can be unrolled from a roll of metal, coated by a metal alloy coating, and re-rolled into a roll of coated metal strip. In one aspect of this embodiment, the thickness of the metal strip is not more than about 5080 microns. In another and/or alternative aspect of this embodiment, the thickness of the metal strip is less than about 2540 microns. In yet another and/or alternative aspect of this embodiment, the thickness of the metal strip is less than about 1270 microns. In still another and/or alternative aspect of this embodiment, the thickness of the metal strip is less than about 762 microns. In a further and/or alternative aspect of this embodiment, the thickness of the metal strip is about 127–762 microns. In yet a further and/or alternative aspect of this embodiment, the thickness of the metal strip is about 254–762 microns. In still a further and/or alternative aspect of this embodiment, the thickness of the metal strip is about 381–762 microns. In yet a further and/or alternative aspect of this embodiment, the thickness of the metal strip is about 127–381 microns. In still yet a further and/or alternative aspect of this embodiment, the thickness of the metal strip is about 508–762 microns. In another and/or alternative embodiment of the invention, the thickness of the metal strip is not more than about 1588 microns when the metal strip is formed of stainless steel, nickel alloys, titanium or titanium alloys. These types of metal strip are difficult to maneuver at economical, high speeds through the coating process when the metal strip thickness is greater than 1588 microns. In one aspect of this embodiment, metal strip made primarily of stainless steel, nickel alloys, titanium or titanium alloy strip has a thickness of about 127–762 microns. In another and/or alternative aspect of this embodiment, metal strip made primarily of stainless steel, carbon steel, nickel alloys, titanium or titanium alloy strip has a thickness of about 255–762 microns.

In accordance with still yet another and/or alternative aspect of the invention, the base metal is a metal plate. In one embodiment of the invention, the metal plate is a rectangular or square metal plate having a length of about 1 to 15 feet and a width of about 1–20 feet. In another and/or alternative embodiment of the invention, the thickness of the metal plate is not more than about 51000 microns (2 inches). In one aspect of this embodiment, the thickness of the metal plate is not more than about 25400 microns. In another and/or alternative aspect of this embodiment, the thickness of the metal plate is not more than about 12700 microns.

In accordance with another and/or alternative aspect of the invention, the base metal is primarily carbon steel that has been hot dip coated, clad and/or plated with copper and/or a copper alloy. In one embodiment of the invention, the carbon steel base metal is a metal strip. In one aspect of this embodiment, the thickness of the carbon steel strip is less than about 2540 microns. In another and/or alternative aspect of this embodiment, the thickness of the carbon steel strip is less than about 1588 microns. In yet another and/or alternative aspect of this embodiment, the thickness of the carbon steel strip is less than about 1270 microns. In still and/or alternative another aspect of this embodiment, the thickness of the carbon steel strip is up to about 762 microns. In a further and/or alternative aspect of this embodiment, the thickness of the carbon steel strip is about 127–762 microns. In yet a further and/or alternative aspect of this embodiment, the thickness of the carbon steel strip is about 254–762 microns. In still a further and/or alternative aspect of this embodiment, the thickness of the carbon steel strip is about 381–762 microns. In another and/or alternative embodiment of the invention, the carbon steel base metal is a metal plate. In still another and/or alternative embodiment of the invention, the thickness of the copper and/or copper alloy on the carbon steel base metal is less than about 2540 microns. In one aspect of this embodiment, the thickness of the copper and/or copper alloy is less than about 1270 microns. In yet another and/or alternative aspect of this embodiment, the thickness of the copper and/or copper alloy is less than about 762 microns. In still and/or alternative another aspect of this embodiment, the thickness of the copper and/or copper alloy is about 1–500 microns. In a further and/or alternative aspect of this embodiment, the thickness of the copper and/or copper alloy is about 3–255 microns. In yet a further and/or alternative aspect of this embodiment, the thickness of the copper and/or copper alloy is about 5–100 microns. In still a further and/or alternative aspect of this embodiment, the thickness of the copper and/or copper alloy is about 5–50 microns. In still yet a further and/or alternative aspect of this embodiment, the thickness of the copper and/or copper alloy is about 5–25 microns. In another and/or alternative aspect of this embodiment, the thickness of the copper and/or copper alloy is less than the thickness of the carbon steel base metal. In yet another and/or alternative embodiment of the invention, the copper and/or copper alloy is applied to the carbon steel base metal by plating. In still yet another and/or alternative embodiment of the invention, the copper and/or copper alloy is applied to the carbon steel base metal by cladding. In a further and/or alternative embodiment of the invention, the copper and/or copper alloy is applied to the carbon steel base metal by hot dip coating.

In accordance with still another and/or alternative aspect of the invention, the base metal is primarily stainless steel that has been hot dip coated, clad and/or plated with copper and/or a copper alloy. "Stainless steel" is used in its technical sense and includes a large variety of ferrous alloys containing chromium and iron. Carbon steel base metal that is plated with chromium and subsequently coated with a metal alloy coating by a hot dip process transforms the carbon steel into stainless steel at least at the surface of the base metal surface. The stainless steel can also contain other elements or compounds such as, but not limited to, nickel, nickel alloys, carbon, molybdenum, silicon, manganese, titanium, boron, copper, aluminum and/or various other metals or compounds. Elements such as nickel can be flashed (plated) onto the surface of the stainless steel or directly incorporated into the stainless steel. In one embodiment of the invention, the stainless steel base metal is 304 or 316 stainless steel. In another and/or alternative embodiment of the invention, the stainless steel base metal is a metal strip. In one aspect of this embodiment, the thickness of the stainless steel strip is less than about 2540 microns. In another and/or alternative aspect of this embodiment, the thickness of the stainless steel strip is less than about 1588 microns. In yet another and/or alternative aspect of this embodiment, the thickness of the stainless steel strip is less than about 1270 microns. In still another and/or alternative aspect of this embodiment, the thickness of the stainless steel strip is up to about 762 microns. In a further and/or alternative aspect of this embodiment, the thickness of the stainless steel strip is about 127–762 microns. In yet a further and/or alternative aspect of this embodiment, the thickness of the stainless steel strip is about 254–762 microns. In still a further and/or alternative aspect of this embodiment, the thickness of the stainless steel strip is about 381–762 microns. In still another and/or alternative embodiment of the invention, the stainless steel base metal is a metal plate. In yet another and/or alternative embodiment of the invention, the thickness of the copper and/or copper alloy on the stainless steel base metal is less than about 2540 microns. In one aspect of this embodiment, the thickness of the copper and/or copper alloy is less than about 1270 microns. In yet another and/or alternative aspect of this embodiment, the thickness of the copper and/or copper alloy is less than about 762 microns. In still and/or alternative another aspect of this embodiment, the thickness of the copper and/or copper alloy is about 1–500 microns. In a further and/or alternative aspect of this embodiment, the thickness of the copper and/or copper alloy is about 3–255 microns. In yet a further and/or alternative aspect of this embodiment, the thickness of the copper and/or copper alloy is about 5–100 microns. In still a further and/or alternative aspect of this embodiment, the thickness of the copper and/or copper alloy is about 5–50 microns. In still yet a further and/or alternative aspect of this embodiment, the thickness of the copper and/or copper alloy is about 5–25 microns. In another and/or alternative aspect of this embodiment, the thickness of the copper and/or copper alloy is less than the thickness of the stainless steel base metal. In still yet another and/or alternative embodiment of the invention, the copper and/or copper alloy is applied to the stainless steel base metal by plating. In a further and/or alternative embodiment of the invention, the copper and/or copper alloy is applied to the stainless steel base metal by cladding. In still a further and/or alternative embodiment of the invention, the copper and/or copper alloy is applied to the stainless steel base metal by hot dip coating.

In accordance with yet another and/or alternative aspect of the invention, the base metal is copper. Copper metal is known for its malleability properties and natural corrosion resistant properties. Copper metal that is coated with a metal alloy can be formed in a variety of simple and complex shapes. In one embodiment of the invention, the copper base metal is a metal strip. In one aspect of this embodiment, the thickness of the copper strip is not more than about 5080 microns. In another and/or alternative aspect of this embodiment, the thickness of the copper strip is less than about 2540 microns. In yet another and/or alternative aspect of this embodiment, the thickness of the copper strip is less than about 1270 microns. In still another and/or alternative aspect of this embodiment, the thickness of the copper strip is up to about 762 microns. In a further and/or alternative aspect of this embodiment, the thickness of the copper strip is about 127–762 microns. In yet a further and/or alternative aspect of this embodiment, the thickness of the copper strip is about 254–762 microns. In still a further and/or alternative aspect of this embodiment, the thickness of the copper strip is about 381–762 microns. In still another and/or alternative embodiment of the invention, the copper base metal is a metal plate.

In accordance with still yet another and/or alternative aspect of the invention, the base metal is a copper alloy. "Copper alloys" as used herein include, but are not limited to, brasses, bronzes, and nickel-copper alloys. Brass is defined as a copper alloy that includes a majority of copper and zinc. Bronze is defined as an alloy that includes tin and a majority of copper. Brass and bronze are copper alloys with known corrosion resistant properties in various environments. Although brass and bronze are relatively corrosion resistant in many environments, brass and bronze are susceptible to a greater degree of corrosion in some environments than others. Brass and bronze are also relatively bright and reflective materials which can be undesirable for use in several applications. As a result, it has been found that brass and bronze coated with a corrosion resistant metal alloy can overcomes these deficiencies. In one embodiment of the invention, the copper content of the brass is about 50.1–99 weight percent and the zinc content is about 1–49.9 weight percent. In one aspect of this embodiment, the brass includes one or more additives such as, but not limited to, aluminum, beryllium, carbon, chromium, cobalt, iron, lead, manganese, magnesium, nickel, niobium, phosphorous, silicon, silver, sulfur, and/or tin. These additives typically alter the mechanical and/or corrosion resistant properties of the brass. In another and/or alternative embodiment of the invention, the bronze includes one or more additives such as, but not limited to, aluminum, iron, lead, manganese, nickel, nitrogen, phosphorous, silicon, and/or zinc. In still another and/or alternative embodiment of the invention, the copper alloy base metal is a metal strip. In one aspect of this embodiment, the thickness of the copper alloy strip is not more than about 5080 microns. In another and/or alternative aspect of this embodiment, the thickness of the copper alloy strip is less than about 2540 microns. In yet another and/or alternative aspect of this embodiment, the thickness of the copper alloy strip is less than about 1270 microns. In still another and/or alternative aspect of this embodiment, the thickness of the copper alloy strip is less than about 762 microns. In a further and/or alternative aspect of this embodiment, the thickness of the copper alloy strip is about 127–762 microns. In yet a further and/or alternative aspect of this embodiment, the thickness of the copper alloy strip is about 254–762 microns. In still a further and/or alternative aspect of this embodiment, the thickness of the copper alloy strip is about 381–762 microns. In yet another and/or alternative embodiment of the invention, the copper alloy base metal is a metal plate.

In accordance with a further and/or alternative aspect of the invention, the base metal is primarily made of aluminum, aluminum alloys, nickel alloys, tin, titanium, or titanium alloys that have been hot dip coated, clad and/or plated with copper and/or a copper alloy. "Aluminum alloys" as used herein include, but are not limited to, alloys including at least about 10 weight percent aluminum. "Nickel alloys" as used herein include, but are not limited to, alloys including at least about 5 weight percent nickel. In one embodiment of the invention, the base metal is primarily an aluminum metal strip that has been coated, clad and/or plated with copper and/or a copper alloy. In another and/or alternative embodiment of the invention, the base metal is primarily an aluminum alloy metal strip that has been coated, clad and/or plated with copper and/or a copper alloy. In yet another and/or alternative embodiment of the invention, the base metal is primarily a nickel alloy strip that has been coated, clad and/or plated with copper and/or a copper alloy. In still another and/or alternative embodiment of the invention, the base metal is primarily a tin metal strip that has been coated, clad and/or plated with copper and/or a copper alloy. In still yet another and/or alternative embodiment of the invention, the base metal is primarily a titanium metal strip that has been coated, clad and/or plated with copper and/or a copper alloy. In a further and/or alternative embodiment of the invention, the base metal is primarily a titanium alloy metal strip that has been coated, clad and/or plated with copper and/or a copper alloy. In one aspect of these embodiments, the thickness of the aluminum, aluminum alloy, nickel alloy, tin, titanium, or titanium alloy strip is less than about 2540 microns. In another and/or alternative aspect of these embodiments, the thickness of the aluminum, aluminum alloy, nickel alloy, tin, titanium, or titanium alloy strip is less than about 1588 microns. In yet another and/or alternative aspect of these embodiments, the thickness of the aluminum, aluminum alloy, nickel alloy, tin, titanium, or titanium alloy strip is less than about 1270 microns. In still another and/or alternative aspect of these embodiments, the thickness of the aluminum, aluminum alloy, nickel alloy, tin, titanium, or titanium alloy strip is up to about 762 microns. In a further and/or alternative aspect of these embodiments, the thickness of the aluminum, aluminum alloy, nickel alloy, tin, titanium, or titanium alloy strip is about 127–762 microns. In yet a further and/or alternative aspect of these embodiments, the thickness of the aluminum, aluminum alloy, nickel alloy, tin, titanium, or titanium alloy strip is about 240–762 microns. In still a further and/or alternative aspect of these embodiments, the thickness of the aluminum, aluminum alloy, nickel alloy, tin, titanium, or titanium alloy strip is about 381–762 microns. In yet a further and/or alternative embodiment of the invention, the base metal is primarily an aluminum metal plate. In still a further and/or alternative embodiment of the invention, the base metal is primarily an aluminum alloy metal plate. In still yet a further and/or alternative embodiment of the invention, the base metal is primarily a nickel alloy plate. In another and/or alternative embodiment of the invention, the base metal is primarily a tin metal plate. In yet another and/or alternative embodiment of the invention, the base metal is primarily a titanium metal plate. In still another and/or alternative embodiment of the invention, the base metal is primarily a titanium alloy metal plate. In yet another and/or alternative embodiment of the invention, the thickness of the copper and/or copper alloy on the aluminum, aluminum alloy, nickel alloy, tin, titanium, or titanium alloy base metal is less than about 2540 microns. In one aspect of this embodiment, the thickness of the copper and/or copper alloy is less than about 1270 microns. In yet another and/or alternative aspect of this embodiment, the thickness of the copper and/or copper alloy is less than about 762 microns. In still and/or alternative another aspect of this embodiment, the thickness of the copper and/or copper alloy is about 1–500 microns. In a further and/or alternative aspect of this embodiment, the thickness of the copper and/or copper alloy is about 3–255 microns. In yet a further and/or alternative aspect of this embodiment, the thickness of the copper and/or copper alloy is about 5–100 microns. In still a further and/or alternative aspect of this embodiment, the thickness of the copper and/or copper alloy is about 5–50 microns. In still yet a further and/or alternative aspect of this embodiment, the thickness of the copper and/or copper alloy is about 5–25 microns. In another and/or alternative aspect of this embodiment, the thickness of the copper and/or copper alloy is less than the thickness of the aluminum, aluminum alloy, nickel alloy, tin, titanium, or titanium alloy base metal. In still yet another and/or alternative embodiment of the invention, the copper and/or copper alloy is applied to the aluminum, aluminum alloy, nickel alloy, tin, titanium, or titanium alloy base metal by plating. In a further and/or alternative embodiment of the invention, the copper and/or copper alloy is applied to the aluminum, aluminum alloy, nickel alloy, tin, titanium, or titanium alloy base metal by cladding. In still a further and/or alternative embodiment of the invention, the copper and/or copper alloy is applied to the aluminum, aluminum alloy, nickel alloy, tin, titanium, or titanium alloy base metal by hot dip coating.

In accordance with yet a further and/or alternative aspect of the invention, the base metal is pretreated prior to applying the metal alloy to the base metal. The pretreatment of the base metal is designed to remove dirt, oil, adhesives, plastic, paper and/or other foreign substances from the surface of the base metal; to remove oxides and other compounds from the base metal surface; etch the base metal surface; and/or improve the bonding of the metal alloy coating to the surface of the base metal. The pretreatment process may include one or more process steps depending on the surface condition of the base metal. In one embodiment of the invention, the various steps of the pretreatment process for the base metal include one or more of the pretreatment process operations disclosed in U.S. Pat. No. 5,395,702, which is incorporated herein. In another and/or alternative embodiment of the invention, the pretreatment process includes, but is not limited to, an abrasion process; an absorbent process; solvent and/or cleaning solution process; a low oxygen environment process; a rinse process; a pickling process; a chemical activation process; and/or a flux treating process. In one aspect of this embodiment, each of these pretreatment process can be use singly or in combination with one another. The type and/or number of pretreatment process used generally depends on the type of base metal and/or condition of the base metal surface. The pretreatment process can be applied to a portion of the base metal surface or the complete surface of the base metal. In still another and/or alternative embodiment of the invention, the abrasion process, absorbent process and/or solvent or cleaning process are designed to remove foreign materials and/or oxides from the base metal surface. In one aspect of this embodiment, the abrasion process includes, but is not limited to, the use of brushes, scrappers and the like to mechanically remove oxides and/or foreign material from the surface of the base metal. In another and/or alternative aspect of this embodiment, the absorbent process includes, but is not limited to, the use of absorbing materials (i.e. towels, absorbent paper products, sponges, squeegees, etc.) to mechanically remove oxides and/or foreign material from the surface of the base metal. In still another and/or alternative aspect of this embodiment, the solvent or cleaning process includes, but is not limited to, the use of water, detergents, abrasives, chemical solvents, and/or chemical cleaners to remove oxides and/or foreign material from the surface of the base metal. The abrasion process, absorbent process, and/or solvent or cleaning process can be use individually or in conjunction with one another to remove foreign materials and/or oxides from the base metal surface. In yet another and/or alternative embodiment of the invention, the low oxygen environment process is designed to inhibit the formation and/or reformation of oxides on the surface of the base metal. The low oxygen environment may take on several forms such as, but not limited to, a low oxygen-containing gas environment and/or a low oxygen-containing liquid environment. Examples of gases used in the low oxygen-containing gas environments include, but are not limited to, nitrogen, hydrocarbons, hydrogen, noble gasses and/or other non-oxidizing gasses. The one or more gases partially or totally shield oxygen and/or other oxidizing elements or compounds from the base metal. In one aspect of this embodiment, the low oxygen-containing gas environment includes nitrogen. Examples of liquids used in the low oxygen-containing liquid environment include, but are not limited to, non-oxidizing liquids and/or liquids containing a low dissolved oxygen content. The liquids partially or totally shield oxygen and/or other oxidizing elements or compounds from the base metal. In another and/or alternative aspect of this embodiment, the low oxygen-containing liquid environment includes heated water that is at least about 37–49° C. (100–110° F.). In still another and/or alternative aspect of this embodiment, the low oxygen-containing environment is applied to the base metal by spraying the low oxygen-containing environment onto the surface of the base metal, partially or totally immersing the base metal in the low oxygen-containing environment, and/or encasing the base metal in the low oxygen-containing environment. In still yet another and/or alternative aspect of this embodiment, agitators are used in the low oxygen-containing liquid environment to facilitate in the removal of oxides and/or inhibit oxide formation on the base metal. The agitators can include brushes which contact the base metal. In still yet another and/or alternative embodiment of the invention, the rinsed process is designed to remove foreign materials, oxides, pickling solution, deoxidizing agent, fluxes, solvents, and/or cleaning solutions from the surface of the base metal. In one aspect of this embodiment, the rinse process includes the use of a rinse solution that includes a low or non-oxidizing liquid. In one design of this aspect, the low or non-oxidizing liquid includes water that is at least about 21° C. (70° F.). In another and/or alternative aspect of this embodiment, the rinse solution can be applied to the surface of the base metal by spraying the rinse solution onto the base metal and/or partially or totally immersing the base metal in the rinse solution. In yet another and/or alternative aspect of this embodiment, the rinse solution is agitated to facilitate in the cleaning of the base metal surface. In still yet another and/or alternative aspect of this embodiment, the rinse solution is recirculated, diluted and/or temperature is maintained during the rinsing process. In a further and/or alternative embodiment of the invention, the pickling process is designed to remove a very thin surface layer from the base metal. The removal of the thin layer from the base metal results in the partial or total removal of oxides and/or other foreign matter from the base metal surface. The removal of the thin surface layer from the base metal causes slight etching of the base metal surface which results in the formation of microscopic valleys on the base metal surface. These microscopic valleys increase the surface area to which the metal alloy and/or intermediate barrier metal layer can bond thereby facilitating in the formation of a stronger bond between the base metal and the metal alloy and/or intermetallic barrier metal layer. The pickling process includes the use of a pickling solution which can be an acidic or a basic solution. In one aspect of this embodiment, the pickling solution is an acidic solution. The acid can be an organic acid, an inorganic acid, or combinations thereof. In one particular design of this aspect, the inorganic acid used in the pickling solution includes, but are not limited to, hydrobromic acid, hydroiodic acid, choleic acid, perchloric acid, hydrofluoric acid, sulfuric acid, nitric acid, hydrochloric acid, phosphoric acid, and/or isobromic acid. In another and/or alternative particular design of this aspect, the organic acid used in the pickling solution includes, but are not limited to, formic acid, propionic acid, butyric acid, and/or isobutyric acid. In another and/or alternative aspect of this embodiment, the pickling solution includes a single acid. Typically, a copper or copper alloy surface can be satisfactorily cleaned or pickled with the use of a single acid. In one particular design of this aspect, the pickling solution only includes an inorganic acid. In still another and/or alternative aspect of this embodiment, the pickling solution includes two or more acids. In some situations, the surface of the base metal is more difficult to clean or pickle. Pickling solutions that include two or more acids typically can provide a more rapid oxide removal rate. In one particular design of this aspect, the pickling solution contains a combination of hydrochloric acid and nitric acid. One specific formulation of this dual acid pickling solution is the pickling solution including about 5–25% by volume hydrochloric acid and about 1–15% by volume nitric acid. A more specific formulation of this dual acid pickling solution is the pickling solution including about 5–15% by volume hydrochloric acid and about 1–5% by volume nitric acid. A yet more specific formulation of this dual acid pickling solution is the pickling solution including about 10% by volume hydrochloric acid and about 3% by volume nitric acid. In yet another and/or alternative aspect of this embodiment, the temperature of the pickling solution is maintained to obtain the desired activity of the pickling solution. In one particular design of this aspect, the pickling solution is maintained at a temperature of above about 26° C. In another and/or alternative particular design of this aspect, the pickling solution is maintained at a temperature of about 48–60° C. In yet another and/or alternative particular design of this aspect, the pickling solution is maintained at a temperature of about 53–56° C. Higher acid concentrations and/or higher acid temperatures will typically increase the activity and aggressiveness of the pickling solution. In yet another and/or alternative aspect of this embodiment, the pickling solution is agitated to prevent or inhibit the pickling solution from stagnating, varying in concentration, varying in temperature, and/or to remove gas pockets which form on the base metal surface. In one particular design of this aspect, the pickling solution is at least partially agitated by placing agitators in a pickling tank and/or by recirculating the pickling solution in a pickling tank. Typically, agitation brushes in the pickling tank contact the base metal as it passes through the pickling tank to facilitate in oxide removal and cleaning of the base metal surface. In a further and/or alternative aspect of this embodiment, the base metal is exposed to the pickling solution for a sufficient time to properly clean and/or pickle the surface of the base metal. In one particular design of this aspect, the total time for pickling the base metal is less than about 10 minutes. In another and/or alternative particular design of this aspect, the total time for pickling the base metal is less than about two minutes. In still another and/or alternative particular design of this aspect, the total time for pickling the base metal is less than about one minute. In still yet another and/or alternative particular design of this aspect, the total time for pickling the base metal is about 5–60 seconds. In a further and/or alternative particular design of this aspect, the total time for pickling the base metal is about 10–20 seconds. In still a further and/or alternative aspect of this embodiment, the pickling solution is applied to the base metal by spray jets. In yet a further and/or alternative aspect of this embodiment, the base metal is partially or fully immersed in the pickling solution contained in a pickling tank. In still a further and/or alternative embodiment of the invention, the chemical activation process is designed to remove oxides and/or foreign material from the base metal surface. In one aspect of this embodiment, the chemical activation process includes the subjecting of the base metal surface to a deoxidizing agent. Various types of deoxidizing agents may be used. In another and/or alternative aspect of this embodiment, the deoxidizing agent includes zinc chloride. In one particular design of this aspect, the deoxidizing agent includes at least about 1% by volume zinc chloride. In another and/or alternative particular design of this aspect, the deoxidizing agent includes at least about 5% by volume zinc chloride. The zinc chloride removes oxides and foreign materials from the base metal surface and/or provides a protective coating which inhibits oxide formation on the base metal surface. In still another and/or alternative aspect of this embodiment, the temperature of the zinc chloride solution is at least about ambient temperature (about 15–32° C.). In yet another and/or alternative aspect of this embodiment, the deoxidizing solution is agitated to maintain a uniform solution concentration and/or temperature. In one particular design of this aspect, the agitators include brushes which contact the base metal. In still yet another and/or alternative aspect of this embodiment, small amounts of acid are included to the deoxidizing solution to enhance oxide removal. In one particular design of this aspect, hydrochloric acid is included to the deoxidizing solution. In one specific formulation of this design, the deoxidizing solution includes about 1–50% by volume zinc chloride and about 0.5–15% by volume hydrochloric acid. In another and/or alternative specific formulation of this design, the deoxidizing solution includes about 5–50% by volume zinc chloride and about 1–15% by volume hydrochloric acid. In a further and/or alternative aspect of this embodiment, the base metal is subjected to the deoxidizing solution for less than about 10 minutes. In one particular design of this aspect, the base metal is subjected to the deoxidizing solution for up to about one minute. In still a further and/or alternative aspect of this embodiment, the deoxidizing solution is applied to the base metal by spray jets. In yet a further and/or alternative aspect of this embodiment, the base metal is partially or fully immersed in the deoxidizing solution contained in a deoxidizing tank.

In accordance with still a further and/or alternative aspect of the invention, one or more surfaces of the base metal is coated with an intermediate barrier metal layer prior to applying the metal alloy to the base metal. The intermediate barrier metal layer is designed to improve the bonding of the metal alloy coating to the surface of the base metal. The application of an intermediate barrier metal layer can be used as a substitute for one or more pretreatment process, or can be applied after one or more pretreatment process have been applied to the surface of the base metal. The intermediate barrier metal process is designed to coat one or more surface areas of the base metal with a thin metal coating. The intermediate metal barrier is applied to part of or the complete surface of the base metal by a plating process, a plating and subsequent flow heating process, a metal spraying process, a coating roller process, an immersion process in molten metal prior to applying the metal alloy coating to the base metal, and/or pickling process. The intermediate barrier metal typically provides additional corrosion resistance to the base metal in many types of corrosive environments. In marine environments where the coated base metal is exposed to salt and/or halogens (i.e. chlorine, fluorine, etc.), the use of an intermediate barrier metal can significantly extend the life of the coated base metal. The use of an intermediate barrier metal can also enhance the bonding of the metal alloy coating to the base metal. Some base metals may form a weaker bond with certain formulations of the metal alloy. The application of an intermediate barrier metal on part of or the complete surface of the base metal can, in many instances, improve the strength of the bond of the metal alloy coating to the base metal. The intermediate barrier metal includes copper and/or nickel. Other or additional metals can be included in the intermediate barrier metal, such as, but not limited to, aluminum, chromium, cobalt, molybdenum, Sn—Ni, Fe—Ni, tin, and/or zinc. Typically, one intermediate barrier metal is formed on the surface of the base metal; however, more than one layer of one or more intermediate barrier metals can be applied to the surface of the base metal to form a thicker intermediate barrier metal layer, alter the composition of the intermediate barrier metal layer, alter the composition of the heat created intermetallic layer if formed, and/or improve the bonding of the metal alloy coating to the intermediate barrier metal layer and/or base metal. In one embodiment of the invention, copper or a copper alloy is included in the intermediate barrier metal. A copper or copper alloy containing intermediate barrier metal layer enhances the corrosion-resistant properties of the heat created intermetallic layer that is formed between the metal alloy and the base metal, improves the bonding of the metal alloy to the base metal, and/or improves the corrosion resistance of the metal alloy and/or coated base metal. The copper or copper ahoy in the intermediate barrier metal can also inhibit adverse zinc crystal growth in the heat created intermetallic layer. A thick zinc layer can cause poor coating quality or cracking of the coating during forming and bending, give rise to localized corrosion, and/or adversely affect performance of the coated base metal in some applications. The copper or copper alloy is typically plated onto the surface of the base metal; however, the copper or copper alloy can be applied to the surface of the base metal by other means such as, but not limited to, hop dip coating, cladding or other bonding methods. In one aspect of this embodiment, the copper or copper alloy is plated on the surface of the base metal. The plated copper or copper alloy layer can be formed by passing the base metal through an electroplating process or by adding copper sulfate to a pickling solution and pickling the coated base metal. In another and/or alternative embodiment of the invention, the intermediate barrier metal includes nickel. Typically, the nickel is flashed or plated to the base metal surface; however, the nickel can be applied to the surface of the base metal by other means. The nickel in the intermediate barrier metal layer improves corrosion-resistance of the base metal and/or metal alloy, especially against halogen containing compounds which can penetrate the metal alloy coating and attack and oxidize the surface of the base metal thereby weakening the bond between the base metal and the metal alloy coating. The nickel in the intermediate barrier metal layer has also been found to provide a formidable barrier to alcohols and/or various type of petroleum products. The metal alloy coating and nickel in the intermediate barrier metal can effectively complement one another to provide superior corrosion resistance. An intermediate barrier metal layer which includes nickel can also improve the bonding of the metal alloy coating to the base metal. An intermediate barrier metal layer which includes nickel can also inhibit the formation of a thick zinc layer in the heat created intermetallic layer. In yet another and/or alternative embodiment of the invention, the thickness of the intermediate barrier metal layer is at least about 0.3 micron. In one aspect of this embodiment, the thickness of the intermediate barrier metal layer is at least about 1 micron. In another and/or alternative aspect of this embodiment, the thickness of the intermediate barrier metal layer is less than about 500 microns. In yet another and/or alternative aspect of this embodiment, the thickness of the intermediate barrier metal layer is less than about 250 microns. In still another and/or alternative aspect of this embodiment, the thickness of the intermediate barrier metal layer is less than about 50 microns. In still yet another and/or alternative aspect of this embodiment, the thickness of the intermediate barrier metal layer is less than about 20 microns. In a further and/or alternative aspect of this embodiment, the thickness of the intermediate barrier metal layer is less than about 15 microns. In yet a further and/or alternative aspect of this embodiment, the thickness of the intermediate barrier metal layer is less than about 12 microns. In accordance with still yet another and/or alternative embodiment of the invention, the intermediate barrier metal layer is heated prior to applying the metal alloy coating to the base metal. The heating of the intermediate barrier metal layer to a sufficient temperature for a sufficient amount of time causes a heat created intermetallic layer to form between the intermediate barrier metal layer and the base metal. A heat created intermetallic layer can be formed without the use of a subsequent heating step when the intermediate barrier metal is applied to the base metal by a metal spraying process, a coating roller process, and/or an immersion process. The temperature of the intermediate barrier metal in the heated or molten state causes a heat created intermetallic layer to at least partially form between the intermediate barrier metal and the base metal. A "heat created intermetallic layer" is defined herein as a metal layer formed by heat wherein the metal layer is a mixture of at least the primary surface components of the base metal and components of a coated metal layer (i.e. intermediate barrier metal and/or metal alloy coating). The application of heat to the base metal and the coated metal layer results in the surface of the base metal to soften and/or melt, and to combine with a portion of the soften or melted coated metal layer. In many instances, the formation of a heat created intermetallic layer results in improved bonding of the coated metal layer to the base metal, and/or improves the corrosion-resistance of the base metal and/or coated metal layer. Typically the temperature that the coated metal layer and/or base metal is exposed to at least partially cause the formation of a heat created intermetallic layer is a temperature that at least softens the surface of the base metal and/or the coated metal layer. In many instances, the melting point of the coated metal layer will be less than the melting temperature of the surface of the base metal. As such, the temperature that the coated metal layer and/or base metal is exposed to is typically the temperature that at least softens the coated metal layer. For example, if the coated metal layer was plated copper, the temperature needed to at least partially cause the formation of a heat created intermetallic layer would be at least about 926° C. (1700° F.), and typically at least about 1060° C. (1940° F.). In one aspect of this embodiment, the thickness of the heat created intermetallic layer formed between the base metal and the intermediate barrier metal is at least about 0.1 micron. In another and/or alternative aspect of this embodiment, the thickness of the heat created intermetallic layer formed between the base metal and the intermediate barrier metal is at least about 0.3 micron. In still another and/or alternative aspect of this embodiment, the thickness of the heat created intermetallic layer formed between the base metal and the intermediate barrier metal is at least about 0.5 micron. In yet another and/or alternative aspect of this embodiment, the thickness of the heat created intermetallic layer formed between the base metal and the intermediate barrier metal is at least about 1 micron. In still yet another and/or alternative aspect of this embodiment, the thickness of the heat created intermetallic layer formed between the base metal and the intermediate barrier metal is less than about 100 microns. In still yet another and/or alternative aspect of this embodiment, the thickness of the heat created intermetallic layer formed between the base metal and the intermediate barrier metal is less than about 50 microns. In a further and/or alternative aspect of this embodiment, the thickness of the heat created intermetallic layer formed between the base metal and the intermediate barrier metal is less than about 25 microns. In yet a further and/or alternative aspect of this embodiment, the thickness of the heat created intermetallic layer formed between the base metal and the intermediate barrier metal is less than about 20 microns. In still a further and/or alternative aspect of this embodiment, the thickness of the heat created intermetallic layer formed between the base metal and the intermediate barrier metal is less than about 18 microns. In still yet a further and/or alternative aspect of this embodiment, the thickness of the heat created intermetallic layer formed between the base metal and the intermediate barrier metal is less than about 15 microns. In still another and/or alternative aspect of this embodiment, the thickness of the heat created intermetallic layer formed between the base metal and the intermediate barrier metal is less than about 12 microns. Typically the formation of a heat created intermetallic layer makes at least a couple seconds to form. In still another and/or alternative embodiment of the present invention, the base metal is exposed to heat for at least about 2 seconds to at least partially form the heat created intermetallic layer between the base metal and the intermediate barrier metal. The time period of heat exposure for an intermediate barrier metal layer applied by a plating and/or a pickling process is the time the intermediate barrier metal is exposed to heat after the plating and/or pickling process. The time period for heat exposure for an intermediate barrier metal layer applied by metal spraying, coating rollers, and/or immersion in molten metal includes the time of applying the intermediate barrier metal to the base metal and the time the intermediate barrier metal is exposed to heat after the metal spraying, coating rollers, and/or immersion in molten metal process. Typically, the time of total heat exposure is less than about four hours; however, greater heat exposure times can be used. In one aspect of this embodiment, the total time period of heat exposure to an intermediate barrier metal layer applied to the base metal to at least partially form an intermetallic layer between the base metal and the intermediate barrier metal layer is less than about 20 minutes. In another and/or alternative aspect of this embodiment, the total time period of heat exposure to an intermediate barrier metal layer applied to the base metal to at least partially form an intermetallic layer between the base metal and the intermediate barrier metal layer is less than about 10 minutes. In yet another and/or alternative aspect of this embodiment, the total time period of heat exposure to an intermediate barrier metal layer applied to the base metal to at least partially form an intermetallic layer between the base metal and the intermediate barrier metal layer is less than about 5 minutes. In still another and/or alternative aspect of this embodiment, the total time period of heat exposure to an intermediate barrier metal layer applied to the base metal to at least partially form an intermetallic layer between the base metal and the intermediate barrier metal layer is about 0.033–2 minutes. When heat is applied to the coated base metal to form or further form the heat created intermetallic layer between the base metal and intermediate metal barrier layer, the heat typically is applied by, but not limited to, an oven and/or furnace, induction heating coils, lasers, heat exchanger, and/or radiation. As can be appreciated, the flow heating of the plated intermediated barrier layer can also function as a pre-heat process for the base metal. Alternatively, or in addition to, the heat can be supplied by coating the base metal and the intermediated metal barrier layer with a metal alloy by a hot-dip process. The heat from the hot-dip process causes the formation of the heat created intermetallic layer. In still another embodiment of the invention, the application of the intermediate barrier metal layer on the surface of the base metal is a partial or complete pretreatment process for the surface of the base metal prior to applying the metal alloy coating to the base metal. The application of the an intermediate barrier metal to the surface of the base metal forms a clean metal surface on the base metal surface. Due to this clean metal surface, the application of the an intermediate barrier metal to the surface of the base metal can function as the sole pretreatment process for the surface of the base metal. As can be appreciated, the surface of the base metal can be pretreated with other pretreatment process prior to applying the intermediate barrier metal layer and/or pretreated with other pretreatment process subsequent to applying the intermediate barrier metal layer.

In accordance with another and/or alternative aspect of the invention, metal alloy coating is coated on the base metal by a plating process or by a hot dip process. The coating process for the metal alloy coating can be by a batch or continuous process. As defined herein, a "hot dip process" for the metal alloy is any process that coats the metal alloy coating on the base metal and causes the at least partial formation of a heat created intermetallic layer between the base metal and the metal alloy coating. Examples of a hot dip process include, but are not limited to, 1) plating a metal alloy coating partially or totally on the base metal and subsequently heating the plated layer until a heat created intermetallic layer at least partially forms between the plated layer and the base metal, 2) plating a metal alloy partially or totally on the base metal and subsequent partial or total immersion of the base metal in a molten bath of metal alloy for a sufficient period of time to partially or totally coat the base metal and to at least partially form a heat created intermetallic layer between the coated metal alloy layer and the base metal, 3) plating a metal alloy partially or totally on the base metal and subsequent spray coating molten metal alloy onto the base metal to partially or totally coat the base metal wherein the base metal is spray coated for a sufficient period of time to at least partially form a heat created intermetallic layer between the coated metal layer and base metal, 4) plating a metal alloy partially or totally on the base metal and subsequent partial or total immersion of the base metal in a molten bath of metal alloy and spray coating molten metal alloy onto the base metal to partially or totally coat the base metal wherein the base metal is spray coated and immersed for a sufficient period of time to at least partially form a heat created intermetallic layer between the coated metal layer and base metal, 5) partial or total immersion of the base metal in a molten bath of metal alloy for a sufficient period of time to partially or totally coat the base metal and to at least partially form a heat created intermetallic layer between the coated metal layer and the base metal, 6) partial or total immersion of the base metal in a molten bath of metal alloy for a sufficient period of time to partially or totally coat the base metal and spray coating molten metal alloy onto the base metal to partially or totally coat the base metal wherein the base metal is immersed and sprayed for a sufficient period of time to at least partially form a heat created intermetallic layer between the coated metal layer and base metal, 7) spray coating the base metal with molten metal alloy to partially or totally coat the base metal for a sufficient period of time to at least partially form a heat created intermetallic layer between the coated metal layer and the base metal, 8) plating and subsequent heating and subsequent immersion in molten metal alloy coating and/or spray coating molten metal alloy coating to at least partially form a heat created intermetallic layer between the coated metal layer and the base metal, 9) plating and subsequent heating and subsequent immersion in molten metal alloy coating and/or spray coating molten metal alloy coating and subsequent heating after immersion in molten metal alloy coating and/or spray coating molten metal alloy coating to at least partially form a heat created intermetallic layer between the coated metal layer and the base metal, 10) immersion in molten metal alloy coating and subsequent heating to at least partially form a heat created intermetallic layer between the coated metal layer and the base metal, 11) immersion in molten metal alloy coating and spray coating molten metal alloy coating and subsequent heating after immersion and spray coating to at least partially form a heat created intermetallic layer between the coated metal layer and the base metal, 12) spray coating molten metal alloy coating and subsequent heating after spray coating to at least partially form a heat created intermetallic layer between the coated metal layer and the base metal, 13) coating molten metal alloy by coating rollers to at least partially form a heat created intermetallic layer between the coated metal layer and the base metal, 14) coating molten metal alloy by coating rollers and spray coating to at least partially form a heat created intermetallic layer between the coated metal layer and the base metal, 15) immersion in molten metal alloy and coating molten metal alloy by coating rollers to at least partially form a heat created intermetallic layer between the coated metal layer and the base metal, 16) plating and coating molten metal alloy by coating rollers to at least partially form a heat created intermetallic layer between the coated metal layer and the base metal, 17) coating molten metal alloy by coating rollers and subsequent heating to at least partially form a heat created intermetallic layer between the coated metal layer and the base metal. As can be appreciated, many other hot dip coating combinations can be used. As further can be appreciated, the base metal can be coated a multiple times by various types of coated processes. When heat is applied to the coated base metal to form or further form the heat created intermetallic layer between the base metal and the metal alloy coating, the heat typically is applied by, but not limited to, an oven and/or furnace, induction heating coils; lasers, heat exchanger, and/or radiation. In one embodiment of the invention, the thickness of the heat created intermetallic layer is at least about 0.3 micron. In one aspect of this embodiment, the thickness of the heat created intermetallic layer formed between the base metal and the metal alloy coating is at least about 1 micron. In yet another and/or alternative aspect of this embodiment, the thickness of the heat created intermetallic layer formed between the base metal and the metal alloy coating is less than about 100 microns. In still another and/or alternative aspect of this embodiment, the thickness of the heat created intermetallic layer formed between the base metal and the metal alloy coating is less than about 50 microns. In still yet another and/or alternative aspect of this embodiment, the thickness of the heat created intermetallic layer formed between the base metal and the metal alloy coating is less than about 25 microns. In a further and/or alternative aspect of this embodiment, the thickness of the heat created intermetallic layer formed between the base metal and the metal alloy coating is less than about 20 microns. In still a further and/or alternative aspect of this embodiment, the thickness of the heat created intermetallic layer formed between the base metal and the metal alloy coating is less than about 18 microns. In still yet a further and/or alternative aspect of this embodiment, the thickness of the heat created intermetallic layer formed between the base metal and the metal alloy coating is less than about 15 microns. In still another and/or alternative aspect of this embodiment, the thickness of the heat created intermetallic layer formed between the base metal and the metal alloy coating is less than about 12 microns. Typically, the formation of a heat created intermetallic layer takes at least a couple seconds to form. In another and/or alternative embodiment of the invention, the base metal and/or metal alloy coating is exposed to heat for at least 2 seconds to at least partially form the heat created intermetallic layer between the base metal and the metal alloy coating. The time period of heat exposure of a metal alloy coating layer applied by a plating process is the time the metal alloy coating is exposed to heat after the plating process. The time period for heat exposure for a metal alloy coating layer applied by metal spraying, coating rollers and/or immersion in molten metal includes the time of applying the metal ahoy coating to the base metal and the time the metal alloy coating is exposed to heat after the metal spraying, coating rollers, and/or immersion in molten metal process. In one aspect of this embodiment, the total time period of heat exposure to a metal alloy coating layer applied to the base metal to at least partially form an intermetallic layer between the base metal and the metal alloy coating layer is less than about 4 hours; however, greater heat exposure times can be used. In another and/or alternative aspect of this embodiment, the total time period of heat exposure to a metal alloy coating layer applied to the base metal to at least partially form an intermetallic layer between the base metal and the metal alloy coating layer is less than about 3 hours. In still another and/or alternative aspect of this embodiment, the total time period of heat exposure to a metal alloy coating layer applied to the base metal to at least partially form an intermetallic layer between the base metal and the metal alloy coating layer is less than about 2 hours. In yet another and/or alternative aspect of this embodiment, the total time period of heat exposure to a metal alloy coating layer applied to the base metal to at least partially form an intermetallic layer between the base metal and the metal alloy coating layer is less than about 1 hour. In still yet another and/or alternative aspect of this embodiment, the total time period of heat exposure to a metal alloy coating layer applied to the base metal to at least partially form an intermetallic layer between the base metal and the metal alloy coating layer is less than about 30 minutes. In a further and/or alternative aspect of this embodiment, the total time period of heat exposure to a metal alloy coating layer applied to the base metal to at least partially form an intermetallic layer between the base metal and the metal alloy coating layer is less than about 20 minutes. In yet further and/or alternative aspect of this embodiment, the total time period of heat exposure to a metal alloy coating layer applied to the base metal to at least partially form an intermetallic layer between the base metal and the metal alloy coating layer is less than about 10 minutes. In still a further and/or alternative aspect of this embodiment, the total time period of heat exposure to a metal alloy coating layer applied to the base metal to at least partially form an intermetallic layer between the base metal and the metal alloy coating layer is less than about 5 minutes. In still yet further and/or alternative aspect of this embodiment, the total time period of heat exposure to a metal alloy coating layer applied to the base metal to at least partially form an intermetallic layer between the base metal and the metal alloy coating layer is about 0.033–2 minutes. In another and/or alternative aspect of this embodiment, the total time period of heat exposure to a metal alloy coating layer applied to the base metal to at least partially form an intermetallic layer between the base metal and the metal alloy coating layer is about 0.033–0.5 minutes. In yet another and/or alternative aspect of this embodiment, the total time period of heat exposure to a metal alloy coating layer applied to the base metal to at least partially form an intermetallic layer between the base metal and the metal alloy coating layer is about 0.083–0.5 minutes. In still yet another and/or alternative embodiment of the invention, the metal alloy coating formed on the surface of the base metal by a batch coating process or by a continuous coating process can result in different types of coatings. These differences can include, but are not limited to, the following:

a) Uniformity of coating (weight and thickness)

b) Surface appearance c) Smoothness d) Texture control e) Control of intermetallic phases (growth and uniformity)

A base metal coated in a continuous coating process typically produces a coated base metal having superior uniformity of coating (weight and thickness), superior metallographic structure, superior surface appearance, superior smoothness, superior spangle size, and fewer surface defects. Furthermore, the composition of the heat created intermetallic layer is typically superior as compared to a base metal coated in a batch coating process. In addition to surface appearance and uniformity of thickness, the formability of the coated base metal is generally better due to a more uniform coating thickness on the surface of the base metal. In general, thicker coatings provide greater corrosion protection, whereas thinner coatings tend to give better formability and weldability. Thinner coatings with uniformity of thickness can be better formed by a continuous coating process.

In still another and/or alternative aspect of the invention, the metal alloy coating is at least partially applied to the surface of the base metal, the surface of the intermediate barrier metal layer, and/or an existing metal alloy coating by a plating process. When a plating process is used, a heat created intermetallic layer is not formed between the metal alloy coating and the surface of the base metal, the surface of the intermediate barrier metal layer, and/or a previously applied metal alloy coating. Typically, the plating process is carried out by standard plating processes, thus a detailed description of a plating process is not described herein. The complete or partial surface of the base metal, the surface of the intermediate barrier metal layer, and/or surface of a previously applied metal alloy can be coated by the plating process. The plating of the components of the corrosion resistant metal alloy can be accomplished at the same time or in subsequent steps. For instance, a corrosion resistant tin and zinc alloy which an be plated by a) simultaneously plating the tin and zinc onto the surface of the base metal, the surface of the intermediate barrier metal layer, and/or metal alloy coating, b) first plating the tin on the surface of the base metal, the surface of the intermediate barrier metal layer and/or metal alloy coating, and subsequently plating the zinc on the surface of the base metal, the surface of the intermediate barrier metal layer, and/or metal alloy coating, or c) first plating the zinc on the surface of the base metal, the surface of the intermediate barrier metal layer, and/or metal alloy coating, and subsequently plating the tin on the surface of the base metal, the surface of the intermediate barrier metal layer, and/or metal alloy coating. Similarly, a corrosion resistant tin and zinc alloy which includes antimony can be plated by a) simultaneously plating the tin, zinc and antimony onto the surface of the base metal, the surface of the intermediate barrier metal layer, and/or metal alloy coating, b) first plating the tin on the surface of the base metal, the surface of the intermediate barrier metal layer, and/or metal alloy coating, then plating the zinc on the surface of the base metal, the surface of the intermediate barrier metal layer, and/or metal alloy coating, and subsequently plating the antimony on the surface of the base metal, the surface of the intermediate barrier metal layer, and/or metal alloy coating, c) first plating the zinc on the surface of the base metal, the surface of the intermediate barrier metal layer, and/or metal alloy coating, then plating the tin on the surface of the base metal, the surface of the intermediate barrier metal layer, and/or metal alloy coating, and subsequently plating the antimony on the surface of the base metal, the surface of the intermediate barrier metal layer, and/or metal alloy coating, d) first plating the antimony on the surface of the base metal, the surface of the intermediate barrier metal layer, and/or metal alloy coating, and subsequently simultaneously plating tin and zinc on the surface of the base metal, the surface of the intermediate barrier metal layer, and/or metal alloy coating, etc. In one embodiment of the invention, a tin and zinc alloy is plated on the surface of the base metal. In one aspect of this embodiment, the plating process includes the plating of tin and zinc in an electrolytic solution containing stannous tin, zinc and an acid.

In yet another and/or alternative aspect of the invention, the metal alloy coating is at least partially applied to the surface of the base metal, the surface of the intermediate barrier metal layer, and/or previously applied metal alloy coating by a hot dip process that includes plating and subsequent heating of the plated metal alloy. The metal alloy is plated onto the surface of the base metal, the surface of the intermediate barrier metal layer, and/or a previously applied metal alloy coating by a plating process that is the same as or similar to the plating process described above. After the metal alloy is plated onto the surface of the base metal, the surface of the intermediate barrier metal layer, and/or previously applied metal alloy coating, the plated metal alloy coating is subjected to heat for a sufficient period of time and at a sufficient temperature to form a heat created intermetallic layer between the plated metal alloy coating and the surface of the base metal, the surface of the intermediate barrier metal layer, and/or the surface of the previously applied metal alloy coating (i.e. flow heating). If one or more of the components of the corrosion resistant metal alloy coating are plated by a separate plating process, the plated metal components of the metal alloy coating can be subjected to heat after one or more of the plating processes, or after all the components of the metal alloy coating have been coated onto the surface of the base metal, the surface of the intermediate barrier metal layer, and/or the surface of the previously applied metal alloy coating. The heating of the plated metal alloy coating causes at least a portion of the metal alloy to enter a softened or molten state and to form an at least partially uniform and substantially level coating layer. The heating of the plated metal alloy coating also facilitates in the reduction and/or elimination of pin holes in the metal alloy coating which may have formed during the plating process. The time period selected for heating the plated metal alloy coating generally depends on the time necessary to soften and/or melt the desired amount of metal coating to form the desired thickness of the heat created intermetallic layer. When one or more of the components of the metal alloy coating are plated by separate plating process, the plated metal components of the metal alloy coating are subjected to heat for a sufficient period of time to at least partially alloy together the components of the metal alloy coating. The heating process for the plated metal alloy can be by a batch or by a continuous process. In one embodiment of the invention, the plated metal alloy coating is exposed to heat by the application of another molten metal alloy coating onto the surface of the plated metal alloy coating. The heat of the molten metal alloy upon contact with the plated metal alloy causes the components of the plated metal alloy coating to at least partially alloy together and/or to at least partially form the heat created intermetallic layer between the plated metal alloy coating and the surface of the base metal, the surface of the intermediate barrier metal layer, and/or the surface of the previously applied metal alloy coating. In one aspect of this embodiment, a molten metal alloy is applied by immersion and coated onto the surface of the plated metal alloy coating. In another aspect of this embodiment, a molten metal alloy is applied by coating rollers and coated onto the surface of the plated metal alloy coating. In still another aspect of this embodiment, a molten metal alloy is applied by spray coating and coated onto the surface of the plated metal alloy coating. In another embodiment of the invention, the plated metal alloy coating is exposed to an external heat source for a time period and temperature sufficient to at least partially alloy together the components of the plated metal alloy coating and/or to at least partially form the heat created intermetallic layer between the plated metal alloy coating and the surface of the base metal, the surface of the intermediate barrier metal layer, and/or the surface of the previously applied metal alloy coating. The plated metal alloy coating is typically exposed to heat through the use of a convection oven, a furnace, heated fluids, flames, induction heating, lasers, hot gasses, radiation, and the like. In one aspect of this embodiment, the temperature the plated metal alloy is exposed to a temperature that is at least about 200° C. In another aspect of this embodiment, the temperature the plated metal alloy is exposed to a temperature that is less than about 2000° C. In still another aspect of this embodiment, the temperature the plated metal alloy is exposed to is less than about 1000° C. In yet another aspect of this embodiment, the temperature that the plated metal alloy is exposed to is less than about 500° C.

In accordance with still yet another and/or alternative aspect of the invention, the corrosion resistant metal alloy is at least partially coated onto the surface of the base metal, the surface of the intermediate barrier metal layer, and/or the surface of the previously applied metal alloy coating by immersion into molten corrosion resistant metal alloy. In one embodiment of the invention, the molten corrosion resistant metal alloy is maintained at a temperature of at least about 232° C. (449° F.). In one aspect of this embodiment, the molten corrosion resistant metal alloy is maintained at a temperature of at least about 2–30° C. above the melting point of the corrosion resistant metal alloy. In another embodiment of the invention, the residence time of the base metal in the molten corrosion resistant alloy is selected to at least partially form a heat created intermetallic layer between the corrosion resistant alloy metal coating and the surface of the base metal, the surface of the intermediate barrier metal layer, and/or the surface of the previously applied metal alloy coating. In one aspect of this embodiment, the residence time of the base metal in the molten metal alloy is at least about 0.033–0.083 minutes. In another aspect of this embodiment, the residence time of the base metal in the molten metal alloy is less than about 10 minutes. In still another aspect of this embodiment, the residence time of the base metal in the molten metal alloy is less than about two minutes. In yet another aspect of this embodiment, the residence time of the base metal in the molten metal alloy is less than about one minute. In still yet another aspect of this embodiment, the residence time of the base metal in the molten metal alloy is about 0.083–0.5 minutes.

In accordance with another and/or alternative aspect of the invention, the hot dip coating of the base metal by immersion in molten metal alloy includes the use of a flux box. The flux box is designed to receive the base metal prior to the base metal passing into the molten metal alloy. The flux solution in the flux box can be formulated to remove residual oxides from the base metal surface; shield the surface of the base metal, the surface of the intermediate barrier metal layer, and/or the surface of the previously applied metal alloy coating from oxygen until the surface of the base metal, the surface of the intermediate barrier metal layer, and/or the surface of the previously applied metal alloy coating base metal is coated with the molten metal alloy; inhibit the formation of viscous oxides at the point where the base metal enters the molten metal alloy; and/or inhibit dross formation during the coating process. The exposure of the base metal to the flux solution is typically the last pretreatment process of the base metal prior to being coated by immersion in molten metal alloy. In one embodiment of the invention, the flux box contains a flux solution which has a lower specific gravity than the molten metal alloy, thus the flux solution at least partially floats on the surface of the molten alloy. In another and/or alternative embodiment of the invention, the flux solution includes a zinc chloride solution. In one aspect of this embodiment, the flux solution includes ammonium chloride. In another and/or alternative aspect of this embodiment, the flux solution includes about 20–75% by volume zinc chloride. In yet another and/or alternative aspect of this embodiment, the flux solution includes zinc chloride and ammonium chloride. In still yet another and/or alternative aspect of this embodiment, the flux solution includes about 20–75% by volume zinc chloride and up to about 40% by volume ammonium chloride. In a further and/or alternative aspect of this embodiment, the flux solution includes about 30–60% by volume zinc chloride and up to about 1–20% by volume ammonium chloride. In yet a further and/or alternative aspect of this embodiment, the flux solution includes about 50% by volume zinc chloride and about 8% by volume ammonium chloride.

In accordance with still another and/or alternative aspect of the invention, the hot dip process of coating the base metal is by immersion in a molten metal alloy includes a melting pot for heating the molten metal alloy. In one embodiment of the invention, the melting pot is heated by heating coils, heating rods, gas jets, induction heating, lasers, radiation, etc. In one aspect of this embodiment, the melting pot is heated by at least one gas jet directed toward at least one side of the melting pot. In another and/or alternative aspect of this embodiment, heating coils and heating rods are used to heat the metal alloy directly in the melting pot. In still another and/or alternative aspect of this embodiment, gas jets are used heat the molten metal alloy in the melting pot.

In accordance with a further and/or alternative aspect of the invention, the hot dip process of coating the base metal by immersion in molten metal alloy includes the use of a protective material on at least a portion of the surface of the molten metal alloy in the melting pot. The protective material is formulated to at least partially shield the molten metal alloy from the atmosphere thereby preventing or inhibiting oxide formation on the surface of the molten metal alloy, and/or preventing or inhibiting dross formation on the coated base metal as the coated base metal enters and/or exits from the melting pot. In one embodiment of the invention, the protective material has a specific gravity which is less than the specific gravity of the molten metal alloy so that at least a portion of the protective material at least partially floats on the surface of the molten metal alloy. In another and/or alternative embodiment of the invention, the protective material includes an oil. In one aspect of this embodiment, the protective material includes palm oil. When the protective material is palm oil, the melting point of the metal alloy should be below about 344° C., the degrading point of palm oil. For metal alloys having a higher melting point, other oils, fluxes, or other materials and/or special cooling processes for the protective material are employed when a protective material is used. In still another and/or alternative embodiment, the protective material facilitates in forming a smooth and uniform coating on the surface of the base metal.

In accordance with another and/or alternative aspect of the invention, the thickness of the metal alloy coating by immersion in molten metal alloy is at least partially regulated by the residence time of the base metal in the molten metal alloy, the temperature of the molten metal alloy in the melting pot, and/or the speed at which the base metal moves through the molten metal alloy. In one embodiment of the invention, the base metal is maintained at a substantially constant speed through the molten metal alloy. The substantially uniform speed results in a substantially uniform growth of the heat created intermetallic layer between the metal alloy and the base metal, a substantially smooth coating of metal alloy, and/or a substantially constant metal alloy coating thickness. As the base metal passes through the molten metal alloy at a substantially constant speed, the metal alloy adheres to the moving base metal and shears a portion of the metal alloy coating from the moving base metal. The shearing effect results from the viscosity of the molten alloy and the speed of the moving base metal. For a given speed and metal alloy viscosity, a certain thickness of metal alloy will be applied to the base metal over a given time. The shearing effect results in a substantially uniform coating, excellent surface appearance, excellent smoothness, excellent texture control and a substantially uniform heat created intermetallic layer. In another and/or alternative embodiment of the invention, the base metal is coated by moving the base metal through the molten metal alloy in the melting pot at a relatively constant speed of about 1–400 ft/min. In one aspect of this embodiment, the base metal is moved through the molten metal alloy in the melting pot at a relatively constant speed of about 50–250 ft/min.

In accordance with still another and/or alternative aspect of the invention, the corrosion resistant metal alloy is at least partially coated onto the surface of the base metal, the surface of the intermediate barrier metal layer, and/or the surface of the previously applied metal alloy coating by a coating roller process. Molten metal alloy on the coating rollers is applied to the surface of the base metal, the surface of the intermediate barrier metal layer, and/or the surface of the previously applied metal alloy coating by a coating roller process as the base metal passes by or between one or more coating rollers. The coating rollers form a substantially smooth and/or uniform metal alloy coating layer on the base metal. One or more coating rollers at least partially press against and coat the surface of the base metal, the surface of the intermediate barrier metal layer, and/or the surface of the previously applied metal alloy coating; and/or fill pinholes or uncoated surfaces on the surface of the base metal, the surface of the intermediate barrier metal layer, and/or the surface of the previously applied metal alloy coating by a coating. roller process. The coating rollers can also control the thickness of the metal alloy coating onto the surface of the base metal, the surface of the intermediate barrier metal layer, and/or the surface of the previously applied metal alloy coating by a coating roller process. In one embodiment of the invention, one or more coating rollers are used in conjunction with an immersion process and/or metal spray process. In another and/or alternative embodiment, at least two coating rollers are spaced apart a sufficient distance so that the base metal can pass between the coating rollers. As the base metal basses between one or more coating rollers, the coating rollers maintain a desired coating thickness of the metal alloy on the base metal, remove excess metal alloy from the base metal, and/or coat any non-coated regions on the surface of the base metal. In one aspect of this embodiment, the coating thickness of the metal alloy is selected to ensure that essentially no uncoated regions exist on the surface of the base metal. Typically, the average thickness of the metal alloy on the surface of base metal is at least about 1 micron, and generally at least about 2.5 microns, more generally about 7 to 2550 microns, and even more generally about 7–1270 microns. In another and/or alternative aspect of this embodiment, the coating thickness of the metal alloy is selected to ensure the coated metal alloy has essentially no pin holes, and/or does not shear when formed into various products. A metal alloy coating thickness of about 25–51 microns forms a coating that has few, if any, pin holes, provides greater elongation characteristics, and resist shearing when formed into various shaped articles; however, thinner coating may include few, if any, pin holes. In still another and/or alternative aspect of this embodiment, the thickness of the metal alloy is selected for use in certain types of environments in which the coated base metal is to be used. A metal alloy coating thickness of about 25–51 microns forms a coating that significantly reduces the corrosion rate of the base metal in virtually all types of environments; however, thinner coatings can significantly reduces the corrosion rate of the base metal. Metal alloy coating thicknesses greater than about 51 microns are typically used in harsh environments to provide added corrosion protection. In yet another and/or alternative embodiment of the invention, the molten metal alloy is maintained at a temperature at least about 2–30° C. above the melting point of the metal alloy, while the metal alloy is on the coating rollers. In still yet another and/or alternative embodiment of the invention, the coating process includes at least one set of coating rollers that partially or fully coat the surface of the base metal as the base metal passes the coating rollers. In a further and/or alternative embodiment of the invention, one or more coating rollers are at least partially immersed in molten metal alloy during the coating process. In one aspect of this embodiment, the coating process is used in conjunction with an immersion coating process one or more of the coating rollers are at least partially immersed in molten metal alloy in the melting pot. In another and/or alternative aspect of this embodiment, one or more of the coating rollers are at least partially immersed in a protective material in the melting pot. In yet a further and/or alternative embodiment of the invention, one or more coating rollers are positioned above the molten metal alloy in the melting pot when the coating rollers are used in conjunction with an immersion coating process. In still a further and/or alternative embodiment of the invention, one or more coating rollers are at least partially coated with molten metal alloy by one or more spray jets that directs molten metal alloy on to the one or more coating rollers. The one or more spray jets at least partially direct the molten metal alloy on to the surface of the coating rollers as the base metal passes by or between the coating rollers thereby resulting in the base metal being partially or completely coated with the metal alloy. In still a further and/or alternative embodiment of the invention, one or more coating rollers include an internal cavity in which molten metal alloy is directed into and then directed onto the surface of the coating roller which at least partially directs the molten metal alloy on to the surface of the coating rollers as the base metal passes by or between the coating rollers. In still yet a further and/or alternative embodiment of the invention, the time period the base metal is exposed to each coating roller is a relatively short time. The time period is dependant on the speed of the base metal and the size of the coating rollers. Typically, the base metal is exposed to the coating rollers for at least about 0.3 seconds and generally about 0.5–30 seconds. In another and/or alternative embodiment of the invention, one or more coating rollers include one or more grooves. The one or more grooves are designed to facilitate in maintaining the molten metal alloy on the coating roller during the coating process.

In accordance with yet another and/or alternative aspect of the present invention, the corrosion resistant metal alloy is at least partially coated onto the surface of the base metal, the surface of the intermediate barrier metal layer, and/or the surface of the previously applied metal alloy coating by a spray coating process. Molten metal alloy is sprayed onto the surface of the base metal, the surface of the intermediate barrier metal layer, and/or the surface of the previously applied metal alloy coating by one or more spray jets. The spray jets spray molten metal alloy onto the surface of the base metal, the surface of the intermediate barrier metal layer, and/or the surface of the previously applied metal alloy coating to at least partially coat the surface of the base metal, the surface of the intermediate barrier metal layer, and/or the surface of the previously applied metal alloy coating, and/or ensure that a uniform and/or continuous coating is applied on the surface of the base metal, the surface of the intermediate barrier metal layer, and/or the surface of the previously applied metal alloy coating. The speed and time the surface of the base metal, the surface of the intermediate barrier metal layer, and/or the surface of the previously applied metal alloy is in contact with the molten metal can be controlled so that the desired coating thickness and/or desired thickness of the heat created intermetallic layer is obtained. In one embodiment of the invention, the spray jets are used in conjunction with coating rollers and/or an immersion process. In one aspect of this embodiment, the spray jets at least partially direct molten metal alloy onto the coating rollers and/or onto the surface of the base metal, the surface of the intermediate barrier metal layer, and/or the surface of the previously applied metal alloy coating during the coating process. In another and/or alternative embodiment of the invention, the molten metal alloy is maintained at a temperature of at least about 2–30° C. above the melting point of the metal alloy as the metal alloy is sprayed from the one or more spray jets. In yet another and/or alternative embodiment of the invention, the base metal passes by or between one or more metal spray jets during the coating process to partially or completely coat the surface of the base metal. In still another and/or alternative embodiment of the invention, the base metal is exposed to the molten metal alloy from the one or more metal spray jets for a sufficient time to partially or fully coat the surface of the base metal. The time the base metal is exposed to the molten metal alloy from the metal spray jets is dependent on the speed of the moving base metal. Typically, the base metal is exposed to the molten metal alloy from the metal spray jets for at least about 0.3 seconds, generally about 0.5–60 seconds, and typically about 1–30 seconds.

In accordance with another and/or alternative aspect of the present invention, the coated base metal which is coated by a hot dip process is subjected to an air-knife process. In an air-knife process, the coated metal alloy is subjected to a high velocity fluid. The high velocity fluid removes surplus molten corrosion resistant metal alloy coating from the surface of the base metal, the surface of the intermediate barrier metal layer, and/or the surface of the previously applied metal alloy coating; smears the coated corrosion resistant metal alloy over the surface of the base metal, the surface of the intermediate barrier metal layer, and/or the surface of the previously applied metal alloy coating thereby reducing or eliminating pin holes or other uncoated surfaces; improves the grain size of the coated metal alloy; smooths and/or reducing lumps or ribs in the coated metal alloy; reduces the metal alloy coating thickness; and/or cools and/or hardens the molten metal alloy. In one embodiment of the invention, the air knife process uses a high velocity fluid which generally does not oxidize the corrosion resistant alloy. In one aspect of this embodiment, the fluid used in the air-knife process includes, but is not limited to, an inert or substantially inert gas such as, but not limited to, nitrogen, sulfur hexafluoride, carbon dioxide, hydrogen, noble gases, and/or hydrocarbons. In another and/or alternative embodiment of the invention, the high velocity fluid of the air-knife process is directed onto both sides of the coated base metal and at a direction which is not perpendicular to the surface of the coated base metal. In still another and/or alternative embodiment of the invention, the protective material on the surface of the molten metal alloy in the melting pot is eliminated when the air-knife process is used in conjunction with a coating process by immersion in molten alloy. When an air-knife process is used in conjunction with coating by immersion, the inert or substantially inert fluid inhibits or prevents dross formation and/or viscous oxide formation in the region in which the inert or substantially inert fluid contacts the molten metal alloy in the melting pot. The high velocity of the inert or substantially inert fluid also breaks up and/or pushes away dross or viscous oxides on the surface of the molten metal alloy thus forming a dross and oxide free region for the coated base metal to be removed from the melting pot. In yet another and/or alternative embodiment of the invention, the air-knife process includes one or more blast nozzles to direct a high velocity fluid toward the metal alloy coating on the surface of the base metal. In one aspect of this embodiment, the coated base metal is directed between two or more blast nozzles. In still yet another and/or alternative embodiment, the air-knife process at least partially causes molten metal alloy on the surface of the base metal to be directed back into the melting pot when the air-knife process is used in conjunction with an immersion coating process. In a further and/or alternative embodiment, one or more blast nozzles are adjustable so as to direct the high velocity fluid at various angles onto the surface of the coated base metal. In yet a further and/or alternative embodiment of the invention, one or more blast nozzles are partially or fully enclosed in a chamber, which chamber is designed to accumulate or trap at least a portion of the fluid after the fluid is directed toward the base metal. The accumulated fluid can then be recirculated back through the blast nozzles. In still a further and/or alternative embodiment of the invention, the air-knife process is used to control the thickness and/or quality of the molten metal alloy coating. In still yet a further and/or alternative embodiment of the invention, the base metal is exposed to the fluid from the air-knife process for a relatively short period of time. The time the base metal is exposed to the fluid can be dependent on the speed of the moving base metal. Typically, the base metal is exposed to the fluid from the air-knife process for at least about 0.3 seconds, generally about 0.5–60 seconds, and typically about 1–30 seconds.

In accordance with another and/or alternative aspect of the present invention, the coated base metal is cooled by a cooling process. Typically the coated base metal is cooled after being coated by a hot dip coating process. The coated base metal can be cooled by spraying with and/or subjecting the coated base metal to a cooling fluid and/or immersing the coated base metal in a cooling fluid. As previously stated, when an air-knife process is used, the coated base metal can be at least partially cooled by the fluid from the air-knife process. When the heated corrosion resistant metal alloy slowly cools, larger grain sizes and lower grain densities generally occur in the corrosion resistant metal alloy coating, and the corrosion resistant metal alloy coating typically forms a more reflective surface. When the heated corrosion resistant metal alloy rapidly cools, fine grain sizes and/or increased grain densities occur in the corrosion resistant metal alloy coating, and the corrosion resistant metal alloy coating typically forms a less reflective surface than a slowly cooled corrosion resistant alloy coating. Small grain sizes and/or higher grain densities in the corrosion resistant metal alloy coating typically result in a stronger bonding coating and greater corrosion resistance. In one embodiment of the invention, the cooling process is less than about two hours. In one aspect of this embodiment, the cooling process is less than about one hour. In another and/or alternative aspect of this embodiment, the cooling process is less than 10 minutes. In still another and/or alternative aspect of this embodiment, the cooling process is less than about 5 minutes. In another and/or alternative embodiment of the invention, a liquid or gas is jet sprayed onto the surface of the coated base metal to cool the metal alloy coating. In one aspect of this embodiment, the cooling fluid is water. In another and/or alternative aspect of this embodiment, the temperature of the cooling fluid is about 15–95° C. In yet another and/or alternative aspect of this embodiment, the temperature of the cooling fluid is about 20–60° C. In yet another and/or alternative aspect of this embodiment, the temperature of the cooling fluid is about ambient temperature (20–28° C.). In still yet another and/or alternative aspect of this embodiment, the coated base metal is at least partially guided by a camel-back guide as the coated base metal is cooled by the spray jets. The camel-back guide is designed to minimize contact with the coated base metal thereby reducing the amount of metal alloy coating inadvertently removed from the base metal. In one aspect of this embodiment, the camel-back design allows cooling fluid to be applied to both sides of the coated base metal. In still another and/or alternative embodiment of the invention, the coated metal alloy is cooled by immersion in a cooling fluid. Typically, the coated base metal is directed into a cooling tank that contains a cooling fluid. In one aspect of this embodiment, the temperature of the cooling fluid in the cooling tank is maintained at a desired temperature by use of agitators, heat exchangers, and/or replenishment of cooling fluid. In another and/or alternative aspect of this embodiment, the temperature of the cooling fluid is about 15–95° C. In yet another and/or alternative aspect of this embodiment, the temperature of the cooling fluid is about 20–60° C. In yet another and/or alternative aspect of this embodiment, the temperature of the cooling fluid is about ambient temperature (20–28° C.:). In still yet another and/or alternative aspect of this embodiment, water is used as the cooling fluid. The oxygen in the water can cause discoloration of the metal alloy coating thereby reducing the reflectiveness of the metal alloy coating. In a further and/or alternative embodiment of the invention, the metal alloy is cooled at a sufficient rate so as to control the grain size of the zinc crystal. In one aspect of this embodiment, the metal alloy is cooled at a rate such that there are no more than about 40 zinc crystals in the metal alloy have a maximum dimension of over about 400 $\mu$m within a 0.25 mm$^2$ region of the metal alloy. In one aspect of this embodiment, the metal alloy is cooled at a sufficient rate such that there are no more than about 30 zinc crystals in the metal alloy have a maximum dimension of over about 400 $\mu$m within a 0.25 mm$^2$ of the metal alloy. In still another and/or alternative aspect of this embodiment, the metal alloy is cooled at a sufficient rate such that there are no more than about 20 zinc crystals in the metal alloy have a maximum dimension of over about 400 $\mu$m within a 0.25 mm$^2$ region of the metal alloy. In yet another and/or alternative aspect of this embodiment, the metal alloy is cooled at a sufficient rate such that there are no more than about 30 zinc crystals in the metal alloy have a maximum dimension of over about 300 $\mu$m within a 0.25 mm$^2$ region of the metal alloy. In still yet another and/or alternative aspect of this embodiment, the metal alloy is cooled at a sufficient rate such that there are no more than about 20 zinc crystals in the metal alloy have a maximum dimension of over about 300 $\mu$m within a 0.25 mm$^2$ region of the metal alloy. In a further and/or alternative aspect of this embodiment, the metal alloy is cooled at a sufficient rate such that there are no more than about 10 zinc crystals in the metal alloy have a maximum dimension of over about 300 $\mu$m within a 0.25 mm$^2$ region of the metal alloy. In still a further and/or alternative aspect of this embodiment, the metal alloy is cooled at a sufficient rate such that there are no more than about 10 zinc crystals in the metal alloy have a maximum dimension of over about 200 $\mu$m within a 0.25 mm$^2$ region of the metal alloy.

In accordance with another and/or alternative aspect of the invention, the coated base metal is passed through a leveler whereby the coated metal alloy is molded about the base metal, and/or smoothed. In one embodiment of the invention, a final coating thickness is obtained by the leveler. In another and/or alternative embodiment of the invention, the leveler includes a plurality of rollers. In yet another and/or alternative embodiment of the invention, the base metal is maintained at a tension as it is passed through the leveler. In still another and/or alternative embodiment of the invention, the surface coarseness Ra of the metal alloy is less than about 5 $\mu$m. In one aspect of this embodiment, the surface coarseness Ra of the metal alloy is less than about 4 $\mu$m. In another and/or alternative aspect of this embodiment, the surface coarseness Ra of the metal alloy is less than about 0.01–4 μm. In another and/or alternative aspect of this embodiment, the surface coarseness Ra of the metal alloy is less than about 0.05–3 μm.

In accordance with yet another and/or alternative aspect of the invention, the coated base metal is rolled into a coil for later processing or use.

In accordance with still another and/or alternative aspect of the invention, the coated base metal is sheared into specific length plates or strip for later use or immediate processing. In one embodiment of the invention, a shearing device shears a continuously moving coated base metal. In one aspect of this embodiment, the shearing device moves with the moving coated base metal when shearing.

In accordance with still yet another and/or alternative aspect of the present invention, the heat created intermetallic layer formed between the metal alloy coating and the surface of the base metal, surface of the intermediate barrier metal layer, and/or surface of a previously applied metal alloy coating is at least partially exposed. The exposed heat created intermetallic layer has been found, in some situations, to provide excellent corrosion resistance in a number of environments. The heat created intermetallic layer can be exposed by mechanical and/or chemical processes. In one embodiment of the invention, at least a portion of the metal alloy coating is removed by a mechanical process that includes, but is not limited to, grinding, melting, shearing and the like. In another and/or alternative embodiment of the invention, at least a portion of the metal alloy coating is removed by a chemical process which includes, but is not limited to, an oxidation process. The oxidation process at least partially removes the coated metal alloy and at least partially exposes the heat created intermetallic layer. The oxidation process includes the use of an oxidizing solution. In one aspect of this embodiment, the oxidation solution is selected to be autocatalytic in that the oxidation solution removes the metal alloy coating but does not or only very slowly removes the heat created intermetallic layer. In another and/or alternative aspect of this embodiment, the oxidation solution includes nitric acid and/or chromic acid. When nitric acid is included in the oxidation solution, the nitric acid concentration is generally about 5–60% by volume and typically about 10–25% by volume of the oxidation solution. In still another and/or alternative aspect of this embodiment, the oxidation solution includes copper sulfate. When copper sulfate is included in the oxidation solution, the copper sulfate is generally less than about 10% by volume, typically about 0.5–2% by volume of the oxidation solution, and more typically about 1% by volume of the oxidation solution. In yet another and/or alternative aspect of this embodiment, the exposure of the coated base metal to the oxidation solution in the oxidation process is generally less than about one hour; however, longer times can be used depending on the concentration and temperature of the oxidation solution, the type of metal alloy, the thickness of the metal alloy, and/or the degree of desired exposure of the heat created intermetallic layer. In one non-limiting design of this aspect, the exposure to the oxidation solution in the oxidation process is less than about ten minutes. In another and/or alternative non-limiting design of this aspect, the exposure to the oxidation solution in the oxidation process is less than about two minutes. In still another and/or alternative non-limiting design of this aspect, the exposure to the oxidation solution in the oxidation process is about 0.08–1.5 minutes. In a further and/or alternative aspect of this embodiment, after a sufficient amount of the heat created intermetallic layer is exposed by the oxidation solution, the oxidation solution is removed from the base metal and/or the base metal is removed from the oxidation solution. In still a further and/or alternative aspect this embodiment, the temperature of the oxidation solution is about 15–80° C. In one non-limiting design of this aspect this embodiment, the temperature of the oxidation solution is about 30–80° C. In another and/or alternative non-limiting design of this aspect, the temperature of the oxidation solution is about 15–60° C. In still another and/or alternative non-limiting design of this aspect, the temperature of the oxidation solution is about 12–62° C. In yet another and/or alternative non-limiting design of this aspect, the temperature of the oxidation solution is about 40–60° C. In still yet another and/or alternative non-limiting design of this aspect, the temperature of the oxidation solution is about 22–42° C. In a further and/or alternative design of this aspect, the temperature of the oxidation solution is about 32° C. In still yet a further and/or alternative aspect of this embodiment, the oxidation solution is at least partially rinsed off after the intermetallic layer is exposed. In still another and/or alternative embodiment of the invention, one non-limiting method of at least partially removing the metal alloy coating is described in U.S. Pat. No. 5,397,652, which is incorporated herein.

In accordance with another and/or alternative aspect of the present invention, the exposed heat created intermetallic layer is at least partially passivated by a passivation process. The passivation process is designed to at least partially react with the heat created intermetallic layer and to form a thin corrosion resistant layer. The corrosion resistant layer typically exhibits improved corrosion resistant properties, improved abrasion resistance, improved hardness, improved formality, resists cracking, and/or has less reflective color as compared to a non-passified intermetallic layer. The passivation process includes the use of a passivation solution. In one embodiment of the invention, the passivation solution includes a nitrogen containing compound. In another and/or alternative embodiment of the invention, the passivation solution is the same as the oxidation solution, thus the oxidation/passivation solution removes the metal alloy to expose the heat created intermetallic layer and subsequently passifies the exposed heat created intermetallic layer to form the corrosion resistant layer. In one aspect of this embodiment, the oxidizing solution fully or substantially ceases to react with the intermetallic layer after the passivation later is formed (auto-catalytic). In another and/or alternative embodiment of the invention, the coated base metal material is at least partially passivated in a different tank from the oxidation solution. In yet another and/or alternative embodiment of the invention, the oxidation solution and/or passivation solution is at least partially rinsed off the coated base metal after the formation of the passivation layer. In still yet another and/or alternative embodiment of the present invention, the pacified intermetallic layer exhibits excellent formability characteristics. The formability of the base material having a pacified intermetallic layer on the surface of the base material can exhibit improved formability characteristics. The improved formability is believed to be at least partially the result of the complete or partial removal of the metal alloy from the surface of the base material. The removal of the metal alloy reduces the thickness of the treated base material. In yet another and/or alternative embodiment of the invention, the thickness of the passivation layer is at least about 0.1 micron. In one aspect of this embodiment, the thickness of the passivation layer is about 0.1–5 microns. In another and/or alternative aspect of this embodiment, the thickness of the passivation layer is up to about 1.5 microns.

In accordance with still another and/or alternative aspect of the present invention, the coated base metal is at least partially treated with a weathering agent to accelerate the weathering, discoloration of the surface of the metal alloy coating, and/or control the formation of white rust on the surface of the metal alloy coating. In one embodiment of the invention, the weathering material is applied to the metal alloy coating to oxidize the metal alloy coating surface, reduce the reflectivity of the metal alloy coating, and/or discolor the metal alloy coating. In another and/or alternative embodiment of the invention, the weathering material is an asphalt-based paint which causes accelerated weathering of the metal alloy coating when exposed to the atmosphere. The asphalt-based paint decreases the weathering time of the metal alloy coating. In one aspect of this embodiment, the asphalt paint is a petroleum-based paint which includes asphalt, titanium oxide, inert silicates, clay, carbon black or other free carbon and an anti-settling agent. In another and/or alternative aspect of this embodiment, the asphalt-based paint is applied at a thickness to form a semi-transparent or translucent layer over the metal alloy coating. In one non-limiting design of this aspect, the thickness of the asphalt-based paint is about 1–500 microns. In another and/or alternative non-limiting design of this aspect, the thickness of the asphalt-based paint is about 6–150 microns. In still another and/or alternative non-limiting design of this aspect, the thickness of the asphalt-based paint is about 6–123 microns. In yet another and/or alternative non-limiting design of this aspect, the thickness of the asphalt-based paint is about 12–50 microns. In still yet a further and/or alternative non-limiting design of this aspect, the thickness of the asphalt-based paint is about 12–25 microns. In still yet another and/or alternative embodiment of the invention, the weathering agent is at least partially dried by air drying and/or by heating lamps.

In accordance with yet another and/or alternative aspect of the present invention, the base metal coated with the metal alloy coating is immediately formed, or formed at a manufacturing site, or formed at a building site. In one embodiment of the invention, the coated base metal is formed into roofing materials such as disclosed in, but not limited to, gutter systems or roofing material which are illustrated in U.S. Pat. Nos. 4,987,716; 5001,881; 5,022,203; 5,259,166; and 5,301,474, all of which are incorporated herein by reference. In one aspect of this embodiment, the roofing materials are formed on site. In another and/or alternative embodiment of the invention, the coated base metal is formed into an automotive part such as, but not limited to, a gasoline tank. In one aspect of this embodiment, the gasoline tank includes a first and second metal shell member. The two combined cavities of the shell members are combined to form an inner fuel receiving chamber which holds fuel within the receptacle. The abutting peripheral edges of the shell members are joined together and sealed to maintain the fuel within the inner petroleum receiving chamber. The two shell members can be joined in any of a number of ways that will securely prevent the shells from separating and petroleum from leaking from the interior chamber (i.e. welding, soldering and/or bonding the edges together). Such a fuel tank is illustrated in U.S. Pat. No. 5,455,122, which is incorporated herein by reference. In one aspect of this embodiment, a tin-zinc coated base metal is used to at least partially for the gasoline tank, and any other receptacle or component that is exposed to petroleum products. It has been found that when a tin-zinc coating or a tin alloy that includes a significant amount of zinc is applied to a copper or copper alloy base metal, or a non-copper or non-copper alloy base metal that has a copper surface (e.g., plated, clad, hot dipped, brazened, etc.), the zinc at least partially migrates from the tin and zinc alloy or tin alloy and combines with the copper to form a corrosion resistant copper-zinc heat created intermetallic layer. The layer above the heat created intermetallic layer is primarily tin and the remaining zinc content of the original tin zinc alloy or tin alloy. It has been found that using tin and zinc alloys or tin alloys containing about 5–65 zinc, a highly corrosion resistant copper-zinc alloy and a upper layer that primarily includes tin and a number of zinc globules or fingers. The top coating which primarily includes tin results in little, if any, oxidation of the tin. In the past, when zinc was exposed to petroleum products, the zinc formed a white chalky surface layer. The upper layer of the present invention which primarily includes tin resists or prevents the formation of this white chalky surface layer. In addition, the copper-zinc intermetallic layer provides added corrosion resistence in other environments. As a result, the inner surface of the petroleum receptacle resists corrosion due to the high tin content of the upper layer, and the outer surface of the petroleum receptacle resists corrosion from the outside elements due to the tin and zinc in the upper layer and the copper-zinc intermetallic layer below the upper layer. Consequently, this coating provides enhanced corrosion resistance for petroleum receptacles.

In accordance with still yet another and/or alternative aspect of the present invention, the base metal coated with the metal alloy coating is coated with a sealant or protective layer. The protective layer can be chromate film, and/or an organic-inorganic composite film. In one embodiment of the invention, the protective coating is typically formulated to have a high compatibility with the metal alloy layer. In another and/or alternative embodiment of the invention, the protective layer is also typically formulated to cover imperfections in the metal alloy coating (e.g. pin holes, uncoated regions, etc), and/or to provided additional corrosion resistance to the metal alloy coating. In still another and/or alternative embodiment of the invention, the organic-inorganic composite film includes acrylic, polyester and/or epoxy resins. In one aspect of this embodiment, the one or more resins are used as a solvent type or a water soluble type and in the form of the organic-inorganic composite resin. In another and/or alternative aspect of this embodiment, the organic-inorganic composite film includes chromium, silicon, phosphorus and/or manganese compounds these compounds can improve adhesion, corrosion resistance and/or weldability coated metal alloy. In one non-limiting formulation, the chromium compound is added in the form of chromic acid and/or a chromate. In another and/or alternative non-limiting formulation, the silicon compound is added as silicon oxides and/or silicon fluorides. In still another and/or alternative non-limiting formulation, the phosphorus compound is added as organic or inorganic phosphoric acids and/or phosphates. In still another and/or alternative embodiment of the invention, the sealant or protective coating includes an inorganic phosphate coating. The phosphate coating be used separately or serve as a base for the later application of a siccative organic coating composition such as paint, lacquer, varnish, primer, synthetic resin, enamel, and the like. Such coatings are disclosed in U.S. Pat. Nos. 3,454,483; 3,620,949; 3,864,230; 4,007,102; 4,165,242; Re 27,896; and 5,603,818, which are incorporated herein by reference. In still another and/or alternative embodiment of the invention, the protective coating is has a thickness of about 1–150 microns, and typically about 1–50 microns. In still yet another and/or alternative embodiment of the invention, the protective layer is at least partially dried by air drying and/or by heating lamps.

In accordance with yet another and/or alternative aspect of the present invention, the metal alloy and/or coated base metal base material can be formed on site without the metal alloy cracking and/or flaking off.

In accordance with still another and/or alternative aspect of the present invention, the metal alloy is formed into a corrosion-resistant strip or sheet. In one embodiment of the invention, the metal alloy strip is formed by a roll forming process. In the roll forming process, a vat of molten metal alloy is provided. The molten alloy is then directed through a series of rollers until the desired thickness of the metal alloy strip or sheet is obtained.

The primary object of the present invention is the provision of a metal alloy having corrosion-resistant properties.

Another and/or alternative object of the present invention is the provision of a base metal coated with a metal alloy having corrosion resistant properties.

Still another and/or alternative object of the present invention is the provision of a coated base metal which is both corrosion-resistant and environmentally-friendly.

Still yet another and/or alternative object of the present invention is the provision of a coated base metal having a sufficient coating thickness to reduce or eliminate pinholes in the coating and/or which the shearing of the coating is inhibited when the coated base metal is formed.

Another and/or alternative object of the present invention is the provision of a coated base metal having a heat created intermetallic layer formed between the base metal and the metal alloy coating.

Yet another and/or alternative object of the present invention is the provision of a coated base metal at least partially coated by a hot dip process.

Still another and/or alternative object of the present invention is the provision of at least partially coating a base metal by a plating process.

Yet still another and/or alternative object of the present invention is the provision of a base metal coated by a continuous process.

Still yet another and/or alternative object of the present invention is the provision of a coated base metal which is formed and sheared into various building and roofing components, automotive components, marine products, household materials, and other formed materials that are subsequently assembled on site or in a forming facility.

Another and/or alternative object of the present invention is the provision of a coated base metal that is corrosion-resistant and which can be formed into complex shapes and/or ornamental designs.

Another and/or alternative object of the present invention is the provision of a corrosion resistant metal alloy which includes a coloring agent to alter the color of the corrosion resistant metal alloy, a corrosion-resistance agent to improve the corrosion-resistance of the corrosion resistant metal alloy, a mechanical agent to improve the mechanical properties of the corrosion resistant metal alloy, a grain agent to positively affect grain refinement of the corrosion resistant metal alloy, an oxidation agent to reduce oxidation of the molten corrosion resistant metal alloy, an inhibiting agent to inhibit the crystallization of the corrosion resistant metal alloy, and/or a bonding agent to improve the bonding characteristics of the corrosion resistant metal alloy.

Still another and/or alternative object of the present invention is the provision of a corrosion resistant metal alloy which includes a majority of tin.

Yet another and/or alternative object of the present invention is the provision of a corrosion resistant metal alloy which includes a majority of tin and zinc.

Another and/or alternative object of the present invention is the provision of applying an intermediate barrier metal layer to the surface of the base metal prior to applying the corrosion resistant metal alloy coating.

Still yet another and/or alternative object of the invention is the provision of a coated base metal which is economical to produce.

Another and/or alternative object of the invention is the provision of a coated base metal that can be soldered with conventional tin-lead solders or no-lead solders.

Yet another and/or alternative object of the present invention is the provision of pretreating the base metal prior to coating the base metal with a corrosion resistant alloy to remove oxides and/or foreign materials from the surface of the base metal.

Another and/or alternative object of the present invention is the provision of pickling the base metal to remove surface oxides on the base metal prior to coating the base metal with a metal alloy.

Yet another and/or alternative object of the present invention is the provision of chemically activating the base metal to remove surface oxides on the base metal prior to coating the base metal with a metal.

Still yet another and/or alternative object of the present invention is the provision of reducing the oxygen interaction with the base metal prior to and/or during the coating process.

Another and/or alternative object of the present invention is the provision of abrasively treating the surface of the base metal prior to coating the base metal with a metal alloy.

Still yet another and/or alternative object of the present invention is the provision of a metal coating that is not highly reflective.

Yet another and/or alternative object of the present invention is the provision of a metal coating for a base metal which has a low lead content.

Still yet another and/or alternative object of the present invention is the provision of using spray jets to spray molten metal alloy onto the surface of the base metal to at least partially coat the surface of the base metal.

Another and/or alternative object of the present invention is the provision of coating a metal coating with a weathering agent to accelerate the dulling of the surface of the metal alloy.

Still another and/or alternative object of the present invention is the use of an air-knife process to at least partially control the thickness and quality of the metal alloy coating on the base metal.

Yet still another and/or alternative object of the present invention is the provision of cooling the metal alloy and/or a metal coating to form fine and/or high density grains which produce a strong bonding, corrosive-resistant, and/or discolored coating.

Another and/or alternative object of the present invention is the provision of at least partially subjecting the coated base metal to an oxidation solution to at least partially remove the metal alloy from the base metal and to at least partially expose the heat created intermetallic layer.

Still another and/or alternative object of the present invention is the provision of subjecting the heat created intermetallic layer to a passivation solution to form a highly corrosion-resistant, non-reflective surface layer on the base metal.

Still yet another and/or alternative object of the present invention is the provision of a metal alloy coating which has superior corrosive characteristics permitting a thinner coating of the metal alloy to the base metal than that which is required for conventional terne coatings with the high lead content.

Still yet another and/or alternative object of the present invention is the provision of using spray jets which at least partially spray metal alloy onto the coating rollers and/or base metal surface to reduce or eliminate non-coated surfaces on the base metal.

Another and/or alternative object of the present invention is the indirect heating of the melting pot without use of heating coils or heating rods.

Another and/or alternative object of the present invention is the provision of a corrosion resistant metal alloy that can be coated on a number of different base metal compositions.

Yet another and/or alternative object of the present invention is the provision of a corrosion resistant metal alloy that can be coated on a base metal having a number of different shapes.

Still another and/or alternative object of the present invention is the provision of providing a coated base metal which is formed by a continuous, hot dip process wherein the base metal has a controlled residence time when exposed to the molten metal alloy.

Still yet another and/or alternative object of the present invention is the provision of producing a highly corrosion-resistant coated base material that has a desired zinc crystal size in the metal alloy.

A further and/or alternative object of the present invention is the provision of producing a highly corrosion-resistant coated base material that includes a desired surface smoothness.

Still a further and/or alternative object of the present invention is the provision of producing a highly corrosion-resistant coated base material that includes a protective coating on the surface of the metal alloy.

Yet a further and/or alternative object of the present invention is the provision of producing a highly corrosion-resistant coated base material that includes an intermetallic layer that includes a majority of copper and zinc.

Still yet a further and/or alternative object of the present invention is the provision of producing a highly corrosion-resistant coated base material that is economical to make.

These and other objects and advantages will become apparent to those skilled in the art upon the reading and following of this description taken together with the accompanied drawing.

BRIEF DESCRIPTION OF THE DRAWINGS

Reference may now be made to the drawings, which illustrate various embodiments that the invention may take in physical form and in certain parts and arrangements of parts wherein;

FIGS. 1A–1B is a cross-sectional view of a hot dip process wherein a metal strip is coated with a corrosion resistant alloy by immersing the metal strip in molten corrosion resistant metal alloy;

FIG. 2 is a cross-section view of additional and/or alternative processes for handling the coated metal strip;

FIG. 3 is a cross-sectional view of the process of plating a metal strip with a corrosion resistant metal alloy;

FIG. 4 illustrates a cross-sectional view of the process of flow heating the plated metal alloy;

FIG. 16 is a plane view of a gasoline tank formed from the metal alloy or base metal coated with the metal alloy of the present invention;

FIG. 17 illustrates the joining of the first and second shell members of the gasoline tank at the peripheral edges;

FIG. 18 is a partial cross-sectional view of a gasoline tank illustrating a corrosion resistant coating on the metal shell after a coated base metal shell has been drawn;

DESCRIPTION OF THE PREFERRED EMBODIMENTS

Figure 5:
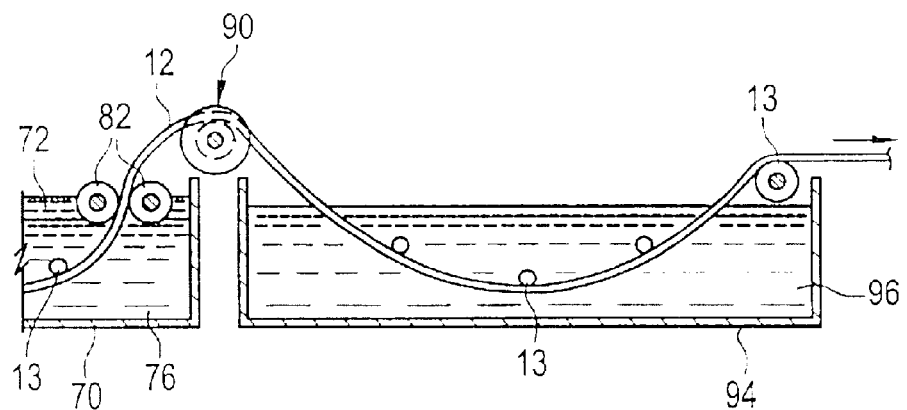
FIG. 5 illustrates a cross-section view of an alternative process of cooling the hot-dip coated base metal in a cooling tank.

Referring now to the drawings, wherein the showings are for the purpose of illustrating preferred embodiments of the invention only and not for the purpose of limiting the same, reference is first had to FIGS. 1A–1B which illustrates one type of hot-dip process for coating a metal alloy on a base metal and for forming a heat created intermetallic layer between the metal alloy coating and the base metal. However, as will be later discussed, the base metal can be alternatively coated by a process that does not form a heat created intermetallic layer between the metal strip and metal alloy coating. The base metal and process used to coat and/or pre-treat the base metal are illustrated in FIGS. 1–15. The base metal is in the form of a metal strip; however, other forms of the base metal can be used (i.e. metal plates, metal strip or metal plate formed into various shapes, various shaped metal objects) and be coated with a metal alloy in accordance with the present invention.

The metal alloy is a corrosion resistant alloy. When the metal alloy is coated onto the surface of a base metal, the metal alloy inhibits or prevent the base metal from corroding when exposed to the atmosphere. The metal alloy is highly corrosive resistant. The metal alloy is also typically abrasive resistant, pliable, weldable and/or environmentally friendly. The metal alloy binds with the base metal to form a durable protective coating which is not easily removable.

The amount of corrosion resistance protection provided by the metal alloy is of primary importance. The coating of the base metal with the metal alloy functions to form a barrier to the atmosphere and/or surrounding environment which inhibits or prevents the base metal from corroding. By coating the base metal with the metal alloy, the life of the base metal is extended for many years. The pliability of the metal alloy is also important when the coated base metal is to be formed. For materials such as, but not limited to, wall systems, roofing systems and petroleum receptacles, the coated base metal is formed into various shapes and is usually folded to form seams to bind together the coated base metal components. A metal coating on the base metal that forms a rigid or brittle coating can crack and/or prevent the coated base metal components from being properly shaped. The metal alloy of the present invention can be formulated to facilitate in the forming of a coated base metal. The metal alloy can also be formulated to be connected together by solder or a weld.

Base metal, such as, but not limited to, carbon steel, stainless steel, copper, copper alloys, aluminum and aluminum alloys, oxidize when exposed to the atmosphere and/or various types of chemicals or petroleum products. Over a period of time, the oxidized base metal can begin to weaken and disintegrate. The application of a corrosion resistant metal alloy onto the base metal acts as a barrier to the atmosphere, environment, and/or chemical or petroleum products to inhibit or prevent the oxidation of the base metal. By coating the base metal with the corrosion resistant metal alloy, the life of the base metal can be extended for many years.

As illustrated in FIGS. 1A–1B, abase metal in the form of a metal strip 12 is typically provided from a large metal roll 10. Metal strip 12 has a thickness of less than about 12700 microns, and typically about 127–5080 microns; however, other metal strip thickness can be used depending on the type of base metal and the use of the coated base metal. Metal strip 12 is typically carbon steel, stainless steel, aluminum, aluminum alloy, copper or a copper alloy. Metal strip 12 is unwound from roll 10 at speeds which are generally less than about 400 ft./min., typically about 1–150 feet, more typically about 70–250 ft./min., and yet more typically about 50–115 ft/min. The metal strip speed is ultimately selected so that the residence time of the metal strip in contact with the molten metal alloy is sufficient to coat the desired amount of strip to a desired thickness and to form a heat created intermetallic layer of a desired thickness. After metal strip 12 is unrolled from metal roll 10, metal strip 12 is optionally pretreated prior to being coated with the metal alloy. As illustrated in FIGS. 1A–1B, metal strip 12 is pretreated to clean and/or remove surface oxides from the surface of the metal strip prior to the metal strip being coated with the corrosion resistant metal alloy. The type and number of pretreatment process for metal strip 12 will depend on the surface condition of the metal strip. Typically carbon steel and stainless steel are subjected to one or more pretreatment process steps.

Figure 9:
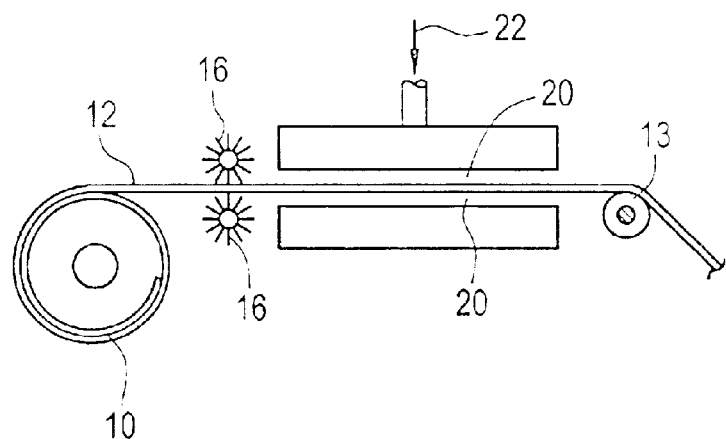
FIG. 9 illustrates a cross-sectional view of an alternative process of using abrasion treaters in conjunction with a low oxygen environment to pre-treat the base metal.

Metal strip 12 is illustrated in FIGS. 1A and 9 as being at least partially cleaned by an abrasion treater 14 after being unrolled from metal roll 10. The abrasion treater includes brushes 16 that are driven by motors. The brushes are placed in contact with metal strip 12 to remove foreign materials from the surface of metal strip 12, and/or to initially etch and/or mechanically remove oxides from the surface of metal strip 12. Brushes 16 are typically biased against metal strip 12 to cause friction between the brushes and metal strip 12, which friction facilitates in the cleaning and/or etching of the surface of metal strip 12. Typically, brushes 16 are located on the top and bottom surface of strip 12. As can be appreciated, the brushes can be positioned to only contact a portion of the surface of the metal strip. Brushes 16 are typically made of a material having a hardness equal to or greater than metal strip 12 so that the brushes will not quickly wear down when removing foreign materials and/or pre-etching the surface of metal strip 12. In one non-limiting arrangement, the brushes are made of a metal material such as, but not limited to, carbon steel wire brushes. Brushes 16 typically rotate in a direction that is opposite of the direction of the moving metal strip. This opposite rotational direction of the brushes causes increased abrasive contact with the surface of the metal strip. The abrasion treatment of the metal strip surface can also include the use of absorbents, cleaners and/or solvents. These absorbents, cleaners and/or solvents can be applied to part of or to the full surface of metal strip 12 before, during and/or after metal strip 12 is treated with brushes 16. The cleaners and/or solvents can include, but are not limited to, alkaline cleaners, acidic cleaners and/or organic solvents. Typically a carbon steel strip or stainless steel strip is subjected to the abrasion treater, and/or absorbents, cleaners and/or solvents.

After metal strip 12 passes through abrasion treater 14, if such abrasion treater is used, metal strip 12 can be guided by strip guides 13 to a low oxygen environment 20. As shown in FIGS. 1A and 9, strip guides 13 are positioned throughout the pretreatment and coating processes to at least partially guide metal strip 12 through each process. Low oxygen environment 20 is illustrated as being a low oxygen gas environment that at least substantially surrounds the surface of metal strip 12 with low oxygen-containing gas 22. As can be appreciated, the low oxygen gas environment can be designed to only partially protect one or more surfaces of metal strip 12. The low oxygen-containing gas includes, but are not limited to, nitrogen, hydrocarbons, hydrogen, noble gases and/or other non-oxygen containing gases. The low oxygen-containing gas surrounds metal strip 12 and forms a barrier against the oxygen containing atmosphere thereby preventing or inhibiting oxide formation on the surface of metal strip 12. As can be appreciated, low oxygen environment 20 can include or in the alternative be a low oxygen liquid environment. In a low oxygen liquid environment, the liquid can be sprayed on to one or more surfaces of the metal strip or the metal strip can be partially or fully immersed in the low oxygen-containing liquid. Typically a carbon steel strip or stainless steel strip is subjected to the low oxygen gas environment.

Metal strip 12, after passing through low oxygen gas environment 20, if such low oxygen environment is used, enters pickling tank 30 which contains a pickling solution 32. The pickling solution is formulated to remove surface oxides from the metal strip surface, remove dirt and other foreign materials from the metal strip surface and/or etch the surface of the metal strip. Pickling tank 30 is of sufficient length and depth to allow for complete immersion of metal strip 12 in pickling solution 32 and to maintain the metal strip in contact with the pickling solution for a sufficient period of time. Typically, pickling tank 30 is at least about 25 feet in length. As can be appreciated, the pickling tank can be longer or shorter depending on the speed of the metal strip. Furthermore, the pickling tank can be designed so that only a portion of the surface of metal strip 12 contacts the pickling solution. The pickling solution typically contains one or more acids. The acids include organic and/or inorganic acids. Such acids include, but are not limited to, perchloric acid, hydrofluoric acid, sulfuric acid, nitric acid, hydrochloric acid, phosphoric acid, and/or isobromic acid. Typically, pickling solution 32 includes hydrochloric acid. Generally, the pickling solution contains at least about 5% by volume hydrochloric acid. For metal strip having extensive surface oxides and/or difficult to remove surface oxides such as, but not limited to, stainless steel strip, an aggressive pickling solution can be used. One type of aggressive pickling solution is a dual acid solution of hydrochloric acid and nitric acid. Formulations of the hydrochloric-nitric acid include a) about 1–30% by volume hydrochloric acid and about 0.1–15% by volume nitric acid, b) about 5–25% by volume hydrochloric acid and 1–15% by volume nitric acid, and c) about 10% hydrochloric acid and 3% nitric acid. Pickling solution 32 is maintained at a temperature to obtain the desired activity of the pickling solution. Typically, pickling solution 32 is maintained at a temperature of at least about 26° C., generally about 48–60° C., and typically about 53–56° C. Pickling tank 30 is shown as containing one or more agitators 34; however, such agitators are not required. Agitator 34 is designed to agitate pickling solution 32 to maintain a uniform solution concentration, maintain a uniform solution temperature and/or break up gas pockets which form on the surface of metal strip 12. Agitator 34 typically includes an abrasive material which can both agitate pickling solution 32 and remove of oxides from metal strip 12 when in contact with the surface of the metal strip. Agitator 34 is typically made of a material which does not react with pickling solution 32 and resists undue wear when in contact with the metal strip surface. Metal strip 12 is typically not exposed to the pickling solution for more than about 10 minutes so as to avoid pitting of the metal strip surface; however, longer pickling times can be used depending on the type of pickling solution, concentration and temperature of the pickling solution, type of metal strip, and/or condition of metal strip surface. Typically, the pickling time is less than about ten minutes, more typically less than about two minutes, still more typically less than about one minute, and yet more typically about 10–20 seconds. A pickling solution vent 36 is typically placed above pickling tank 30 to collect and remove acid fumes and other gasses escaping pickling tank 30. Typically a carbon steel strip or stainless steel strip is subjected to a pickling solution.

As illustrated in FIG. 1A, metal strip 12 enters another low oxygen environment 20 after exiting pickling tank 30. After metal strip 12 exits pickling tank 30, the surface of metal strip 12 is essentially absent surface oxides and other foreign materials and is highly susceptible to oxidation with oxygen and other gases in the atmosphere. Low oxygen environment 20 shields the surface of metal strip 12 from oxygen and other oxidizing gases and/or liquids thereby inhibiting oxide formation on the metal strip surface. Low oxygen environment 20 is a low oxygen-containing gas environment similar to the low oxygen environment used after the abrasion treatment process; however, a low oxygen-containing liquid environment could be used in conjunction with or as an alternative to the low oxygen-containing gas environment. Typically a carbon steel strip or stainless steel strip is subjected to the low oxygen gas environment.

After metal strip 12 exits low oxygen environment 20, metal strip 12 enters rinse tank 40 which contains a rinse solution 42. Rinse tank 40 is designed to remove any remaining pickling solution 32 on the surface of metal strip 12 and/or inhibit the formation of oxides on the metal strip surface. One type of rinse solution includes water that is deoxygenated by heating the water above about 38–43° C. (100–110° F.). As can be appreciated, other rinse liquids can be used. Rinse solution 42 can remove small amounts of oxides that remain on the surface of metal strip 12. The rinse solution typically is slightly acidic due to the acidic pickling solution that is removed from the metal strip surface. As can be appreciated, the rinse solution can be alternatively or additionally acidified by the intentional addition of acid to the rinse solution. The slightly acidic rinse solution 42 removes small amounts of oxides on the surface of metal strip 12. Rinse tank 40 is of sufficient length and depth to facilitate complete immersion of metal strip 12 in rinse solution 42 and to maintain the metal strip in contact with the rinse solution for a sufficient period of time. Typically, rinse tank 40 is at least about 20 feet in length. Metal strip 12 is typically not resident in the rinse tank for more than about 10 minutes; however, longer rinsing times can be used. As can be appreciated, the rinse tank can be longer or shorter depending on the speed of the metal strip. Furthermore, the rinse tank can be designed so that only a portion of the surface of metal strip 12 contacts the rinse solution. The rinse tank typically includes one or more agitators, not shown. The agitators are designed to agitate rinse solution 42 to maintain a uniform solution concentration, maintain a uniform solution temperature, and/or break up gas pockets which form on the surface of metal strip 12. The agitators typically include an abrasive material which can both agitate the rinse solution and remove remaining oxides on the surface of metal strip 12 when in contact with the surface of the metal strip. The agitators are typically made of a material which does not react with rinse solution 42 and resists undue wear when in contact with the metal strip surface. As can be appreciated, the metal strip can be alternatively or additionally rinsed by spraying a rinse fluid onto a portion or the full surface of metal strip 12. Typically a carbon steel strip or stainless steel strip is subjected to the rinse solution after being subjected to a pickling solution.

Referring now to FIG. 1B, metal strip 12 enters low oxygen environment 50 after exiting rinse tank 40. Low oxygen environment 50 is a low oxygen-containing liquid environment which includes spray jets 52. Spray jets 52 are located on each side of metal strip 12 so as to direct the low oxygen-containing liquid onto both sides of metal strip 12. As can be appreciated, the spray jets can be positioned about metal strip 12 so that only a portion of the strip surface is subjected to the low oxygen-containing liquid. The low oxygen-containing liquid 56 inhibits oxide formation of the metal strip surface. Spray jets 52 also remove any remaining pickling solution 32 or other acid on the surface of metal strip 12. Low oxygen-containing liquid 56 is typically heated water having a temperature of at least about 38–43° C. (100–110° F.). As can be appreciated, other low oxygen-containing liquids can be used. Furthermore, it can be appreciated that low oxygen environment 50 can include or in the alternative be a low oxygen-containing gas environment.

Metal strip 12, upon leaving low oxygen liquid environment 50, enters chemical activation tank 60 which includes a chemical activating solution or deoxidizing solution 62. The chemical activation tank is of sufficient length and depth to facilitate complete immersion of metal strip 12 in deoxidizing solution 62 and to maintain the metal strip in contact with the deoxidizing solution for a sufficient period of time. Typically, chemical activation tank is at least about 25 feet in length. As can be appreciated, the chemical activation tank can be longer or shorter depending on the speed of the metal strip. Furthermore, the chemical activation tank can be designed so that only a portion of the surface of metal strip 12 contacts the deoxidizing solution. The chemical activation tank typically includes one or more agitators, not shown. The agitators are designed to agitate deoxidizing solution 62 to maintain a uniform solution concentration, maintain a uniform solution temperature and/or break up gas pockets which form on the surface of metal strip 12. The agitators typically include an abrasive material which can agitate the deoxidizing solution and/or remove remaining oxides on the surface of metal strip 12 when in contact with the surface of the metal strip. The agitators are typically made of a material which does not react with deoxidation solution and resists undue wear when in contact with the metal strip surface. The metal strip is generally subjected to the deoxidizing solution for less than about 10 minutes, and typically less than about one minute; however, longer times can be used. Deoxidizing solution 62 is formulated to remove remaining oxides on the surface of metal strip 12 and/or act as a protective coating to inhibit oxide formation on the surface of metal strip 12. The temperature of the deoxidizing solution is maintained at a temperature to achieve sufficient activity of the deoxidizing solution. Typically, the temperature of the deoxidizing solution is maintained at least about 15° C., typically about 15–33° C., and more typically about 26–33° C. The deoxidizing solution typically includes zinc chloride; however, other chemical compounds can be used. Small amounts of an acid can be add to the deoxidizing solution to further enhance oxide removal from the metal strip surface. One specific deoxidizing solution formulation includes at least about 1% by volume zinc chloride. Another specific deoxidizing solution formulation includes about 5–50% by volume zinc chloride. Yet another specific deoxidizing solution formulation includes about 5–50% by volume zinc chloride and about 0.5–15% by volume hydrochloric acid.

After metal strip 12 exits chemical activation tank 60, metal strip 12 enter the final pretreatment step of immersion in a flux solution 74 contained in flux box 72. As can be appreciated, metal strip 12 can be exposed to a low oxygen environment, not shown, prior to entering flux solution 74 to inhibit or prevent oxide formation on the metal strip surface after the metal strip exits chemical activation tank 60. As also can be appreciated, flux box 72 can be designed so that only a portion of metal strip 12 is exposed to flux solution 74. Flux box 72 is located in melting pot 70. The flux solution in flux box 72 has a specific gravity that is less than or equal to the specific gravity of molten corrosion resistant metal alloy 76 so that flux solution 74 at least partially floats on the surface of the molten corrosion resistant metal alloy. Flux solution 74 typically includes zinc chloride and ammonium chloride; however, other compounds can be used. Specific non-limiting formulations of flux solution 74 include a) about 20–75% by volume zinc chloride and 1–40% by volume ammonium chloride, b) about 20–75% by volume zinc chloride and 1–20% by volume ammonium chloride, c) about 30–60 weight percent zinc chloride and up to about 40 weight percent ammonium chloride, d) about 30–60 weight percent zinc chloride and about 5–40 weight percent ammonium chloride, and e) about 50 weight percent zinc chloride and about 8 weight percent ammonium chloride. As can be appreciated, other concentrations of these two components can be used. Flux solution 74 is the final pre-treating process of metal strip 12 for removal of remaining oxides on the surface of metal strip 12 prior to being coated with metal alloy 76. Flux box 74 also acts as a barrier to oxygen and prevents or inhibits oxides from forming on the surface of the metal strip and on the surface of the molten metal alloy covered by the flux solution.

The one or more pretreatment processes described above may or may not be used for a particular type of metal strip. For example, carbon steel strip may only be pickled and rinsed prior to being coated with a metal alloy. Stainless steel strip may be subjected to all of the pretreatment process set forth above prior to being coated with a metal alloy. Copper strip may only be rinsed prior to being coated with a metal alloy. As set forth above, the use of one or more of the pretreatment processes as set forth above is generally dependent on the type of metal strip, the condition the metal strip is in after being unrolled from metal roll 10, and/or type of pretreatment processes selected from the metal strip (e.g. if pickling is selected, then a rinse process is also used).

An additional or alternative pretreatment process is the coating of metal strip 12 with an intermediate barrier metal layer prior to coating the metal strip with the corrosion resistant metal alloy. The coating of the metal strip with an intermediate barrier metal layer can constitute the only pretreatment process for the metal strip, or the metal strip can be pretreated with one or more other pretreatment process before and/or after the metal strip is coated with an intermediate barrier metal layer. The intermediate barrier metal layer is typically a thin layer of metal such as, but not limited to, tin, nickel, copper, chromium, aluminum, cobalt, molybdenum, Sn—Ni, Fe—Ni, and/or zinc. The thickness of the layer is generally less than about 500 microns and typically less than about 100 microns. The intermediate barrier metal layer can be applied by an electroplating process as illustrated in FIG. 3, an electroplating process and subsequent heating of the plated layer, immersion in molten metal, metal spraying, coating rollers, and the like. The process for plating the intermediate barrier metal layer onto the surface of metal strip 12 is typically by a conventional continuous plating process. The applied intermediate barrier metal layer typically forms a strong bond with the metal strip, whether or not the strip surface has been pretreated with one or more other pretreatment processes. The bonding of the intermediate barrier metal layer to the strip is enhanced by heating the intermediate barrier metal layer and the forming a heat created intermetallic layer between the metal strip and the intermediate barrier metal layer. When the intermediate barrier metal layer is plated and then flow heated, the thickness of the intermediate barrier metal layer is typically at least about 2 microns so that a sufficiently thick intermediate barrier metal layer exists for proper flow heating. The selection of metal of the intermediate barrier metal layer can advantageously change the composition of the heat created intermetallic layer thereby improving corrosion resistance, improving metal alloy bonding, improve metal alloy pliability, and/or inhibiting the formation of a thick zinc layer in the intermetallic layer when zinc is included in the metal alloy. In one specific non-limiting embodiment of the invention, a non-copper metal strip or non-copper alloy metal strip is coated with copper or copper alloy prior to applying the metal alloy. The copper or copper alloy can be applied by plating, cladding or other manner of bonding the copper or copper alloy to the metal strip. Generally the thickness of the copper or copper alloy is about 2–100 microns, and typically about 2–50 microns.

Another additional or alternative pretreatment process is the preheating of the metal strip prior to coating the metal strip with the corrosion resistant metal alloy. Metal strip that has a thickness of less than about 762 microns is typically not pre-heated. Thicker metal strip can be preheated to assist in the formation of the heat created intermetallic layer. A thin metal strip generally does not need to be preheated since the surface of the thin strip quickly heats to the temperature of the molten metal alloy. As the surface of the metal strip approaches the temperature of the molten metal alloy, an intermetallic layer begins to form between the surface of the metal strip and the metal alloy coating. Metal strip having a thickness of up to about 5080 microns is classified as thin metal strip. However, thin metal strip can be preheated and such preheated strip can result in the quicker formation of an intermetallic layer. Metal strip having a thickness over about 5080 microns is classified as a thick metal strip. Thick metal strip is typically preheated prior to coating with the metal alloy. The surface of a thick metal strip takes a longer time to approach the temperature of the molten metal alloy due to the larger heat sink of the thicker metal strip. Preheating the thick metal strip facilitates in the surface of the metal strip reaching or approaching the molten temperature of the metal alloy during the coating process so that a desired heat created intermetallic layer is formed. Metal strip 12 can be preheated in any number of ways, such as but not limited to, convection or induction heating, flames, lasers, and the like. When a heat created intermetallic layer is not to be formed, the meal strip is typically not pre-heated.

Although FIGS. 1A–1B illustrate metal strip 12 being pretreated by the pretreatment processes of abrasion, pickling and rinsing, chemical activation, exposure to low oxygen environment, and the flux solution, the use of all these pretreatment process on all types of metal strip is not always required. When the metal strip has a clean surface and/or little or no oxide formation on the metal strip surface, the pretreatment process can be eliminated or only a select number of pretreatment processes can be used prior to coating the metal strip with the corrosion resistant metal alloy.

Figure 11:
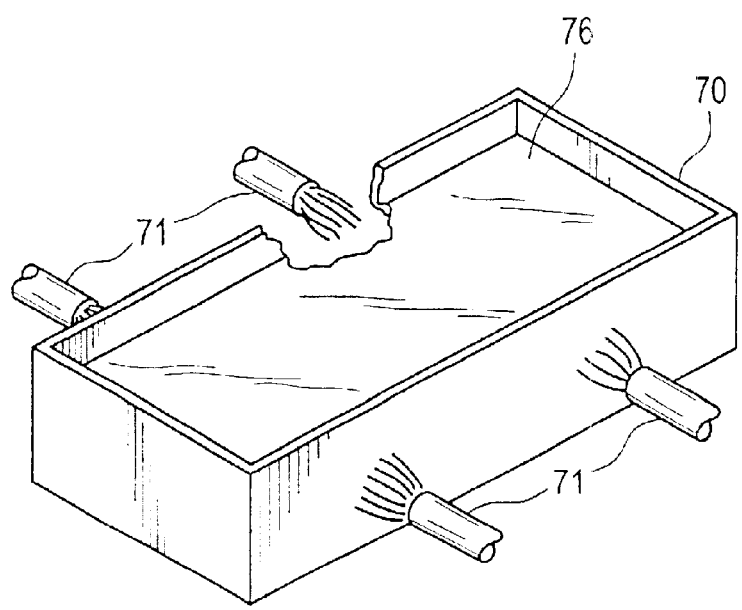
FIG. 11 is a prospective view of a melting pot heated by gas torches.

Referring to FIG. 1B, metal strip 12, after exiting flux box 72, enters molten corrosion resistant metal alloy 76. Melting pot 70 is typically heated by heating jets, coils, rods, heat exchangers, etc. In one non-limiting arrangement, melting pot 70 is heated by four heating jets 71 directed at the outside sides of melting pot 70 as shown in FIG. 11. The heating jets are typically gas jets. Melting pot 70 is maintained at a temperature of at least several degrees Celsius above the melting point of corrosion resistant metal alloy 76 to inhibit or prevent solidification of metal alloy 76 as metal strip 12 enters into and passes through melting pot 70. Tin melts at about 232° C. (450° F.). Zinc melts at about 419.6° C. (787° F.). When additives and/or impurities are included in the tin alloy or tin and zinc alloy, the melting point of metal alloy 76 will be altered. The composition and/or thickness of melting pot 70 is selected to accommodate the various metal alloy melting temperatures. The temperature of the molten metal alloy can be up to or more than 38° C. cooler at the top of the melting pot than at the bottom of the melting pot. Typically, the tin alloy or tin and zinc alloy is maintained at least about 2–30° C. above the melting point of the metal alloy at the top of the melting pot. The temperature of the metal alloy in the melting pot is selected to accommodate the inclusion of additives and/or impurities in metal alloy 76. Generally, the temperature of the molten metal alloy in the melting pot is about 231–538° C. For high melting point metal alloys, additional heating jets or other additional heating devices can be used to heat the metal alloy in the melting pot to the desired temperature.

The molten metal alloy in the melting pot is generally formed by adding ingots of tin for a tin alloy coating and ingots of tin and ingots of zinc for a tin and zinc alloy coating into the melting pot wherein the ingots are melted and mixed. The ingots may contain some additional elements which function as additives or impurities in the tin alloy or tin and zinc alloy. The amount of impurities in the metal alloy are generally controlled so as to reduce the adverse affects of such impurities.

As shown in FIG. 1B, melting pot 70 is divided into two chambers by barrier 80. Barrier 80 is designed to inhibit or prevent protective material 78, such as palm oil, from spreading over the complete top surface of molten corrosion resistant metal alloy 76 in melting pot 70. As can be appreciated, barrier 80 can be eliminated. When the protective material is palm oil, the melting point of the metal alloy should be below the 343° C. so as to not degrade the palm oil. For metal alloys having higher melting point temperatures, special oils, fluxes, or other materials and/or special cooling procedures are employed when a protective material is used. Protective material 78 has a specific gravity which enables the protective material to at least partially float on the surface of molten alloy 76. The protective material inhibits or prevents the surface of molten metal alloy from solidifying by insulating the surface from the atmosphere, inhibits or prevents the surface of molten metal alloy from oxidizing, and/or aids in the properly distribution the metal alloy on the surface of metal strip 12 upon exiting the molten metal alloy.

Melting pot 70 is generally about 10–100 ft. in length so as to provide an adequate residence time for the metal strip in the molten metal alloy as the metal strip moves through the molten metal alloy 76 in the melting pot. Longer melting pot lengths can be employed for fast moving metal strip. The residence time of the metal strip in the molten metal alloy is sufficiently long enough to form the desired thickness of heat created intermetallic layer 140 and the desired thickness of the metal alloy. The residence time of metal strip 12 in melting pot 70 is generally at least about 5 seconds and less than about 10 minutes, typically less than about 2–10 minutes, more typically less than about one minute, still more typically about 5–30 seconds, and even more typically about 10–30 seconds. When the metal strip is coated with the metal alloy by a continuous immersion process, the metal strip is typically moved through the molten tin alloy in the melting pot in a curvilinear path; however, other paths can be used. When the metal strip uses a curvilinear path, the metal strip requires fewer, if any, guide rolls (driving rollers), especially when the metal strip is made of a more malleable material such as, but not limited to, aluminum or copper. The curvilinear path of the metal strip allows the metal strip to at least partially dictate its path in the molten metal alloy. The coating thickness of the metal alloy onto the metal strip is generally a function of the time the metal strip is resident or immersed in the molten tin alloy. The coating thickness typically increases the longer the metal strip is maintained in the molten metal alloy. In a continuous immersion coating process, the resident time of the surfaces of the metal strip in the molten metal alloy is substantially the same. The uniformity of residence time in the molten metal alloy results in a more uniform coating thicknesses on the surface of the metal strip and substantially uniform growth of the heat created intermetallic layer. The metal strip is typically maintained at a constant speed through the molten metal alloy to create a more smooth coated surface. As the metal strip passes through the molten metal alloy at a substantially constant speed, the molten metal alloy about the metal strip adheres to the moving metal strip and shears a portion of the coating from the moving metal strip. This shearing effect results from the viscosity of the molten metal alloy and the speed at which the metal strip is moving through the molten metal alloy. For a given speed and molten metal alloy viscosity, a constant shearing effect is applied to the surface of the moving metal strip thereby smoothing the coated surface and facilitating in the formation of a substantially constant coating thickness. By using a continuous coating process to coat the metal strip with a metal alloy, a uniform of coating (weight and thickness) is obtained, having excellent surface appearance, smoothness, texture control and a substantially uniform heat created intermetallic layer.

Figure 12:
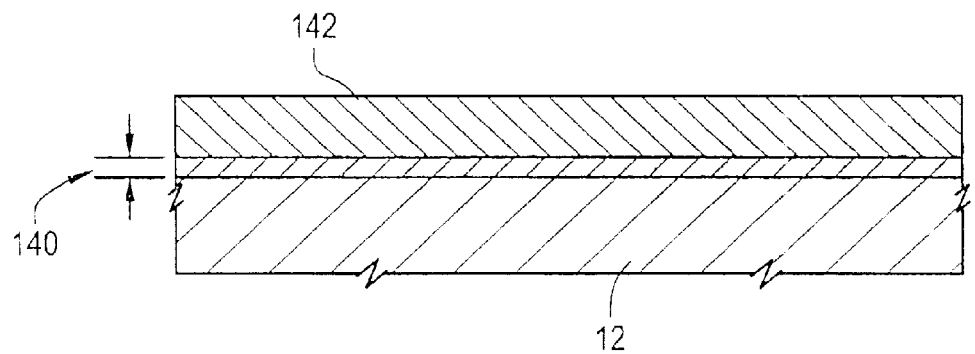
FIG. 12 is a cross-sectional view of a coated metal strip having a heat-created intermetallic layer.

During the coating of the metal strip with molten metal alloy, a heat created intermetallic layer 140 formed between the metal alloy coating layer 142 and metal strip 12 as shown in FIG. 12. The heat created intermetallic layer includes elements of the corrosion resistant metal alloy molecularly intertwined with elements on the surface of metal strip 12. This molecular intertwining occurs when the temperature of the surface of the metal strip approaches the temperature of the molten corrosion resistant metal alloy. The migration of the corrosion resistant metal atoms into the surface layer of strip 12 results in the formation of heat created intermetallic layer 140. A copper strip coated with a tin and zinc alloy or another metal that was coated with copper an then coated with a tin and zinc alloy would form an intermetallic layer that includes at least copper and zinc. Intermetallic layer 140 can include a number of elements such as, but is not limited to, antimony, aluminum, arsenic, bismuth, cadmium, chromium, copper, hydrogen, iron, lead, magnesium, manganese, nickel, nitrogen, oxygen, silicon, silver, sulfur, tellurium, tin, titanium, zinc and/or small amounts of other elements or compounds depending on the composition of the metal strip, the corrosion resistant alloy, and the intermediate barrier metal layer (if used). Heat created intermetallic layer 140 can be thought of as a transition layer between metal strip 12 and corrosion resistant alloy coating 142. Heat created intermetallic layer 140 is believed to be at least partially responsible for the strong bond formed between corrosion resistant metal alloy layer 142 and metal strip 12. The heat created intermetallic layer also typically functions as a corrosion-resistant layer. Typically, the thickness of the heat created intermetallic layer is at least about 0.1 micron, and typically about 1–50 microns; however, thicker heat created intermetallic layers can be formed. The time needed to form the heat created intermetallic layer is typically less than about three minutes and generally less than about one minute; however, longer times can be used.

Figure 6:
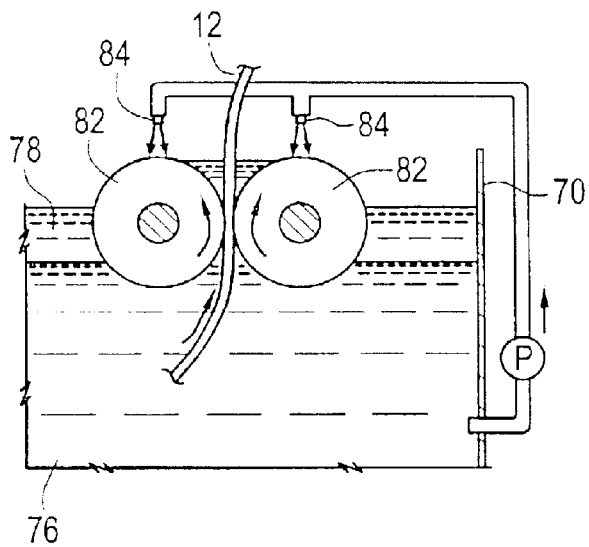
FIG. 6 illustrates a cross-sectional view of an alternative process of using metal spray jets during the hot-dip coating process to coat the metal strip.

As shown in FIGS. 1B and 6, metal strip 12 passes between at least one set of coating rollers 82 upon exiting the molten metal alloy in melting pot 70. As best shown in FIG. 6, the coating rollers are partially immersed in protective material 78. As can be appreciated, the coating rollers can be completely immersed in the protective material or positioned above the protective material. Coating rollers 82 are spaced apart a sufficient distance so that the coated metal strip can pass between the coating rollers. The coating rollers 82 are designed to maintain a desired coating thickness of the metal alloy on the metal strip, remove excess metal alloy 76 from the metal strip, and/or coat any non-coated regions on the surface of the metal strip. The coating thickness of the metal alloy is generally selected to ensure that little, if any, uncoated regions exist on the surface of the metal strip. Typically, the average thickness of the metal alloy on the surface of metal strip 12 is at least about 1 micron, and generally about 7 to 2550 microns. The coating thickness is typically selected to ensure the coated metal alloy has few, if any, pin holes, and/or does not shear when formed into various products. The thickness of the metal alloy is typically selected depending on the environment in which the coated metal strip is to be used. A metal alloy coating thickness of about 25–51 microns generally forms a coating that has few pin holes, provides greater elongation characteristics of the coated metal strip, and/or significantly reduces the corrosion of the metal strip in virtually all types of environments. Metal alloy coating thicknesses greater than about 51 microns are typically used in harsh environments to provide added corrosion protection.

Referring again to FIGS. 1B and 6, a metal spray process is shown wherein metal coating jets or spray jets 84 inject molten metal alloy 76 on the surface of coating rollers 82. As can be appreciated, metal coating jets 84 can be used to exclusively coat the metal strip, or be used in conjunction with a melting pot, coating rollers and/or other coating process to apply metal alloy onto the surface of metal strip 12. As shown in FIG. 6, molten metal alloy is spray jetted from metal coating jets 84 onto coating rollers 82 is then pressed against metal strip 12 by coating rollers 82 as the metal strip 12 moves between the coating rollers thereby filling in most, if not all, uncoated surface areas on metal strip 12 which were not coated as the metal strip passed through the molten alloy in melting pot 70. The motel metal alloy that is supplied to the metal spray jets is at least partially taken from the melting pot 70 and pumped by pump P through a pipe and to the metal spray jets. As can be appreciated, the metal spray process and/or the coating rollers can be used independently of the melting pot and/or be the sole coating process used to coat the metal alloy onto the metal strip.

Figure 7:
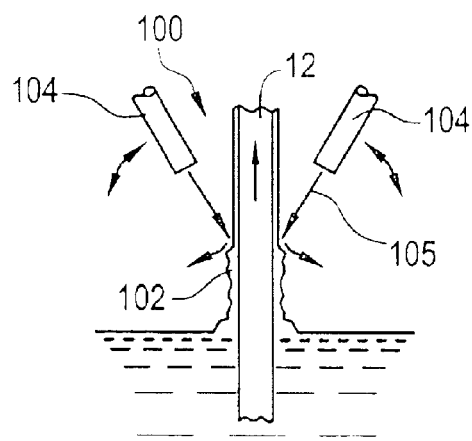
FIG. 7 illustrates a cross-sectional view of an alternative process of using an air-knife during the hot-dip coating process to control the thickness of the coating on the metal strip.

Referring now to FIG. 7, an air-knife 100 can be used to direct a high velocity gas toward metal alloy coating 76 on metal strip 12 as the metal strip exits melting pot 70. The air knife includes at least one blast nozzle 104 that direct a high velocity gas onto the surface of the metal alloy on the metal strip. Typically, the air knife includes at least two blast nozzles 104 which are mutually opposed from each other and are disposed over melting pot 70. The blast nozzles direct high velocity gas 105 toward metal strip 12 and toward the surface of melting pot 70 as the metal strip moves by or between the blast nozzles. Generally, the blast nozzles are adjustable so as to direct the high velocity gas at various angles on to the surface of the metal strip. The high velocity gas removes surplus molten metal alloy coating 102 from the metal strip, smears the molten alloy on metal strip 12 to cover uncoated regions on the metal strip, reduces the thickness of the metal alloy coating on the metal strip, reduces lumps or ribs in the metal alloy coating, cools the metal alloy coating, and/or hardens the metal alloy coating. The high velocity gas is typically an inert gas so as not to oxidize the molten metal alloy. Use of an inert gas also reduces dross formation on the metal alloy coating and/or acts as a protective barrier to the atmosphere which causes viscous oxides to form on the surface of the molten metal alloy in melting pot 70. When inert gas is used, the use of a protective material on the surface of the melting pot can be eliminated. Generally, the inert gas is, but is not limited to, nitrogen or an inert gas that is heavier than air (i.e. has a higher density than air). The blast nozzles are typically enclosed in a box shaped sleeve which accumulates at least a portion of the gas after the gas is directed toward the metal strip. The accumulated gas can then be recirculated back through the blast nozzles. When an air-knife is used to control the thickness and/or quality of the metal alloy coating, the air-knife is generally used as a substitute for or used in conjunction with coating rollers 82. As can be appreciated, the air-knife process can be used after the metal strip is coated by one or more coating rollers and/or by a metal spray jet.

Referring now to FIG. 3, an alternative process for coating metal strip 12 with a corrosion resistant metal alloy is illustrated. FIG. 3 was previously referred to as illustrating a plating process for applying a plated intermediate metal barrier. FIG. 3 is now referenced as also illustrating the coating of a metal strip with a corrosion resistant metal alloy by an electroplating process. This coating process for the metal alloy is a non-hot-dip process in that a heat created intermetallic layer is not formed between the metal strip and metal alloy coating. Metal strip 12 is directed into electrolytic tank 44 and submerged in electrolyte 46. Metal strip 12 can be directed into electrolytic tank 44 immediately after being unrolled from metal roll 10; after being pretreated by one or more pretreatment processes; and/or after being coated with metal alloy by immersion, spray metal coating, and/or roller coating. As metal strip 12 passes through electrolytic tank 44, an electrical current is directed into electrolyte 46 by electrodes 48. The current through electrodes 48 is supplied by power source 49. The plating of the metal alloy onto the surface of the metal strip is typically effectuated by conventional electroplating processes. The metal alloy can be plated onto the surface of metal strip 12 by one or more plating operations. After the metal strip is plated with the metal alloy, the metal strip is moved out of electrolytic tank 44. The average thickness of the plated corrosion resistant alloy is generally at least about 1 micron, and typically less than about 200 microns. Coating thickness of 2–77 microns, and 10–77 microns are typical coating thicknesses. After the metal strip exits electrolytic tank 44, the coated metal strip can be further treated by rinsing, heating, coating with a metal alloy by a hot-dip process, and/or one or more post treatment processes.

When a heat created intermetallic layer is to be formed between the metal strip and the plated metal alloy coating, the plated metal alloy coating is heated. FIG. 4 illustrates one heating process used to form a heat created intermetallic layer between the metal strip and the plated metal alloy coating. Coated metal strip is continuously moved between two heaters 58. Heaters 58 cause the plated corrosion resistant metal alloy to soften and/or become molten. This process of heating the plated metal alloy is referred to as flow heating and constitutes another type of hot-dip process. During the flow heating process, a heat created intermetallic layer is formed between the metal strip and metal alloy coating. The plated metal alloy is subjected to heat for a sufficient time period to form a heat created intermetallic layer having a desired thickness. As can be appreciated, the heating process can occur in single or in multiple stage processes. Furthermore, the heating process can be designed to heat a part of or the complete coated region on the metal strip. After the metal strip is flow heated, the metal alloy coating can be further modified by a process such as, but not limited to, controlling the coating thicknesses by an air-knife process and/or a coating roller process, and/or coating additional layers of metal alloy by additional coating process such as, but not limited to, a plating process, a metal spray process, a coating roller process, and/or an immersion process.

Figure 8:
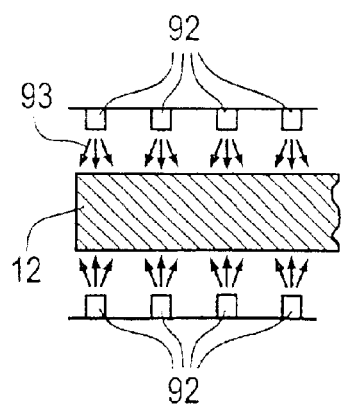
FIG. 8 illustrates a cross-sectional view of an alternative process of cooling the hot-dip metal alloy coated base metal by spray jets.
Figure 10:
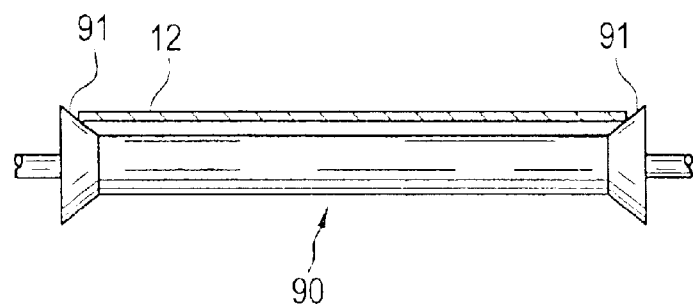
FIG. 10 is a frontal view of a camel-back guide.

After metal strip 12 is coated with a corrosion resistant alloy, the coated metal strip is cooled and/or rinsed. A coated metal strip that is plated as it moves through an electrolyte solution is typically rinsed off to remove electrolyte solution remaining on the surface of the coated metal strip. A coated metal strip that is coated by a hot-dip process is typically cooled to reduce the temperature and/or harden the metal alloy coating. Referring to FIGS. 1B, 8 and 10, the coated metal strip can be cooled by applying a cooling fluid 93 on the coated metal strip by at least one spray jet 92. Typically, the cooling fluid is, but not limited to, water maintained at about ambient temperature. As can be appreciated, multiple temperature cooling fluids can be applied to the coated metal strip. For example, the coated metal strip can be first cooled by steam and then by water near ambient temperature. The velocity of the cooling fluid can be varied to obtain the desired cooling rate and/or rinsing effect of the corrosion resistant metal alloy. As illustrated in FIGS. 1B and 10, metal strip 12 is guided by camel-back guides 90 during the cooling process. Camel-back guide 90 is designed such that it has two receding edges 91 formed by conical surfaces which contact only the edges of metal strip 12 so as to minimize the removal of the metal alloy coating from metal strip 12. Alternatively or in addition to the spray cooling process, the coated metal strip can be cooled in a cooling tank 94 as illustrated in FIG. 5. The coated metal strip is partially or fully immersed in the cooling fluid 96 to cool and/or rinse the coated metal strip. Typically, the cooling fluid is, but not limited to, water maintained at about ambient temperature. The cooling fluid is also typically agitated to increase the rate of cooling of the metal alloy coating, and/or maintain a relatively uniform cooling fluid temperature. The temperature of the cooling water is typically maintained at proper cooling temperatures by recycling the water through heat exchangers and/or replenishing the cooling fluid. The cooling water may not be deoxygenated prior to cooling the coated metal strip coating so as to slightly discolor the metal alloy coating and/or reduce the reflectiveness of the metal alloy coating. Immersion of the coated metal strip in cooling fluid 96 generally results in a faster cooling rate than cooling by spray jets 92. Rapid cooling of the corrosion resistant metal alloy generally produces a metal alloy coating having fine grain size with increased grain density. Typically, the metal alloy is cooled at a rate such that there are no more than about 40 zinc crystals in the metal alloy have a maximum dimension of over about 400 $\mu$m within a 0.25 mm$^2$ region of the metal alloy. In addition, cooling of the metal alloy coating in water results in some oxidation of the metal alloy coating surface which can result in a less-reflective surface, if such a surface is desired. The cooling period for cooling coated metal strip 12 by cooling jets 92 or by immersion in cooling tank 94 is generally less than about 10 minutes, typically less than about 5 minutes, more typically less than about 2 minutes, and even more typically about 10–30 seconds.

After the coated metal strip is cooled, the coated metal strip may be rolled into a metal roll, partially or totally formed into various shapes (i.e. roofing materials, building materials, household parts, automotive parts, etc.), cut into sheets, or processed by a post coating process (e.g oxidation of the coating to partially or fully expose the heat created intermetallic layer, passifying the heat created intermetallic layer, etc.).

Figure 15:
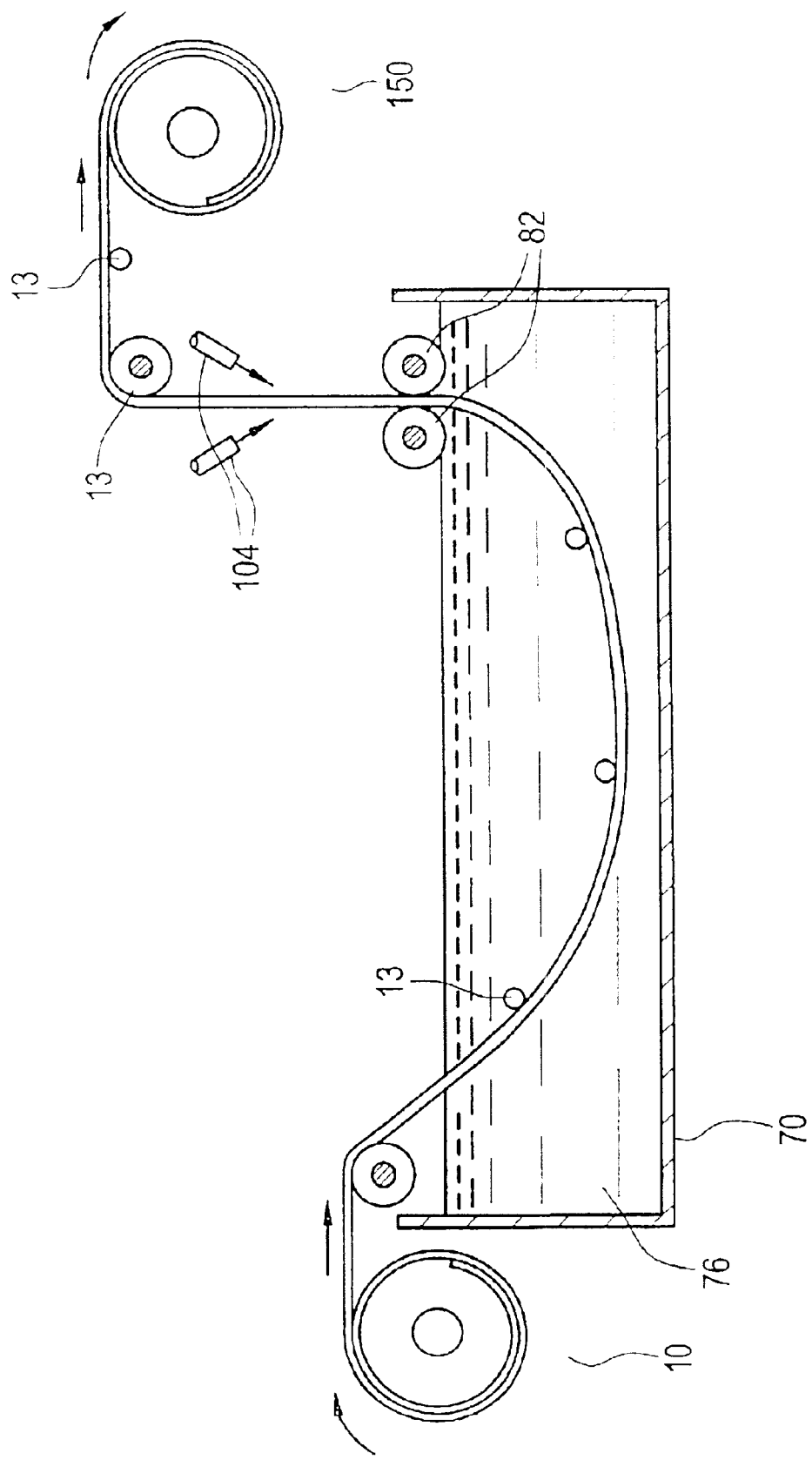
FIG. 15 illustrates a cross-sectional view of an alternative process of coating a base metal by a hot dip process wherein a base metal strip is unrolled and coated by immersing the metal strip in a molten pot of molten alloy and then subjecting the metal strip to coating rollers and an air-knife process and then rolling the coated metal strip into a coil.

As illustrated in FIG. 15, the metal strip is unrolled and immediately directed into a molten bath of metal alloy without any prior pretreatment processes. Copper metal strip is typically unrolled and immediately coated with a molten metal alloy as illustrated in FIG. 15. Upon exiting the molten metal bath, the metal strip passes between coating rollers and is then subjected to an air-knife process to control the coating thickness and reduce the uncoated regions on the metal strip surface. The air-knife also cools and hardens the metal alloy coating so that the coated metal strip can be immediately rolled into a metal roll 150.

As illustrated in FIG. 2, the coated metal strip can be further processed prior to being rolled into a metal roll 150 or cut in to sheets 130. This further processing includes, but is not limited to, leveling, shearing, oxidizing the coated corrosion resistant alloy, passifying the metal alloy and/or heat created intermetallic layer, applying weathering agents, applying paints, sealants etc. As shown in FIG. 2, the coated metal strip is subjected to a leveler 100. Leveler 100 includes several rollers 102 which produce a uniform and smooth corrosion resistant alloy coating 142 on metal strip 12. Typically the surface coarseness Ra of the metal alloy after passing through the leveler is less than about 5 μm. After metal strip 12 exits leveler 100, metal strip 12 is illustrated as being cut into sheets 130 by shear 111. The coated metal sheets or strip can be further processed by applying a paint, sealant or weathering agent on the surface of the coated metal sheets or strip. The paint, sealant or weathering agent 112 can be applied to a portion or the full surface of the coated metal alloy. The paint, sealant or weathering agent can be applied by coaters 114 and/or by sprayers 116. A reservoir 110 holds the paint, sealant or weathering agent for coaters 114 and/or sprayers 116. After the paint, sealant or weathering agent is applied, it can be dried by heat lamp 120 and/or by a dryer 122.

When a weathering agent is applied to the coated metal strip, the weathering agent is used to accelerate the patina formation on the metal alloy coating. This process is generally used to discolor the metal alloy and/or reduce the reflectiveness of the metal alloy. The natural weathering of the metal alloy can take, in some instances, over ten years to weather to the desired degree. The weathering agent is formulated to reduce the time period of weathering. In one non-limiting formulation, the weathering agent is typically a petroleum based product. Generally, the petroleum based weathering agent is an asphalt based paint containing a suspension of free carbon and a thinner. When this formulation is used, a thin film or coating of weathering agent is applied to the surface of the metal alloy and the ultraviolet light from the atmosphere facilitates in accelerating the weathering of the metal alloy. Generally, the thin layer of weathering agent is a semi-transparent or translucent coating and at least partially allows the metal alloy to be exposed to oxygen, moisture and to the sun's radiation. The weathering agent can include, but is not limited to, asphalt, titanium dioxide, inert silicates and low clay, carbon black (lampblack) or other free carbon and an anti-settling agent. The asphalt makeup of the weathering agent is typically about 60% to 80% by weight of the weathering agent, typically about 64% to 78% by weight of the weathering agent, and more typically about 68% by weight of the weathering agent. The amount of titanium oxide in the weathering agent is about 1% to 25% by weight of the weathering agent, and typically about 19% by weight of the weathering agent. Typically, over 50% of the titanium oxide is anatase grade. When carbon black is added to the weathering agent, the carbon black is present in an amount of up to about 2% by weight of the weathering agent, typically about 0.5 to 1% by weight of the weathering agent, and more typically about 0.7% by weight of the weathering agent. The inert silicates and/or low clay, such as, but not limited to calcium borosilicate, when added to the weathering agent, is present in an amount of about 8–11% by weight of the weathering agent. The antisettling agent, when added to the weathering agent, is present in an amount of about 0.4–0.7% by weight of the weathering agent, and typically about 0.5% by weight of the weathering agent. One specific formulation of the weathering agent includes about 60–80 weight percent asphalt, about 1–25 weight percent titanium oxide, about 8–11 weight percent inert silicates and clay, about 0.5–2 weight percent carbon black, about 0.4–0.7 weight percent anti-settling agent, and solvent. Another specific non-limiting formulation of the weathering agent includes 65–75 weight percent gilsonite, 15–20 weight percent titanium oxide, 8–11 weight percent calcium borosilicate, 0.5–1 weight percent carbon black, 0.4–0.6 weight percent anti-settling agent, and solvent. Still another specific non-limiting formulation of the weathering agent includes 64–78 weight percent gilsonite, 11.68–20.5 weight percent titanium oxide, 8.4–10.3 weight percent inert silicates and clay, 0.63–0.77 weight percent carbon black, 0.4–0.52 weight percent anti-settling agent, and solvent. Yet another non-limiting specific formulation of the weathering agent includes 70.86 weight percent gilsonite, 18.65 weight percent titanium oxide, 9.32 weight percent calcium borosilicate, 0.7 weight percent carbon black, 0.47 weight percent anti-settling agent, and solvent. A solvent such as, but not limited to, naphthalene and/or paint thinners, is used to thin the weathering agent so that a thin, translucent or semi-translucent film can be formed on the surface of the metal alloy. The thickness of the weather agent layer is generally less than about 123 mils, more typically about 6–123 microns, even more typically up to about 50 microns, yet even more typically up to about 25 microns, and still more typically about 12–25 microns. The color of the weathering agent is typically a dull, lackluster color which has low reflective properties. As a result, the weathering agent accelerates the patina formation on the metal alloy coating and reduces the reflective properties of the newly applied or formed metal alloy. Another type of weathering agent which can be used is disclosed in U.S. Pat. No. 5,296,300, which is incorporated herein.

When a sealant is applied to the coated metal strip, the sealant is typically used to provide additional protection to the coated metal alloy and/or coated base metal. The protective layer can be chromate film, phosphate coating, and/or an organic-inorganic composite film. The protective coating is typically formulated to have a high compatibility with the metal alloy layer. The protective layer is also typically formulated to cover imperfections in the metal alloy coating, and/or to provided additional corrosion resistance to the metal alloy coating. The protective coating typically is has a thickness of about 1–150 microns, and typically about 1–50 microns. The protective layer is typically dried by air drying and/or by heating lamps.

Figure 13:
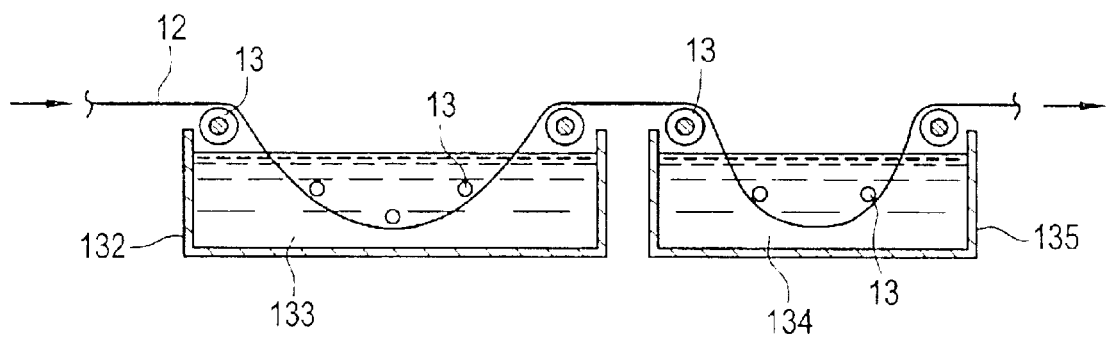
FIG. 13 illustrates a cross-sectional view of an alternative process of using an oxidation process and rinse process to at least partially remove the metal alloy coating from the base metal to at least partially expose the heat created intermetallic layer.

Metal strip 12 can be oxidized to partially or fully expose the heat created intermetallic layer prior to or subsequent to the coated metal strip being rolled into a metal roll, cut into sheets of strip, and/or formed into various shapes. To expose the heat created intermetallic layer, the coated metal alloy can be ground off and/or chemically removed. Typically the metal alloy coating is chemically removed by an oxidizing solution. As shown in FIG. 13, coated metal strip is immersed in oxidizing solution 133 in oxidizing tank 132. The oxidizing solution is formulated to at least partially removes the metal alloy coating from metal strip 12 thereby at least partially exposing heat created intermetallic layer 140. The intermetallic layer has been found in many environments to be an excellent corrosion resistant layer. Oxidation tank 132 is of sufficient length and depth to facilitate complete immersion of metal strip 12 in oxidation solution 133 and to maintain the metal strip in contact with the oxidation solution for a sufficient period of time. Typically, oxidation tank 132 is at least about 20 feet in length. As can be appreciated, the oxidation tank can be longer or shorter depending on the speed of the metal strip. Furthermore, the oxidation tank can be designed so that only a portion of the surface of metal strip 12 contacts the oxidation solution. The oxidation tank typically includes one or more agitators, not shown. The agitators are designed to agitate oxidation solution 133 to maintain a uniform solution concentration, maintain a uniform solution temperature, and/or break up gas pockets which form on the surface of metal strip 12. The agitators typically include an abrasive material which can both agitate the oxidation solution and facilitate in the removal of the metal alloy on the surface of metal strip 12 when in contact with the surface of the metal strip. The agitators are typically made of a material which does not react with oxidation solution 133 and resists undue wear when in contact with the metal strip surface. The oxidizing solution typically includes an acid such as, but not limited to, nitric acid. When nitric acid is included in the oxidation solution, the nitric acid concentration is generally about 5%–60% by volume and typically about 10–25% by volume, more typically about 25% by volume, and even more typically about 20% by volume. Copper sulfate is generally added to the acid in the oxidizing solution to improve the oxidation of the metal alloy coating. Copper sulfate, when present, is generally added in a concentration of less than about 10% by volume, typically about 0.5–2% by volume, and more typically about 1% by volume. The temperature of the oxidizing solution is maintained at a temperature that provides sufficient activity of the oxidizing solution. Generally, the temperature is maintained between about 20–80° C., typically about 30–80° C., more typically about 40–60° C., and even more typically about 50° C.; however, other temperatures can be used. By increasing the concentration and/or temperature of the oxidation solution, the time needed to at least partially remove the metal alloy coating 76 is shortened. Metal strip 12 is generally not exposed to the oxidation solution for more than about 20 minutes, typically less than about ten minutes, more typically less than about two minutes, still more typically about 0.08–1.5 minutes, and even more typically about 0.33 minutes; however, longer oxidation times can be used depending on the type of oxidation solution, concentration and temperature of the oxidation solution, type of metal alloy, and/or thickness of the metal alloy. The exposed heat created intermetallic layer is typically has a dark grey, non-reflective surface. As can be appreciated, the oxidation solution can be applied to the coated metal strip after or just prior to the metal strip being formed and/or installed. In this instance, the oxidizing solution can be swabbed or sprayed onto the surface of the coated metal strip.

Once the desired amount of metal alloy coating is removed, the exposed heat created intermetallic layer is typically passivated to enhance the corrosion-resistance of the intermetallic layer. The intermetallic layer is generally passivated by a passivating solution. One type of passivating solution includes a nitrogen containing solution and/or a chromium solution such as, but not limited to, nitric acid and/or chromate acid. The passivation solution can be the same as or different from the oxidizing solution. When chromate acid is included in the passivation solution, the concentration of chromate acid is generally about 0.5–5 g/liter. Phosphate can be added to the passivation solution to enhance the passivation of the metal alloy. When the passivation solution and the oxidizing solution are the same, the removal of metal alloy coating and passivation of the heat created intermetallic layer can both be accomplished in a single tank. In a single tank arrangement, the passivation solution and the oxidizing solution are formulated such that when the heat created intermetallic layer is exposed and then passified, the passivated layer is not removed or very slowly removed by the passivation solution and the oxidizing solution, thus making the oxidation and passivation process autocatalytic or semi-autocatalytic. As illustrated in FIG. 13, metal strip 13 is directed into a passivation tank 135 after being oxidized in oxidation tank 132. The passivation tank 132 typically includes an agitator to prevent or reduce stagnation and/or vast concentration differences of the passivation solution in the tank, prevent or reduce gas bubbles from forming on the surface of metal strip 12, and/or maintain a substantially uniform temperature for the passivation solution. The temperature of the passivation solution is maintained at a temperature that provides sufficient activity of the passivation solution. Generally, the temperature of the passivation solution is maintained between about 15–80° C., typically about 40–60° C. By increasing the concentration and/or temperature of the passivation solution, the time needed to at least partially passivate the exposed heat created intermetallic layer is shortened. The amount of time to passivate the heat created intermetallic layer is generally less than about ten minutes, and typically about 0.02–1.5 minutes; however, longer times can be used.

Figure 14:
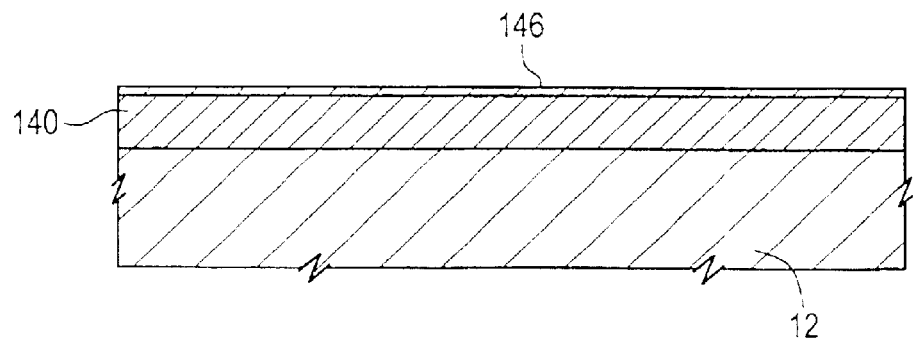
FIG. 14 is a cross-sectional view of a coated metal strip having a heat-created intermetallic layer and passivated surface layer.

Referring now to FIG. 14, passivation layer 146 is a very thin layer. Generally, the thickness of the passivation layer is less than about 13 microns, typically less than about 3 microns, and more typically up to about 1.5 microns. The passivation layer facilitates in inhibiting or preventing oxidation (i.e. white rust) of the outer metal layer. The passivation layer 146 can significantly enhance the corrosion-resistance of the intermetallic layer 142. Although it is not entirely known how passivation layer 148 exhibits increased corrosion resistance, it is believed that a unique covalently bonded system is formed when the intermetallic layer is passified. When the intermetallic layer 142 is passified with passivation solution 162, a chemical reaction is believed to occur to modify the atomic structure of passivation layer 146. Other elements such as, but not limited to, nitrogen, hydrogen, oxygen may also be present in passivation layer 146 to enhance the stability of passivation layer 146. The special formulation of the intermetallic layer 142 in combination with the passivation layer 146 provides for superior corrosion resistance for metal strip 12. Passivation layer 146 is typically malleable and generally does not crack when formed into various shapes. Passivation layer 146 is generally a grey, earth tone color non-reflective surface. Passivation layer 146 displays increased corrosion resistance, abrasion resistance, and/or increased hardness as compared to the heat created intermetallic layer. Heat created intermetallic layer 142 and passivation layer 146 are generally resistant to scratching thereby improving the visual quality of metal strip 12 and/or enhancing the damage resistance of metal strip 12. The relative nonexistence of lead in intermetallic layer 142 and passivated layer, especially when low lead metal alloys are used, makes the passivated metal strip a superior substitute to terne coated materials. Not only is the corrosion resistance of the intermetallic layer and passivated layer greater than terne coatings in many different environments, the intermetallic layer and the passivated layer contain little, if any, lead thereby alleviating any concerns associated with the use of lead materials.

After metal strip 12 is oxidized and/or passified, metal strip 12 is typically rinsed to remove any oxidation solution and/or passivation solution remaining of the metal strip. The rinse process can be performed by liquid spray jets and/or immersion of the metal strip in a tank that contains a rinse solution. Typically, the rinse liquid is about ambient temperature. The rinse tank, when used, typically includes an agitator to assist in the removal of the oxidizing solution and/or passivation solution from metal strip 12. Once the rinse process is complete, the metal strip is rolled into strip roll 150, cut into sheets 130, preformed to various articles, and painted or sealed.

Referring now to FIGS. 16–18, a fuel tank is formed from coated metal strip 12. Fuel tank 160 is made up of two shell members 162 and 164. As can be appreciated, the fuel tank can be made of more or less members. The shell members are typically shaped in a die by placing the coated metal strip or a section thereof on a die and drawing the coated metal strip over the die. As can be appreciated, the shell members can be formed by other process such as, but not limited to, Hot Metal Gas Forming processes, Hydraulic Metal Forming process, etc. The shells are typically formed in a cylindrical shape and each have a peripheral edge 166; however, other shapes can be formed. The two shells are joined together at the respective peripheral edges to form an inner fuel receiving chamber 168 wherein the fuel is stored within the tank. Fuel tank 160 also contains a spout 170 which communicates with interior chamber 168 of the fuel tank so that the fuel can be inserted into the inner chamber. Typically, the spout is inserted at the top portion of shell 162 for easy insertion of the fuel into the tank; however, the spout can be located in other areas. Fuel tank 160 also contains a drain hole 172 which communicates with the interior of the fuel tank chamber and the fuel system of a motor of a vehicle, boat, airplane, etc. Typically, drain hole 172 is located at the top of the fuel tank on shell 162; however, the drain hole can be located in other areas. A fuel pump can be located in the inner chamber of the fuel tank to pump the fuel out of and/or into the inner chamber.

As illustrated in FIG. 18, shell members 162 and 164 are joined together by abutting and connecting together peripheral edges 166 of the respective shell members. Typically, the peripheral edges are connected together a weld or solder 180; however, the peripheral edges can be connected together by other or additional means. Spout 170 and drain hole 172 are also connected to the shell member typically by a weld or solder; however, the spout and/or drain hole can be connected by other or additional means. Generally, the weld or solder is essentially lead-free so as not to add any lead to the fuel tank. Each shell member includes a corrosion resistant metal alloy coating 186 and an inner corrosion resistant metal alloy coating 188. Typically the thicknesses of the two coatings are the same. When the coated metal strip is drawn over the die, the corrosion resistant metal alloy coating 186,188 becomes elongated about the peripheral edge corner 190. When corrosion resistant metal alloy coating is elongated, the corrosion resistant metal alloy coating can reduce in thickness. If the corrosion resistant alloy coating is too thin, the alloy coating can tear or shear and expose the unprotected surface of metal strip 12. Typically, the average thickness of the corrosion resistant metal alloy coating is at least about 7 microns so that as the metal alloy coating can be elongated and shaped by the die with little, if any, incident of shearing and exposing the surface of the base metal of the metal strip. Examples of fuel tanks that can be used are disclosed in U.S. Pat. Nos. 5,827,618; 5,695,822; 5,667,849; 5,616,424; 5,597,656; 5,491,036; 5,491,035; and 5,455,122, which are incorporated herein by reference.

Figure 19:
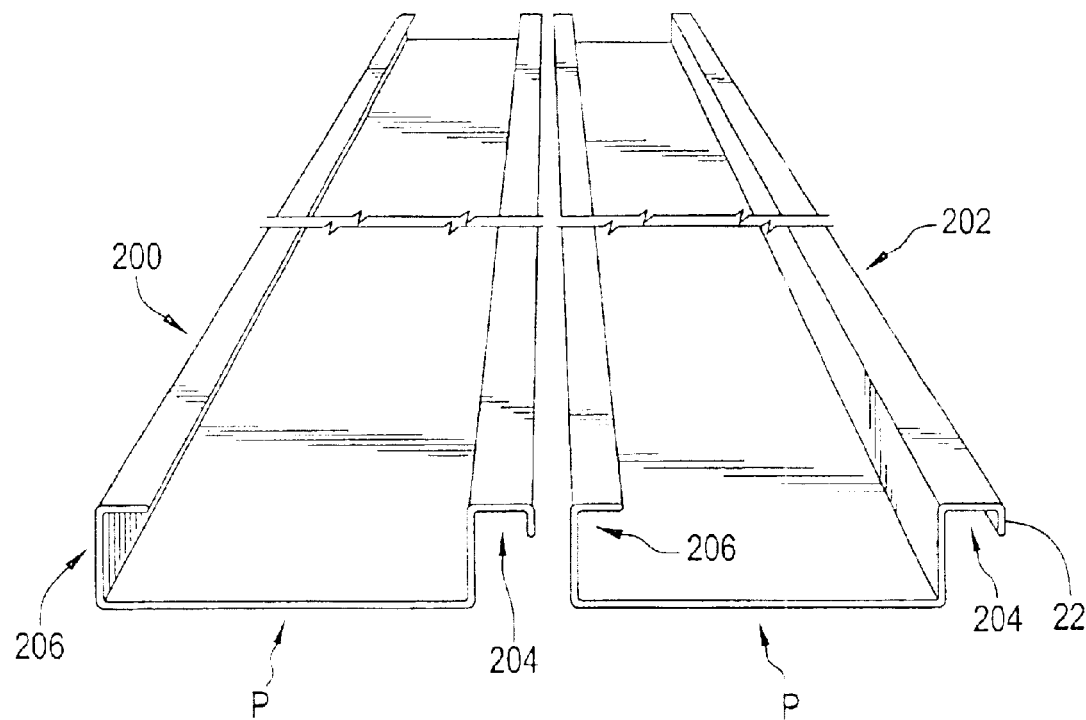
FIG. 19 is a perspective view of a pair of adjacent roofing panels formed from the metal alloy or base metal coated with the alloy of the present invention.
Figure 20:
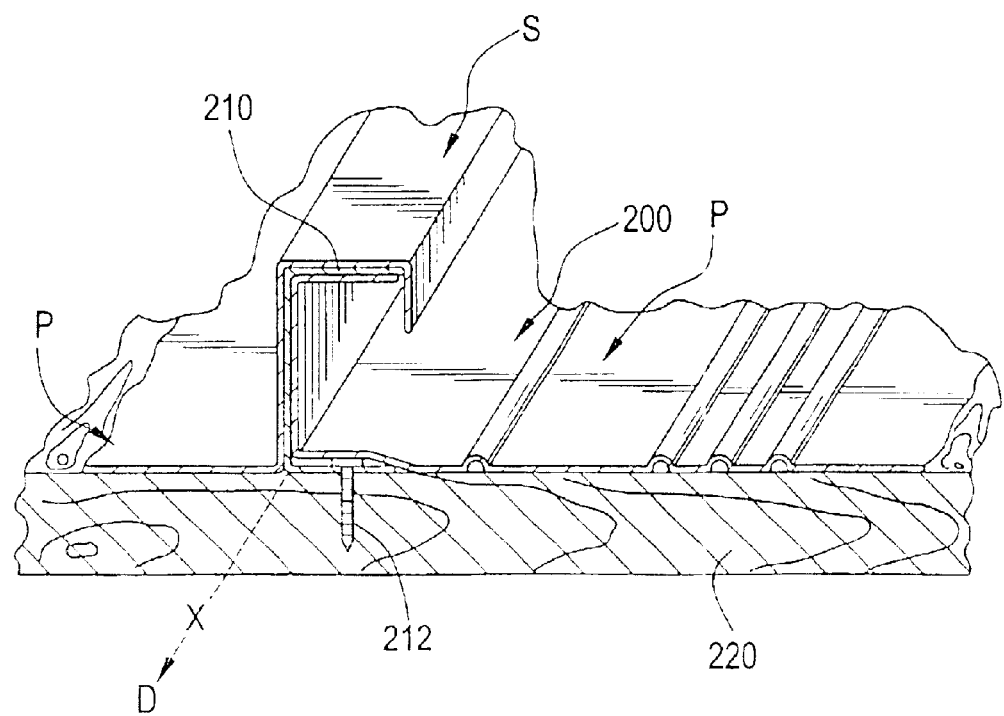
FIG. 20 is a cross-sectional view showing the initial assembly of the roofing panels of FIG. 19.

Referring now to FIGS. 19–20, building materials such as roofing panels are illustrated as being formed from the coated metal strip. Roofing panels P are joined together by an elongated standing seam S. Roofing panels P are typically formed on site or preformed in the shape of elongated pans as shown in FIG. 19. Pans 200 and 202 are illustrated as having substantially similar features. Both pans have a right edge portion 204 and a left edge portion 206. As shown in FIG. 20, pans 202 and 204 are adjacently positioned together to define the elongated direction D lying along base line X. A cleat 210 is used to form seal S. Nails 212 are typically used to maintain the pans on roof 220 while seam S is formed. In standing seam applications, the edges of the roofing materials are typically folded together and then soldered to form a water tight seal. The metal alloy coating inherently includes excellent soldering characteristics. The metal alloy coating can be also welded or soldered. Typical solders contain about 50% tin and about 50% lead; however, higher lead content solders can be used. The metal alloy has the added advantage of being solderable with low or no-lead solders. The roofing materials can be used in mechanically joined roofing systems due to the malleability of the metal alloy. Mechanically joined systems form water tight seals by folding adjacent roof material edges together and subsequently applying a compressive force to the seam which is typically in excess of about 1,000 psi. Under these high pressures, the metal alloy plastically deforms within the seam and produces a water tight seal. This type of roofing system is disclosed in U.S. Pat. Nos. 4,934,120; 4,982,543; 4,987,716; 4,934,120; 5,001,881; 5,022,203; 5,259,166; and 5,301,474, which are incorporated herein by reference.

Figure 21:
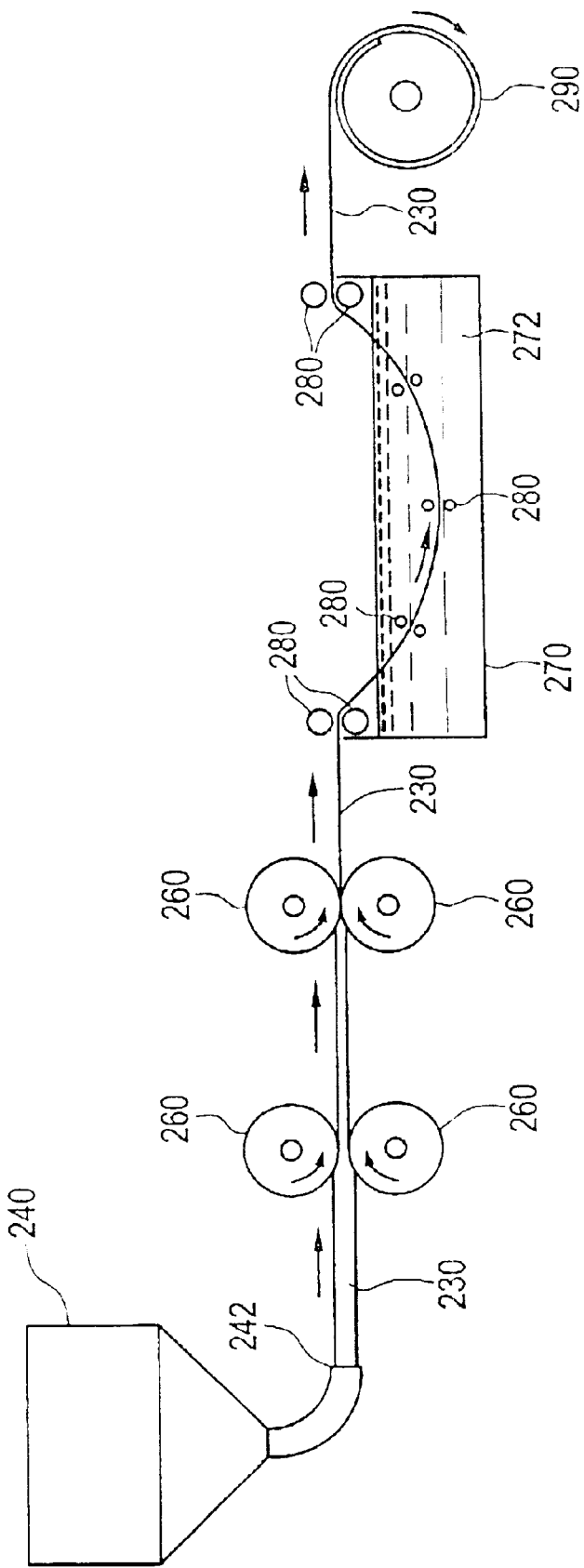
FIG. 21 is a cross-sectional view of the process of roll forming the metal alloy of the present invention into a metal alloy strip.

Referring now to FIG. 21, a corrosion resistant metal alloy is formed into a metal alloy strip 230 by a roll forming process. As can be appreciated, the metal alloy can alternatively be formed into a wire, a tube, or molded or cast into other shapes. Ingots of tin or tin and zinc are typically placed into the melting pot 240 wherein the tin or the tin and zinc ingots are melted. The molten metal alloy is maintained above its melting point in the melting pot. Other metals such as, but not limited to, iron, nickel, aluminum, titanium, copper, manganese, bismuth, antimony can be added into the melting pot to alter the composition of the metal alloy, and/or can be included due to impurities in the tin and/or zinc ingots. The inclusion of these other metals typically alters the melting point of the metal alloy. In order to accommodate for the high melting temperature of the metal alloy, the melting pot is made of materials to withstand such temperatures. Once the metal alloy is properly mixed and melted in melting pot 240, the molten alloy is allowed to flow out of the bottom of the melting pot through pot opening 242. The molten metal alloy 230 is then directed through one or more sets of rollers 260 until the desired thickness of the metal alloy sheet or strip is obtained. The process of roll forming metal strip is well known in the art, thus further details as to the forming of the metal alloy strip 230 will not be discussed. The thickness of the formed metal alloy strip 230 is typically less than about 5080 microns.

Once metal alloy strip 230 has passed through rollers 260, metal alloy strip 230 may be further processed, such as by a pretreatment processes, a coating process, and/or a post coating process as discussed above. As shown in FIG. 21, metal alloy strip 230 is directed into a passivation tank 270. Passivation tank 270 includes a passivation solution 272. The passivation solution is typically the same passivation solution as described above. As the metal alloy strip is directed into passivation tank 270, guide rollers 280 guide the metal alloy strip. The passivation solution reacts with the surface of the metal alloy strip to form a passivation layer which is highly corrosion resistant. The passivation solution also causes the surface of the metal strip to change colors. The passivation tank generally includes an agitator to prevent or inhibit stagnation and/or vast concentration differences of the passivation solution in the passivation tank. After metal alloy strip 230 passes through the passivation tank, the metal alloy strip typically proceeds to a rinsing process, not shown, to remove passivation solution remaining on the metal alloy strip. Generally, the passivation solution is removed by passing the metal alloy strip through a rinse tank and/or by spraying the metal alloy strip with a rinse fluid. As shown in FIG. 21, after metal alloy strip is passivated, the strip is rolled into a roll 290 of metal alloy strip. As can be appreciated, the molten metal alloy can alternatively be formed into a wire or tube. Such wire or tube can be used for pipes, wire, cable, solder or welding wire. When the metal alloy is formed into a solder or welding wire, the metal alloy is generally not passivated. The solder or welding wire has been found to form a strong bond with the metal materials and has excellent wetting properties to create a high quality bond. The solder also has good conductive properties so that it can be used to form electrical connections. The types of base metals which can be soldered by the metal alloy include, but are not limited to, carbon steel, stainless steel, copper, copper alloys, aluminum, aluminum alloys, nickel alloys, tin, titanium, titanium alloys. Materials coated with tin, tin alloys, zinc, zinc alloys, tin and zinc alloys, lead, lead and tin alloys, and various other metals can also be soldered or welded by the metal alloy. The metal alloy strip can also be formed into roofing materials and/or gasoline tanks, as described above, or a variety of components.

The corrosion resistant metal alloy described above is a tin alloy or a tin and zinc alloy. Both of these metal alloys exhibit excellent bonding and corrosion resistant properties when applied to a base metal by a hot dip process and/or by a plating process.

The tin alloy is formulated to include at least a majority of tin. Generally, the tin alloy includes at least about 75 weight percent tin and less than about 10 weight percent zinc, and typically at least about 90 and less than about 10 weight percent zinc. In certain tin alloys, the tin content can at least about 95 weight percent tin, or at least about 98 weight percent tin, or at least about 99 weight percent tin. The high percentage of tin in the tin alloy is substantially different from standard terne alloy formulations which contain about 80% lead and 20% tin. The high concentration of tin in the tin alloy increases the uniformity and strength of the bond between the tin alloy and many types of metal strip 12 as compared with standard terne alloy coatings. The superior bonding characteristics of the tin alloy makes the tin alloy coating ideal for use with many different types of metal strip compositions, and can be formed in a variety of simple and complex shapes. Industrial grade tin typically is used as the tin source for the tin alloy; however, other sources of the tin can be used. Industrial grade tin typically contains trace amounts of impurities such as, but not limited to, cobalt, nickel, silver and sulphur. It has been found that these elements in controlled amounts do not adversely affect the corrosive resistive properties of the tin alloy. Indeed, elements such as, but not limited to, nickel can enhance some properties of the tin alloy.

The tin and zinc alloy is a special combination of tin and zinc. The tin and zinc alloy is formulated to include at least about 9–10 weight percent zinc and at least about 15 weight percent tin and the majority weight percent of the tin and zinc alloy includes tin and zinc. It has been found that the addition of zinc in the amount of at least about 9–10 weight percent of the tin and zinc alloy produces a metal alloy having enhanced corrosion-resistance in various types of environments. The tin content of the tin and zinc alloy is generally about 15–90 weight percent. The zinc content of the alloy is generally about 9 to 10–85 weight percent. The tin plus zinc content of the tin and zinc alloy typically constitutes at least a majority of the tin and zinc alloy. Typically, tin plus zinc content of the tin and zinc alloy constitutes at least about 75 weight percent tin and zinc, more typically at least about 80 weight percent tin and zinc, even more typically at least about 90 weight percent tin and zinc, still even more typically at least about 95 weight percent tin and zinc, yet still even more typically at least about 98 weight percent tin and zinc, and yet still even more typically at least about 99 weight percent tin and zinc. The tin and zinc formulation typically oxidizes to form a colored coating which closely resembles the popular grey, earth-tone color of weathered terne. The use of large weight percentages of zinc in the tin and zinc alloy has been found to not cause the coating to become too rigid or too brittle. The tin and zinc alloy is formable thus can be, in many instances, bent into simple or complex shapes without cracking or breaking. The malleability of tin and zinc alloy is believed to be at partially the result of the unique tin and zinc distributions within the tin and zinc alloy. The tin and zinc form a two phase matrix wherein zinc globules or crystals are at least partially surrounded by tin. Zinc facilitates in stabilizing the tin in the tin and zinc alloy so as to inhibit or prevent tin crystallization in the tin and zinc alloy. When determining the composition of the tin and zinc alloy, the environment the coating is to be used in should be considered. In some situations, a higher tin concentration may be beneficial to limit the amount of zinc rich globules or crystals in the tin and zinc alloy. In other environments, the reverse may be true.

The tin alloy or the tin and zinc alloy typically contains one or more additives without adversely affecting the tin alloy or the tin and zinc alloy; however, the addition of additives is not required. The additives are included and/or added to tin alloy or the tin and zinc alloy to modify the mechanical properties of the metal alloy, the corrosion-resistance of the metal alloy, the color of the corrosion resistant metal alloy, the stability of the metal alloy, and/or the coating properties of the metal alloy. The additive(s) generally constitute less than about 25 weight percent of the metal alloy. Typically, the additive(s) constitute less than about 10 weight percent of the metal alloy. The content of the additives is controlled so that the additives properly mix with the metal alloy. The proper mixing of the additives in the metal alloy is of greater importance for a tin and zinc alloy wherein the tin and zinc form a special two phase matrix. Typically, the additives are added to a tin and zinc alloy in a manner that maintains the two phase matrix of the tin and zinc so as not to form a tin and zinc alloy having more than two phases or which disrupts the tin and zinc matrix.

The tin alloy typically includes at least an effective amount of one or more stabilizing additives to inhibit or prevent the tin from crystallizing. The tin and zinc alloy can also include stabilizing additives; however, such additives can be eliminated since the zinc in the tin and zinc alloy generally facilitates in stabilizing the tin to inhibit or prevent the tin from crystallizing. Tin can begin to crystallize when the temperature drops below about 13° C. Crystallization of the tin in the alloy can weaken the bond between the metal strip and the metal alloy and can result in flaking of the metal alloy from the metal strip. The addition of small amounts of stabilizing metals such as, but not limited to, antimony, bismuth, cadmium, copper, zinc and mixtures thereof prevent and/or inhibit the crystallization of the tin in the metal alloy. Only small amounts of one or more of these metals is needed to stabilize the tin in the metal alloy and inhibit and/or prevent the tin from crystallizing. Amounts of at least about 0.001–0.01 weight percent of the metal alloy are generally sufficient to inhibit or prevent tin crystallization. Typically, the one or more stabilizing metals are included in an amount of at least about 0.001–0.005 weight percent of the metal alloy to inhibit crystallization of the tin.

The tin alloy or tin and zinc alloy can include other additives to alter and/or enhance one or more properties of the metal alloy. The metal alloy can include at least an effective amount of corrosion-resistant agent to enhance the corrosion-resistant properties of the metal alloy. The corrosion-resistant agent includes, but is not limited to, antimony, bismuth, cadmium, chromium, copper, lead, manganese, magnesium, nickel, titanium and/or zinc. The metal alloy can include at least an effective amount of coloring agent to alter the color of the metal alloy. The coloring agent includes, but is not limited to, cadmium, copper, iron, lead, silver and/or titanium. The metal alloy can include at least an effective amount of reflective agent to positively alter the reflectiveness of said metal alloy. The reflective agent includes, but is not limited to, aluminum, cadmium, chromium, copper, silver and/or titanium. A metal alloy which includes a sufficient amount of coloring agents and/or reflective agent may not be required to be weathered or weathered as long prior to use in certain applications. The metal alloy can include at least an effective amount of grain agent to positively alter the grain density of the metal alloy. The grain agent includes, but is not limited to, cadmium, manganese and/or titanium. The metal alloy can include at least an effective amount of mechanical agent to positively alter the mechanical properties of the metal alloy. The mechanical properties of the metal alloy include, but are not limited to, the strength of the metal alloy, the hardness of the metal alloy, the pliability of the metal alloy, the elongation of the metal alloy, the tensile strength of the metal alloy, the elasticity of the metal alloy, the rigidity of the metal alloy, the conductivity of the metal alloy, the heat transfer properties of the metal alloy, etc. The mechanical agent includes, but is not limited to, aluminum, antimony, arsenic, bismuth, cadmium, chromium, copper, iron, lead, magnesium, manganese, nickel, silver, titanium, and/or zinc. The metal alloy can include at least an effective amount of deoxidizing agent to reduce the amount of oxidation of the metal alloy in a molten state. The deoxidizing agent includes, but is not limited to, aluminum, cadmium, magnesium, manganese and/or titanium. The metal alloy can include at least an effective amount of bonding agent to enhance the bonding properties of the metal alloy to the metal strip and/or intermediate barrier metal layer. The bonding agent includes, but is not limited to, cadmium, lead, manganese, titanium and/or zinc.

Aluminum, if added to and/or included in the metal alloy, is generally present in amounts up to about 5 weight percent of the metal alloy; however, higher weight percentages can be used. In several aspects of the present invention, the aluminum content of the metal alloy is a) up to about 2 weight percent of the metal alloy, b) up to about 1 weight percent of the metal alloy, c) up to about 0.75 weight percent of the metal alloy, d) up to about 0.5 weight percent of the metal alloy, f) up to about 0.4 weight percent of the metal alloy, g) up to about 0.3 weight percent of the metal alloy, h) up to about 0.25 weight percent of the metal alloy, i) at least about 0.05 weight percent of the metal alloy, j) about 0.1–1 weight percent of the metal alloy, k) about 0.1–0.5 weight percent of the metal alloy, l) about 0.1–0.3 weight percent of the metal alloy, m) about 0.01–1 weight percent of the metal alloy, n) about 0.01–0.5 weight percent of the metal alloy, o) about 0.01–0.3 weight percent of the metal alloy, p) about 0.01–0.1 weight percent of the metal alloy, q) about 0.0005–0.75 weight percent of the metal alloy, r) about 0.001–0.5 weight percent of the metal alloy, s) about 0.001–0.4 weight percent of the metal alloy, t) about 0.002–0.4 weight percent of the metal alloy, u) about 0.001–0.4 weight percent of the metal alloy, v) about 0.001–0.01 weight percent of the metal alloy, and w) about 0.0001–0.005 weight percent of the metal alloy, x) about 0.001–0.005 weight percent of the metal alloy, and y) less than about 0.001 weight percent of the metal alloy. When aluminum is added to the metal alloy, the aluminum is typically added in the form of an alloy such as, but not limited to, Al—Cu—Mg alloy.

Antimony, if added to and/or included in the alloy, is generally present in amounts up to about 7.5 weight percent of the metal alloy; however, higher weight percentages can be used. In several aspects of the present invention, the antimony content of the metal alloy is a) up to about 5.5 weight percent of the metal alloy, b) up to about 2.5 weight percent of the metal alloy, c) up to about 2 weight percent of the metal alloy, d) up to about 1 weight percent of the metal alloy, e) up to about 0.75 weight percent of the metal alloy, f) up to about 0.5 weight percent of the metal alloy, g) about 0.001–1 weight percent of the metal alloy, h) about 0.005–0.8 weight percent of the metal alloy, i) about 0.01–0.8 weight percent of the metal alloy, j) about 0.01–0.5 weight percent of the metal alloy, and k) about 0.05–0.5 weight percent of the metal alloy.

Bismuth, if added to and/or included in the metal alloy, is generally present in amounts up to about 1.7 weight percent of the metal alloy; however, higher weight percentages can be used. In several aspects of the present invention, the bismuth content of the metal alloy is a) up to about 1 weight percent of the metal alloy b) up to about 0.5 weight percent of the metal alloy, c) up to about 0.01 weight percent of the metal alloy, d) about 0.0001–0.5 weight percent of the metal alloy, e) about 0.05–0.5 weight percent of the metal alloy, f) about 0.0001–0.2 weight percent of the metal alloy, g) about 0.002–0.1 weight percent of the metal alloy, and h) about 0.001–0.01 weight percent of the metal alloy.

Cadmium, if added and/or included in the metal alloy, is present in amounts of up to about 0.5 weight percent of the metal alloy; however, higher weight percentages can be used. In several aspects of the present invention, the cadmium content of the metal alloy is a) up to about 0.1 weight percent of the metal alloy, and b) less than about 0.05 weight percent of the metal alloy.

Chromium, if added and/or included in the metal alloy, is present in amounts of at least about 0.0001 weight percent. In several aspects of the present invention, the chromium content of the metal alloy is a) less than about 0.1 weight percent of the metal alloy, and b) up to about 0.02 weight percent of the metal alloy.

Copper, if added to and/or included in the metal alloy, is present in amounts up to about 5 weight percent of the metal alloy; however, higher weight percentages can be used. In several aspects of the present invention, the copper content of the metal alloy is a) up to about 2.7 weight percent of the metal alloy, b) up to about 2 weight percent of the metal alloy, c) up to about 1.6 weight percent of the metal alloy, d) up to about 1.5 weight percent of the metal alloy, e) up to about 1 weight percent of the metal alloy, f) up to about 0.05 weight percent of the metal alloy, g) at least about 0.001 weight percent of the metal alloy, h) at least about 0.1 weight percent of the metal alloy, i) about 0.001–2.7 weight percent of the metal alloy, j) about 0.01–2.7 weight percent of the metal alloy, k) about 0.001–1.6 weight percent of the metal alloy, l) about 0.1–1.6 weight percent of the metal alloy, m) about 1–1.5 weight percent of the metal alloy, n) about 0.001–1 weight percent of the metal alloy, o) about 0.001–0.5 weight percent of the metal alloy, p) about 0.005–0.6 weight percent of the metal alloy, q) about 0.005–0.1 weight percent of the metal alloy, r) about 0.01–0.1 weight percent of the metal alloy, s) about 0.05–0.1 weight percent of the metal alloy, t) about 0.005–2.7 weight percent of the metal alloy, u) about 0.005–1.6 weight percent of the metal alloy, and v) about 0.1–1.5 weight percent of the metal alloy. When copper is added to the metal alloy, the copper is typically added in the form of brass and/or bronze.

Iron, if added to and/or included in the metal alloy, is added in amounts up to about 1 weight percent of the metal alloy; however, higher weight percentages can be used. In several aspects of the present invention, the iron content of the metal alloy is a) less than about 0.5 weight percent of the metal alloy, b) less than about 0.1 weight percent of the metal alloy, c) up to about 0.02 weight percent of the metal alloy, d) less than about 0.01 weight percent of the metal alloy, e) less than about 0.005 weight percent of the metal alloy, and f) less than about 0.002 weight percent of the metal alloy.

Lead, if added to and/or included in the metal alloy, is present in low levels, generally less than about 10 weight percent of the metal alloy; however, higher weight percentages can be used. In several aspects of the present invention, the lead content of the metal alloy is a) less than about 2 weight percent of the metal alloy, b) less than about 1 weight percent of the alloy, c) less than about 0.5 weight percent of the alloy, d) less than about 0.1 weight percent of the metal alloy, e) less than about 0.075 weight percent of the metal alloy, f) less than about 0.06 weight percent of the metal alloy, g) less than about 0.05 weight percent of the metal alloy, h) less than about 0.02 weight percent of the metal alloy; i) less than about 0.01 weight percent of the metal alloy, j) less than about 0.001 weight percent of the metal alloy, and k) about 0.001–0.1 weight percent.

Magnesium, if added to and/or included in the metal alloy, is present in amounts up to about 5 weight percent of the metal alloy; however, higher weight percentages can be used. In several aspects of the present invention, the magnesium content of the metal alloy is a) up to about 2 weight percent of the metal alloy, b) up to about 1 weight percent of the metal alloy, c) up to about 0.4 weight percent of the metal alloy, d) up to about 0.1 weight percent of the metal alloy, e) about 0.1–0.4 weight percent of the metal alloy, f) about 0.01–0.4 weight percent of the metal alloy, and g) about 0.001–0.1 weight percent of the metal alloy. When magnesium is added to the metal alloy, the magnesium is typically added in the form of pure magnesium.

Manganese, if added to and/or included in the metal alloy, is present in amounts up to about 0.1 weight percent of the metal alloy; however, higher weight percentages can be used. In several aspects of the present invention, the manganese content of the metal alloy is a) at least about 0.0001 weight percent of the metal alloy, b) up to about 0.01 weight percent of the metal alloy, c) about 0.0001–0.1 weight percent of the metal alloy, d) about 0.001–0.1 weight percent of the metal alloy, and e) about 0.0001–0.01 weight percent of the metal alloy.

Nickel, if added to and/or included in the metal alloy, is present in amounts up to about 5 weight percent of the metal alloy; however, higher weight percentages can be used. In several aspects of the present invention, the nickel content of the metal alloy is a) up to about 2 weight percent of the metal alloy, b) up to about 1 weight percent of the metal alloy, c) up to about 0.9 weight percent of the metal alloy, d) up to about 0.7 weight percent of the metal alloy; e) up to about 0.3 weight percent of the metal alloy, f) up to about 0.1 weight percent of the metal alloy, g) up to about 0.005 weight percent of the metal alloy, h) about 0.001–0.1 weight percent of the metal alloy, i) about 0.001–0.9 weight percent of the metal alloy, j) about 0.001–0.3 weight percent of the metal alloy, k) about 0.001–0.05 weight percent of the metal alloy, l) about 0.001–0.005 weight percent of the metal alloy, and m) about 0.01–0.7 weight percent of the metal alloy.

Titanium, if added to and/or included in the metal alloy, is present in amounts up to about 1 weight percent of the metal alloy; however, higher weight percentages can be used. In several aspects of the present invention, the titanium content of the metal alloy is a) up to about 0.5 weight percent of the metal alloy, b) up to about 0.2 weight percent of the metal alloy, c) up to about 0.18 weight percent of the metal alloy; d) up to about 0.15 weight percent of the metal alloy; e) up to about 0.1 weight percent of the metal alloy, f) up to about 0.075 weight percent of the metal alloy, g) up to about 0.05 weight percent of the metal alloy, h) at least about 0.0005 weight percent of the metal alloy, i) about 0.01–0.5 weight percent of the metal alloy, j) about 0.01–0.15 weight percent of the metal alloy, k) about 0.0001–0.075 weight percent of the metal alloy, l) about 0.0005–0.05 weight percent of the metal alloy, m) about 0.0005–0.18 weight percent of the metal alloy; n) about 0.001–0.05 weight percent of the metal alloy, and o) about 0.005–0.02 weight percent of the metal alloy. When titanium is added to a tin and zinc alloy, the titanium is typically added as an alloy such as, but not limited to, a Zn—Ti alloy.

Zinc, if added to and/or included in the tin alloy, is present in amounts up to about 9–10 weight percent of the metal alloy. Higher weight percentages of zinc transforms the metal alloy to a tin and zinc alloy. In several aspects of the present invention, the zinc content of the tin alloy is a) up to about 8 weight percent of the tin alloy, b) up to about 7 weight percent of the tin alloy, c) up to about 1.5 weight percent of the tin alloy, d) less than about 1 weight percent of the tin alloy, e) up to about 0.5 weight percent of the tin alloy, f) about 0.001–0.5 weight percent of the tin alloy, and g) less than about 0.2 weight percent of the tin alloy.

A general formulation of the corrosion resistant tin alloy by weight percent includes the following:

| Tin | 75–99.99 |
|---|---|
| Antimony | 0–7.5 |
| Bismuth | 0–1.7 |
| Copper | 0–5 |
| Lead | 0–10 |

A more specific formulation of the corrosion resistant tin alloy by weight percent includes the following:

| Tin | 75–99.99 |
|---|---|
| Aluminum | 0–5 |
| Antimony | 0–7.5 |
| Bismuth | 0–1.7 |
| Copper | 0–5 |
| Lead | 0–10 |
| Nickel | 0–5 |
| Zinc | 0–9 |

Another and/or alternative more specific formulation of the corrosion resistant tin alloy by weight percent includes the following:

| Tin | 90–99.99 |
|---|---|
| Aluminum | 0–2 |
| Antimony | 0–2 |
| Arsenic | 0–0.05 |
| Bismuth | 0–1.5 |
| Boron | 0–0.1 |
| Cadmium | 0–0.5 |
| Carbon | 0–1 |
| Chromium | 0–1 |
| Copper | 0–2 |
| Iron | 0–1 |
| Lead | 0–2 |
| Magnesium | 0–1 |
| Manganese | 0–0.1 |
| Molybdenum | 0–0.1 |
| Nickel | 0–1 |
| Silicon | 0–0.5 |
| Silver | 0–0.1 |
| Tellurium | 0–0.05 |
| Titanium | 0–0.5 |
| Vanadium | 0–0.1 |
| Zinc | 0–7 |

Still another and/or alternative more specific formulation of the tin alloy by weight percent includes the following:

| Tin | 90–99.9 |
|---|---|
| Aluminum | 0–5 |
| Antimony | 0–7.5 |
| Arsenic | 0–0.005 |
| Bismuth | 0–1.7 |
| Boron | 0–0.1 |
| Cadmium | 0–0.1 |
| Carbon | 0–1 |
| Chromium | 0–1 |
| Copper | 0–5 |
| Iron | 0–1 |
| Lead | 0–2 |
| Magnesium | 0–5 |
| Manganese | 0–0.1 |
| Molybdenum | 0–0.1 |
| Nickel | 0–5 |

-continued

| Silicon | 0–0.5 |
|---|---|
| Silver | 0–0.005 |
| Tellurium | 0–0.05 |
| Titanium | 0–1 |
| Vanadium | 0–0.1 |
| Zinc | 0–9 |

A few examples of the metal alloy composition by weight percent which have exhibited the desired characteristics as mentioned above are set forth as follows:

| Alloy Ingredients | A | B | C | D | E |
|---|---|---|---|---|---|
| Tin | Bal. | Bal. | Bal. | Bal. | Bal. |
| Aluminum | ≦0.01 | ≦0.01 | ≦0.05 | 0 | 0 |
| Antimony | ≦1 | ≦0.1 | ≦0.1 | ≦0.05 | ≦0.05 |
| Bismuth | ≦0.05 | ≦0.05 | ≦0.01 | ≦0.01 | ≦0.01 |
| Copper | ≦0.5 | ≦0.05 | 0 | 1 | 0 |
| Iron | ≦0.1 | ≦0.005 | 0 | 0 | 0 |
| Lead | ≦1 | ≦0.1 | ≦0.1 | ≦0.1 | ≦2 |
| Nickel | ≦0.005 | ≦0.05 | ≦0.05 | ≦0.005 | ≦0.05 |
| Zinc | ≦1 | ≦2 | ≦3 | ≦0.5 | ≦1 |

| Alloy Ingredients | F | G | H | I | J |
|---|---|---|---|---|---|
| Tin | Bal. | Bal. | Bal. | Bal. | Bal. |
| Aluminum | ≦0.01 | ≦0.01 | 0 | 0 | ≦0.05 |
| Antimony | ≦0.1 | ≦0.01 | ≦0.05 | ≦0.05 | ≦0.1 |
| Bismuth | ≦0.05 | ≦0.01 | ≦0.01 | ≦0.01 | ≦0.1 |
| Copper | ≦0.5 | 0 | 0 | 0 | ≦0.5 |
| Iron | ≦0.005 | 0 | 0 | 0 | ≦0.05 |
| Lead | ≦0.1 | ≦0.1 | ≦0.1 | ≦0.05 | ≦1 |
| Nickel | 0 | 0 | 0 | 0 | ≦1 |
| Zinc | ≦1 | ≦1 | ≦1 | ≦1 | ≦9 |

| Alloy Ingredients | K | L | M | N | O |
|---|---|---|---|---|---|
| Tin | Bal. | Bal. | Bal. | Bal. | Bal. |
| Aluminum | ≦0.01 | ≦0.01 | ≦0.05 | 0.0 | 0.0 |
| Antimony | ≦1.0 | ≦0.1 | ≦0.1 | ≦0.05 | ≦0.05 |
| Bismuth | ≦0.05 | ≦0.05 | ≦0.01 | ≦0.01 | ≦0.01 |
| Copper | ≦0.5 | ≦0.5 | 0.0 | 1.0 | 0.0 |
| Iron | ≦0.1 | ≦0.005 | ≦0.0 | ≦0.0 | ≦0.0 |
| Lead | ≦1.0 | ≦0.1 | ≦0.1 | ≦0.1 | ≦2.0 |
| Nickel | ≦0.005 | ≦0.0 | ≦0.0 | ≦0.005 | ≦0.0 |
| Zinc | ≦1 | ≦2 | ≦3 | ≦0.5 | ≦1 |

One formulation of the corrosion resistant tin alloy includes by weight percent at least 75% tin; 0–1% aluminum; 0–2% antimony; 0–0.02% arsenic; 0–1.5% bismuth; 0–0.1% boron; 0–0.1% cadmium; 0–0.5% carbon; 0–0.5% chromium; 0–2% copper; 0–1% iron; 0–2% lead; 0–0.4% magnesium; 0–0.1% manganese; 0–0.1% molybdenum; 0–1% nickel; 0–0.05% silicon; 0–0.1silver; 0–0.02% sulfur; 0–0.04% tellurium; 0–0.15% titanium; 0–0.1% vanadium; and 0–9% zinc. Another and/or alterative formulation of the corrosion resistant tin alloy includes 90–99.9% tin; 0–0.5% aluminum; 0–2% antimony; 0–0.01% arsenic; 0–1.5% bismuth; 0–0.05% boron; 0–0.1% cadmium; 0–0.5% carbon; 0–0.5% chromium; 0–2% copper; 0–1% iron; 0–1% lead; 0–0.4magnesium, 0–0.1% manganese; 0–0.1% molybdenum; 0–1% nickel; 0–0.5% silicon; 0–0.1% silver; 0–0.01% sulfur; 0–0.01% tellurium; 0–0.15% titanium; 0–0.1% vanadium; and 0–9% zinc. Still another and/or alterative formulation of the corrosion resistant tin alloy includes at least 90% tin; 0–1% aluminum; 0–2% antimony; 0–0.02% arsenic; 0–1.5% bismuth; 0–0.05% boron; 0–0.1% cadmium; 0–0.5% carbon; 0–0.5% chromium; 0–2% copper; 0–1% iron; 0–2% lead; 0–0.4% magnesium; 0–0.1% manganese; 0–0.1% molybdenum; 0–1% nickel; 0–0.05% silicon; 0–0.05% silver; 0–0.02% sulfur; 0–0.04% tellurium; 0–0.15% titanium; 0–0.05% vanadium; and 0–5% zinc. Yet another and/or alterative formulation of the corrosion resistant tin alloy includes 95–99.99% tin; 0–0.4% aluminum; 0–0.8% antimony; 0–0.005% arsenic; 0–0.5% bismuth; 0–0.1% boron; 0–0.05% cadmium; 0–0.1% carbon; 0–0.05% chromium; 0–1% copper; 0–1% iron; 0–5% lead; 0–0.01% magnesium; 0–0.01% manganese; 0–0.05% molybdenum; 0–0.9% nickel; 0–0.5% silicon; 0–0.01% silver; 0–0.01sulfur; 0–0.01% tellurium; 0–0.1% titanium; 0–0.01% vanadium; and 0–2% zinc. Still yet another and/or alterative formulation of the corrosion resistant tin alloy includes 95–99.99% tin; 0–0.4% aluminum; 0–0.8% antimony; 0–0.005% arsenic; 0–0.5% bismuth; 0–0.1% boron; 0–0.05% cadmium; 0–0.1% carbon; 0–0.05% chromium; 0–1% copper; 0–0.5% iron; 0–0.5% lead; 0–0.01% magnesium; 0–0.01% manganese; 0–0.05% molybdenum; 0–0.9% nickel; 0–0.01% silicon; 0–0.01% silver; 0–0.01% sulfur; 0–0.01% tellurium; 0–0.1% titanium; 0–0.01% vanadium; and 0–2% zinc. A further and/or alterative formulation of the corrosion resistant tin alloy includes 98–99.9% tin; 0–0.01% aluminum; 0–1% antimony and/or bismuth; 0–0.1% copper; 0–0.05% iron; 0–0.5% lead; 0–0.05% magnesium; 0–0.05% manganese; 0–0.1% nickel; and 0–0.1% zinc. Yet a further and/or alterative formulation of the corrosion resistant tin alloy includes 98–99.99% tin; 0–0.1% aluminum; 0–1% antimony and/or bismuth; 0–0.001% arsenic; 0–0.001% boron; 0–0.001% cadmium; 0–0.01% carbon; 0–0.01chromium; 0–0.1% copper; 0–0.05% iron; 0–0.05% lead; 0–0.001% magnesium; 0–0.001% manganese; 0–0.001% molybdenum; 0–0.9% nickel; 0–0.001% silicon; 0–0.001% silver; 0–0.001% sulfur; 0–0.001% tellurium; 0–0.05% titanium; 0–0.001% vanadium; and 0–1% zinc. Still yet a further and/or alterative formulation of the corrosion resistant tin alloy includes at least 90% tin and 0.01–0.1% lead. Another and/or alterative formulation of the corrosion resistant tin alloy includes 90–99.9% tin and 0.001–0.1% lead. Still another and/or alterative formulation of the corrosion resistant tin alloy includes 90–99.9% tin; 0–7.5% antimony; 0–1.7% bismuth; 0–2.7% copper; 0.001–0.1% lead; and 0–1.5% zinc. Yet another and/or alterative formulation of the corrosion resistant tin alloy includes 90–99.9% tin; less than 0.001% aluminum; 0–7.5% antimony; 0–1.7% bismuth; less than 0.05% cadmium; 0–2.7% copper; 0.001–0.1% lead; and 0–1.5% zinc. Still yet another and/or alterative formulation of the corrosion resistant tin alloy includes 90–99.9% tin; 0–2.5% antimony; 0–0.5% bismuth; 0–2.7% copper; 0–0.1% iron; 0.001–0.10% lead; and 0.5–1.5% zinc. A further and/or alterative formulation of the corrosion resistant tin alloy includes 90–99.9% tin; 0–7.5% antimony; 0–1.7% bismuth; 0–2.7% copper; 0–0.1% iron; 0.01–0.1% lead; and 0–1.5% zinc. Yet a further and/or alterative formulation of the corrosion resistant tin alloy includes 90–99.95% tin; 0–7.5% antimony; 0–1.7% bismuth; 0–2.7% copper; 0–1% iron; 0–0.5% lead; and 0–0.5% zinc. Still a further and/or alterative formulation of the corrosion resistant tin alloy includes 90–99.95% tin; 0–7.5% antimony; 0–1.7% bismuth; 0–5% copper; 0–1% iron; 0–0.5% lead; and 0–7% zinc. Still yet a further and/or alterative formulation of the corrosion resistant tin alloy includes 90–99.95% tin; 0–0.5% antimony and/or bismuth; 0–1% copper; 0–1% iron; 0–0.05% lead; and 0–1.5% zinc. Another and/or alterative formulation of the corrosion resistant tin alloy includes 90–99.95% tin; 0.005–0.5% antimony; bismuth and/or copper; 0–0.05% lead; and 0–0.5% zinc. Still another and/or alterative formulation of the corrosion resistant tin alloy includes 90–99.9% tin; 0–5% aluminum; 0–7.5% antimony; 0–0.005% arsenic; 0–1.7% bismuth; 0–0.1% cadmium; 0–5% copper; 0–1% iron; 0–2% lead; 0–5% magnesium; 0–5% nickel; 0–0.005% silver; 0–1% titanium; and 0–9% zinc. Yet another and/or alterative formulation of the corrosion resistant tin alloy includes 95–99.9% tin; 0–0.01% aluminum; 0–0.5% antimony; 0–0.5% bismuth; 0–0.005% iron; 0–0.1% lead; 0–0.1% nickel; and 0–2% zinc. Still yet another and/or alterative formulation of the corrosion resistant tin alloy includes 199–99.9% tin; 0–0.4% antimony; 0–0.2% bismuth; 0–0.001% iron; 0–0.05% lead; 0–0.001% nickel; and 0–0.2% zinc. A further and/or alterative formulation of the corrosion resistant tin alloy includes 90–99.9% tin; 0–0.01% aluminum; 0–1% antimony; 0–0.05% bismuth; 0–0.5% copper; 0–0.1% iron; 0–1% lead; 0–0.005% nickel; and 0–1% zinc. Yet a further and/or alterative formulation of the corrosion resistant tin alloy includes 90–99.9% tin; 0–0.5% aluminum; 0–2% antimony; 0–0.01% arsenic; 0–1.5% bismuth; 0–0.05% boron; 0–0.1% cadmium; 0–0.5% carbon; 0–0.5% chromium; 0–2% copper; up to 1% iron; less than 1% lead; 0–0.4% magnesium; 0–0.1% manganese; 0–0.1% molybdenum; 0–1% nickel; 0–0.5% silicon; 0–0.1% silver; 0–0.01% sulfur; 0–0.01% tellurium; 0–0.15% titanium; 0–0.1% vanadium; and 0–9% zinc. Still a further and/or alterative formulation of the corrosion resistant tin alloy includes 98–99.9% tin; 0–0.01% aluminum; 0–1% antimony and/or bismuth; 0–0.1% copper; less than 0.05% iron; less than 0.5% lead; 0–0.05% magnesium; 0–0.05% manganese; 0–0.1% nickel; and 0–0.1% zinc. Still yet a further and/or alterative formulation of the corrosion resistant tin alloy includes 99–99.9% tin; 0.001–0.8% antimony and/or bismuth; 0–0.02% copper; 0–0.001% iron; and 0–0.08% lead; 0–0.001% nickel; and 0–0.001% zinc. Another formulation of the corrosion resistant tin alloy includes 90–99.9% tin; 0–5% aluminum; 0–7.5% antimony; 0–0.005% arsenic; 0–1.7% bismuth; 0–0.005% cadmium; 0–5% copper; 0–1% iron; 0–2% lead; 0–5% magnesium; 0–5% nickel; 0–0.005% silver; 0–1% titanium; and 0–9% zinc. Yet another and/or alterative formulation of the corrosion resistant tin alloy includes 95–99.9% tin; 0–0.05% aluminum; 0–0.2% antimony; 0–0.1% bismuth; 0–0.1% copper; 0–0.1% iron; 0–0.2% lead; 0–0.1% nickel; and 0–9% zinc. Still yet another and/or alterative formulation of the corrosion resistant tin alloy includes 75–99.9% tin; 0–5% aluminum; 0–7.5% antimony; 0–1.7% bismuth; 0–5% copper; 0–10% lead; 0–5% nickel; 0–0.5 titanium; and 0–9% zinc. A further and/or alterative formulation of the corrosion resistant tin alloy includes 90–99.9% tin; 0–2% aluminum; 0–2% antimony; 0–0.05% arsenic; 0–1.5% bismuth; 0–0.1% boron; 0–0.5% cadmium; 0–1% carbon; 0–1% chromium; 0–2% copper; 0–1% iron; 0–2% lead; 0–1% magnesium; 0–0.1% manganese; 0–0.1% molybdenum; 0–1% nickel; 0–0.5% silicon; 0–0.1% silver; 0–0.05% tellurium; 0–0.5% titanium; 0–0.1% vanadium; and 0–7% zinc. Yet a further and/or alterative formulation of the corrosion resistant tin alloy includes at least 90% tin; 0–1% aluminum; 0–2% antimony; 0–0.02% arsenic; 0–1.5% bismuth; 0–0.5% boron; 0–0.1% cadmium; 0–0.5% carbon; 0–0.5% chromium; 0–2% copper; 0–1% iron; 0–0.4% magnesium; 0–0.1% manganese; 0–0.1% molybdenum; 0–1% nickel; 0–0.05% silicon; 0–0.05silver; 0–0.02% sulfur; 0–0.04% tellurium; 0–0.15% titanium; 0–0.05% vanadium; and 0–5% zinc. Still a further and/or alterative formulation of the corrosion resistant tin alloy includes 95–99.99% tin; 0–0.4% aluminum; 0–0.8% antimony; 0–0.005% arsenic; 0–0.5% bismuth; 0–0.1% boron; 0–0.05% cadmium; 0–0.1% carbon; 0–0.05% chromium; 0–1% copper; 0–0.5% iron; 0–0.5% lead; 0–0.01% magnesium; 0–0.01% manganese; 0–0.05% molybdenum; 0–0.3% nickel; 0–0.01% silicon; 0–0.01% silver; 0–0.01% sulfur; 0–0.01% tellurium; 0–0.1% titanium; 0–0.01% vanadium; and 0–2% zinc. Still yet a further and/or alterative formulation of the corrosion resistant tin alloy includes 98–99.99% tin; 0–0.1% aluminum; 0–1% antimony and/or bismuth; 0–0.001% arsenic; 0–0.001% boron; 0–0.001% cadmium; 0–0.01% carbon; 0–0.01% chromium; 0–0.1% copper; 0–0.05% iron; 0–0.05% lead; 0–0.001% magnesium; 0–0.001% manganese; 0–0.001% molybdenum; 0–0.1% nickel; 0–0.001% silicon; 0–0.001% silver; 0–0.001% sulfur; 0–0.001% tellurium; 0–0.05% titanium; 0–0.001% vanadium; and 0–1% zinc. Another and/or alterative formulation of the corrosion resistant tin alloy includes at least 75% tin; 0–1% aluminum; 0–2% antimony; 0–0.02% arsenic; 0–1.5% bismuth; 0–0.05% boron; 0–0.1% cadmium; 0–0.5% carbon; 0–0.5% chromium; 0–2% copper; 0–1% iron; 0–2% lead; 0–0.4% magnesium; 0–0.1% manganese; 0–0.1% molybdenum; 0–1% nickel; 0–0.05% silicon; 0–0.1% silver; 0–0.02% sulfur; 0–0.04% tellurium; 0–0.15% titanium; 0–0.1% vanadium; and 0–9% zinc. Yet another and/or alterative formulation of the corrosion resistant tin alloy includes 95–99.99% tin; 0–0.4% aluminum; 0–0.8% antimony; 0–0.005% arsenic; 0–0.5% bismuth; 0–0.1% boron; 0–0.05% cadmium; 0–0.1% carbon; 0–0.05% chromium; 0–1% copper; 0–1% iron; 0–5% lead; 0–0.01% magnesium; 0–0.01% manganese; 0–0.05% molybdenum; 0–0.9% nickel; 0–0.5% silicon; 0–0.01% silver; 0–0.01% sulfur; 0–0.01% tellurium; 0–0.1% titanium; 0–0.01% vanadium; and 0–2% zinc. Still another and/or alterative formulation of the corrosion resistant tin alloy includes 98–99.99% tin; 0–0.1% aluminum; 0–1% antimony and/or bismuth; 0–0.001% arsenic; 0–0.001% boron; 0–0.001% cadmium; 0–0.01% carbon; 0–0.01% chromium; 0–0.1% copper; 0–0.05% iron; 0–0.05% lead; 0–0.001% magnesium; 0–0.001% manganese; 0–0.001% molybdenum; 0–0.9% nickel; 0–0.001% silicon; 0–0.001% silver; 0–0.001% sulfur; 0–0.001% tellurium; 0–0.05% titanium; 0–0.001% vanadium; and 0–1% zinc. Still yet another and/or alterative formulation of the corrosion resistant tin alloy includes 90–99.9% tin; 0–0.5% antimony; 0–1.5% bismuth; 0.00–1% lead; and 0–0.001% zinc. A further and/or alterative formulation of the corrosion resistant tin alloy includes 90–99.9% tin; 0–0.75% antimony; 0–0.5% bismuth; 0–0.1% iron; 0–1% lead; and 0–0.5% zinc. Yet further and/or alterative formulation of the corrosion resistant tin alloy includes 90–99.9% tin; 0–7.5% antimony; 0–2.7% copper; and 0–1% lead. Still a further and/or alterative formulation of the corrosion resistant tin alloy includes 90–99.9% tin; 0–2.5% antimony; 0–2% copper; 0–1% lead; and 0–0.5% zinc. Still yet a further and/or alterative formulation of the corrosion resistant tin alloy includes 90–99.9% tin; 0–0.75% antimony; 0–0.5% bismuth; 0–0.1% iron; 0–1% lead; an 0–0.5% zinc. Another and/or alterative formulation of the corrosion resistant tin alloy includes 90–99.9% tin; 0–1% antimony; 0–0.5% bismuth; 0–0.1% iron; and 0–1% lead. Still another and/or alterative of the corrosion resistant tin alloy includes 90–99.9% tin; 0–0.5% bismuth; 0–0.1% iron; and 0–1% lead. Yet another and/or alterative formulation of the corrosion resistant tin alloy includes 90–99.9% tin; 0–0.75% antimony; 0–0.5% bismuth; 0–0.01% iron; 0.001–0.05% lead; and 0–0.5% zinc. Still yet another and/or alterative formulation of the corrosion resistant tin alloy includes 90–99.9% tin; 0–0.5% antimony; 0–1.7% bismuth; 0–0.02% lead; and 0–0.001% zinc. A further and/or alterative formulation of the corrosion resistant tin alloy includes 90–99.9% tin; 0–0.75% antimony; 0–0.5% bismuth; 0–0.005% cobalt; 0–2.7% copper; 0–0.1% iron; 0–0.05% lead; 0–0.005% nickel; 0–0.001% silver; 0–0.001% sulfur; and 0–0.5% zinc. Still a further and/or alterative formulation of the corrosion resistant tin alloy includes 90–99.9% tin; 0–7.5% antimony; and 0–2.7% copper. Yet a further and/or alterative formulation of the corrosion resistant tin alloy includes 90–99.9% tin; 0–2.5% antimony; 0–2% copper; and 0–0.5% zinc. Still yet a further and/or alterative formulation of the corrosion resistant tin alloy includes 90–99.9% tin; 0–0.5% antimony; 0–1.5% bismuth; 0–0.005% cobalt; 0–0.02% lead; 0–0.005% nickel; 0–0.001% silver; 0–0.001% sulfur; and 0–0.001% zinc. Another formulation of the corrosion resistant tin alloy includes 90–99.9% tin and 0–0.1% lead. Still another and/or alterative formulation of the corrosion resistant tin alloy includes 90–99.9% tin and 0–0.01% lead. Yet another and/or alterative formulation of the corrosion resistant tin alloy includes 90–99.9% tin; 0–5.5% antimony; 0–0.5% aluminum; 0–1.7% bismuth; 0–2.7% copper; 0–0.4% magnesium; 0–1% nickel; and 0–0.15% titanium. Still yet another and/or alterative formulation of the corrosion resistant tin alloy includes 90–99.9% tin; 0–0.75% antimony; 0–0.5% bismuth; 0–0.005% cobalt; 0–2.7% copper; 0–0.1% iron; 0–0.05% lead; 0–0.005% nickel; 0–0.001silver; 0–0.001% sulfur; and 0–0.5% zinc. A further and/or alterative formulation of the corrosion resistant tin alloy includes 90–95% tin; 0–0.25% aluminum; 0–1.5% copper; 0–0.02% chromium; 0–0.01% iron; 0–0.01% lead; 0–0.01% manganese; 0–0.018% titanium; and 0–9% zinc. Still a further and/or alterative formulation of the corrosion resistant tin alloy includes 0–2.5% antimony, 0–0.5% bismuth, 0–2.7% copper; 0–0.1% iron; 0.001–0.1% lead; 0.5–1.5% zinc and the remainder tin. Another and/or alterative formulation of the corrosion resistant tin alloy includes 90–99.9% tin; 0–7.2% antimony; 0–1.7% bismuth; 0–2.7% copper; 0–0.1% iron; 0.001–0.1% lead; and 0–1.5% zinc. Still another and/or alterative formulation of the corrosion resistant tin alloy includes at least about 95% tin; 0.001–0.1% lead, and at least about 0.5% stabilizer. Yet another and/or alterative formulation of the corrosion resistant tin alloy includes 0–2.5% antimony, 0–0.5% bismuth, 0–2.7% copper, 0–0.1% iron, 0.001–0.1% lead, 0–1.5% zinc and the remainder tin. Still yet another and/or alterative formulation of the corrosion resistant tin alloy includes 90–99.95% tin; 0–7.2% antimony; 0–1.7% bismuth; 0–2.7% copper; 0–0.1% iron; 0.001–0.1% lead; and 0–0.5% zinc. A further and/or alterative formulation of the corrosion resistant tin alloy includes 90–99.95% tin; 0–7.2% antimony; 0–1.7% bismuth; and 0.001–0.05% lead. Still a further and/or alterative formulation of the corrosion resistant tin alloy includes 95–99.9% tin; 0–0.1% aluminum; 0–1% antimony; 0–0.5% bismuth; 0–0.5% copper; 0–0.1% iron; 0–0.5% lead; 0–0.1% nickel; and 0–0.2% zinc. Still yet a further and/or alterative formulation of the corrosion resistant tin alloy includes 98–99.9% tin; 0–0.4% antimony; 0–0.2% bismuth; 0–0.1% copper; 0–0.01% iron; 0–0.05% lead; 0–0.01% nickel; and 0–0.05% zinc. Another and/or alterative formulation of the corrosion resistant tin alloy includes 75–99.99% tin; 0–5% aluminum; 0–7.5% antimony; 0–1.7% bismuth; 0–5% copper; 0–10% lead; 0–5% nickel; 0–0.5% titanium; and 0–9% zinc. Still another and/or alterative formulation of the corrosion resistant tin alloy includes 98–99% tin; 0–0.1% aluminum; 0–1% antimony and/or bismuth; 0–0.001% arsenic; 0–0.001% boron; 0–0.001% cadmium; 0–0.01% carbon; 0–0.01% chromium; 0–0.1% copper; 0–0.05% iron; 0–0.05% lead; 0–0.001% magnesium; 0–0.001% manganese; 0–0.001% molybdenum; 0–0.1% nickel; 0–0.001% silicon; 0–0.001% silver; 0–0.001% sulfur; 0–0.001% tellurium; 0–0.05titanium; 0–0.001% vanadium; and 0–1% zinc. Yet another and/or alterative formulation of the corrosion resistant tin alloy includes 50–99.999% tin; 0–7.5% aluminum; 0–2% antimony; 0–0.05% arsenic; 0–0.1% boron; 0–1.7% bismuth; 0–0.5% cadmium; 0–1% carbon; 0–1% chromium; 0–5% copper; 0–1% iron; 0–10% lead; 0–1% magnesium; 0–0.1% manganese; 0–0.1% molybdenum; 0–5% nickel; 0–0.5% silicon; 0–0.1% silver; 0–0.05% tellurium; 0–0.5% titanium; 0–0.1% vanadium; and 0–9zinc. Yet another and/or alterative formulation of the corrosion resistant tin alloy includes 90–99.999% tin; 0–7.5% aluminum; 0–2% antimony; 0–0.05% arsenic; 0–0.1% boron; 0–1.7% bismuth; 0–0.5% cadmium; 0–1% carbon; 0–1% chromium; 0–5% copper; 0–1% iron; 0–10% lead; 0–1% magnesium; 0–0.1% manganese; 0–0.1% molybdenum; 0–5% nickel; 0–0.5% silicon; 0–0.1% silver; 0–0.05% tellurium; 0–0.5% titanium; 0–0.1% vanadium; and 0–9% zinc. Still another and/or alterative formulation of the corrosion resistant tin alloy includes 75–99.999% tin; 0–7.5% aluminum; 0–2% antimony; 0–0.05% arsenic; 0–0.1% boron; 0–1.7% bismuth; 0–0.5% cadmium; 0–1% carbon; 0–1% chromium; 0–5% copper; 0–1% iron; 0–10% lead; 0–1% magnesium; 0–0.1% manganese; 0–0.1% molybdenum; 0–5% nickel; 0–0.5% silicon; 0–0.1% silver; 0–0.05% tellurium; 0–0.5% titanium; 0–0.1% vanadium; and 0–10% zinc. Yet another and/or alterative formulation of the corrosion resistant tin alloy includes 75–99.999% tin; 0–7.5% aluminum; 0.001–5% antimony, bismuth, cadmium and/or copper; 0–2% lead; 0–1% nickel; and 0–10% zinc. Still yet another and/or alterative formulation of the corrosion resistant tin alloy includes 95–99.999% tin; 0–2% aluminum; 0.001–2% antimony, bismuth, cadmium and/or copper; 0–1% lead; 0–1% nickel; and 0–2% zinc. Still another and/or alterative formulation of the corrosion resistant tin alloy includes 98–99% tin; 0–0.1% aluminum; 0–1% antimony and/or bismuth; 0–0.001% arsenic; 0–0.001% boron; 0–0.001% cadmium; 0–0.01% carbon; 0–0.01% chromium; 0–0.1% copper; 0–0.05% iron; 0–0.05% lead; 0–0.001% magnesium; 0–0.001% manganese; 0–0.001% molybdenum; 0–0.9% nickel; 0–0.001% silicon; 0–0.001% silver; 0–0.001% sulfur; 0–0.001% tellurium; 0–0.05% titanium; 0–0.001% vanadium; and 0–1% zinc.

A general formulation of the corrosion resistant tin and zinc alloy by weight percent includes the following:

| | |
|---|---|
| Tin | 15–90 |
| Zinc | 10–85 |
| Antimony | 0–7.5 |
| Bismuth | 0–5 |
| Copper | 0–5 |

One more specific formulation of the corrosion resistant tin and zinc alloy by weight percent includes the following:

| | |
|---|---|
| Tin | 15–90 |
| Zinc | 10–85 |
| Aluminum | 0–5 |
| Antimony | 0–7.5 |
| Bismuth | 0–5 |
| Cadmium | 0–1 |
| Copper | 0–5 |
| Nickel | 0–5 |

Another and/or alterative specific formulation of the corrosion resistant tin and zinc alloy by weight percent includes the following:

| | |
|---|---|
| Tin | 20–80 |
| Zinc | 20–80 |
| Aluminum | 0–2 |
| Antimony | 0–1 |
| Arsenic | 0–0.05 |
| Bismuth | 0–1 |
| Boron | 0–0.1 |
| Cadmium | 0–0.1 |
| Carbon | 0–0.5 |
| Chromium | 0–0.5 |
| Copper | 0–2 |
| Iron | 0–1 |
| Lead | 0–1 |
| Magnesium | 0–1 |
| Manganese | 0–0.1 |
| Molybdenum | 0–0.1 |
| Nickel | 0–1 |
| Silicon | 0–0.5 |
| Silver | 0–0.1 |
| Tellurium | 0–0.05 |
| Titanium | 0–0.5 |
| Vanadium | 0–0.1 |

Still another and/or alterative specific formulation of the corrosion resistant tin and zinc alloy by weight percent includes the following:

| | |
|---|---|
| Tin | 30–85 |
| Zinc | 15–70 |
| Aluminum | 0–1 |
| Antimony | 0–1 |
| Arsenic | 0–0.01 |
| Bismuth | 0–1 |
| Boron | 0–0.1 |
| Cadmium | 0–0.1 |
| Carbon | 0–0.5 |
| Chromium | 0–0.1 |
| Copper | 0–1 |
| Iron | 0–0.1 |
| Lead | 0–0.1 |
| Magnesium | 0–1 |
| Manganese | 0–0.01 |
| Molybdenum | 0–0.1 |
| Nickel | 0–0.1 |
| Silicon | 0–0.5 |
| Silver | 0–0.01 |
| Tellurium | 0–0.05 |
| Titanium | 0–0.05 |
| Vanadium | 0–0.1 |

Yet another and/or alterative specific formulation of the corrosion-resistant tin and zinc alloy by weight percent includes the following:

| | |
|---|---|
| Tin | 70–90 |
| Zinc | 9–30 |
| Aluminum | 0.001–0.01 |
| Antimony | 0.001–0.8 |

-continued

| | |
|---|---|
| Copper | 0.001–0.02 |
| Bismuth | 0.001–0.005 |
| Boron | 0–0.05 |
| Silver | 0–0.005 |
| Carbon | 0–0.05 |
| Chromium | 0–0.05 |
| Iron | 0–0.005 |
| Magnesium | 0–0.05 |
| Manganese | 0–0.01 |
| Molybdenum | 0–0.05 |
| Silicon | 0–0.05 |
| Tellurium | 0–0.01 |
| Titanium | 0–0.05 |
| Vanadium | 0–0.05 |
| Arsernc | 0–0.005 |
| Cadmium | 0–0.01 |
| Nickel | 0–0.005 |
| Lead | 0.01–0.1 |

Still yet another and/or alterative specific formulation of the corrosion-resistant tin and zinc alloy by weight percent includes the following:

| | |
|---|---|
| Tin | 79.5–81.5 |
| Zinc | 18.5–20.5 |
| Aluminum | 0.002–0.008 |
| Antimony | 0.6–0.7 |
| Arsenic | 0–0.001 |
| Bismuth | 0.002–0.005 |
| Cadmium | 0–0.001 |
| Copper | 0.005–0.02 |
| Iron | 0–0.001 |
| Lead | 0.02–0.08 |
| Nickel | 0–0.001 |
| Silver | 0–0.001 |

Examples of the tin and zinc alloy composition by weight percent include:

| Ingredients | A | B | C | D | E | F | G | H |
|---|---|---|---|---|---|---|---|---|
| Zinc | 10 | 15 | 20 | 25 | 30 | 35 | 40 | 45 |
| Tin | 90 | 85 | 80 | 75 | 70 | 65 | 60 | 55 |
| Aluminum | ≤0.5 | ≤0.5 | ≤0.5 | ≤0.5 | ≤0.5 | ≤0.5 | ≤0.5 | ≤0.5 |
| Antimony | ≤0.5 | ≤0.5 | ≤0.5 | ≤0.5 | ≤0.5 | ≤0.5 | ≤0.5 | ≤0.5 |
| Bismuth | ≤0.5 | ≤0.5 | ≤0.5 | ≤0.5 | ≤0.5 | ≤0.5 | ≤0.5 | ≤0.5 |
| Copper | ≤0.5 | ≤0.5 | ≤0.5 | ≤0.5 | ≤0.5 | ≤0.5 | ≤0.5 | ≤0.5 |
| Lead | ≤0.1 | ≤0.1 | ≤0.1 | ≤0.1 | ≤0.1 | ≤0.1 | ≤0.1 | ≤0.1 |
| Ingredients | I | J | K | L | M | N | O | P |
| Zinc | 50 | 55 | 60 | 65 | 70 | 75 | 80 | 85 |
| Tin | 50 | 45 | 40 | 35 | 30 | 25 | 20 | 15 |
| Aluminum | ≤0.5 | ≤0.5 | ≤0.5 | ≤0.5 | ≤0.5 | ≤0.5 | ≤0.5 | ≤0.5 |
| Antimony | ≤0.5 | ≤0.5 | ≤0.5 | ≤0.5 | ≤0.5 | ≤0.5 | ≤0.5 | ≤0.5 |
| Bismuth | ≤0.5 | ≤0.5 | ≤0.5 | ≤0.5 | ≤0.5 | ≤0.5 | ≤0.5 | ≤0.5 |
| Copper | ≤0.5 | ≤0.5 | ≤0.5 | ≤0.5 | ≤0.5 | ≤0.5 | ≤0.5 | ≤0.5 |
| Lead | ≤0.1 | ≤0.1 | ≤0.1 | ≤0.1 | ≤0.1 | ≤0.1 | ≤0.1 | ≤0.1 |

One formulation of the corrosion resistant tin and zinc alloy includes by weight percent 20–80% tin; 20–80% zinc; 0–1% aluminum; 0–2% antimony; 0–0.02% arsenic; 0–1.5% bismuth; 0–0.1% boron; 0–0.1% cadmium; 0–0.5% carbon; 0–0.5% chromium; 0–2% copper; 0–1% iron; 0–1% lead; 0–0.4% magnesium; 0–0.1% manganese; 0–0.1% molybdenum; 0–1% nickel; 0–0.5% silicon; 0–0.5% silver; 0–0.02% sulfur; 0–0.04% tellurium; 0–0.15% titanium; and 0–0.05% vanadium. Another and/or alternative formulation of the corrosion resistant tin and zinc alloy includes 30–70% tin; 30–70% zinc; 0–0.4% aluminum; 0–0.8% antimony; 0–0.005% arsenic; 0–0.5% bismuth; 0–0.05% boron; 0–0.05% cadmium; 0–0.1% carbon; 0–0.1% chromium; 0–1% copper; 0–0.6% iron; 0–0.1% magnesium; 0–0.1% manganese; 0–0.05% molybdenum; 0–0.9% nickel; 0–0.01% silicon; 0–0.01% silver; 0–0.01% sulfur; 0–0.01% tellurium; 0–0.1% titanium; and 0–0.01% vanadium; a the tin plus zinc content is at least 90 weight percent of the alloy. Still another and/or alternative formulation of the corrosion resistant tin and zinc alloy includes 40–60% tin; 40–60% zinc; 0–0.4% aluminum; 0–1% antimony and/or bismuth; 0–0.001% arsenic; 0–0.01% boron; 0–0.005% cadmium; 0–0.05% carbon; 0–0.05% chromium; 0–0.1% copper; 0–0.05% iron; 0–0.1% lead; 0–0.01magnesium; 0–0.01% manganese; 0–0.01% molybdenum; 0–0.9% nickel; 0–0.001% silicon; 0–0.001% silver; 0–0.001% sulfur; 0–0.001% tellurium; 0–0.05% titanium; and 0–0.001% vanadium; and the tin plus zinc content is at least 95 weight percent of the alloy. Yet another and/or alternative formulation of the corrosion resistant tin and zinc alloy includes 45–55% zinc; 45–55% tin; 0–0.4% aluminum; 0–0.8% antimony and/or bismuth; 0–0.001% arsenic; 0–0.001% boron; 0–0.001% cadmium; 0–0.01% carbon; 0–0.05% copper; 0–0.001 iron; 0–0.08% lead; 0–0.001% magnesium; 0–0.001% manganese; 0–0.001% molybdenum; 0–0.9% nickel; 0–0.001% silicon; 0–0.005% silver; 0–0.001% sulfur; 0–0.001% tellurium; 0–0.05% titanium and 0–0.001%vanadium; and the tin content plus the zinc content is at least 99% of the alloy. Still yet another and/or alternative formulation of the corrosion resistant tin and zinc alloy includes 30–85% tin; 15–70% zinc; 0–0.5% aluminum; 0–2% antimony; 0–0.01% arsenic; 0–1.5% bismuth; 0–0.05% boron; 0–0.1% cadmium; 0–0.1% carbon; 0–0.1% chromium; 0–2% copper; 0–1% iron; 0–0.5% lead; 0–0.4% magnesium; 0–0.1% manganese; 0–0.05% molybdenum; 0–1% nickel; 0–0.5% silicon; 0–0.05% silver; 0–0.01% sulfur; 0–0.01% tellurium; 0–0.15% titanium; and 0–0.05% vanadium. A further and/or alternative formulation of the corrosion resistant tin and zinc alloy includes 30–65% tin; 35–70% zinc; 0–0.1% aluminum; 0–1% antimony and/or bismuth; 0–0.05% arsenic; 0–0.01% cadmium; 0–0.5% copper; less than 0.05% iron; less than 0.1% lead; 0–0.1% magnesium; 0–0.1% manganese; 0–0.5% nickel; 0–0.05% silver; 0–0.05% titanium; and the tin plus zinc content is at least 98% of the metal alloy. Still a further and/or alternative formulation of the corrosion resistant tin and zinc alloy includes 40–60% tin; 40–60% zinc; 0–0.4% aluminum; 0–0.8% antimony and/or bismuth; 0–0.005% arsenic; 0–0.005% cadmium; 0–0.2% copper; 0–0.05% iron; 0–0.1% lead; 0–0.001% magnesium; 0–0.001% manganese; 0–0.05% nickel; 0–0.005% silver; 0–0.05% titanium; and the tin plus zinc content is at least 99% of the metal alloy. Yet a further and/or alternative formulation of the corrosion resistant tin and zinc alloy includes 60–90% tin 9 to 10–40% zinc; 0–0.5% aluminum; 0–2% antimony; 0–0.01% arsenic; 0–15% bismuth; 0–0.05% boron; 0–0.1% cadmium; 0–0.5% carbon; 0–0.5% chromium; 0–2% copper; up to 1% iron; less than 0.5% lead; 0–0.4% magnesium; 0–0.1% manganese; 0–0.1% molybdenum; 0–1% nickel; 0–0.5% silicon; 0–0.01% silver; 0–0.01% sulfur; 0–0.01% tellurium; 0–0.15% titanium; and 0–0.1% vanadium. Still yet a further and/or alternative formulation of the corrosion resistant tin and zinc alloy includes 70–90% tin; 9 to 10–30% zinc; 0–0.1% aluminum; 0–1% antimony and/or bismuth; 0–0.05% arsenic; 0–0.01% cadmium; 0–0.5% copper; less than 0.05% iron; less than 0.1% lead; 0–0.1% magnesium; 0–0.1% manganese; 0–0.5% nickel; 0–0.05% silver;

0–0.05% titanium; and the tin plus zinc content is at least 95% of the metal ahoy. Yet a further and/or alternative formulation of the corrosion resistant tin and zinc alloy includes 75–85% tin; 15–25% zinc; 0.001–0.01% aluminum; 0.001–0.8% antimony and/or bismuth; 0–0.005% arsenic; 0–0.001% cadmium; 0.005–0.02% copper; 0–0.001 iron; 0.01–0.08% lead; 0–0.001% magnesium; 0–0.001% manganese; 0–0.001% nickel; 0–0.01 silver; 0–0.001% titanium; and the tin plus zinc content is at least 98% of the metal alloy coating. Another and/or alternative formulation of the corrosion resistant tin and zinc alloy includes 15–35% tin; 65–85% zinc; 0–7.5% antimony; 0–1.7% bismuth. Yet another and/or alternative formulation of the corrosion resistant tin and zinc alloy includes 15–35% tin; 65–85% zinc; and 0.01–0.5% antimony and/or bismuth. Still another and/or alternative formulation of the corrosion resistant tin and zinc alloy includes 15–35% tin; 65–85% zinc; 0.01–0.5% antimony and/or bismuth; and less than 2% copper and/or iron. Still yet another and/or alternative formulation of the corrosion resistant tin and zinc alloy includes 15–35% tin; 65–85% zinc; 0–0.5% antimony; 0–0.5% bismuth; and less than 0.01% lead. A further and/or alternative formulation of the corrosion resistant tin and zinc alloy includes 15–35% tin; 65–85% zinc; 0–0.5% antimony; 0–0.5% bismuth; less than 2% copper and/or iron; and less than 0.01% lead. Yet a further and/or alternative formulation of the corrosion resistant tin and zinc alloy includes 15–35% tin; 65–85% zinc; 0–7.5% antimony; 0–1.7% bismuth; 0–2% copper; 0–0.1% iron; and 0–0.05% lead. Another and/or alternative formulation of the corrosion resistant tin and zinc alloy includes 70–90% tin; 9 to 10–30% zinc; 0–7.5% antimony; 0–1.7% bismuth; 0–2% copper; 0–0.1% iron; and 0–0.05% lead. Still another and/or alternative formulation of the corrosion resistant tin and zinc alloy includes 80–90% tin; 9 to 10–20% zinc; 0–7.5% antimony; 0–1.7% bismuth; 0–2% copper; 0–0.1% iron; and 0–0.05% lead. Yet another and/or alternative formulation of the corrosion resistant tin and zinc alloy includes 70–90% tin; 9 to 10–30% zinc; 0–2.5% antimony; 0–0.5% bismuth; 0–2% copper; 0–0.1% iron; and 0–0.05% lead. Still yet another and/or alternative formulation of the corrosion resistant tin and zinc alloy includes 70–90% tin; 9 to 10–30% zinc; 0.5–7.5% antimony; 0.5–1.7% bismuth; 0–2% copper; 0–0.1% iron; and 0–0.05lead. A further and/or alternative formulation of the corrosion resistant tin and zinc alloy includes 80–90% tin; 9 to 10–20% zinc; 0–7.5% antimony; 0–1.7% bismuth; 0–2% copper; 0–0.1% iron; and 0–0.01% lead. A further and/or alternative formulation of the corrosion resistant tin and zinc alloy includes 15–70% tin; 30–85% zinc; 0–7.5% antimony; 0–1.7% bismuth; 0–5% copper; 0–0.01% iron; 0–0.05% lead; and 0–5% nickel. Yet a further and/or alternative formulation of the corrosion resistant tin and zinc alloy includes 15–70% tin; 30–85% zinc; 0–0.5% antimony; 0–0.5% bismuth; 0–2% copper; 0–0.1% iron; 0–0.01% lead; and 0–1% nickel. Still a further and/or alternative formulation of the corrosion resistant tin and zinc alloy includes 35–70% tin; 30–65% zinc; 0–0.5% antimony; 0–0.5% bismuth; 0–2% copper; 0–0.1% iron; 0–0.05% lead; and 0–1% nickel. Still yet a further and/or alternative formulation of the corrosion resistant tin and zinc ahoy includes 45–55% tin; 45–55% zinc; 0–0.5% antimony and/or bismuth; 1–1.5% copper; 0–0.1% iron; 0–0.01% lead; 0.3–0.9% nickel; and the tin content plus zinc content at least 95% of the metal alloy. Another and/or alternative formulation of the corrosion resistant tin and zinc alloy includes 20–90% tin; 9 to 10–80% zinc; 0–0.5% aluminum; 0–1% antimony; 0–2.7% copper; and 0–0.15% titanium. Still another and/or alternative formulation of the corrosion resistant tin and zinc alloy includes 20–90% tin; 9 to 10–80% zinc; 0–0.3% aluminum; 0–5.5% antimony; and 0–1% copper. Yet another and/or alternative formulation of the corrosion resistant tin and zinc alloy includes 20–90% tin 9 to 10–80% zinc; 0–5% aluminum; 0–5.5% antimony; 0–1.7% bismuth; 0–5% copper; 0–0.1% iron; 0–0.05% lead; 0–5% magnesium; 0–5% nickel; and 0–1% titanium. Still another and/or alternative formulation of the corrosion resistant tin and zinc alloy includes 20–75% tin; 25–80% zinc; 0–1% aluminum; 0–5.5% antimony; 0–1.7% bismuth; 0–2.7% copper; 0–0.1% iron; 0–0.05% lead; 0–1% magnesium; 0–1% nickel; and 0–0.5% titanium. Still yet another and/or alternative formulation of the corrosion resistant tin and zinc alloy includes 20–80% tin; 20–80% zinc; 0–0.5% aluminum; 0–5.5% antimony; 0–1.5% bismuth; 0–2.7% copper; 0–0.1% iron; 0–0.01% lead; 0–0.4% magnesium; 0–1% nickel; and 0–0.15% titanium. A further and/or alternative formulation of the corrosion resistant tin and zinc alloy includes 35–70% tin; 30–65% zinc; 0–0.3% aluminum; 0.05–1% antimony and/or bismuth; 0–1% copper; 0–0.1% iron; 0–0.01% lead; 0–0.4% magnesium; 0–0.7% nickel; 0–0.15% titanium; and the tin plus zinc content is at least 90% of the metal alloy. Yet a further and/or alternative formulation of the corrosion resistant tin and zinc alloy includes 15–90% tin; 9 to 10–85% zinc; 0–5% aluminum; 0–7.5% antimony; 0–1.7% bismuth; 0–5% copper; 0–1% iron; 0–1% lead; 0–5% magnesium; 0–5% nickel; and 0–1% titanium. Still yet a further and/or alternative formulation of the corrosion resistant tin and zinc alloy includes 9 to 10–70% tin; 30–90% zinc; 0–0.25% aluminum; 0–0.02% chromium; 0–1.5% copper; 0–0.01% iron; 0–0.01% lead; 0–0.01% magnesium; and 0–0.18% titanium. Another and/or alternative formulation of the corrosion resistant tin and zinc alloy includes 9 to 10–70% tin; 30–90% zinc; 0–0.25% aluminum; 0–0.02% chromium; 0–1.5% copper; 0–0.01% iron; 0–0.01% lead; 0–0.01% magnesium; and 0–0.18% titanium. Still another and/or alternative formulation of the corrosion resistant tin and zinc alloy includes 15–90% tin; 9 to 10–0–85% zinc; 0–0.01% aluminum; 0–1% antimony, 0–0.005% arsenic; 0–0.01% bismuth; 0–0.05% cadmium; 0–0.05% copper; 0–0.005% iron; 0–0.1% lead; 0–0.005% nickel; and 0–0.005% silver. Yet another and/or alternative formulation of the corrosion resistant tin and zinc alloy includes 70–90% tin; 9 to 10–30% zinc; 0–0.01% aluminum; 0.001–0.8% antimony; 0–0.005% arsenic; 0.001-O.005%bismuth; 0–0.01% cadmium; 0–0.02% copper; 0–0.005% iron; 0–0.1% lead; 0–0.005% nickel; and 0–0.005% silver. Still yet another and/or alternative formulation of the corrosion resistant tin and zinc ahoy includes 79.5–81.5% tin; 18.5–20.5% zinc; 0.002–0.008% aluminum; 0.6–0.7% antimony; 0–0.001% arsenic; 0.002–0.005% bismuth; 0–0.001% cadmium; 0.005–0.02% copper; 0–0.001% iron; 0.02–0.08% lead; 0–0.001% nickel; and 0–0.001% silver. A further and/or alternative formulation of the corrosion resistant tin and zinc alloy includes 70–90% tin; 9 to 10–30% zinc; 0–0.01% aluminum; 0–1% antimony; 0–0.005% arsenic; 0–0.01% bismuth; 0–0.01% cadmium; 0–0.5% copper; 0–0.005% iron 0–0.1% lead; 0–0.005% nickel; and 0–0.005% silver. Yet further and/or alternative formulation of the corrosion resistant tin and zinc alloy includes 60–90% tin; 9 to 10–40% zinc; 0–0.5% aluminum; 0–2% antimony; 0–0.01% arsenic; 0–1.5% bismuth; 0–0.05% boron; 0–0.1% cadmium; 0–0.05% carbon; 0.0–0.5% chromium; 0–2% copper; up to 1% iron; less than 0.5% lead; 0–0.4% magnesium; 0–0.1% manganese; 0–0.1% molybdenum; 0–1% nickel; 0–0.5% silicon;

0–0.01% silver; 0–0.01% sulfur; 0–0.01% tellurium; 0–0.15% titanium; and 0–0.1% vanadium. Still a further and/or alternative formulation of the corrosion resistant tin and zinc alloy includes 70–90% tin; 9 to 10–30% zinc; 0–0.1% aluminum; 0–1% antimony and/or bismuth; 0–0.05% arsenic; 0–0.01% cadmium; 0–0.5% copper; less than 0.05% iron; less than 0.1% lead; 0–0.1% magnesium; 0–0.1% manganese; 0–0.5% nickel; 0–0.5% silicon; 0–0.05% silver; 0–0.05% titanium; and the tin plus zinc content is at least 95% of the metal alloy. Still yet a further and/or alternative formulation of the corrosion resistant tin and zinc alloy includes 75–85% tin; 15–25% zinc; 0.001–0.01% aluminum; 0.001–0.8% antimony and/or bismuth; 0–0.005% arsenic; 0–0.001% cadmium; 0.005–0.02% copper; 0–0.0015% iron; 0.01–0.08% lead; 0–0.001% magnesium; 0–0.001% manganese; 0–0.001% nickel; 0–0.5% silicon; 0–0.01% silver; 0–0.001% titanium; and the tin plus zinc content is at least 98% of the metal alloy. Another and/or alternative formulation of the corrosion resistant tin and zinc alloy includes 15–90% tin; 9 to 10–0–85% zinc; 0–2% aluminum; 0–2% antimony; 0–1.7% bismuth; 0–2% copper; 0–0.05% lead; 0–2% magnesium; 0–2% nickel; and 0–1% titanium. Still another and/or alternative formulation of the corrosion resistant tin and zinc alloy includes 15–90% tin; 9to 10–0–85% zinc; 0–1% aluminum; 0–2% antimony; 0–1.7% bismuth; 0–2% copper; 0–1% iron; 0–0.5% lead; 0–1magnesium; 0–1% nickel; and 0–0.5% titanium. Yet another and/or alternative formulation of the corrosion resistant tin and zinc alloy includes 20–90% tin; 9 to 10–80% zinc; 0–0.51% aluminum; 0–2% antimony; 0–1.5% bismuth; 0–0.01% boron; 0–0.1% cadmium; 0–0.5% carbon; 0–0.5% chromium; 0–2% copper; 0–1% iron; 0–0.5% lead; 0–0.4% magnesium; 0–0.1% manganese; 0–0.1% molybdenum; 0–1% nickel; 0–0.5% silicon; and 0–0.15% titanium; and 0–0.1% vanadium. Still another and/or alternative formulation of the corrosion resistant tin and zinc alloy includes 20–65% tin; 30–80% zinc; 0–0.3% aluminum; 0–1% antimony and/or bismuth; 0–1% copper; 0–0.6% iron; 0–0.5% lead; 0–0.4% magnesium; 0–0.1% manganese; 0–0.7% nickel; 0–0.15% titanium; and the tin plus zinc content is at least 95% of the metal alloy. Still yet another and/or alternative formulation of the corrosion resistant tin and zinc alloy includes 20–50% tin; 50–80% zinc; 0–0.3% aluminum; 0.005–0.5% antimony and/or bismuth; 0–0.05% cadmium; 0–0.2% copper; 0–0.6% iron; 0–0.4% lead; 0–0.1% magnesium; 0–0.05% manganese; 0–0.1% nickel; 0–0.1% silicon; 0–0.15% titanium; and the tin plus zinc content is at least 95% of the metal alloy. A further and/or alternative formulation of the corrosion resistant tin and zinc alloy includes 20–70% tin; 30–75% zinc; 0.0005–2% aluminum; 0.001–2% antimony; 0.0001–1% bismuth; 0–2% copper; 0–0.5% lead; and 0.0001–0.1% titanium. Yet a further and/or alternative formulation of the corrosion resistant tin and zinc alloy includes 40–60% tin; 40–60% zinc; 0.0005–0.75% aluminum; 0.001–1% antimony; 0–0.01% arsenic; 0.0001–0.2% bismuth; 0–0.01% cadmium; 0.001–1% copper; 0–0.01% chromium; 0–0.1% iron; 0–0.1% lead; 0–0.01% manganese; 0–0.2% nickel; 0–0.01% silver; and 0.0005–0.05% titanium. Still yet a further and/or alternative formulation of the corrosion resistant tin and zinc alloy includes 25–70% tin; 30–75% zinc; 0–0.5% aluminum; 0–0.5% copper; 0–0.1% lead; and 0–0.05% titanium. Another and/or alternative formulation of the corrosion resistant tin and zinc alloy includes 30–70% tin; 30–70% zinc; 0.0001–0.5% aluminum; 0.001–2% antimony; 0–0.01% arsenic; 0.0001–1% bismuth; 0–0.01% boron; 0–0.01% cadmium; 0–0.05% carbon; 0–0.05% chromium;

0–2% copper; 0–0.1% iron; 0–0.05% lead; 0–0.01% magnesium; 0–0.01% manganese; 0–0.01% molybdenum; 0–1% nickel; 0–0.01% silicon; 0–0.01% silver; 0–0.01% sulfur; 0–0.01% tellurium; 0.0001–0.1% titanium; and 0–0.01% vanadium. Still another and/or alternative formulation of the corrosion resistant tin and zinc alloy includes 40–60% tin; 40–60% zinc; 0.0005–0.4% aluminum; 0.01–0.8% antimony; 0–0.005% arsenic; 0.001–0.05% bismuth; 0–0.005% cadmium; 0.005–0.5% copper; 0–0.05% iron; 0–0.1% lead; 0–0.05% nickel; 0–0.005% silver; and 0.0005–0.05% titanium. Yet another and/or alternative formulation of the corrosion resistant tin and zinc alloy includes 48–52% tin; 48–52% zinc; 0.005–0.24% aluminum; 0.05–0.64% antimony; 0–0.001% arsenic; 0.002–0.005% bismuth; 0–0.001% cadmium; 0.01–0.3% copper; 0–0.016% iron; 0–0.08% lead; 0–0.001% nickel; 0–0.001 silver; and 0.001–0.02titanium. Yet another and/or alternative formulation of the corrosion resistant tin and zinc alloy includes 15–90% tin; 9 to 10–85% zinc; 0–5% aluminum; 0–5% antimony; 0–5% bismuth; 0–1% cadmium; 0–5% copper; 0–1% iron; 0–1% lead; and 0–1% nickel. Still another and/or alternative formulation of the corrosion resistant tin and zinc alloy includes 30–85% tin; 15–70% zinc; 0–1% antimony; 0–0.1% arsenic; 0–1% bismuth; 0–0.1% cadmium; 0–1% copper; 0–0.1% iron; 0–0.1% lead; 0–0.1% manganese; 0–0.1% nickel; 0–0.1% silver; and 0–0.05% titanium. Still yet another and/or alternative formulation of the corrosion resistant tin and zinc alloy includes 30–80% tin; 20–70% zinc; 0–0.5% aluminum; 0–0.5% antimony; 0–0.5% bismuth; 0–0.5% copper; and 0–0.1% lead. A further and/or alternative formulation of the corrosion resistant tin and zinc alloy includes 30–85% tin; 15–70% zinc; 0–0.5% aluminum; 0–2 antimony; 0–0.01% arsenic; 0–1.5% bismuth; 0–0.05% boron; 0–0.1% cadmium; 0–0.1% carbon; 0–0.1% chromium; 0–2% copper; 0–1% iron; 0–0.5% lead; 0–0.4% magnesium; 0–0.1% manganese; 0–0.05% molybdenum; 0–1% nickel; 0–0.5% silicon; 0–0.05% silver; 0–0.01% tellurium; 0–0.15% titanium; and 0–0.05% vanadium. Yet a further and/or alternative formulation of the corrosion resistant tin and zinc alloy includes 30–65% tin; 35–70% zinc; 0–0.1% aluminum; 0–1% antimony and/or bismuth; 0–0.05% arsenic; 0–0.01% cadmium; 0–0.5% copper; 0–0.05% iron; 0–0.1% lead; 0–0.1% magnesium; 0–0.1% manganese; 0–0.5% nickel; 0–0.05% silver; 0–0.05% titanium; and the tin plus zinc content is at least 98% of the metal alloy. Still yet a further and/or alternative formulation of the corrosion resistant tin and zinc alloy includes 40–60% tin; 40–60% zinc; 0–0.4% aluminum; 0–0.8% antimony and/or bismuth; 0–0.005% arsenic; 0–0.005% cadmium; 0–0.2% copper; 0–0.001% iron; 0.01–0.08% lead; 0–0.001% magnesium, 0–0.001% manganese; 0–0.05% nickel; 0–0.005% silver; 0–0.05% titanium; and the tin plus zinc content is at least 99% of the metal alloy. Another and/or alternative formulation of the corrosion resistant tin and zinc ahoy includes 15–90% tin; 9 to 10–85% zinc; 0–5% aluminum; 0–7.5% antimony; 0–5% bismuth; 0–1% cadmium; 0–5% copper; 0–5% nickel; and 0–0.5% titanium. Still another and/or alternative formulation of the corrosion resistant tin and zinc alloy includes 20–80% tin; 20–80% zinc; 0–2% aluminum; 0–1% antimony; 0–0.05% arsenic; 0–1% bismuth; 0–0.1% boron; 0–0.1% cadmium; 0–0.5% carbon; 0–0.5% chromium; 0–2% copper; 0–1% iron; 0–1% lead; 0–1% magnesium; 0–0.1% manganese; 0–0.1% molybdenum; 0–1% nickel; 0–0.5% silicon; 0–0.1% silver; 0–0.05% tellurium; 0–0.5% titanium; and 0–0.1% vanadium. Yet another and/or alternative formulation of the corrosion resistant tin and zinc alloy includes 20–80% tin;

20–80% zinc; 0–1% aluminum; 0–2% antimony; 0–0.02% arsenic; 0–1.5% bismuth; 0–0.5% boron; 0–0.1% cadmium; 0–0.5% carbon; 0–0.5% chromium; 0–2% copper; 0–1% iron; 0–1% lead; 0–0.4% magnesium; 0–0.01% manganese; 0–0.1% molybdenum; 0–1% nickel; 0–0.05% silicon; 0–0.05% silver; 0–0.02% sulfur; 0–0.04% tellurium; 0–0.15% titanium; and 0–0.05% vanadium. Still yet another and/or alternative formulation of the corrosion resistant tin and zinc alloy includes 30–70% tin; 30–70% zinc; 0–0.4% aluminum; 0–0.8% antimony; 0–0.005% arsenic; 0–0.5% bismuth; 0–0.1% boron; 0–0.05% cadmium; 0–0.1% carbon; 0–0.1% chromium; 0–1% copper; 0–0.6% iron; 0–0.5% lead; 0–0.1% magnesium; 0–0.1% manganese; 0–0.05% molybdenum; 0–0.7% nickel; 0–0.01% silicon; 0–0.01% silver; 0–0.01% sulfur; 0–0.01% tellurium; 0–0.1% titanium; 0–0.01% vanadium; and the tin plus zinc content is at least 90 weight percent of the metal alloy. Another and/or alternative further formulation of the corrosion resistant tin and zinc alloy includes 40–60% tin; 40–60% zinc; 0–0.4% aluminum; 0–1% antimony and/or bismuth; 0–0.001% arsenic; 0–0.01% boron; 0–0.005% cadmium; 0–0.05% carbon; 0–0.05% chromium; 0–0.1% copper; 0–0.05% iron; 0–0.1% lead; 0–0.01% magnesium; 0–0.01% manganese; 0–0.01% molybdenum; 0–0.3% nickel; 0–0.001% silicon; 0–0.001% silver; 0–0.01% sulfur; 0–0.001% tellurium; 0–0.05% titanium; 0–0.001% vanadium; and the tin plus zinc content is at least 95 weight percent of the metal alloy. Yet a further and/or alternative formulation of the corrosion resistant tin and zinc alloy includes 45–55% zinc; 45–55% tin; 0–0.4% aluminum; 0–0.8antimony and/or bismuth; 0–0.001% arsenic; 0–0.001% boron; 0–0.001% cadmium; 0–0.01% carbon; 0–0.05% copper; 0–0.001 iron; 0–0.08% lead; 0–0.001% magnesium; 0–0.001% manganese;0–0.001% molybdenum; 0–0.1% nickel; 0–0.001% silicon; 0–0.005% silver; 0–0.001% sulfur; 0–0.001% tellurium; 0–0.05% titanium; 0–0.001% vanadium; and the tin content plus the zinc content is at least 99% of the metal alloy. Another and/or alternative formulation of the corrosion resistant tin and zinc alloy includes 20–80% tin; 20–80% zinc; 0–1% aluminum; 0–2% antimony; 0–0.02% arsenic; 0–1.5% bismuth; 0–0.05% boron; 0–0.1% cadmium; 0–0.5% carbon; 0–0.5% chromium; 0–2% copper; 0–0.1% iron; 0–1% lead; 0–0.4% magnesium; 0–0.1% manganese; 0–0.1% molybdenum; 0–1% nickel; 0–0.5% silicon; 0–0.05% silver; 0–0.02% sulfur; 0–0.04% tellurium; 0–0.15% titanium; and 0–0.05% vanadium. Yet another and/or alternative formulation of the corrosion resistant tin and zinc alloy includes 30–70% tin; 30–70% zinc; 0–0.4% aluminum; 0–0.8% antimony; 0–0.005% arsenic; 0–0.05% bismuth; 0–0.1% boron; 0–0.05% cadmium; 0–0.1% carbon; 0–0.1%chromium; 0–1% copper; 0–0.6% iron; 0–0.5% lead; 0–0.1% magnesium; 0–0.1% manganese; 0–0.05% molybdenum; 0–0.9% nickel; 0–0.01% silicon; 0–0.01% silver; 0–0.01% sulfur; 0–0.01% tellurium; 0–0.1% titanium; 0–0.001% vanadium; and the tin plus zinc content is at least 90 weight percent of the metal alloy. Still another and/or alternative formulation of the corrosion resistant tin and zinc alloy includes 40–60% tin; 40–60% zinc; 0–0.4% aluminum; 0–1% antimony and/or bismuth; 0–0.001% arsenic; 0–0.01% boron; 0–0.005% cadmium; 0–0.05% carbon; 0–0.05% chromium; 0–0.1% copper; 0–0.05% iron; 0–0.01% lead; 0–0.01% magnesium; 0–0.01% manganese; 0–0.01% molybdenum; 0–0.9% nickel; 0–0.001% silicon; 0–0.001% silver; 0–0.001% sulfur; 0–0.001% tellurium; 0–0.05% titanium; 0–0.001% vanadium; and the tin plus zinc content is at least 95 weight percent of the metal alloy. Still yet another and/or alternative formulation of the corrosion resistant tin and zinc alloy includes 45–55% zinc; 45–55% tin; 0–0.4% aluminum; 0–0.8% antimony and/or bismuth; 0–0.001% arsenic; 0–0.001% boron; 0–0.001% cadmium; 0–0.01% carbon; 0–0.05% copper; 0–0.001% iron; 0–0.08% lead; 0–0.001% magnesium; 0–0.001% manganese; 0–0.001% molybdenum; 0–0.9% nickel; 0–0.001% silicon; 0–0.005% silver; 0–0.001% sulfur; 0–0.001% tellurium; 0–0.05% titanium; 0–0.001% vanadium; and the tin content plus the zinc content is at least 99% of the metal alloy. A further and/or alternative formulation of the corrosion resistant tin and zinc alloy includes 15–90% tin; 9 to 10–85% zinc; 0–0.5% aluminum; 0–5.5% antimony; 0–1.7% bismuth; 0–2.7% copper; 0–0.4% magnesium; 0–1% nickel; 0–0.15% titanium. Yet a further and/or alternative formulation of the corrosion resistant tin and zinc alloy includes 15–90% tin; 9 to 10–85% zinc; 0–0.3% aluminum; 0–1% antimony; 0–1.7% bismuth; 0–1% copper; 0–0.4% magnesium; 0–1% nickel; 0–0.15% titanium. Still a further and/or alternative formulation of the corrosion resistant tin and zinc alloy includes 15–80% tin; 20–85% zinc; 0–0.3% aluminum; 0–1% antimony; 0–1.7% bismuth; 0–1% copper; 0–0.4% magnesium; 0–1% nickel; 0–0.15% titanium. Still yet further and/or alternative formulation of the corrosion resistant tin and zinc alloy includes 15–80% tin; 20–85% zinc; 0–0.5% aluminum; 0–5.5antimony; 0–1.7% bismuth; 0–2.7% copper; 0–0.4% magnesium; 0–1% nickel; and 0–0.15% titanium. Another and/or alternative formulation of the corrosion resistant tin and zinc alloy includes 15–70% tin; 30–85% zinc; 0–0.25% aluminum; 0–1.5% copper; 0–0.02% chromium; 0–0.01% iron; 0–0.01% lead; 0–0.01% manganese; and 0–0.18% titanium. Still another and/or alternative formulation of the corrosion resistant tin and zinc alloy includes 49.75–50.25% tin; 49.75–50.25% zinc; 0–0.02% aluminum; 0–0.2% antimony; 0–0.2% arsenic; 0–0.2% copper; 0–0.025% iron; 0–0.002% palladium; and 0–0.015% titanium. Yet another and/or alternative formulation of the corrosion resistant tin and zinc alloy includes 49.5–50.5% tin; 49.5–50.5% zinc; 0.005–0.21% aluminum; 0.05–0.64% antimony; 0–0.001% arsenic; 0–0.004% bismuth; 0–0.001% cadmium; 0.01–0.3% copper; 0–0.001% iron, 0–0.001% nickel; 0–0.001% silver; 0.001–0.02% titanium. Still yet another and/or alternative formulation of the corrosion resistant tin and zinc alloy includes 49.75–50.25% tin; 49.75–50.25% zinc; 0–0.25% aluminum; 0–0.35% antimony; 0–0.02% arsenic; 0–0.001% cadmium; 0–0.02% copper; 0–0.025% iron; 0–0.08% lead; and 0–0.0175% titanium. A further and/or alternative formulation of the corrosion resistant tin and zinc alloy includes 35–70% tin; 30–65% zinc; 0–5% copper; and 0–5% nickel. Yet a further and/or alternative formulation of the corrosion resistant tin and zinc alloy includes 20–80% tin; 20–85% zinc; 0–0.1% lead. Still a further and/or alternative formulation of the corrosion resistant tin and zinc alloy includes 15–30% tin; 70–85% zinc; and 0–0.1% lead. Yet a further and/or alternative formulation of the corrosion resistant tin and zinc alloy includes 15–90% tin; 10–85% zinc; and 0–2% magnesium. Still yet a further and/or alternative formulation of the corrosion resistant tin and zinc alloy includes 10–75% tin; 25–90% zinc; 0–0.25% aluminum; 0–1.5% copper; 0–0.02% chromium; 0–0.01% iron; 0–0.01% lead; 0–0.01% manganese; and 0–0.18% titanium. Another and/or alternative formulation of the corrosion resistant tin and zinc alloy includes 15–35% tin; 65–85% zinc; 0–7.5% antimony; 0–1.7% bismuth; 0–0.1% iron; and 0–0.05% lead. Yet another and/or alternative formulation of the corrosion resistant tin and zinc alloy includes 15–70% tin; 30–85% zinc;

0–7.5% antimony; 0–1.7% bismuth; 0–5% copper; 0–0.1% iron; 0–0.05% lead; and 0.3–5% nickel. Still another and/or alternative formulation of the corrosion resistant tin and zinc alloy includes 15–70% tin; 30–85% zinc; 0–7.5% antimony; 0–1.7%bismuth; 0–2% copper; 0–0.1% iron; 0–0.05% lead; and 0.3–1% nickel. Still yet another and/or alternative formulation of the corrosion resistant tin and zinc alloy includes 15–70% tin; 30–85% zinc; 0.1–5% copper; and 0.3–5% nickel. A further and/or alternative formulation of the corrosion resistant tin and zinc alloy includes 35–70% tin; 30–65% zinc; 0.1–2% copper; and 0.3–1% nickel. Still a further and/or alternative formulation of the corrosion resistant tin and zinc alloy includes 35–70% tin; 30–65% zinc; 0.1–1.5% copper; and 0.3–0.9% nickel. A further and/or alternative formulation of the corrosion resistant tin and zinc alloy includes at least 15% tin; zinc; and at least 0.05% antimony, bismuth and/or copper. Still a further formulation of the corrosion resistant tin and zinc alloy includes 9 to 10–20% zinc; 0–2.5% antimony; 0–0.5% bismuth; and the remainder tin. Still a further and/or alternative formulation of the corrosion resistant tin and zinc ahoy includes 80–90% tin 9 to 10–20% zinc; 0.5–1.7% bismuth; 0–2% copper; 0–0.1% iron; and 0–0.05% lead. Still yet a further and/or alternative formulation of the corrosion resistant tin and zinc alloy includes 80–90% tin; 9 to 10–20% zinc; 0.5–7.5% antimony; 0–2% copper; 0–0.1% iron; and 0–0.05% lead. Another and/or alternative formulation of the corrosion resistant tin and zinc alloy includes 80–90% tin; 9 to 10–20% zinc; 0–0.5% antimony; 0–2% copper; 0–0.1% iron; and 0–0.05% lead. Still another and/or alternative formulation of the corrosion resistant tin and zinc alloy includes 80–90% tin; 9 to 10–20% zinc; 0–0.5% bismuth; 0–2% copper; 0–0.1% iron; and 0–0.05% lead. Yet another and/or alternative formulation of the corrosion resistant tin and zinc alloy includes 70–90% tin 9 to 10–30% zinc; at least 0.01% antimony. Still yet another and/or alternative formulation of the corrosion resistant tin and zinc alloy includes 70–90% tin;9 to 10–30% zinc; 0.01–1.7% bismuth. Still another and/or alternative formulation of the corrosion resistant tin and zinc alloy includes 70–90% tin; 9to 10–30% zinc; 0.1–2% iron. Yet another and/or alternative formulation of the corrosion resistant tin and zinc alloy includes 70–90% tin; 9 to 10–30% zinc; 0.1–2% copper. Still yet another and/or alternative formulation of the corrosion resistant tin and zinc alloy includes a majority of tin and zinc, 0–0.5% aluminum; 0–5.5% antimony; 0–2.7% copper; and 0–0.15% titanium. A further and/or alternative formulation of the corrosion resistant tin and zinc alloy includes a majority of tin and zinc, 0–0.3% aluminum; 0–1% antimony; and 0–1% copper. Yet a further and/or alternative formulation of the corrosion resistant tin and zinc alloy includes 20–90% tin; 9 to 10–80% zinc; 0–1% aluminum; 0–5.5% antimony; 0–1.7% bismuth; 0–2.7% copper; 0–0.1% iron; 0–0.05% lead; 0–1% magnesium; 0–1% nickel; and 0–0.5% titanium. Still a further and/or alternative formulation of the corrosion resistant tin and zinc alloy includes 20–80% tin; 20–80% zinc; 0–5% aluminum; 0–5.5% antimony; 0–1.5% bismuth; 0–5% copper; 0–5% magnesium; 0–5% nickel; and 0–1% titanium. Still yet a further and/or alternative formulation of the corrosion resistant tin and zinc alloy includes 20–80% tin; 20–80% zinc; 0–0.5% aluminum; 0–5.5% antimony; 0–1.7% bismuth; 0–2.7% copper; 0–0.4% magnesium; 0–1% nickel; and 0–0.15% titanium. Still a further and/or alternative formulation of the corrosion resistant tin and zinc alloy includes 20–80% tin; 20–80% zinc; 0–0.3% aluminum; 0–1% antimony; 0–1.7% bismuth; 0–1% copper; 0–0.4% magnesium; 0–0.7% nickel; and 0–0.15% titanium. Another and/or alternative formulation of the corrosion resistant tin and zinc alloy includes a majority of tin and zinc, 0–0.5% aluminum; 0–2% antimony; 0–2% copper; and 0–0.15% titanium. Still another and/or alternative formulation of the corrosion resistant tin and zinc alloy includes a majority of tin and zinc, 0–0.3% aluminum; 0–1% antimony; and 0–1% copper. Yet another and/or alternative formulation of the corrosion resistant tin and zinc alloy includes 20–90% tin; 9 to 10–80% zinc; 0–2% aluminum; 0–2% antimony and/or bismuth; 0–2% copper; 0–1% iron; 0–0.5% lead; 0–0.4% magnesium; 0–0.1% manganese; 0–1% nickel; and 0–0.15% titanium. Still yet another and/or alternative formulation of the corrosion resistant tin and zinc alloy includes 20–65% tin; 35–80% zinc; 0–2% aluminum; 0–1% antimony and/or bismuth; 0–1% copper; 0–0.6% iron; 0–0.5% lead; 0–0.4% magnesium; 0–0.1% manganese; 0–0.7% nickel; and 0–0.15% titanium. Yet another and/or alternative formulation of the corrosion resistant tin and zinc alloy includes 20–50% tin; 50–80% zinc; 0–0.3% aluminum; 0.005–0.5% antimony and/or bismuth; 0–0.2% copper; 0–0.6% iron; 0–0.4% lead; 0–0.4% magnesium; 0–0.05% manganese; 0–0.1% nickel; and 0–0.15% titanium. A further and/or alternative formulation of the corrosion resistant tin and zinc alloy includes 15–90% tin; 9 to 10–85% zinc; 0–2% aluminum; 0–2% antimony; 0–1.7% bismuth; 0–2% copper; 0–1% iron; 0–1% lead; 0–2% nickel; and 0–1% titanium. Still a further and/or alternative formulation of the corrosion resistant tin and zinc alloy includes 30–85% tin; 15–70% zinc; 0–1% aluminum; 0–1% antimony; 0–0.01% arsenic; 0–1% bismuth; 0–0.1% cadmium; 0–0.1% chromium; 0–1% copper; 0–0.1% iron; 0–0.1% lead; 0–0.01% manganese; 0–0.1% nickel; 0–0.01% silver; and 0–0.05% titanium. Still yet a further and/or alternative formulation of the corrosion resistant tin and zinc alloy includes 50–85% tin; 15–50% zinc; 0–7.5% aluminum; 0–2% antimony; 0–0.05% arsenic; 0–0.1% boron; 0–1.7% bismuth; 0–0.5% cadmium; 0–1% carbon; 0–1% chromium; 0–5% copper; 0–1% iron; 0–10% lead; 0–1% magnesium; 0–0.1% manganese; 0–0.1% molybdenum; 0–5% nickel; 0–0.5% silicon; 0–0.1% silver; 0–0.05% tellurium; 0–0.5% titanium; and 0–0.1% vanadium. Yet a further and/or alternative formulation of the corrosion resistant tin and zinc alloy includes 15–50% tin; 50–85% zinc; 0–7.5% aluminum; 0–2% antimony; 0–0.05% arsenic; 0–0.1% boron; 0–1.7% bismuth; 0–0.5% cadmium; 0–1% carbon; 0–1% chromium; 0–5% copper; 0–1% iron; 0–10% lead; 0–1% magnesium; 0–0.1% manganese; 0–0.1% molybdenum; 0–5% nickel; 0–0.5% silicon; 0–0.1% silver; 0–0.05% tellurium; 0–0.5% titanium; and 0–0.1% vanadium. Still a further and/or alternative formulation of the corrosion resistant tin and zinc alloy includes 20–80% tin; 20–80% zinc; 0–5% aluminum; 0–7.5% antimony; 0–5% bismuth; 0–1% cadmium; 0–5% copper; 0–5% nickel; and 0–0.5% titanium. Still yet a further and/or alternative formulation of the corrosion resistant tin and zinc alloy includes 15–90% tin; 9 to 10–85% zinc; 0–7.5% aluminum; 0–2% antimony; 0–0.05% arsenic; 0–0.1% boron; 0–1.7% bismuth; 0–0.5% cadmium; 0–1% carbon; 0–1% chromium; 0–5% copper; 0–1% iron; 0–10% lead; 0–1% magnesium; 0–0.1% manganese; 0–0.1% molybdenum; 0–5% nickel; 0–0.5% silicon; 0–0.1% silver; 0–0.05% tellurium; 0–0.5% titanium; and 0–0.1% vanadium. Another and/or alternative formulation of the corrosion resistant tin and zinc alloy includes 30–70% tin; 30–70% zinc; 0–7.5% aluminum; 0–2% antimony; 0–1.7% bismuth; 0–0.5% cadmium; 0–5% copper; 0–10% lead; and 0–5% nickel. Still another and/or alternative formulation of the corrosion resistant tin and zinc alloy includes 40–60% tin; 40–60% zinc; 0–2% aluminum; 0–2% antimony, bismuth, cadmium and/or copper; 0–2% lead; and 0–1% nickel.

The following are several examples of tin or tin and zinc alloy being applied by various processes to various types of metal strip. The following examples also illustrate various ways the coated metal strip can be formed in various types of products. The following examples further illustrate the formation of the metal alloy into various types of materials. The following examples only illustrate a few, not all, aspects of the present invention.

EXAMPLE A

A metal strip is unwound from a roll of metal strip. The metal strip has an average thickness of about 762 microns. The metal strip is continuously passed through an electrolytic tank to plate nickel on the strip surface. The nickel plated layer has a thickness of about 1–3 microns. The metal alloy includes at least about 85% tin and at least about 9 to 10% zinc and less than about 0.5% lead. The metal alloy in the melting pot at a temperature of about 301–455° C. The metal strip is passed through the melting pot having a length of about 16 feet at a speed of about 100 ft/min. The metal strip has a resident time in the melting pot of less than about 10 seconds. The coated metal strip is passed through coating rollers and/or an air-knife to achieve an average coating thickness of about 7–77 microns. The coated metal strip is rewound into a roll of coated metal strip.

EXAMPLE B

A metal strip is unwound from a roll of metal strip. The metal strip has an average thickness of about 762 microns. The metal strip is plated with chromium of a thickness of less than about 3 microns. A metal alloy having a composition of at least about 45% tin, at least about 45% zinc, less than about 1% of a metal additive, and less than about 0.1% lead is coated onto the metal strip. The metal alloy is heated in a melting pot at a temperature of about 301–482° C. The strip is passed through the melting pot having a length of about 16 feet at a speed of about 100 ft/min. The metal strip has a resident time in the melting pot of less than about 10 seconds. The coated metal strip is passed through coating rollers and/or an air-knife to achieve an average coating thickness of about 7–77 microns. The coated metal strip is rewound into a roll of coated metal strip.

EXAMPLE C

A metal strip is unwound from a roll of metal strip. The metal strip has an average thickness of about 762 microns. The metal strip is continuously plated with a tin layer of about 1–3 microns thick. A metal alloy having a composition of at least about 45% tin and at least about 45% zinc is coated onto the metal strip. The metal alloy is heated in a melting pot at a temperature of about 301–482° C. The metal strip is passed through the melting pot having a length of about 16 feet at a speed of about 100 ft./min. The metal strip has a resident time in the melting pot of less than about 10 seconds. The coated metal strip is passed through coating rollers and/or an air-knife to achieve an average coating thickness of about 7–77 microns. The coated metal strip is rewound into a roll of coated metal strip.

EXAMPLE D

A metal strip is unwound from a roll of metal strip and continuously plated with a tin layer of a thickness of less than about 3 microns. The metal strip has an average thickness of about 762 microns. A metal alloy having a composition of at least about 45% tin, at least about 45% zinc, and less than about 0.1% lead is coated onto the metal strip. The metal alloy is heated in a melting pot at a temperature of about 301–427° C. The metal strip is passed through the melting pot having a length of about 16 feet at a speed of about 100 ft/min. The metal strip has a resident time in the melting pot of less than about 10 seconds. The coated metal strip is passed through coating rollers and/or an air-knife to achieve an average coating thickness of about 7–77 microns. The coated metal strip is rewound into a roll of coated metal strip.

EXAMPLE E

A metal strip is unwound from a roll of metal strip. The metal strip is continuously plated with a tin layer of about 1–3 microns thick. The metal strip has an average thickness of about 762 microns. A metal alloy having a composition of at least about 20% tin, and at least about 75% zinc and is heated in a melting pot at a temperature of about 301–427° C. The metal strip is passed through the melting pot having a length of about 16 feet at a speed of about 100 ft/min. The metal strip has a resident time in the melting pot of less than about 10 seconds. The coated metal strip is passed through coating rollers and/or an air-knife to achieve an average coating thickness of about 7–77 microns. The coated metal strip is rewound into a roll of coated metal strip.

EXAMPLE F

A metal strip is unwound from a roll of metal strip and is pickled with a hydrochloric acid solution and a copper sulfate solution. Copper is plated onto the metal strip surface during the pickling process forming a copper layer of about 1–3 microns thick. The metal strip has an average thickness of about 762 microns. The metal alloy includes at least about 70% tin, at least about 25% zinc, and less than about 0.2% lead. The metal alloy in the melting pot is heated to a temperature of about 301–482° C. The metal strip is passed through the melting pot having a length of about 16 feet at a speed of about 100 ft/min. The metal strip has a resident time in the melting pot of less than about 10 seconds. The coated metal strip is passed through coating rollers and/or an air-knife to achieve an average coating thickness of about 7–77 microns. The coated metal strip is rewound into a roll of coated metal strip.

EXAMPLE G

A metal strip is unwound from a roll of metal strip and is pickled with a hydrochloric acid solution and chemically activated with a zinc chloride solution prior to coating the metal alloy. The metal strip has an average thickness of about 762 microns. The metal strip is not pre-heated prior to coating. A tin alloy having a composition of about 90–99% tin and less than about 2% lead is coated onto the metal strip. The tin alloy in the melting pot is heated to at least above 238–246° C. The metal strip is passed through the melting pot at a speed of about 100 ft/min. The metal strip has a resident time in the melting pot of less than about 10 seconds. The coated metal strip is passed through coating rollers and/or an air knife to achieve an average coating thickness of about 7–51 microns. The coated metal strip is then cooled. The coated metal strip is then oxidized to remove the coated tin alloy and to expose and passify the heat created intermetallic layer. The metal strip is then wound into a roll of the metal strip.

EXAMPLE H

A metal strip is unwound from a roll of metal strip and is pickled with a hydrochloric acid solution and chemically activated with a zinc chloride solution prior to coating. The metal strip has an average thickness of about 762 microns. The metal strip is plated with nickel having a thickness of less than about 3 microns. The metal strip is preheated prior to coating. A tin alloy having a composition of above 90–99% tin and less than about 2% lead is coated onto the metal strip. The metal alloy is heated in a melting pot to a temperature of about 238–482° C. The metal strip is passed through the melting pot at a speed of about 100 ft/min. The metal strip has a resident time in the melting pot of less than about 10 seconds. The coated metal strip is passed through coating rollers and/or an air-knife to achieve an average coating thickness of about 7–51 microns. The coated metal strip is cooled and then oxidized to remove the tin alloy to expose and passify the heat created intermetallic layer. The metal strip is then wound into a roll of metal strip.

EXAMPLE I

A metal strip is unwound from a roll of metal strip. The metal strip has an average thickness of about 762 microns. The metal strip is not pre-heated prior to coating with a metal alloy. A tin alloy having a composition of about 90–99% tin, and less than about 0–5% lead is coated onto the metal strip. The tin alloy is applied to the metal strip by an electroplating process. The plated metal strip is then flow heated for less than about 5 minutes. The coated metal strip is then passed through coating rollers and/or an air-knife to achieve an average coating thickness of about 7–51 microns. The coated metal strip is then cooled. The coated metal strip is then oxidized to remove the tin alloy and to expose and passify the heat created intermetallic layer. The metal strip is then wound into a roll of metal strip.

EXAMPLE J

A metal strip is unwound from a roll of metal strip and plated with a zinc layer having a thickness of less than about 3 microns. The metal strip has an average thickness of about 762 microns. The metal strip is pre-heated prior to coating with a metal alloy. A tin alloy having a composition of about 90–99% tin and less than about 0–1% lead is coated onto the metal strip. The metal strip is passed through a metal spaying process at a speed of up to about 100 ft/min to coat the metal strip. The coated metal strip is then passed through coating rollers and/or an air-knife to achieve an average coating thickness of about 7–51 microns. The coated metal strip is cooled and then oxidized to remove the tin alloy and to expose and passify the heat created intermetallic layer. The metal strip is then cut into metal sheets.

EXAMPLE K

A metal strip is unwound from a roll of metal strip and is pickled with an acid solution and then chemically activated with a chemical activation solution. The metal strip is then plated with a metal layer of about 1–3 microns thick. The metal strip is not pre-heated prior to coating with a metal alloy. A tin alloy having a composition of about 90–99% tin is coated onto the metal strip. The tin alloy is plated onto the metal strip and then flow heated. The metal strip is then coated again by a spray metal process. The coated metal strip is then passed through coating rollers and/or an air-knife to achieve an average coating thickness of about 7–51 microns. The coated metal strip is then cooled and wound into a roll of coated metal strip. The roll of coated metal strip is formed into roofing materials and installed on a building. The formed coated metal strip is then exposed to an oxidizing solution on site to remove the tin alloy and expose and passify the heat created intermetallic layer.

EXAMPLE L

A carbon steel strip is unwound from a roll of carbon steel strip. The carbon steel strip has an average thickness of about 762 microns. The carbon steel strip is continuously passed through an electrolytic tank to plate nickel on the carbon steel strip surface. The nickel plated layer has a thickness of about 1–3 microns. A metal alloy having a composition of at least about 95% tin and zinc, and less than about 0.5% lead is coated onto the carbon steel strip. The metal alloy in the melting pot is at a temperature of about 301–455° C. The carbon steel strip is passed through the melting pot having a length of about 16 feet at a speed of about 100 ft/min. The carbon steel strip has a resident time in the melting pot of less than about 10 seconds. The coated carbon steel strip is passed through coating rollers and/or an air-knife to achieve an average coating thickness of about 7–77 microns. The coated carbon steel strip is rewound into a roll of coated carbon steel strip.

EXAMPLE M

A carbon steel strip is unwound from a roll of carbon steel strip. The carbon steel strip has an average thickness of about 762 microns. The carbon steel strip is plated with chromium of a thickness of less than about 3 microns. A metal alloy having a composition of at least about 98% tin and zinc, less than about 1% of a metal additive, less than about 0.1% lead is coated onto the carbon steel strip. The metal alloy is heated in a melting pot at a temperature of about 301–482° C. The carbon steel strip is passed through the melting pot having a length of about 16 feet at a speed of about 100 ft/min. The carbon steel strip has a resident time in the melting pot of less than about 10 seconds. The coated carbon steel strip is passed through coating rollers and/or an air-knife to achieve an average coating thickness of about 7–77 microns. The coated carbon steel strip is rewound into a roll of coated carbon steel strip.

EXAMPLE N

A copper strip is unwound from a roll of copper strip. The copper strip has an average thickness of about 762 microns. The copper strip is continuously plated with a tin layer of about 1–3 microns thick. A metal alloy having a composition of at least about 99% tin and zinc is coated onto the copper strip. The metal alloy is heated in a melting pot at a temperature of about 301–482° C. The coated strip is passed through the melting pot having a length of about 16 feet at a speed of about 100 ft./min. The copper strip has a resident time in the melting pot of less than about 10 seconds. The coated copper strip is passed through coating rollers and/or an air-knife to achieve an average coating thickness of about 7–77 microns. The coated copper strip is rewound into a roll of coated copper strip.

EXAMPLE O

A carbon steel strip is unwound from a roll of carbon steel strip and continuously plated with a tin layer of a thickness of less than about 3 microns. The carbon steel strip has an average thickness of about 762 microns. A metal alloy having a composition of at least about 98% tin and zinc, and less than about 0.1% lead is coated onto the carbon steel strip. The metal alloy is heated in a melting pot at a temperature of about 301–427° C. The carbon steel strip is passed through the melting pot having a length of about 16 feet at a speed of about 100 ft/min. The carbon steel strip has a resident time in the melting pot of less than about 10 seconds. The coated carbon steel strip is passed through coating rollers and/or an air-knife to achieve an average coating thickness of about 7–77 microns. The coated carbon steel strip is rewound into a roll of coated carbon steel strip.

EXAMPLE P

A stainless steel strip is unwound from a roll of stainless steel strip. The stainless steel strip is continuously plated with a tin layer of about 1–3 microns thick. The stainless steel strip has an average thickness of about 762 microns. A metal alloy having a composition of at least about 98–99% tin and zinc is heated in a melting pot at a temperature of about 301–427° C. The stainless steel strip is passed through the melting pot having a length of about 16 feet at a speed of about 100 ft/min. The stainless steel strip has a resident time in the melting pot of less than about 10 seconds. The coated stainless steel strip is passed through coating rollers and/or an air-knife to achieve an average coating thickness of about 7–77 microns. The coated stainless steel strip is rewound into a roll of coated stainless steel strip.

EXAMPLE Q

A carbon steel strip is unwound from a roll of carbon steel strip and is pickled with a hydrochloric acid solution and a copper sulfate solution. Copper is plated onto the carbon steel strip surface during the pickling process to form a copper layer of about 1–3 microns thick. The carbon steel strip has an average thickness of about 762 microns. A metal alloy having a composition of at least about 95–99% tin and zinc, and less than about 0.2% lead is coated onto the carbon steel strip. The metal in a melting pot is heated to a temperature of about 301–482° C. The carbon steel strip is passed through the melting pot having a length of about 16 feet at a speed of about 100 ft/min. The carbon steel strip has a resident time in the melting pot of less than about 10 seconds. The coated carbon steel strip is passed through coating rollers and/or an air-knife to achieve an average coating thickness of about 7–77 microns. The coated carbon steel strip is rewound into a roll of coated carbon steel strip.

EXAMPLE R

A carbon steel strip is unwound from a roll of carbon steel strip and is pickled with a hydrochloric acid solution and chemically activated with a zinc chloride solution prior to coating. The carbon steel strip has an average thickness of about 762 microns. The carbon steel strip is not pre-heated prior to coating. A metal alloy having a composition of about 90–95% tin, and less than about 0.5% lead is coated onto the carbon steel strip. The metal alloy in the melting pot is heated to a temperature of about 238–246° C. The melting pot is heated by four external gas torches directed to the outer sides of the melting pot. The carbon steel strip is passed through the melting pot having a length of about 16 feet at a speed of about 100 ft/min. The carbon steel strip has a resident time in the melting pot of less than about 10 seconds. The coated carbon steel is passed through coating rollers and/or an air-knife to achieve an average coating thickness of about 7–51 microns. The coated carbon steel strip is then cooled and rewound into a roll of coated carbon steel strip.

EXAMPLE S

A carbon steel strip is unwound from a roll of carbon steel strip and is pickled with a hydrochloric acid solution and chemically activated with a zinc chloride solution prior to coating. The carbon steel strip has an average thickness of about 762 microns. The carbon steel strip is plated with chromium of a thickness of less than about 3 microns. The carbon steel strip is not pre-heated prior to coating. A metal alloy having a composition of about 90–99% tin, about 0.01–1% metallic stabilizer selected from antimony, bismuth and/or copper, and less than about 0.5% lead is coated onto the carbon steel strip. The metal alloy is heated in a melting pot at a temperature of about 238–482° C. The melting pot is heated by four external gas torches directed to the outer sides of the melting pot. The carbon steel strip is passed through the melting pot having a length of about 16 feet at a speed of about 100 ft/min. The carbon steel strip has a resident time in the melting pot of less than about 10 seconds. The coated carbon steel strip is passed through coating rollers and/or an air-knife to achieve an average coating thickness of about 7–51 microns. The coated carbon steel strip is then cooled and rewound into a roll of coated carbon steel strip.

EXAMPLE T

A copper strip is unwound from a roll of copper strip and is pickled with a hydrochloric acid solution and chemically activated with a zinc chloride solution prior to coating. The copper strip has an average thickness of about 762 microns. The copper strip is not pre-heated prior to coating. A metal alloy having a composition of about 90–99% tin, 0–1% metallic stabilizer, and less than about 0.1% lead is coated onto the copper strip. The metal alloy is heated in a melting pot at a temperature of about 238–246° C. The melting pot is heated by four external gas torches directed to the outer sides of the melting pot. The copper strip is passed through the melting pot having a length of about 16 feet at a speed of about 100 ft./min. The copper strip has a resident time in the melting pot of less than about 10 seconds. The coated copper strip is passed through coating rollers and/or an air-knife to achieve an average coating thickness of about 7–51 microns. The coated copper strip is then cooled and rewound into a roll of coated copper strip.

EXAMPLE U

A carbon steel strip is unwound from a roll of carbon steel strip and plated with a nickel layer of a thickness of less than about 3 microns. The carbon steel strip has an average thickness of about 762 microns. The carbon steel strip is not pre-heated prior to coating. A metal alloy having a composition of about 90–99% tin, and less than about 0.1% lead is coated onto the carbon steel strip. The metal ahoy is heated in a melting pot at a temperature of about 238–255° C. The melting pot is heated by four external gas torches directed to the outer sides of the melting pot. The carbon steel strip is passed through the coating tank having a length of about 16 feet at a speed of about 100 ft/min. The carbon steel strip has a resident time in the melting pot of less than about 10 seconds. The coated carbon steel strip is passed through coating rollers and/or an air-knife to achieve an average coating thickness of 7–51 microns. The coated carbon steel strip is then cooled and rewound into a roll of coated carbon steel strip.

EXAMPLE V

A stainless steel strip is unwound from a roll of stainless steel strip and is aggressively pickled with a dual acid solution of hydrochloric acid and nitric acid and chemically activated with a zinc chloride solution. The stainless steel strip is plated with a nickel layer of about 1–3 microns thick. The stainless steel strip has an average thickness of about 762 microns. The stainless steel strip is not pre-heated prior to coating. A metal alloy having a composition of about 90–99% tin and is heated in a melting pot at a temperature of about 238–260° C. The melting pot is heated by four external gas torches directed to the outer sides of the melting pot. The stainless steel strip is passed through the melting pot having a length of about 16 feet at a speed of about 100 ft/min. The stainless steel strip has a resident time in the melting pot of less than about 10 seconds. The coated stainless steel strip is passed through coating rollers and/or an air-knife to achieve an average coating thickness of about 7–51 microns. The coated stainless steel strip is then cooled and rewound into a roll of coated stainless steel strip.

EXAMPLE W

A carbon steel strip is unwound from a roll of carbon steel strip and is pickled with a hydrochloric acid solution and a copper sulfate solution and chemically activated with a zinc chloride solution prior to coating. Copper is plated onto the carbon steel strip surface during the pickling process to form a copper layer of about 1–3 microns thick. The carbon steel strip has an average thickness of about 762 microns. The carbon steel strip is not pre-heated prior to coating. A metal alloy having a composition of about 90–95% tin and less than about 0.5% lead is coated onto the carbon steel strip. The metal alloy is heated in a melting pot at a temperature of about 238–250° C. The melting pot is heated by four external gas torches directed to the outer sides of the melting pot. The carbon steel strip is passed through the melting pot having a length of about 16 feet at a speed of about 100 ft/min. The carbon steel strip has a resident time in the melting pot of less than about 10 seconds. The coated carbon steel strip is passed through coating rollers and/or an air-knife to achieve an average coating thickness of about 7–51 microns. The coated carbon steel strip is then cooled and rewound into a roll of coated carbon steel strip.

EXAMPLE X

A carbon steel strip is unwound from a roll of carbon steel strip and is pickled with a hydrochloric acid solution and chemically activated with a zinc chloride solution prior to coating. The carbon steel strip has an average thickness of more than about 762 microns. The carbon steel strip is pre-heated prior to coating. A metal alloy having a composition of about 90–99% tin and less than about 0.1% lead is coated onto the carbon steel strip. The metal alloy is heated in a melting pot at a temperature of about 237–246° C. The melting pot is heated by four external gas torches directed to the outer sides of the melting pot. The carbon steel strip is passed through the melting pot having a length of about 16 feet at a speed of about 100 ft/min. The carbon steel strip has a resident time in the melting pot of less than about 10 seconds. The coated carbon steel strip is passed through coating rollers and/or an air-knife to achieve an average coating thickness of about 7–51 microns. The coated carbon steel strip is then cooled and rewound into a roll of coated carbon steel strip.

EXAMPLE Y

A thin strip of carbon steel uncoiled from a roll of carbon steel is passed through an electroplating bath to deposit an ultra thin layer of tin on the carbon steel strip. The carbon steel strip has an average thickness of about 762 microns. The carbon steel strip is then coated with a two-phase zinc-tin coating to produce an intermetallic layer between the metal alloy and the carbon steel strip. The tin-zinc alloy has a coating of tin and zinc content at least about 75 weight percent.

EXAMPLE Z

The process of Example Y was preformed with the addition of a heating furnace to flow heat the thin tin plating and, thus, form a heat created intermetallic layer including iron and tin prior to the metal alloy coating process.

EXAMPLE AA

The process of Example Y was preformed with copper being plated on the carbon steel strip by an electrolytic bath.

EXAMPLE BB

A copper strip is unwound from a roll of copper strip. The copper strip has an average thickness of about 762 microns. The copper strip is pickled with an acid to clean the surface of the copper strip. The copper strip is continuously passed through an electrolytic tank to plate nickel on the copper strip surface. The nickel plated layer has a thickness of about 1–3 microns. The copper strip is no preheated. A metal alloy having a composition of at least about 95% tin and zinc, and less than about 0.5% lead is coated onto the copper strip. The metal alloy is in a melting pot at a temperature of about 301–454° C. The copper strip is passed through the melting pot having a length of about 16 feet at a speed of about 100 ft/min. The copper strip has a resident time in the melting pot of less than about 10 seconds. The coated copper strip is passed through coating rollers and/or an air-knife to achieve an average coating thickness of about 7–77 microns. The coated copper strip is rewound into a roll of coated copper strip.

EXAMPLE CC

A brass strip is unwound from a roll of brass strip. The brass strip has an average thickness of about 762 microns. The brass strip is pickled to remove surface oxides. The brass strip is plated with chromium having a thickness of less than about 3 microns. The brass strip is not preheated. A metal alloy having a composition of at least about 98% tin and zinc, less than about 1% of a metal additive, and less than about 0.1% lead is coated onto the brass strip. The metal alloy is heated in a melting pot at a temperature of about 301–482° C. The brass strip is passed through the melting pot having a length of about 16 feet at a speed of about 100 ft/min. The brass strip has a resident time in the melting pot of less than about 10 seconds. The coated brass strip is passed through coating rollers and/or an air-knife to achieve an average coating thickness of about 7–77 microns. The coated brass strip is rewound into a roll of coated brass strip.

EXAMPLE DD

A bronze strip is unwound from a roll of bronze strip. The bronze strip has an average thickness of about 762 microns. The copper strip is continuously plated with a tin layer of about 1–3 microns thick. A metal alloy having a composition of at least about 99% tin and zinc is coated onto the bronze strip. The metal alloy is heated in a melting pot at a temperature of about 301–482° C. The bronze strip is passed through the melting pot having a length of about 16 feet at a speed of about 100 ft./min. The bronze strip has a resident time in the melting pot of less than about 10 seconds. The coated bronze strip is passed through coating rollers and/or an air-knife to achieve an average coating thickness of about 7–77 microns. The coated bronze strip is rewound into a roll of coated bronze strip.

EXAMPLE EE

A carbon steel strip is unwound from a roll of carbon steel strip and continuously plated with a tin layer of an average thickness of about 3 microns. The carbon steel strip has a thickness of less than 762 microns. A metal alloy having a composition of at least about 98% tin and zinc, and less than about 0.1% lead is coated onto the carbon steel strip. The metal alloy is plated and subsequently flow heated onto the surface of the carbon steel strip. The coated carbon steel strip is passed through an air-knife to achieve an average coating thickness of about 7–77 microns. The coated carbon steel strip is oxidized to expose the heat created intermetallic layer. The oxidized carbon steel strip is rewound into a roll of oxidized carbon steel strip.

EXAMPLE FF

A stainless steel strip is unwound from a roll of stainless steel strip. The stainless steel strip is aggressively pickled and chemically activated to clean the stainless steel strip surface. The stainless steel strip is continuously plated with a tin layer of about 1–3 microns thick. The stainless steel strip has an average thickness of about 762 microns. The stainless steel strip is preheated. A metal alloy having a composition of at least about 98–99% tin and zinc is heated in a melting pot at a temperature of about 301–427° C. The stainless steel strip is passed through the melting pot having a length of about 16 feet at a speed of about 100 ft/min. The stainless steel strip has a resident time in the melting pot of less than about 10 seconds. The coated stainless steel strip is passed through coating rollers and/or an air-knife to achieve an average coating thickness of about 7–77 microns. The coated stainless steel strip is oxidized to expose the heat created intermetallic layer. The oxidized stainless steel strip is rewound into a roll of oxidized stainless steel strip.

EXAMPLE GG

A carbon steel strip is unwound from a roll of carbon steel strip and is pickled with a hydrochloric acid solution and a copper sulfate solution. Copper is plated onto the carbon steel strip surface during pickling to form a copper layer of about 1–3 microns thick. The carbon steel strip has an average thickness of about 762 microns. A metal alloy having a composition of at least about 95–99% tin and zinc, and less than about 0.2% lead is coated onto the carbon steel strip. The metal alloy is plated and subsequently flow heated onto the carbon steel strip. The coated carbon steel strip is passed through coating rollers and/or an air-knife to achieve an average coating thickness of about 7–77 microns. The coated carbon steel strip is rewound into a roll of coated carbon steel strip.

EXAMPLE HH

A brass strip is unwound from a roll of brass strip. The brass strip has an average thickness of about 762 microns. The brass is continuously passed through an electrolytic tank to plate nickel on the brass strip surface. The nickel plated layer has a thickness of about 1–3 microns. A metal alloy having a composition of 95–98% tin and zinc, and less than about 0.5% lead is coated onto the brass strip. The metal alloy in a melting pot is heated to a temperature of about 301–455° C. The carbon steel strip is passed through the melting pot having a length of about 16 feet at a speed of about 100 ft/min. The brass strip has a resident time in the melting pot of less than about 10 seconds. The coated brass strip is passed through coating rollers and/or an air-knife to achieve an average coating thickness of about 7–77 microns. The coated brass strip is rewound into a roll of coated brass strip.

EXAMPLE II

A tin strip is unwound from a roll of tin strip. The tin strip has an average thickness of about 762 microns. The tin strip is plated with chromium of a thickness of less than about 3 microns. A metal alloy having a composition of about 95–98% tin and zinc, less than about 2% of a metal additive, and less than about 0.5% lead is coated onto the tin strip. The metal alloy is heated in a melting pot at a temperature of about 301–482° C. The tin strip is passed through the melting pot having a length of about 16 feet at a speed of about 100 ft/min. The tin strip has a resident time in the melting pot of less than about 10 seconds. The coated tin strip is passed through coating rollers and/or an air-knife to achieve an average coating thickness of about 7–77 microns. The coated tin strip is rewound into a roll of coated tin strip.

EXAMPLE JJ

A copper strip is unwound from a roll of copper strip. The copper strip has an average thickness of about 762 microns. The copper strip is continuously plated with a tin layer of about 1–3 microns thick. A metal alloy having a composition of about 90–99% tin and 0–5% lead is coated onto the copper strip. The metal alloy is heated in a melting pot at a temperature of about 301–482° C. The copper strip is passed through the melting pot having a length of about 16 feet at a speed of about 100 ft./min. The copper strip has a resident time in the melting pot of less than about 10 seconds. The coated copper strip is passed through coating rollers and/or an air-knife to achieve an average coating thickness of about 7–77 microns. The coated copper strip is rewound into a roll of coated copper strip.

EXAMPLE KK

A carbon steel strip is unwound from a roll of carbon steel strip and continuously plated with a tin layer of an average thickness of about 3 microns. The carbon steel strip has a thickness of less than about 762 microns. A metal alloy having a composition of about 90–99% tin and zinc, and less than about 0.5% lead is coated onto the carbon steel strip. The metal alloy is heated in a melting pot at a temperature of about 301–482° C. The carbon steel strip is passed through the melting pot having a length of about 16 feet at a speed of about 100 ft/min. The carbon steel has a resident time in the melting pot of less than about 10 seconds. The coated carbon steel strip is passed through coating rollers and/or an air-knife to achieve an average coating thickness of about 7–77 microns. The coated carbon steel strip is rewound into a roll of coated carbon steel strip.

EXAMPLE LL

A stainless steel strip is unwound from a roll of stainless steel strip. The stainless steel strip is continuously plated with a tin layer of about 1–3 microns thick. The stainless steel strip has an average thickness of about 762 microns. A metal alloy having a composition of about 90–99% tin and zinc is heated in a melting pot at a temperature of about 301–482° C. The stainless steel strip is passed through the melting pot having a length of about 16 feet at a speed of about 100 ft/min. The stainless steel strip has a resident time in the melting pot of less than about 10 seconds. The coated stainless steel strip is passed through coating rollers and/or an air-knife to achieve an average coating thickness of about 7–77 microns. The coated stainless steel strip is rewound into a roll of coated stainless steel strip.

EXAMPLE MM

A brass strip is unwound from a roll of brass strip and is pickled with a hydrochloric acid solution and a copper sulfate solution. Copper is plated onto the carbon steel strip surface during pickling to form a copper layer of about 1–3 microns thick. The brass strip has an average thickness of 762 microns. A metal alloy having a composition of about 90–95% tin, and less than about 0.5% lead is heated in a melting pot at a temperature of about 301–482° C. The brass strip is passed through the melting pot having a length of about 16 feet at a speed of about 100 ft/min. The brass strip has a resident time in the melting pot of less than about 10 seconds. The coated brass strip is passed through coating rollers and/or an air-knife to achieve an average coating thickness of about 7–77 microns. The coated brass strip is rewound into a roll of coated brass strip.

EXAMPLE NN

A copper strip is unwound from a roll of copper strip and is pickled with a hydrochloric acid solution and chemically activated with a zinc chloride solution prior to coating. The copper strip has an average thickness of about 762 microns. The copper strip is not pre-heated prior to coating. A tin alloy having a composition of about 90–99% tin, and less than about 2% lead is heated in a melting pot at a temperature of about 237–246° C. The copper strip is passed through the melting pot at a speed of about 100 ft/min. The copper strip has a resident time in the coating tank of less than about 10 seconds. The coated copper strip is passed through coating rollers and/or an air knife to achieve an average coating thickness of about 7–51 microns. The coated copper strip is then cooled. The coated copper strip is then oxidized to remove the coated tin alloy and to expose and pacify the heat created intermetallic layer. The copper strip is then wound into a roll of copper strip.

EXAMPLE OO

A copper strip is unwound from a roll of copper strip and is pickled with a hydrochloric acid solution and chemically activated with a zinc chloride solution prior to coating. The copper strip has an average thickness of about 762 microns. The copper strip is plated with nickel having a thickness of less than about 3 microns. The copper strip is preheated prior to coating. A tin alloy having a composition of about 90–99% tin, and less than about 2% lead is heated in a melting pot at a temperature of about 237–482° C. The copper strip is passed through the melting pot at a speed of about 100 ft./min. The copper strip has a resident time in the melting pot of less than about 10 seconds. The coated copper strip is passed through coating rollers and/or an air-knife to achieve an average coating thickness of about 7–51 microns. The coated copper strip is cooled and then oxidized to remove the tin alloy and to expose and pacify the heat created intermetallic layer. The copper strip is then wound into a roll of copper strip.

EXAMPLE PP

A copper strip is unwound from a roll of copper strip. The copper strip has an average thickness of about 762 microns. The strip is not pre-heated prior to coating. A tin alloy having a composition of about 99% tin, and less than about 0–5% lead is applied to the copper strip by an electroplating process. The plated copper strip is then flow heated for less than about 5 minutes. The coated copper strip is passed through coating rollers and/or an air-knife to achieve an average coating thickness of about 7–51 microns. The coated copper strip is then cooled. The coated copper strip is then oxidized to remove the tin alloy and to expose and pacify the heat created intermetallic layer. The copper strip is then wound into a roll of copper strip.

EXAMPLE QQ

A copper steel strip is unwound from a roll of copper strip and plated with a chromium layer having a thickness of less than about 3 microns. The copper strip has an average thickness of about 762 microns. The copper strip is pre-heated prior to coating. A tin alloy having a composition of about 90–99% tin, and less than about 0–1% lead is coated onto the copper strip. The copper strip is passed through a metal spaying process at a speed of up to about 100 ft/min. The coated copper strip is then passed through coating rollers and/or an air-knife to achieve an average coating thickness of about 7–51 microns. The coated copper strip is cooled and then oxidized to remove the tin alloy to expose and pacify the heat created intermetallic layer. The copper strip is then cut into sheets.

EXAMPLE RR

A copper strip is unwound from a roll of copper strip and is pickled with an acid solution and then chemically activated with a chemical activation solution. The copper strip is plated with a metal layer of about 1–3 microns thick. The copper strip is not pre-heated prior to coating. A tin alloy having a composition of about 90–99% tin is metal sprayed onto the copper strip. The coated copper strip is then passed through coating rollers and/or an air-knife to achieve an average coating thickness of about 7–51 microns. The coated copper strip is then cooled and wound into a roll of copper strip. The roll of coated copper strip is later formed into roofing materials and installed on a building. The formed coated copper strip is then exposed on site to an oxidizing solution to remove the tin alloy and expose and pacify the intermetallic layer.

EXAMPLE SS

A tin strip is unwound from a roll of tin strip. The tin strip has an average thickness of about 762 microns. The tin strip is continuously passed through an electrolytic tank to plate nickel on the tin strip surface. The nickel plated layer has a thickness of about 1–3 microns. A metal alloy having a composition of at least about 85% tin, at least about 9 to 10% zinc, and less than about 0.5% lead is heated in a melting pot at a temperature of about 301–455° C. The tin strip is passed through the melting pot having a length of about 16 feet at a speed of about 100 ft/min. The tin strip has a resident time in the melting pot of less than about 10 seconds. The coated tin strip is passed through coating rollers and/or an air-knife to achieve an average coating thickness of about 7–77 microns. The coated tin strip is rewound into a roll of coated tin strip.

EXAMPLE TT

A bronze strip is unwound from a roll of bronze strip. The bronze strip has an average thickness of about 762 microns.

The bronze strip is plated with chromium of a thickness of less than about 3 microns. A metal alloy having a composition of at least about 45% tin, at least about 45% zinc, less than about 1% of a metal additive, and less than about 0.1% lead is heated in a melting pot at a temperature of about 301–482° C. The bronze strip is passed through the melting pot having a length of about 16 feet at a speed of about 100 fill-in. The bronze strip has a resident time in the melting pot of less than about 10 seconds. The coated bronze strip is passed through coating rollers and/or an air-knife to achieve an average coating thickness of about 7–77 microns. The coated bronze strip is rewound into a roll of coated bronze strip.

EXAMPLE UU

An aluminum strip is unwound from a roll of aluminum strip. The aluminum strip has an average thickness of about 762 microns. The aluminum strip is continuously plated with a tin layer of about 1–3 microns thick. A metal alloy having a composition of at least about 45% tin and at least about 45% zinc is heated in a melting pot at a temperature of about 301–482° C. The aluminum strip is passed through the melting pot having a length of about 16 feet at a speed of about 100 ft./min. The aluminum strip has a resident time in the melting pot of less than about 10 seconds. The coated aluminum strip is passed through coating rollers and/or an air-knife to achieve an average coating thickness of about 7–77 microns. The coated aluminum strip is rewound into a roll of coated aluminum strip.

EXAMPLE VV

A tin strip is unwound from a roll of tin strip and continuously plated with a tin layer of a thickness of less than about 3 microns. The tin strip has an average thickness of about 762 microns. A metal alloy having a composition of at least about 45% tin, at least about 45% zinc, and less than about 0.1% lead is heated in a melting pot at a temperature of about 301–427° C. The tin strip is passed through the melting pot having a length of about 16 feet at a speed of about 100 ft/min. The tin has a resident time in the melting pot of less than about 10 seconds. The coated tin strip is passed through coating rollers and/or an air-knife to achieve an average coating thickness of about 7–77 microns. The coated tin strip is rewound into a roll of coated tin strip.

EXAMPLE WW

A brass strip is unwound from a roll of brass strip. The brass strip is continuously plated with a tin layer of about 1–3 microns thick. The brass strip has an average thickness of about 762 microns. A metal alloy having a composition of at least about 20% tin, and at least about 75% zinc is heated in a melting pot at a temperature of about 301–427° C. The brass strip is passed through the melting pot having a length of about 16 feet at a speed of about 100 ft/min. The brass strip has a resident time in the melting pot of less than about 10 seconds. The coated brass strip is passed through coating rollers and/or an air-knife to achieve an average coating thickness of about 7–77 microns. The coated brass strip is rewound into a roll of coated brass strip.

EXAMPLE XX

A brass strip is unwound from a rail of brass strip and is pickled with a hydrochloric acid solution and a copper sulfate solution. Copper is plated onto the brass strip surface during pickling to form a copper layer of about 1–3 microns thick. The brass strip has an average thickness of about 762 microns. A metal alloy having a composition of at least about 70% tin, at least about 25% zinc, and less than about 0.2% lead is heated in a melting pot at a temperature of about 301–482° C. The brass strip is coated by metal strap jets. The coated brass strip is passed through coating rollers and/or an air-knife to achieve an average coating thickness of about 7–77 microns. The coated brass strip is rewound into a roll of coated brass strip.

EXAMPLE YY

A brass strip is unwound from a roll of brass strip and is pickled with a hydrochloric acid solution and chemically activated with a zinc chloride solution prior to coating. The brass strip has an average thickness of about 762 microns. The brass strip is not pre-heated prior to coating. A tin alloy having a composition of about 90–99% tin, and less than about 2% lead is heated in a melting pot at a temperature of about 237–246° C. The brass strip is passed through the melting pot at a speed of about 100 ft/min. The brass strip has a resident time in the melting pot of less than about 10 seconds. The coated brass strip is passed through coating rollers and/or an air knife to achieve an average coating thickness of about 7–51 microns. The coated brass strip is then cooled. The coated brass strip is then oxidized to remove the coated tin alloy to expose and pacify the heat created intermetallic layer. The brass strip is then wound into a roll of brass strip.

EXAMPLE ZZ

A brass strip is unwound from a roll of brass strip and is pickled with a hydrochloric acid solution and chemically activated with a zinc chloride solution prior to coating. The brass strip has an average thickness of about 762 microns. The brass strip is plated with nickel having a thickness of less than about 3 microns. The brass strip is preheated prior to coating. A tin alloy having a composition of about 90–99% tin, and less than about 2% lead is heated in a melting pot at a temperature of about 237–482° C. The brass strip is passed through the melting pot at a speed of about 100 ft/min. The brass strip has a resident time in the melting pot of less than about 10 seconds. The coated brass strip is passed through coating rollers and/or an air-knife to achieve an average coating thickness of about 7–51 microns. The coated brass strip is cooled and then oxidized to remove the tin alloy to expose and pacify the heat created intermetallic layer. The brass strip is then wound into a roll of brass strip.

EXAMPLE AAA

A brass strip is unwound from a roll of brass strip. The brass strip has an average thickness of about 762 microns. The brass strip is pickled to clean the brass strip surface. The brass strip is not pre-heated prior to coating. A tin alloy having a composition of about 99% tin, and less than about 0–5% lead is applied to the brass strip by an electroplating process. The plated brass strip is then flow heated for less than about 5 minutes. The coated brass strip is passed through coating rollers and/or an air-knife to achieve an average coating thickness of about 7–51 microns. The coated brass strip is then cooled. The coated brass strip is then oxidized to remove the tin alloy and to expose and pacify the heat created intermetallic layer. The brass strip is then wound into a roll of brass strip.

EXAMPLE BBB

A brass strip is unwound from a roll of brass strip and plated with a zinc layer having an average thickness of about 3 microns. The brass strip has a thickness of less than about 762 microns. The brass strip is pre-heated prior to coating. A tin alloy having a composition of about 90–99% tin, and less than about 0–1% lead is passed through a metal spaying process at a speed of up to 100 ft/min. The coated brass strip is then passed through coating rollers and/or an air-knife to achieve an average coating thickness of about 7–51 microns. The coated brass strip is cooled and then oxidized to remove the tin alloy and to expose and pacify the heat created intermetallic layer. The brass strip is then cut into sheets.

EXAMPLE CCC

A brass strip is unwound from a roll of brass strip and is pickled with an acid solution and then chemically activated with a chemical activation solution. The brass strip is plated with a metal layer of about 1–3 microns thick. The brass strip is not pre-heated prior to coating. A tin alloy having a composition of about 90–99% tin is plated onto the brass strip and then flow heated. The brass strip is then coated again by a spray metal process. The coated brass strip is then passed through coating rollers and/or an air-knife to achieve an average coating thickness of about 7–51 microns. The coated brass strip is then cooled and wound into a roll of brass strip. The roll of coated brass strip is formed into roofing materials and installed on a building. The formed coated strip is then exposed on site to an oxidizing solution to remove the tin alloy and to expose and to pacify the intermetallic layer.

EXAMPLE DDD

Figure 22:
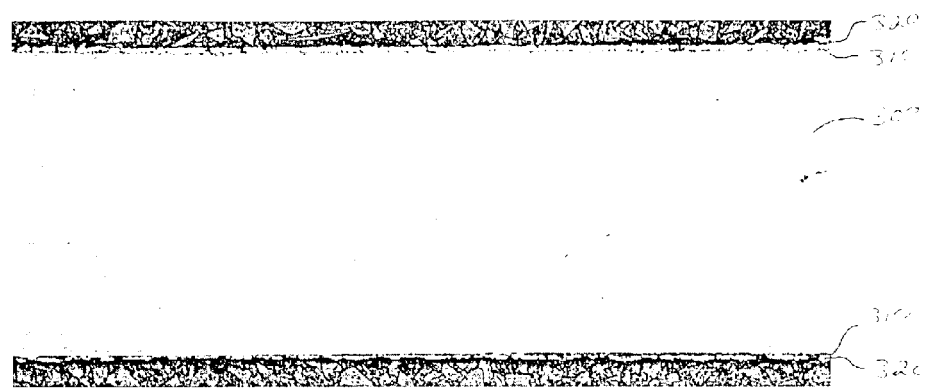
FIG. 22 is a illustration of a copper base metal coated on both sides with a tin and zinc metal alloy; and, FIG. 23 is an enlarged portion of the copper base metal coated with a tin and zinc alloy that illustrates the heat created intermetallic layer and the surface layer and a spectral analysis of the heat created intermetallic layer and the surface layer of the coated copper base metal.
Figure 23:
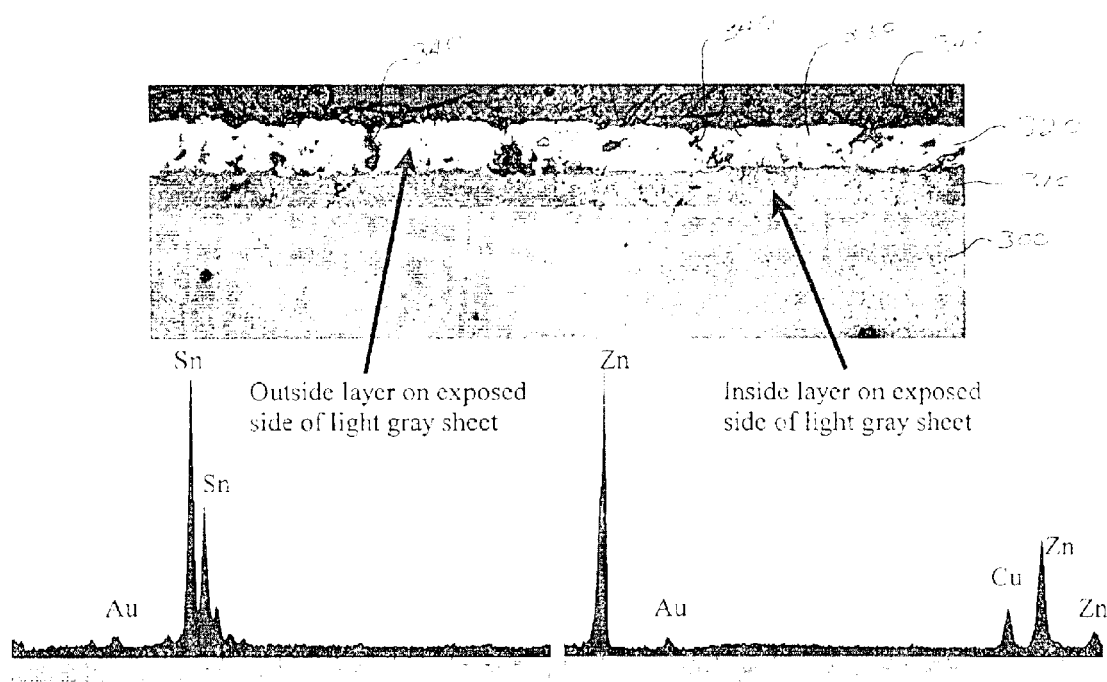

A copper metal strip is unwound from a roll of copper metal strip. The copper metal strip has an average thickness of about 762 microns. A metal alloy having a composition of about 40–60% tin and about 40–60% zinc is coated onto the copper metal strip. The copper metal strip is passed through the melting pot having a length of at least about 5 feet at a speed of about 20–100 ft./min. The copper metal strip has a resident time in the melting pot of less than about 100 seconds. The coated copper metal strip is passed through coating rollers and/or an air-knife to achieve an average coating thickness of about 3–77 microns. FIG. 22 illustrates the copper base metal 300 coated with the tin and zinc alloy 320. A heat created intermetallic layer 310 is also illustrated between tin and zinc alloy 320 and copper base metal 300. As best illustrated in FIG. 23, the thickness of the intermetallic layer and the tin and zinc alloy are about the same. The thickness of each of these layers is less than about 10 microns, and typically about 4–8 microns. As such, the total thickness of the heat created intermetallic layer plus the tin and zinc alloy is about 3–20 microns, and typically 8–16 microns. As can be appreciated, the residence time of the copper metal strip in the melting pot can be selected to created thicker or thinner layers. The thickness of the copper metal strip illustrated in FIG. 22 is about 200–600 microns and typically about 240–480 microns. As can be appreciated, thicker or thinner copper metal strip can be used. A unique phenomena was discovered when analyzing the composition of the tin and zinc top coating and the heat created intermetallic layer. As illustrated by the graphs in FIG. 23, the composition of heat created intermetallic layer is principally copper and zinc. The graph illustrates that little, if any, tin is included in the heat created intermetallic layer 310. Apparently, the molten tin in the tin and zinc alloy has significantly less affinity than the zinc to combine with the copper in the heated interface between the copper metal strip and the molten tin and zinc. The zinc appears to have partially migrated from the tin and zinc alloy and into the copper to form a copper-zinc heat created intermetallic layer. The composition of the tin and zinc layer 320 is also interesting at the interface with the heat created intermetallic layer. Upon crossing the interface into the tin and zinc alloy coating, little, if any, copper is present in the tin and zinc alloy coating. The distribution of the zinc in the tin for the tin and zinc coating was also interesting. The tin and zinc layer was found to be porous and include scattered small fingers of zinc penetrating through the tin to the surface of the tin and zinc coating. The reasons for these phenomena are presently not known to the inventors. The coated copper metal strip was subjected to various types of environments. The results of these tests revealed that the bonding of the tin and zinc alloy to the copper metal strip was very strong, thus exhibited little, if any, flaking. The teats also revealed that the coated copper metal strip had excellent corrosion resistant properties. In environments that exposed the coated copper metal strip to water, the coated copper metal strip exhibited excellent corrosion resistant properties. Applicants believe that the formation of the copper and zinc heat created intermetallic layer is facilitated by the fact that the zinc content in the tin and zinc alloy is above the eutectic point of the tin and zinc alloy. As such, the globules of zinc in the tin and zinc alloy are able the combine with the copper to form the copper and zinc heat created intermetallic layer. As such, tin and zinc coatings that include at least 9 to 10 weight percent zinc readily form a copper and zinc heat created intermetallic layer when such a tin and zinc alloy is coated on the copper metal strip. Copper metal strip that is coated with a tin alloy that includes less than 9 to 10 weight percent zinc will form a copper and zinc heat created intermetallic layer to a lesser degree. When using a tin alloy coating, the zinc content should be at least about 5 to 10 weight percent of the coating so as to form a significant copper-zinc heat created intermetallic layer. The formation of the highly corrosion resistant copper and zinc intermetallic layer will be present in copper alloy metal strip that is coated with a tin and zinc alloy or tin alloy having a significant amount of zinc (e.g., at least about 5 weight percent), and also in a non-copper or non-copper alloy metal strip that has been plated, clad, brazened, hot dipped, etc. with a copper or copper alloy layer and then coated with a tin and zinc alloy or tin alloy having a significant amount of zinc.

EXAMPLE EEE

A carbon steel metal strip is unwound from a roll of carbon steel metal strip. The carbon steel metal strip has an average thickness of about 762 microns. The carbon steel strip is plated with a copper layer of about 1–6 microns thick. A metal ahoy having a composition of about 40–60% tin and about 40–60% zinc is coated onto the carbon steel metal strip. The carbon steel metal strip is passed through the melting pot having a length of at least about 5 feet at a speed of about 20–100 ft./min. The carbon steel metal strip has a resident time in the melting pot of less than about 100 seconds. The coated carbon steel metal strip is passed through coating rollers and/or an air-knife to achieve an average coating thickness of about 3–77 microns. A heat created intermetallic layer was formed that principally included copper and zinc. The tin and zinc layer was found to be porous and included scattered small fingers of zinc penetrating through the tin to the surface of the tin and zinc coating. Improved corrosion resistance was observed in the heat created intermetallic layer when the thickness of the plated copper later was over about 1 micron.

EXAMPLE FFF

A carbon steel metal strip is unwound from a roll of carbon steel metal strip. The carbon steel metal strip has an average thickness of about 762 microns. The carbon steel strip is plated with a copper layer of about 1–6 microns thick. A metal alloy having a composition of about 91–95% tin and about 5–9% zinc is coated onto the carbon steel metal strip. The carbon steel metal strip is passed through the melting pot having a length of at least about 5 feet at a speed of about 20–100 ft./min. The carbon steel metal strip has a resident time in the melting pot of less than about 100 seconds. The coated carbon steel metal strip is passed through coating rollers and/or an air-knife to achieve an average coating thickness of about 3–77 microns. A heat created intermetallic layer was formed that principally included copper and zinc. The tin layer was found to included tin and zinc. improved corrosion resistance was observed in the heat created intermetallic layer when the thickness of the plated copper later was over about 1 micron.

EXAMPLE GGG

This example is similar to Example EEE and FFF except that the base metal strip is stainless steel instead of carbon steel. The phenomena concerning the composition of the heat created intermetallic layer and the tin and zinc alloy coating as set forth in Example EEE and FFF also existed in the coated stainless steel metal strip.

EXAMPLE HHH

A metal alloy is formed into a metal strip to be formed to various types of materials, or into a solder or a welding wire for connecting two or more metal materials together. One general composition of the metal strip, solder or welding wire is 20–70% tin, 30–75% zinc, 0.0005–2% aluminum, 0.001–2% antimony, 0.0001–1% bismuth, 0–2% copper, 0–0.5% lead, 0.0001–0.1% titanium. Another and/or alternative formulation of the metal strip, solder or welding wire is 40–60% tin, 40–60% zinc, 0.0005–0.75% aluminum, 0.001–1% antimony, 0.0001–0.2% bismuth, 0–0.01% arsenic, 0–0.01% cadmium, 0–0.01% chromium, 0.001–1% copper, 0–0.1% iron, 0–0.1% lead, 0–0.01% manganese, 0–0.2% nickel, 0–0.01% silver, 0.0005–0.05% titanium. Still another and/or alternative formulation of the metal strip, solder or welding wire includes 30–70% tin; 30–70% zinc; 0.0001–0.5% aluminum; 0.001–2% antimony; 0–0.01% arsenic; 0.0001–1% bismuth; 0–0.01% boron; 0–0.01% cadmium; 0–0.05% carbon; 0–0.05% chromium; 0–2% copper; 0–0.1% iron; 0–0.5% lead; 0–0.01% magnesium; 0–0.01% manganese; 0–0.01% molybdenum; 0–1% nickel; 0–0.01% silicon; 0–0.01% silver; 0–0.01% sulfur; 0–0.01% tellurium; 0.0001–0.1% titanium; and 0–0.01% vanadium. Yet another and/or alternative formulation of the metal strip, solder or welding wire is 40–60% tin; 40–60% zinc; 0.0005–0.4% aluminum; 0.01–0.8% antimony; 0–0.005% arsenic; 0.001–0.05% bismuth; 0–0.005% cadmium; 0.005–0.5% copper; 0–0.05% iron; 0–0.1% lead; 0–0.05% nickel; 0–0.005% silver; and 0.0005–0.05% titanium. Still yet a further and/or alternative formulation of the metal strip, solder or welding wire is 48–52% tin; 48–52% zinc; 0.005–0.24% aluminum; 0.05–0.64% antimony; 0–0.001% arsenic; 0.002–0.005% bismuth; 0–0.001% cadmium; 0.01–0.3% copper; 0–0.016% iron; 0–0.08% lead; 0–0.001% nickel; 0–0.001% silver; 0.001–0.02% titanium. Another and/or alternative formulation of the metal strip, solder or welding wire is 5–70% tin; 30–95% zinc; 0–0.25% aluminum; 0–0.02% chromium; 0–1.5% copper; 0–0.01% iron; 0–0.01% lead; 0–0.01% manganese; and 0–0.18% titanium. When the metal alloy is used as a solder metal or electrode, the metal alloy is typically formed into a thin wire or thin strip by common known processes. The thin wire or thin strip is typically rolled for later processing or use. The metal alloy made for solder typically includes aluminum and/or titanium since these two metal additives positively affect the surface tension of the metal alloy in the molten state so that the molten metal alloy has the desired wetting characteristics. The higher the concentration of titanium and/or aluminum, the more the solder will bead when applied to a workpiece. The addition of titanium and/or aluminum to the metal alloy also causes the metal alloy to resist flowing at temperatures near the melting point of the metal alloy. This resistance imparts excellent soldering characteristics. The titanium and/or aluminum are believed to cause oxide formation on the surface of the molten solder to form a dull greyish, earth tone colored solder. The titanium and aluminum are also believe to assist in forming an intermetallic layer with the tin and zinc in the metal alloy and the workpiece before solidification of the solder to thereby form a strong bond with the workpiece. The solder typically includes little, if any, lead additions, and such, any lead in the solder is typically due to impurities. The solder composition is particularly useful in soldering carbon steel, stainless steel, copper, copper alloys, tin, tin alloys, zinc and zinc alloys. However, the solder can be used on other types of metals. If the solder is to be used to connect copper or copper alloys, copper is typically added to the metal alloy composition. The addition of copper reduces the reactivity of the solder with the copper or copper alloy materials. The solder may be used with a wide variety of fluxes. If the solder is to be used in ultrasonic welding, a flux is typically not used.

EXAMPLE III

The metal alloy is used for standing seam and press fit (mechanical joining such as, shown in U.S. Pat. No. 4,987, 716) applications for roofing. In standing seam applications, the edges of the roofing materials are folded together and then soldered to form a water tight seal. The metal alloy inherently includes excellent soldering characteristics. When the metal alloy is heated, it has the necessary wetting properties to produce a tight water resistant seal. As a result, the metal alloy acts as both a corrosive resistive coating and a soldering agent for standing seam roofing systems. The metal alloy coated can be also welded with standard solders. Typical solders contain about 50% tin and about 50% lead. The metal alloy has the added advantage of being able to be soldered with low or no-lead solders. The metal alloy coated roofing materials also can be used in mechanically joined roofing systems due to the malleability of the metal alloy. Mechanically joined systems form water tight seals by folding adjacent roof material edges together and subsequently applying a compressive force to the seam in excess of about 1,000 psi. Under these high pressures, the metal alloy plastically deforms within the seam and produces a water tight seal.

The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention.

We claim:

1. A corrosion-resistant metal strip having a base metal strip coated with a corrosion-resistant metal alloy and a heat created intermetallic layer between said metal alloy coating and said base metal strip, said base metal strip having a surface that includes copper prior to said metal alloy coating being coated on said base metal strip, said metal alloy coating including at least about 15 weight percent tin, an at least an effective amount of zinc to form a multi-phase metal alloy coating after said metal alhoy coating cools on said base metal strip, said tin content plus said zinc content at least about 90 weight percent, said heat created intermetallic layer including a majority of copper plus zinc and having a thickness of up to about 10 microns.

2. The corrosion-resistant metal strip as defined in claim 1, wherein said base metal strip includes a majority of copper.

3. The corrosion-resistant metal strip as defined in claim 2, wherein said base metal strip is a copper strip.

4. The corrosion-resistant metal strip as defined in claim 1, wherein said metal alloy coating has an average thickness of less than about 30 microns.

5. The corrosion-resistant metal strip as defined in claim 3, wherein said metal alloy coating has an average thickness of less than about 30 microns.

6. The corrosion-resistant metal strip as defined in claim 1, wherein said base metal strip has an average thickness of less than about 2540 microns, said base metal strip thickness being greater than said metal alloy coating thickness.

7. The corrosion-resistant metal strip as defined in claim 5, wherein said base metal strip has an average thickness of less than about 2540 microns, said base metal strip thickness being greater than said metal alloy coating thickness.

8. The corrosion-resistant metal strip as defined in claim 1, wherein said heat created intermetallic layer includes at least about 75 weight percent copper plus zinc.

9. The corrosion-resistant metal strip as defined in claim 7, wherein said heat created intermetallic layer includes at least about 75 weight percent copper plus zinc.

10. The corrosion-resistant metal strip as defined in claim 1, wherein said metal alloy coating includes at least about 20 weight percent zinc.

11. The corrosion-resistant metal strip as defined in claim 9, wherein said metal alloy coating includes at least about 20 weight percent zinc.

12. The corrosion-resistant metal strip as defined in claim 10, wherein said metal alloy coating includes at least about 40 weight percent zinc.

13. The corrosion-resistant metal strip as defined in claim 1, wherein said metal alloy coating includes at least one metal additive to positively affect the chemical and/or physical properties of said metal alloy coating; said metal additive including a metal selected from the group consisting of aluminum, antimony, bismuth, chromium, copper, lead, magnesium, manganese, molybdenum, nickel, silicon, titanium, and mixtures thereof.

14. The corrosion-resistant metal strip as defined in claim 9, wherein said metal alloy coating includes at least one metal additive to positively affect the chemical and/or physical properties of said metal alloy coating; said metal additive including a metal selected from the group consisting of aluminum, antimony, bismuth, chromium, copper, lead, magnesium, manganese, molybdenum, nickel, silicon, titanium, and mixtures thereof.

15. The corrosion-resistant metal strip as defined in claim 11, wherein said metal alloy coating includes at least one metal additive to positively affect the chemical and/or physical properties of said metal alloy coating; said metal additive including a metal selected from the group consisting of aluminum, antimony, bismuth, chromium, copper, lead, magnesium, manganese, molybdenum, nickel, silicon, titanium, and mixtures thereof.

16. The corrosion-resistant metal strip as defined in claim 1, wherein said metal alloy comprises:

| | |
|---|---|
| Tin | 15–90 |
| Zinc | 9–85 |
| Aluminum | 0–2 |
| Antimony | 0–2 |
| Bismuth | 0–1.7 |
| Copper | 0–2 |
| Iron | 0–1 |
| Magnesium | 0–2 |
| Nickel | 0–2 |
| Titanium | 0–1. |

17. The corrosion-resistant metal strip as defined in claim 15, wherein said metal alloy comprises:

| | |
|---|---|
| Tin | 15–90 |
| Zinc | 9–85 |
| Aluminum | 0–2 |
| Antimony | 0–2 |
| Bismuth | 0–1.7 |
| Copper | 0–2 |
| Iron | 0–1 |
| Magnesium | 0–2 |
| Nickel | 0–2 |
| Titanium | 0–1. |

18. The corrosion-resistant metal strip as defined in claim 16, wherein said metal alloy comprises:

| | |
|---|---|
| Tin | 45–55 |
| Zinc | 45–55 |
| Aluminum | 0–2 |
| Antimony | 0–2 |
| Bismuth | 0–1.7 |
| Boron | 0–0.01 |
| Cadmium | 0–0.1 |
| Carbon | 0–0.5 |
| Chromium | 0–0.5 |
| Copper | 0–2 |
| Iron | 0–1 |
| Lead | 0–0.5 |
| Magnesium | 0–0.4 |
| Manganese | 0–0.1 |
| Molybdenum | 0–0.1 |
| Nickel | 0–2 |
| Silicon | 0–0.5 |
| Titanium | 0–1 |
| Vanadium | 0–0.1. |

19. The corrosion-resistant metal strip as defined in claim 17, wherein said metal alloy comprises:

| | |
|---|---|
| Tin | 45–55 |
| Zinc | 45–55 |
| Aluminum | 0–2 |
| Antimony | 0–2 |
| Bismuth | 0–1.7 |
| Boron | 0–0.01 |
| Cadmium | 0–0.1 |
| Carbon | 0–0.5 |

-continued

| | |
|---|---|
| Chromium | 0–0.5 |
| Copper | 0–2 |
| Iron | 0–1 |
| Lead | 0–0.5 |
| Magnesium | 0–0.4 |
| Manganese | 0–0.1 |
| Molybdenum | 0–0.1 |
| Nickel | 0–2 |
| Silicon | 0–0.5 |
| Titanium | 0–1 |
| Vanadium | 0–0.1. |

20. A corrosion-resistant metal strip having a base metal strip coated with a corrosion-resistant metal alloy and a heat created intermetallic layer formed between said base metal strip and said metal alloy coating, said base metal strip formed of a majority of copper and having a surface which includes copper prior to being coated with said metal alloy coating, said metal alloy coating including about 9–80 weight percent zinc and at least about 15 weight percent tin, said tin content plus said zinc content of said metal alloy coating at least about 90 weight percent, said base metal strip having an average thickness of about 381–2540 microns, said metal alloy coating having an average thickness of about 2–1250 microns, said base metal strip having a thickness greater than said metal alloy coating thickness, said heat created intermetallic layer including a majority of copper plus zinc and having an average thickness of about 0.3–20 microns.

21. The corrosion-resistant metal strip as defined in claim 2, wherein said base metal strip is a copper strip.

22. The corrosion-resistant metal strip as defined in claim 20, wherein said metal alloy coating has an average thickness of less than about 30 microns.

23. The corrosion-resistant metal strip as defined in claim 21, wherein said metal alloy coating has an average thickness of less than about 30 microns.

24. The corrosion-resistant metal strip as defined in claim 20, wherein said heat created intermetallic layer includes at least about 75 weight percent copper plus zinc.

25. The corrosion-resistant metal strip as defined in claim 23, wherein said heat created intermetallic layer includes at least about 75 weight percent copper plus zinc.

26. The corrosion-resistant metal strip as defined in claim 20, wherein said metal alloy coating includes at least about 20 weight percent zinc.

27. The corrosion-resistant metal strip as defined in claim 25, wherein said metal alloy coating includes at least about 20 weight percent zinc.

28. The corrosion-resistant metal strip as defined in claim 20, wherein said metal alloy coating includes at least one metal additive to positively affect the chemical and/or physical properties of said metal alloy coating; said metal additive including a metal selected from the group consisting of aluminum, antimony, bismuth, chromium, copper, lead, magnesium, manganese, molybdenum, nickel, silicon, titanium, and mixtures thereof.

29. The corrosion-resistant metal strip as defined in claim 25, wherein said metal alloy coating includes at least one metal additive to positively affect the chemical and/or physical properties of said metal alloy coating; said metal additive including a metal selected from the group consisting of aluminum, antimony, bismuth, chromium, copper, lead, magnesium, manganese, molybdenum, nickel, silicon, titanium, and mixtures thereof.

30. The corrosion-resistant metal strip as defined in claim 27, wherein said metal alloy coating includes at least one metal additive to positively affect the chemical and/or physical properties of said metal alloy coating; said metal additive including a metal selected from the group consisting of aluminum, antimony, bismuth, chromium, copper, lead, magnesium, manganese, molybdenum, nickel, silicon, titanium, and mixtures thereof.

31. The corrosion-resistant metal strip as defined in claim 20, wherein said metal alloy comprises:

| | |
|---|---|
| Tin | 15–90 |
| Zinc | 9–85 |
| Aluminum | 0–2 |
| Antimony | 0–2 |
| Bismuth | 0–1.7 |
| Copper | 0–2 |
| Iron | 0–1 |
| Magnesium | 0–2 |
| Nickel | 0–2 |
| Titanium | 0–1. |

32. The corrosion-resistant metal strip as defined in claim 30, wherein said metal alloy comprises:

| | |
|---|---|
| Tin | 15–90 |
| Zinc | 9–85 |
| Aluminum | 0–2 |
| Antimony | 0–2 |
| Bismuth | 0–1.7 |
| Copper | 0–2 |
| Iron | 0–1 |
| Magnesium | 0–2 |
| Nickel | 0–2 |
| Titanium | 0–1. |

33. The corrosion-resistant metal strip as defined in claim 31, wherein said metal alloy comprises:

| | |
|---|---|
| Tin | 45–55 |
| Zinc | 45–55 |
| Aluminum | 0–2 |
| Antimony | 0–2 |
| Bismuth | 0–1.7 |
| Boron | 0–0.01 |
| Cadmium | 0–0.1 |
| Carbon | 0–0.5 |
| Chromium | 0–0.5 |
| Copper | 0–2 |
| Iron | 0–1 |
| Lead | 0–0.5 |
| Magnesium | 0–0.4 |
| Manganese | 0–0.1 |
| Molybdenum | 0–0.1 |
| Nickel | 0–2 |
| Silicon | 0–0.5 |
| Titanium | 0–1 |
| Vanadium | 0–0.1. |

34. The corrosion-resistant metal strip as defined in claim 32, wherein said metal alloy comprises:

| | |
|---|---|
| Tin | 45–55 |
| Zinc | 45–55 |
| Aluminum | 0–2 |
| Antimony | 0–2 |
| Bismuth | 0–1.7 |
| Boron | 0–0.01 |
| Cadmium | 0–0.1 |
| Carbon | 0–0.5 |
| Chromium | 0–0.5 |
| Copper | 0–2 |

-continued

| | |
|---|---|
| Iron | 0–1 |
| Lead | 0–0.5 |
| Magnesium | 0–0.4 |
| Manganese | 0–0.1 |
| Molybdenum | 0–0.1 |
| Nickel | 0–2 |
| Silicon | 0–0.5 |
| Titanium | 0–1 |
| Vanadium | 0–0.1. |

35. A corrosion-resistant metal strip having a copper base metal strip coated with a multi-phase tin-zinc alloy coating and a heat created intermetallic layer formed between said copper base metal strip and said tin-zinc alloy coating, said metal alloy including at least about 15 weight percent tin and at least an amount of zinc to form said multi-phase tin-zinc alloy, said tin content plus said zinc content at least about 90 weight percent, said tin-zinc alloy including at least one metal additive to positively affect the chemical and/or physical properties of said tin-zinc alloy, said metal additive including a metal selected from the group consisting of aluminum, antimony, bismuth, chromium, copper, lead, magnesium, manganese, molybdenum, nickel, silicon, titanium, and mixtures thereof, said copper base metal strip having an average thickness of about 381–1270 microns, said tin-zinc coating having an average thickness of about 2–77 microns, said heat created intermetallic layer including a majority of copper plus zinc and having an average thickness of about 0.3–20 microns, said thickness of said tin-zinc alloy coating being greater than said thickness of said heat created intermetallic layer.

36. The corrosion-resistant metal strip as defined in claim 35, wherein said metal alloy coating has an average thickness of less than about 30 microns.

37. The corrosion-resistant metal strip as defined in claim 35, wherein said heat created intermetallic layer includes at least about 75 weight percent copper plus zinc.

38. The corrosion-resistant metal strip as defined in claim 36, wherein said heat created intermetallic layer includes at least about 75 weight percent copper plus zinc.

39. The corrosion-resistant metal strip as defined in claim 35, wherein said metal alloy coating includes at least about 20 weight percent zinc.

40. The corrosion-resistant metal strip as defined in claim 38, wherein said metal alloy coating includes at least about 20 weight percent zinc.

41. The corrosion-resistant metal strip as defined in claim 35, wherein said metal alloy comprises:

| | |
|---|---|
| Tin | 15–90 |
| Zinc | 9–85 |
| Aluminum | 0–2 |
| Antimony | 0–2 |
| Bismuth | 0–1.7 |
| Copper | 0–2 |
| Iron | 0–1 |
| Magnesium | 0–2 |
| Nickel | 0–2 |
| Titanium | 0–1. |

42. The corrosion-resistant metal strip as defined in claim 40, wherein said metal alloy comprises:

| | |
|---|---|
| Tin | 15–90 |
| Zinc | 9–85 |
| Aluminum | 0–2 |
| Antimony | 0–2 |
| Bismuth | 0–1.7 |
| Copper | 0–2 |
| Iron | 0–1 |
| Magnesium | 0–2 |
| Nickel | 0–2 |
| Titanium | 0–1. |

43. The corrosion-resistant metal strip as defined in claim 41, wherein said metal alloy comprises:

| | |
|---|---|
| Tin | 45–55 |
| Zinc | 45–55 |
| Aluminum | 0–2 |
| Antimony | 0–2 |
| Bismuth | 0–1.7 |
| Boron | 0–0.01 |
| Cadmium | 0–0.1 |
| Carbon | 0–0.5 |
| Chromium | 0–0.5 |
| Copper | 0–2 |
| Iron | 0–1 |
| Lead | 0–0.5 |
| Magnesium | 0–0.4 |
| Manganese | 0–0.1 |
| Molybdenum | 0–0.1 |
| Nickel | 0–2 |
| Silicon | 0–0.5 |
| Titanium | 0–1 |
| Vanadium | 0–0.1. |

44. The corrosion-resistant metal strip as defined in claim 42, wherein said metal alloy comprises:

| | |
|---|---|
| Tin | 45–55 |
| Zinc | 45–55 |
| Aluminum | 0–2 |
| Antimony | 0–2 |
| Bismuth | 0–1.7 |
| Boron | 0–0.01 |
| Cadmium | 0–0.1 |
| Carbon | 0–0.5 |
| Chromium | 0–0.5 |
| Copper | 0–2 |
| Iron | 0–1 |
| Lead | 0–0.5 |
| Magnesium | 0–0.4 |
| Manganese | 0–0.1 |
| Molybdenum | 0–0.1 |
| Nickel | 0–2 |
| Silicon | 0–0.5 |
| Titanium | 0–1 |
| Vanadium | 0–0.1. |

* * * * *